(12) United States Patent
DeHon

(10) Patent No.: US 11,340,902 B2
(45) Date of Patent: *May 24, 2022

(54) TECHNIQUES FOR METADATA PROCESSING

(71) Applicant: The Charles Stark Draper Laboratory, Inc., Cambridge, MA (US)

(72) Inventor: Andre' DeHon, Philadelphia, PA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,172

(22) Filed: Nov. 14, 2019

(65) Prior Publication Data

US 2020/0089500 A1 Mar. 19, 2020

Related U.S. Application Data

(60) Continuation of application No. 16/002,987, filed on Jun. 7, 2018, now Pat. No. 10,521,230, which is a (Continued)

(51) Int. Cl.
*G06F 9/30* (2018.01)
*G06F 9/38* (2018.01)
(Continued)

(52) U.S. Cl.
CPC ...... *G06F 9/30101* (2013.01); *G06F 9/30072* (2013.01); *G06F 9/30098* (2013.01);
(Continued)

(58) Field of Classification Search
CPC ............. G06F 12/0875; G06F 12/1408; G06F 12/1458; G06F 15/78; G06F 21/52;
(Continued)

(56) References Cited

U.S. PATENT DOCUMENTS 5,201,056 A 4/1993 Daniel
5,377,336 A 12/1994 Eickemeyer
(Continued)

FOREIGN PATENT DOCUMENTS

CN 101558388 10/2009
CN 102160033 8/2011
(Continued)

OTHER PUBLICATIONS

Search Query Report from IP.com (performed Nov. 21, 2020). (Year: 2020).*

(Continued)

*Primary Examiner* — Sharon S Lynch

(74) *Attorney, Agent, or Firm* — Hamilton, Brook, Smith & Reynolds, P.C.

(57) ABSTRACT

A method of and system for performing metadata tag compression in security policy enforcement system may comprise conveying a set of data elements, each with an associated metadata tag, from a first processor subsystem to a second processor subsystem. The first processor subsystem may be configured to process conventional tasks, the second processor configured to apply one or more policy decisions to the data element. The conveying may further comprise sending the set of data elements along with an index element that identifies one or more metadata tags, and sending one or more of the metadata tags identified by the index element.

20 Claims, 90 Drawing Sheets

Related U.S. Application Data continuation of application No. 15/695,541, filed on Sep. 5, 2017, now Pat. No. 10,261,794, which is a division of application No. 15/426,098, filed on Feb. 7, 2017, now Pat. No. 9,785,440, which is a continuation of application No. 15/168,689, filed on May 31, 2016, now Pat. No. 10,235,176.

(60) Provisional application No. 62/270,187, filed on Dec. 21, 2015, provisional application No. 62/268,639, filed on Dec. 17, 2015.

(51) Int. Cl.
*G06F 12/0875* (2016.01)
*G06F 12/14* (2006.01)
*G06F 21/52* (2013.01)
*G06F 21/62* (2013.01)
*G06F 15/78* (2006.01)

(52) U.S. Cl.
CPC ........ *G06F 9/3867* (2013.01); *G06F 12/0875* (2013.01); *G06F 12/1408* (2013.01); *G06F 12/1458* (2013.01); *G06F 15/78* (2013.01); *G06F 21/52* (2013.01); *G06F 21/6218* (2013.01); *G06F 2212/1052* (2013.01); *G06F 2212/402* (2013.01); *G06F 2212/452* (2013.01)

(58) Field of Classification Search
CPC ........ G06F 21/6218; G06F 2212/1052; G06F 2212/402; G06F 2212/452; G06F 9/30072; G06F 9/30098; G06F 9/30101; G06F 9/3867
See application file for complete search history.

(56) References Cited

U.S. PATENT DOCUMENTS

| | | | |
|---|---|---|---|
| 5,521,910 A * | 5/1996 | Matthews | H04L 12/5602 370/256 |
| 5,559,952 A | 9/1996 | Fujimoto | |
| 5,664,197 A * | 9/1997 | Kardach | G06F 13/28 710/107 |
| 5,664,223 A * | 9/1997 | Bender | G06F 13/28 710/22 |
| 5,764,946 A | 6/1998 | Tran | |
| 5,778,423 A | 7/1998 | Sites | |
| 5,848,433 A | 12/1998 | Tran | |
| 5,890,008 A | 3/1999 | Panwar | |
| 5,941,981 A | 8/1999 | Tran | |
| 6,014,734 A | 1/2000 | Tran | |
| 6,035,374 A | 3/2000 | Panwar | |
| 6,058,466 A | 5/2000 | Panwar | |
| 6,240,502 B1 | 5/2001 | Panwar | |
| 6,269,436 B1 | 7/2001 | Tran | |
| 6,298,432 B1 | 10/2001 | Goto | |
| 6,321,297 B1 | 11/2001 | Shamanna | |
| 6,324,599 B1 * | 11/2001 | Zhou | G06F 13/28 710/22 |
| 6,351,784 B1 * | 2/2002 | Neal | G06F 13/36 710/108 |
| 6,438,673 B1 | 8/2002 | Jourdan | |
| 6,449,714 B1 | 9/2002 | Sinharoy | |
| 6,549,903 B1 | 4/2003 | Babaian | |
| 6,549,959 B1 * | 4/2003 | Yates | G06F 9/45554 710/1 |
| 6,625,146 B1 * | 9/2003 | Merchant | H04L 47/6215 370/349 |
| 6,636,523 B1 * | 10/2003 | Lau | H04L 47/30 370/230 |
| 6,922,740 B2 * | 7/2005 | Kondratiev | G06F 13/28 709/212 |
| 6,976,147 B1 | 12/2005 | Isaac | |
| 7,047,394 B1 | 5/2006 | Van Dyke | |
| 7,095,783 B1 | 8/2006 | Sotheran | |
| 7,213,247 B1 | 5/2007 | Wilner | |
| 7,263,572 B2 * | 8/2007 | Hiji | G06F 13/28 710/308 |
| 7,301,541 B2 | 11/2007 | Hansen | |
| 7,340,469 B1 | 3/2008 | Alghathbar | |
| 7,430,650 B1 | 9/2008 | Ross | |
| 7,434,002 B1 | 10/2008 | Zedlewski et al. | |
| 7,467,414 B2 * | 12/2008 | Schlesinger | G06F 21/6218 726/27 |
| 7,487,264 B2 * | 2/2009 | Pandya | H04L 69/166 709/250 |
| 7,574,536 B2 * | 8/2009 | Johnsen | G06F 13/28 709/212 |
| 7,580,914 B2 | 8/2009 | Wang | |
| 7,581,064 B1 | 8/2009 | Zedlewski et al. | |
| 7,631,107 B2 * | 12/2009 | Pandya | H04L 29/06 370/389 |
| 7,688,838 B1 * | 3/2010 | Aloni | G06F 13/385 370/395.7 |
| 7,813,342 B2 * | 10/2010 | Gadelrab | H04L 49/90 370/389 |
| 7,886,148 B2 * | 2/2011 | Kiriansky | G06F 21/53 713/166 |
| 8,074,052 B2 | 12/2011 | Tadonato | |
| 8,121,828 B2 * | 2/2012 | Yates, Jr. | G06F 9/45533 703/26 |
| 8,127,121 B2 * | 2/2012 | Yates, Jr. | G06F 9/30189 712/244 |
| 8,131,663 B1 | 3/2012 | Taylor | |
| 8,131,762 B2 * | 3/2012 | Smetters | G06F 16/2453 707/781 |
| 8,166,404 B2 | 4/2012 | Grinstein | |
| 8,271,447 B1 | 9/2012 | Natanson | |
| 8,326,774 B2 * | 12/2012 | Candelore | G06F 21/10 705/50 |
| 8,346,760 B2 | 1/2013 | Wang | |
| 8,364,910 B2 | 1/2013 | Wilkerson | |
| 8,380,933 B2 | 2/2013 | Uchiyama | |
| 8,423,720 B2 * | 4/2013 | Doring | G06F 12/0862 710/305 |
| 8,516,193 B1 * | 8/2013 | Clinton | H04L 67/1097 711/118 |
| 8,543,606 B2 * | 9/2013 | Pulfer | G06F 16/93 707/785 |
| 8,572,410 B1 | 10/2013 | Tkacik | |
| 8,677,457 B2 | 3/2014 | Fullerton | |
| 8,701,200 B2 * | 4/2014 | Naldurg | G06F 21/577 726/25 |
| 8,738,860 B1 * | 5/2014 | Griffin | G06F 12/0897 711/122 |
| 8,756,185 B2 | 6/2014 | Dawson | |
| 8,788,792 B2 * | 7/2014 | Yates, Jr. | G06F 9/3861 712/209 |
| 8,826,391 B2 | 9/2014 | Tkacik | |
| 8,874,850 B1 * | 10/2014 | Goodson | G06F 12/0893 711/133 |
| 8,875,170 B1 * | 10/2014 | Daniel | H04N 21/2541 725/25 |
| 8,887,230 B2 | 11/2014 | Barton | |
| 8,904,477 B2 | 12/2014 | Barton | |
| 9,026,733 B1 * | 5/2015 | Clinton | G06F 12/0868 711/118 |
| 9,165,078 B2 | 10/2015 | Bester | |
| 9,208,082 B1 | 12/2015 | Cheriton et al. | |
| 9,219,752 B2 * | 12/2015 | Balinsky | G06F 21/6245 |
| 9,251,052 B2 | 2/2016 | Talagala et al. | |
| 9,311,093 B2 | 4/2016 | Gschwind | |
| 9,317,708 B2 * | 4/2016 | Lee | G06F 21/6218 |
| 9,467,474 B2 | 10/2016 | Barton | |
| 9,507,598 B1 | 11/2016 | Bonanno | |
| 9,525,606 B1 * | 12/2016 | Staggs | H04L 69/22 |
| 9,571,509 B1 | 2/2017 | Satish | |
| 9,576,147 B1 | 2/2017 | McClintock | |
| 9,665,603 B2 | 5/2017 | Bester | |
| 9,680,738 B2 | 6/2017 | Jackson | |

(56) References Cited

U.S. PATENT DOCUMENTS

| | | |
|---|---|---|
| 9,736,185 B1 | 8/2017 | Belamaric |
| 9,785,440 B2 | 10/2017 | DeHon |
| 9,792,472 B1 | 10/2017 | Robshaw |
| 9,906,557 B2 | 2/2018 | Hsiung |
| 9,953,095 B1* | 4/2018 | Scott .................. G06F 16/955 |
| 10,073,977 B2* | 9/2018 | Pappachan .......... G06F 16/2365 |
| 10,078,763 B2* | 9/2018 | Chiricescu .............. G06F 21/71 |
| 10,235,176 B2 | 3/2019 | DeHon |
| 10,261,794 B2 | 4/2019 | DeHon |
| 10,424,043 B1 | 9/2019 | Koston |
| 10,521,230 B2 | 12/2019 | DeHon |
| 10,545,760 B2 | 1/2020 | DeHon |
| 10,642,616 B2 | 5/2020 | DeHon |
| 10,719,630 B2 | 7/2020 | Chiricescu |
| 10,725,778 B2 | 7/2020 | DeHon |
| 10,754,650 B2 | 8/2020 | DeHon |
| 10,936,713 B2 | 3/2021 | DeHon |
| 11,150,910 B2 | 10/2021 | Milburn et al. |
| 11,182,162 B2 | 11/2021 | DeHon et al. |
| 2002/0083298 A1 | 6/2002 | Cook |
| 2002/0087795 A1 | 7/2002 | Hum |
| 2002/0124156 A1 | 9/2002 | Yoaz |
| 2003/0014466 A1 | 1/2003 | Berger |
| 2003/0023783 A1* | 1/2003 | Arimilli ................ G06F 13/28 710/22 |
| 2003/0058889 A1* | 3/2003 | Lansing ................ H04L 69/04 370/471 |
| 2003/0120892 A1 | 6/2003 | Hum |
| 2003/0145235 A1 | 7/2003 | Choo |
| 2003/0149895 A1 | 8/2003 | Choo |
| 2003/0172109 A1 | 9/2003 | Dalton |
| 2003/0196108 A1 | 10/2003 | Kung |
| 2004/0015845 A1 | 1/2004 | Hickman |
| 2004/0117599 A1 | 6/2004 | Mittal |
| 2004/0133777 A1* | 7/2004 | Kiriansky ............... G06F 21/53 713/166 |
| 2004/0236876 A1* | 11/2004 | Kondratiev ............. G06F 13/28 710/22 |
| 2004/0255267 A1 | 12/2004 | Meijer |
| 2005/0055565 A1* | 3/2005 | Fournet ................ G06F 21/577 726/26 |
| 2005/0108518 A1 | 5/2005 | Pandya |
| 2005/0149521 A1 | 7/2005 | Wang |
| 2005/0154838 A1 | 7/2005 | DeWitt et al. |
| 2006/0059567 A1 | 3/2006 | Bird |
| 2006/0080489 A1* | 4/2006 | Hiji .................... G06F 13/4059 710/306 |
| 2006/0080553 A1* | 4/2006 | Hall .................... G06F 21/6227 713/189 |
| 2006/0090084 A1 | 4/2006 | Buer |
| 2006/0143689 A1 | 6/2006 | Yu |
| 2006/0242332 A1* | 10/2006 | Johnsen .................. G06F 13/28 710/22 |
| 2006/0248599 A1 | 11/2006 | Sack |
| 2006/0277392 A1* | 12/2006 | Bittner, Jr. .............. G06F 9/325 712/25 |
| 2007/0006294 A1 | 1/2007 | Hunter |
| 2007/0050586 A1 | 3/2007 | Shin |
| 2007/0261033 A1 | 11/2007 | Chen |
| 2007/0279264 A1 | 12/2007 | Nakagawa |
| 2008/0010233 A1 | 1/2008 | Sak |
| 2008/0016547 A1 | 1/2008 | Anderson |
| 2008/0028196 A1* | 1/2008 | Kailas .................. G06F 9/3855 712/245 |
| 2008/0052488 A1 | 2/2008 | Fritz |
| 2008/0126841 A1 | 5/2008 | Benhanokh et al. |
| 2008/0168529 A1 | 7/2008 | Anderson |
| 2008/0216073 A1* | 9/2008 | Yates .................. G06F 9/30189 718/100 |
| 2008/0216102 A1 | 9/2008 | Quinn |
| 2008/0222397 A1* | 9/2008 | Wilkerson .......... G06F 12/1483 712/220 |
| 2008/0240111 A1* | 10/2008 | Gadelrab ............ H04L 49/9063 370/395.7 |
| 2008/0244232 A1 | 10/2008 | Sherman |
| 2008/0250216 A1 | 10/2008 | Kershaw |
| 2008/0282040 A1* | 11/2008 | Doring ................ G06F 12/0862 711/E12.017 |
| 2008/0282093 A1* | 11/2008 | Hatakeyama ....... G06F 12/1416 713/190 |
| 2008/0288941 A1 | 11/2008 | Adams |
| 2008/0301256 A1* | 12/2008 | McWilliams ....... G06F 12/0806 709/214 |
| 2008/0301471 A1* | 12/2008 | Demarest ................ H04L 63/12 713/193 |
| 2008/0320235 A1 | 12/2008 | Beckmann |
| 2009/0006519 A1 | 1/2009 | Nandan |
| 2009/0063951 A1 | 3/2009 | Rjaibi |
| 2009/0097815 A1 | 4/2009 | Lahr |
| 2009/0113132 A1 | 4/2009 | Cain |
| 2009/0113135 A1 | 4/2009 | Cain |
| 2009/0144388 A1 | 6/2009 | Gross |
| 2009/0164705 A1 | 6/2009 | Gorobets |
| 2009/0164766 A1* | 6/2009 | Suggs ................... G06F 9/3848 712/240 |
| 2009/0178102 A1 | 7/2009 | Alghathbar |
| 2009/0204785 A1 | 8/2009 | Yates |
| 2009/0241097 A1 | 9/2009 | Wang |
| 2009/0254543 A1 | 10/2009 | Ber |
| 2010/0011209 A1* | 1/2010 | Kiriansky ............... G06F 21/53 713/166 |
| 2010/0049974 A1 | 2/2010 | Winjum |
| 2010/0138613 A1 | 6/2010 | Parker |
| 2010/0154026 A1 | 6/2010 | Chatterjee et al. |
| 2010/0019192 A1 | 7/2010 | Dickey |
| 2010/0169382 A1 | 7/2010 | Scheaffer |
| 2010/0191922 A1 | 7/2010 | Dickey et al. |
| 2010/0022869 A1 | 9/2010 | Dawson |
| 2010/0025072 A1 | 9/2010 | Morris |
| 2010/0228693 A1 | 9/2010 | Dawson et al. |
| 2010/0235580 A1 | 9/2010 | Bouvier |
| 2010/0250729 A1 | 9/2010 | Morris |
| 2010/0332716 A1 | 12/2010 | Sheaffer et al. |
| 2011/0078369 A1 | 3/2011 | Patel |
| 2011/0078389 A1 | 3/2011 | Patel et al. |
| 2011/0099336 A1 | 4/2011 | Yasufuku |
| 2011/0126265 A1 | 5/2011 | Fullerton |
| 2011/0161623 A1 | 6/2011 | Eichenberger |
| 2011/0219424 A1 | 9/2011 | Panasyuk |
| 2012/0036507 A1 | 2/2012 | Jonnala et al. |
| 2012/0079458 A1 | 3/2012 | Williams |
| 2012/0117610 A1* | 5/2012 | Pandya .................. H04L 69/32 726/1 |
| 2012/0144167 A1* | 6/2012 | Yates, Jr. ............ G06F 9/30174 712/216 |
| 2012/0151184 A1 | 6/2012 | Wilkerson |
| 2012/0180031 A1 | 7/2012 | Eichenberger |
| 2012/0203970 A1 | 8/2012 | Biran |
| 2012/0210066 A1* | 8/2012 | Joshi .................... G06F 12/0811 711/118 |
| 2012/0210068 A1* | 8/2012 | Joshi .................... G06F 9/45558 711/122 |
| 2012/0236756 A1 | 9/2012 | Bennett |
| 2012/0297057 A1 | 11/2012 | Ghosh |
| 2013/0006993 A1 | 1/2013 | Kobayashi |
| 2013/0016075 A1 | 1/2013 | Schlesinger |
| 2013/0067593 A1* | 3/2013 | Candelore ................ G06F 21/10 726/27 |
| 2013/0081134 A1 | 3/2013 | Glew |
| 2013/0097667 A1* | 4/2013 | Pulfer ................ G06F 21/6218 726/1 |
| 2013/0138892 A1 | 5/2013 | Loh et al. |
| 2013/0160075 A1* | 6/2013 | Schlesinger ........ G06F 21/6218 726/1 |
| 2013/0185475 A1 | 7/2013 | Talagala et al. |
| 2013/0185488 A1* | 7/2013 | Talagala ............ G06F 12/0246 711/103 |
| 2013/0227218 A1 | 8/2013 | Chang |
| 2013/0283017 A1* | 10/2013 | Wilkerson .......... G06F 12/1483 712/225 |
| 2013/0290607 A1 | 10/2013 | Chang et al. |
| 2014/0006804 A1 | 1/2014 | Tkacik |

(56) References Cited

U.S. PATENT DOCUMENTS

| | | | |
|---|---|---|---|
| 2014/0019385 A1 | 1/2014 | Dawson | |
| 2014/0047181 A1 | 2/2014 | Peterson | |
| 2014/0047183 A1 | 2/2014 | Chawla | |
| 2014/0101396 A1 | 4/2014 | Bonnano | |
| 2014/0140342 A1* | 5/2014 | Narad | G06F 9/30145 370/389 |
| 2014/0173211 A1* | 6/2014 | Loh | G06F 12/0842 711/129 |
| 2014/0223445 A1* | 8/2014 | Beckmann | G06F 9/5011 718/104 |
| 2014/0280248 A1 | 9/2014 | Bester | |
| 2014/0282832 A1* | 9/2014 | Chanoch | H04L 63/1408 726/1 |
| 2014/0283040 A1* | 9/2014 | Wilkerson | G06F 21/52 726/22 |
| 2104/0283107 | 9/2014 | Walton | |
| 2015/0012689 A1* | 1/2015 | Atkisson | G06F 12/0246 711/103 |
| 2015/0046658 A1 | 2/2015 | Wilson | |
| 2015/0058997 A1 | 2/2015 | Lee | |
| 2015/0089186 A1 | 3/2015 | Kim | |
| 2015/0092778 A1* | 4/2015 | Jackson | H04L 45/64 370/392 |
| 2015/0120699 A1* | 4/2015 | Faerber | G06F 16/221 707/718 |
| 2015/0205535 A1* | 7/2015 | Joshi | G06F 3/0613 711/103 |
| 2015/0220453 A1* | 8/2015 | Heisswolf | G06F 12/1441 726/27 |
| 2015/0249668 A1 | 9/2015 | Reddy | |
| 2015/0278311 A1* | 10/2015 | Isherwood | G06F 16/245 707/741 |
| 2015/0339062 A1* | 11/2015 | Toyoda | G06F 12/0859 711/118 |
| 2015/0339329 A1 | 11/2015 | Bester | |
| 2015/0378780 A1 | 12/2015 | Busaba | |
| 2015/0381660 A1 | 12/2015 | Hsiung | |
| 2016/0048551 A1* | 2/2016 | Baldwin | H04L 67/2847 707/756 |
| 2106/0048551 | 2/2016 | Baldwin | |
| 2016/0062803 A1* | 3/2016 | Beckmann | G06F 12/0875 718/104 |
| 2016/0077816 A1 | 3/2016 | Eilam | |
| 2016/0092702 A1 | 3/2016 | Durham | |
| 2016/0132536 A1 | 5/2016 | Lee | |
| 2016/0140363 A1* | 5/2016 | Chiricescu | G06F 21/64 726/1 |
| 2016/0154833 A1* | 6/2016 | Isherwood, Jr. | G06F 16/24573 707/741 |
| 2016/0170769 A1 | 6/2016 | LeMay | |
| 2016/0188891 A1* | 6/2016 | Schlesinger | G06F 21/00 726/1 |
| 2016/0196432 A1 | 7/2016 | Main | |
| 2016/0239223 A9* | 8/2016 | Joshi | G06F 12/0888 |
| 2016/0274810 A1 | 9/2016 | Godard et al. | |
| 2016/0335187 A1 | 12/2016 | Godard | |
| 2016/0350019 A1 | 12/2016 | Koufaty | |
| 2016/0350230 A1 | 12/2016 | Murphy | |
| 2016/0366102 A1 | 12/2016 | Smith | |
| 2016/0371496 A1 | 12/2016 | Sell | |
| 2017/0024568 A1* | 1/2017 | Pappachan | G06F 21/64 |
| 2017/0048249 A1 | 2/2017 | Berrange | |
| 2017/0061160 A1 | 2/2017 | Simonov | |
| 2017/0083338 A1 | 3/2017 | Burger | |
| 2017/0091107 A1 | 3/2017 | Peterson | |
| 2017/0126687 A1 | 5/2017 | Martinelli | |
| 2017/0126738 A1* | 5/2017 | Wilkerson | G06F 12/145 |
| 2017/0177367 A1 | 6/2017 | DeHon | |
| 2017/0192986 A1* | 7/2017 | Isherwood | G06F 16/164 |
| 2017/0220806 A1 | 8/2017 | Munoz | |
| 2017/0235840 A1 | 8/2017 | Bester | |
| 2017/0286119 A1 | 10/2017 | Al Sheikh | |
| 2017/0293563 A1 | 10/2017 | DeHon | |
| 2017/0308480 A1 | 10/2017 | Wilson | |
| 2017/0329961 A1 | 11/2017 | Shanbhogue | |
| 2018/0011708 A1* | 1/2018 | DeHon | G06F 12/0875 |
| 2018/0046579 A1 | 2/2018 | Greenspan | |
| 2018/0189062 A1 | 7/2018 | Baghsorkhi | |
| 2018/0302443 A1 | 10/2018 | Weiss | |
| 2018/0336031 A1* | 11/2018 | DeHon | G06F 15/78 |
| 2018/0336032 A1* | 11/2018 | DeHon | G06F 15/78 |
| 2018/0336033 A1* | 11/2018 | DeHon | G06F 12/1458 |
| 2018/0341490 A1* | 11/2018 | DeHon | G06F 12/1408 |
| 2019/0034665 A1* | 1/2019 | Chiricescu | G06F 21/64 |
| 2019/0155606 A1 | 5/2019 | Rotem | |
| 2019/0171457 A1 | 6/2019 | DeHon | |
| 2019/0213322 A1 | 7/2019 | DeHon | |
| 2019/0243655 A1 | 8/2019 | Milburn | |
| 2019/0243768 A1 | 8/2019 | Doshi | |
| 2019/0384604 A1 | 12/2019 | DeHon | |
| 2020/0154026 A1 | 5/2020 | Yu | |
| 2020/0201576 A1 | 6/2020 | Yudanov | |
| 2020/0387374 A1 | 12/2020 | DeHon | |
| 2021/0004231 A1 | 1/2021 | DeHon | |
| 2021/0026934 A1 | 1/2021 | Boling et al. | |
| 2021/0042100 A1 | 2/2021 | Wang | |
| 2021/0073375 A1 | 3/2021 | Wang | |
| 2021/0406028 A1 | 12/2021 | Boling et al. | |
| 2022/0043654 A1 | 2/2022 | DeHon et al. | |

FOREIGN PATENT DOCUMENTS

| | | |
|---|---|---|
| CN | 104794067 | 7/2019 |
| GB | 2519608 S | 4/2015 |
| JP | 2013-242633 A | 12/2013 |
| WO | 2010028316 A1 | 3/2010 |
| WO | 2015047295 A1 | 4/2015 |
| WO | 2015183481 A1 | 12/2015 |
| WO | 2017106101 A1 | 6/2017 |
| WO | 2017106103 A1 | 6/2017 |
| WO | 2019152795 A1 | 8/2019 |
| WO | 2020097177 A1 | 5/2020 |
| WO | 2020150351 A1 | 7/2020 |
| WO | 2021076871 A1 | 4/2021 |
| WO | 2021092138 A1 | 5/2021 |

OTHER PUBLICATIONS

Search Report from IP.com (conducted May 21, 2021) (Year: 2021).*

Search Query Report from IP.com (performed Nov. 19, 2021) (Year: 2021).*

Search Query Report from IP.com (performed Mar. 10, 2022) (Year: 2022).*

Zeldovich et. al, Hardware Enforcement of Application Security Policies Using Tagged Memory, Proceedings of the 8th USENIX conference on Operating systems design and implementation pp. 225-240 (2008).

Tiwari et. al, A Small Cache of Large Ranges: Hardware Methods for Efficiently Searching, Storing, and Updating Big V Dataflow Tags, Proceedings of the 41st annual IEEE/ACM International Symposium on Microarchitecture, pp. 94-105 (2008).

Search Query Report from IP.Com (performed Mar. 15, 2020).

Dhawan, et al. "Architectural Support for Software-Defined Metadata Processing", ACM, Mar. 2015.

Evans, et al., "Melding Security Metadata between software and hardware", ACM, Dec. 2012.

Woodruff, J., et al., "A RISC cabality machine for practical memory safety", Univ of Cambridge, Jul. 2014.

Juglaret, et al., "Towards a Fully Abstract Complier Using Micro-Policies", Secure Compilation for Mutaully Distrustful Component, Oct. 2015.

Watson, et al., "Capability Hardware Enhanced RISC Instructions: CHERI Instruction-Set Architecture", Univ. of Cambridge, Sep. 2015.

Dhawan, et al. "PUMP: A Programmable Unit for Metada Processing, In Proceedings of the 3rd International Workshop on Hardware and Architectural Support for Security and Privacy", Jun. 2014.

(56) References Cited

OTHER PUBLICATIONS

DeAmorim, et al, Micro-Policies: Formally Verified, Tag-Based Security Monitors:, 2015 IEEE Symposium on Security and Privacy, pp. 813-830, May 1, 2015.
Slides from presentation Dover: A Metadata-extended RISC-V, RISC-V Workshop, Oracle Conference Center in Redwood Shores, CA. Jan. 6, 2016.
Dhawan, et al., "Area-Efficient Near-Associative Memories on FPGAs", University of Pennsylvania, ACM Transactions on Reconfigurable Technology and Systems, vol. 7, No. 4, Art. 3, Jan. 2015.
Dhawan, et al., "Architectural Support for Software-Defined Metadata Processing," University of Pennsylvania, ASPLOS, Mar. 14-18, 2015.
Jia Song et al., Security Tagging for a Zero-Kernel Operating System, IEEE, 2013.
Sullivan, et al., "The Dover Inherently Secure Processor", University of Pennsylvania, IEEE,Apr. 25-27, 2017.
Alves-Foss et al., Evaluating the Use of Security Tags in Security Policy Enforcement Mechanisms, IEEE, 2015.
Amorim etal., A Verified Information-Flow Architecture, ACM, Jan. 2014.
International Search Report for PCT/US2016/066194 dated Apr. 7, 2017, entitled "Techniques for Metadata Processing".
International Search Report for PCT/US2016/066188 dated Jul. 13, 2017, entitled "Techniques for Metadata Processing".
International Search Report for PCT/US2019016242 dated Mar. 29, 2019, entitled "Systems and Methods for Policy Execution Processing".
Kannan, H., et al., "Decoupling Dynamic Information Flow Tracking with a Dedicated Coprocessor", IEEE, 2009.
Google Search Results—"metadata processing with tag and cache of rules"; Jan. 13, 2021.
International Search Report and Written Opinion received for PCT Patent Application No. PCT/US2019/016272, dated Apr. 8, 2019, 11 pages.
International Search Report and Written Opinion received for PCT Patent Application No. PCT/US2019/016295, dated Jun. 26, 2019, 16 pages.
Mambretti Andrea et al: "Trellis: Privilege Separation for Multi-user Applications Made Easy", Sep. 7, 2016 (Sep. 7, 2016), Proc. Int.Conf. Adv. Biometrics (ICB); [Lecture Notes in Computer Science; Lect.Notes Computer], Springer, Berlin, Heidelberg, pp. 437-456.
Search query report from IP.com (performed Apr. 14, 2020).
Song, W., et al., "The 4th lowRISC Release: Tagged Memory and Minion Cores," University of Cambridge, May 10, 2017, retrieved at https://riscv.org/wpcontent/uploads/2017/05/Wed0930riscv201705_ppt.pdf, pp. 1-20.
Search Query Report from IP.com (performed Mar. 11, 2022) (Year: 2022).
Search Query Report from IP.com (performed Mar. 25, 2022) (Year: 2022).

\* cited by examiner

TABLE 1 - Summary of Investigated Policies

| Policy | Threat | Metadata | Max Unique Tags | Tag Check (allow ?) | Tag Propagation Rules | Ref. |
|---|---|---|---|---|---|---|
| NXD+NWC | code injection | DATA or CODE on memory locations | 2 | $CI$=CODE; $MR$/=CODE on write | no | |
| Memory Safety | spatial/temporal memory safety violation on heap | color on pointers; region color + payload color on memory locations | (#mallocs)$^2$ | pointer color == referenced region color | $R \longleftarrow OPi$ on mov/add/sub; $R \longleftarrow payload(MR)$ on load | [17] |
| CFI | control-flow hijacking (JOP/ROP/code reuse) | unique id on each indirect control-flow source and target | #sources+#targets | $(PC,CI) \in$ program's control-flow path | $PC \longleftarrow CI$ on indirect jumps (including call, return) | [4] |
| Taint Tracking | untrusted code, low-integrity data from IO | source-taint-id on instructions and IO; set of input taint-ids on words | $2^{(\#code+IO\ ids)}$ | user-defined check | $R \longleftarrow CI \cup OP1 \cup OP2 \cup MR$ | [47] |
| Composite | all of the above | structure with 4 elements | product of above | all of the above (Alg. 2 with $N=4$) | | |

FIG—14

TABLE 2 - Taxonomy of Tagging Schemes

| Tag Bits | Propagate? | Outputs allow? | Outputs R (result) | PC | Inputs CI | Inputs OP1 | Inputs OP2 | Inputs MR | Usage |
|---|---|---|---|---|---|---|---|---|---|
| 2 | X | soft | X | X | X | X | X | ✓ | memory protection |
| word | X | limited prog. | X | X | X | X | X | ✓ | memory hygiene, stack, isolation |
| 32 | X | limited prog. | X | X | X | X | X | ✓ | unforgeable data, isolation |
| 2 | X | fixed | fixed | X | X | X | X | ✓ | fine-grained synchronization |
| 1 | ✓ | fixed | X | X | X | ✓ | X | X | capabilities |
| 2-8 | ✓ | fixed | fixed | X | X | ✓ | ✓ | X | types |
| 128 | ✓ | fixed | copy | X | X | ✓ | X | ✓ | memory safety |
| 0 | ✓ | software defined | | X | propagate only one | | | | invariant checking |
| 1 | ✓ | fixed | fixed | X | X | ✓ | ✓ | ✓ | taint |
| 4 | ✓ | limited programmability | | X | X | ✓ | ✓ | X | taint, interposition, fault isolation |
| 10 | ✓ | limited prog. | fixed | X | X | ✓ | ✓ | ✓ | taint, isolation |
| unspec. | ✓ | software defined | | X | X | ✓ | ✓ | ✓ | flexible taint |
| 32 | ✓ | software defined | | X | ✓ | ✓ | ✓ | ✓ | programmable, taint, memory checking, reference counting |
| 0-64 | ✓ | software defined | | ✓ | ✓ | ✓ | ✓ | ✓ | information flow, types |
| Unbounded | ✓ | software defined | | ✓ | ✓ | ✓ | ✓ | ✓ | fully programmable, pointer-sized tags |

Propagate = tag propagates with data (✓) or is a property of memory address (X)
allow? = logic for allowing/disallowing operations
R = policy impacts tag of result
PC = programmable tag on program counter
CI = is current instruction tag checked or propagated
OP1, OP2, MR = is tag on these inputs checked or propagated

FIG-15

TABLE 3 - Memory Resource Estimates for the Baseline and Simple PUMP-extended Processors at 32nm node

| Unit | Design | Organization | Area (mm$^2$) | Access Energy Read/Write (pJ) | Static Power (pJ/cyc) | Latency (ps) | Cyc |
|---|---|---|---|---|---|---|---|
| Register File (Int and FP) | Baseline | 64b, 2R1W, {32 Integer, 32 Floating} | 0.002 | 0.3/0.5 | 0.08 | 264 | 1 |
| | 64b tag extended | 128b, 2R1W, {48 Integer, 32 Floating} | 0.007 | 1.0/1.4 | 0.23 | 295 | 1 |
| L1-$ (I and D) | Baseline | 64KB, 4-way, 64B/line | 0.236 | 17/11 | 14.4 | 880 | 1 |
| | 64b tag extended | 64KB, 4-way, 128B/line (eff. 32KB, 64B/line) | 0.244 | 19/14 | 14.5 | 880 | 1 |
| L2-$ (unified) | Baseline | 512KB, 8-way, 64B/line | 1.207 | 393/481 | 0.111 | 4000 | 5 |
| | 64b tag extended | 1MB, 8-way, 128B/line (eff. 512KB, 64B/line) | 2.350 | 758/1223 | 0.214 | 4930 | 5 |
| TLB (I and D) | Either | 1KB, 2-way set assoc. | 0.04 | 3.6/4.5 | 2 | 800 | 1 |
| DRAM | Baseline | 1GB, access 64B line per transfer | - | 15,000 | - | - | 100 |
| | 64b tag extended | 1GB, access 128B line (eff. 64B line per transfer) | - | 31,000 | - | - | 130 |
| L1 PUMP-$ | 64b tag | fully associative 1024 entry, 328b match, 128b out (not used; shown only for reference) | 1.500 | 750/900 | - | 3000 | 4 |
| | | multi-hash 1024 entry, 328b match, 128b out | 0.683 | 51/62 | 32 | 500 | 1 |
| L2 PUMP-$ | 64b tag | multi-hash 4096 entry, 328b match, 128b out | 0.994 | 173/444 | 0.085 | 3300 | 4 |

Total Baseline Area 1.485mm$^2$
Total 64b-tagged Area 4.318mm$^2$ (+190% over baseline)

FIG-16

TABLE 4 - PUMP Parameter Range Table

| Unit | Parameter | Range | Final |
|---|---|---|---|
| L1 PUMP-$ | Capacity | 512-4096 | 1024 |
| | Tag Bits | 8-12 | 10 |
| L2 PUMP-$ | Capacity | 1024-8192 | 4096 |
| | Tag Bits | 13-16 | 14 |
| UCP-$ | Capacity | 512-4096 | 2048 |
| CTAG-$ | Capacity | 128-1024 | 512 |

FIG-17

TABLE 5 - Memory Resource Estimates for the PUMP-Optimized Processors at 32nm node

| Unit | Design | Organization | Area (mm²) | Access Energy Read/Write (pJ) | Static Power (pJ/cyc) | Latency (ps) | Cyc |
|---|---|---|---|---|---|---|---|
| Register File | Extended 10b | 74b, 2R1W, {48 Integer, 32 Floating} | 0.005 | 0.4/0.5 | 0.13 | 360 | 1 |
| L1 Cache | 10b-tag | 74KB, 4-way, 74B/line (eff. 64KB, 64B/line) | 0.272 | 19/13 | 16.4 | 975 | 1 |
| L2 Cache | 14b-tag | 592KB, 8-way, 78B/line (eff. 512KB, 64B/line) | 1.247 | 343/640 | 0.133 | 4600 | 5 |
| TLB | - | 1KB, 2-way set-assoc. | 0.040 | 3.6/4.5 | 2 | 800 | 1 |
| DRAM | 64b-tag | 1GB, access 128B line (move 76B) | - | 17,500 | - | - | 112 |
| L1 PUMP Cache | 10b L1 tag | multihash 1024-entry, 58b match, 20b out | 0.095 | 15/43.2 | 2.22 | 520 | 1 |
| L2 PUMP Cache | 14b L2 tag | multihash 4096-entry, 78b match, 28b out | 0.287 | 99.4/267 | 0.032 | 2800 | 3 |
| full → L2-tag | 64b → 14b | 8K entry, 64b match, 14b out, multihash | 0.432 | 166/436 | 0.052 | 3400 | 4 |
| L2-tag → full | 14b → 64b | 16K x 64 SRAM | 0.216 | 55.5/31.5 | 0.027 | 1700 | 2 |
| L2-tag → L1-tag | 14b → 10b | 16K x 11 SRAM | 0.038 | 8.8/4.7 | 0.004 | 1420 | 2 |
| L1-tag → L2-tag | 10b → 14b | 1K x 14 SRAM | 0.004 | 0.8/1 | 0.0004 | 780 | 1 |
| UCP Cache | 64b tags | multihash 2048-entry, 328b match, 128b out | 0.377 | 196/479 | 0.035 | 2730 | 3 |
| CTAG Cache | 64b tags | multihash 512-entry | 0.107 | 56/139 | 0.009 | 1700 | 2 |

Total Area  3.120mm² (+ 110% over baseline)

FIG-18

Algorithm 1 Taint Tracking Miss Handler (Fragment)

1: switch *(op)*
2:    case add, sub, or:
3:       $PC_{new} \leftarrow PC$
4:       $R \leftarrow$ canonicalize ($CI \cup OP1 \cup OP2$)
5:    *(... cases for other instructions omitted ...)*
6:    default: trap to error handler

FIG-19

Algorithm 2 N - Policy Miss Handler

1: for i=1 to N do
2:    $M_i \leftarrow \{op, PC[i], CI[i], OP1[i], OP2[i], MR[i]\}$
3:    $\{pc_i, res_i\} \leftarrow policy_i(M_i)$
4: $PC_{new} \leftarrow$ canonicalize ($[pc_1, pc_2, ..., pc_N]$)
5: $R \leftarrow$ canonicalize ($[res_1, res_2, ..., res_N]$)

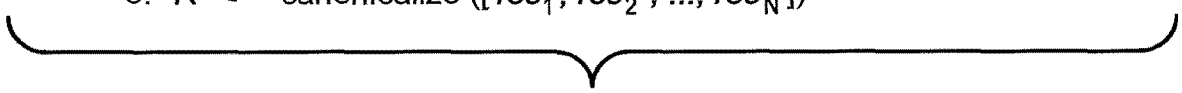

FIG-20

Algorithm 3 N - Policy Miss Handler with HW support

1: for i=1 to N do
2:     $M_i \leftarrow \{op, PC[i], CI[i], OP1[i], OP2[i], MR[i]\}$
3:     $\{hit, pc_i, res_i\} \leftarrow$ UCP-\$$(i, M_i)$
4:     if !*hit* then
5:         $\{pc_i, res_i\} \leftarrow$ policy$_i$ $(M_i)$
6:         insert $\{i, pc_i, res_i\}$ into UCP-\$
7: $pc[1...N] \leftarrow \{pc_1, pc_2, ..., pc_N\}$
8: $\{hit, PC_{new}\} \leftarrow$ CTAG-\$ $(pc[1...N])$
9: if !*hit* then
10:     $PC_{new} \leftarrow$ canonicalize $(pc[1...N])$
11:     insert $\{pc[1...N], PC_{new}\}$ into CTAG-\$
12: $res[1...N] \leftarrow \{res_1, res_2, ..., res_N\}$
13: $\{hit, R\} \leftarrow$ CTAG-\$ $(res[1...N])$
14: if !*hit* then
15:     $R \leftarrow$ canonicalize $(res[1...N])$
16:     insert $\{res[1...N], R\}$ into CTAG-\$

FIG-21

| | Address | Privilege | Name | Description |
|---|---|---|---|---|
| 901a | 0x5C0 | SRW | sboottag | BootstrapTag for OS (cleared on read) |
| 901b | 0x5C1 | SRW | spubumtrust | Public, Untrusted Tag Encoding |
| 901c | 0x5C2 | SRW | sdefaulttag | Default Tag |
| 901d | 0x5C8 | SRW | sopgrpaddr | Address for write to opgroup/care table ((opcode<<3)|funct3) |
| 901e | 0x5C9 | SRW | sopgrpvalue | Data for write to opgroup/care table; write to this CSR triggers insertion into table |
| 901f | 0x5CC | SRW | spumpflush | Write to this CSR triggers PUMP flush |
| 901g | 0x5D0 | SRW | sopgrp | Opgroup for rule miss |
| 901h | 0x5D1 | SRW | spctag | PC tag for rule miss |
| 901i | 0x5D2 | SRW | scitag | CI (current instruction) tag for rule miss |
| 901j | 0x5D3 | SRW | srs1tag | RS1 tag for rule miss |
| 901k | 0x5D4 | SRW | srs2tag | RS2 tag for rule miss |
| 901l | 0x5D5 | SRW | srs3tag | RS3 tag for rule miss |
| 901m | 0x5D6 | SRW | smtag | memory tag for rule miss |
| 901n | 0x5D7 | SRW | sfunct12 | funct12 from instruction |
| 901o | 0x5D8 | SRW | ssubinstr | when a single tag applies to multiple instructions, which one are we executing? (a few bits of the PC) (when instruction length=32, tagged word length=64, this is odd/even) |
| 901p | 0x5E0 | SRW | snewpctag | Tag to place on PC on completion of instruction |
| 901q | 0x5E1 | SRW | srtag | Tag to place on RD register or memory result from instruction; write to this CSR triggers write of rule to PUMP |
| 901r | 0x7C0 | MRW | mtagmode | Mode for PUMP operation |

FIG. 25

| mtagmode Encoding | Operation | Tag Results |
|---|---|---|
| 000 | off | not updated |
| 010 | write default tag on all results | defaulttag |
| 100 | PUMP engaged and operational U only | default prop. or PUMP output |
| 101 | PUMP engaged and operational S, U | default prop. or PUMP output |
| 110 | PUMP engaged and operational H, S, U | default prop. or PUMP output |
| 111 | PUMP engaged and operational M, H, S, U | default prop. or PUMP output |

FIG. 26

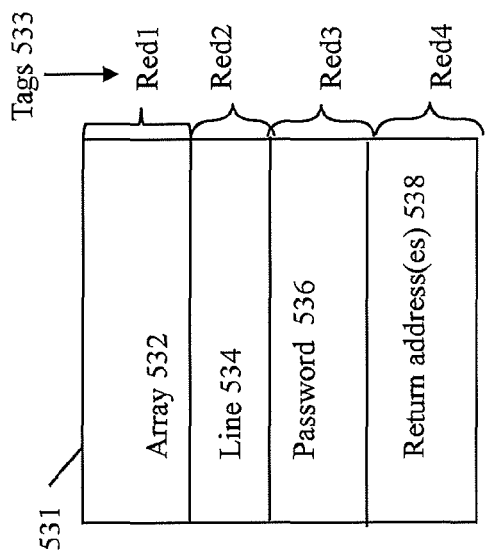
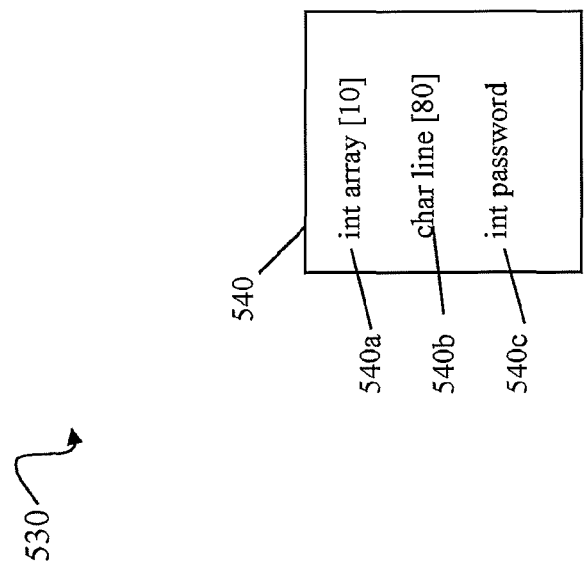
FIG. 48

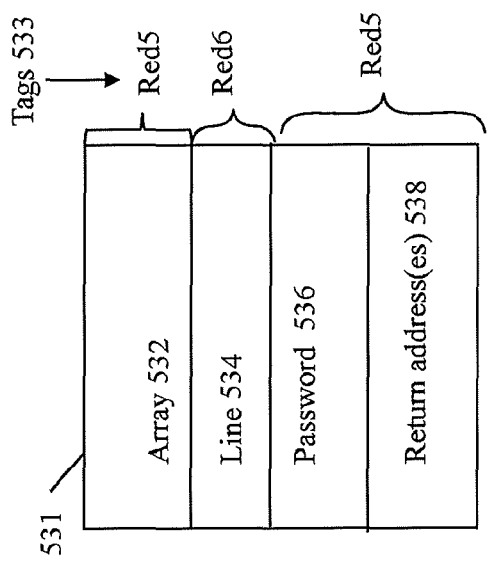
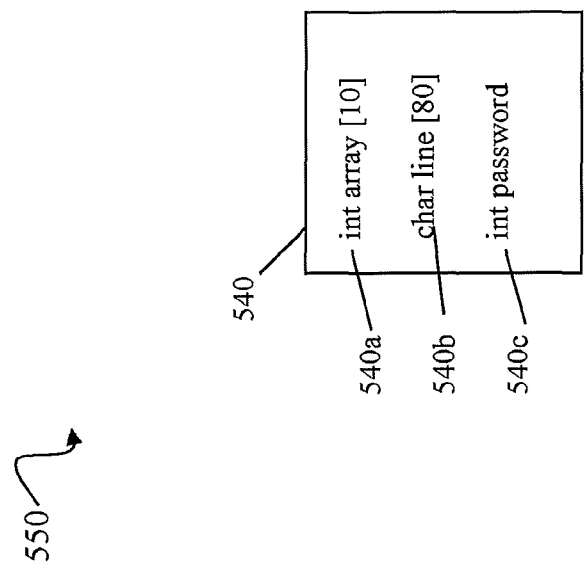
FIG. 49

| Item/runtime behavior to prevent | Preventive Action | Mechanism |
|---|---|---|
| Never Return | Timeout | Separate thread<br>Time/instruction limited call |
| Exhaust resources | Limit Resources of callee | Separate thread<br>Resource limited call |
| Exercise unexpected Authority | Limit authority to least privilege | tag PC as authority and control capabilities visible to callee<br>Limit portion of file system accessible, Limit system calls that can be made<br>Separate process |
| Read items left in registers by functions called by this code | Clear non-input/non-return registers | Explicit register clearing<br>Coloring<br>Separate process |
| Read items left on stack by functions called by this code | Make called stack inaccessible | Separate Stack<br>Capabilities<br>Coloring |

FIG. 51

| Item/runtime behavior to prevent | Preventive Action | Mechanism |
|---|---|---|
| Write over items on stack prefix | Make stack prefix inaccessible or otherwise unwritable | Separate process |
| | | Separate stack |
| | | Capabilities |
| | | Coloring |
| Read items in stack prefix | Make stack prefix inaccessible | Separate process |
| | | Separate stack |
| | | Capabilities |
| | | Coloring |
| Redirect control flow in Prefix (e.g., overwrite return pointer) | Protect return address | Separate process |
| | | Separate stack |
| | | Coloring - tag stack location storing return address |
| | | Capability - tag return pointer by access authority |

FIG. 52

| Item/runtime behavior to prevent | Preventive Action | Mechanism |
|---|---|---|
| Write over unintended items in current frame | Maintain object integrity | capabilities by object<br>color by object |
| Read items in current frame | Maintain object integrity | capabilities by color<br>color by object |
| Write over unintended items in predecessor frame | Isolate frames | capabilities by frame<br>coloring by frame |
| Read items in predecessor frame | Isolate frames | capabilities by frame<br>coloring by frame |
| Read items left on stack by functions called by this code | Make call stack inaccessible | Separate process<br>Separate stack<br>Capabilities<br>Coloring |
| Modify return pointer | Protect return pointer | Coloring- tag stack location storing return address<br>Capability - tag return pointer by access authority |

FIG. 53

| Address | Name | Description |
|---|---|---|
| 0x00 | transaction id | Write to this address increments the transaction (for prefetch); Reads return the current transaction id |
| 0x01 | opgrp | Opgroup for rule miss |
| 0x02 | byteenable | Byte Enables for rule miss |
| 0x03 | pctag | PC tag for rule miss |
| 0x04 | citag | CI (current instruction) tag for rule miss |
| 0x07 | mtag | memory tag for rule miss |
| 0x08 | newpctag | Tag to place on PC on completion of instruction |
| 0x09 | rtag | Tag to place on memory result from instruction |
| 0x0A | commit | when the write value matches the current transaction id, triggers write of rule to the IOPUMP |
| 0x0E | status | enable/fault status of IOPUMP |
| 0x0F | flush | Write to this address triggers IOPUMP flush |

FIG. 75

1721  source set = {};
1722  for each source that is allowed to transfer control to target:
1723    t = allocate new CFI source tag;
1724    tag the source with t;
1725    source set = source set + {t};
1726  tag target with source set.

FIG. 84

TECHNIQUES FOR METADATA PROCESSING

CROSS REFERENCE TO RELATED APPLICATION

This application continuation of U.S. application Ser. No. 16/002,987, filed Jun. 7, 2018, which is a continuation of U.S. application Ser. No. 15/695,541, filed Sep. 5, 2017, which is a divisional of U.S. application Ser. No. 15/426,098, filed Feb. 7, 2017, which issued as U.S. Pat. No. 9,785,440 on Oct. 10, 2017, which is a continuation of U.S. application Ser. No. 15/168,689, filed May 31, 2016 which, claims priority to U.S. Provisional Application No. 62/268,639 filed on Dec. 17, 2015, and U.S. Provisional Application No. 62/270,187 filed on Dec. 21, 2015, The entire teachings of the above applications are incorporated herein by reference.

BACKGROUND

This application relates generally to data processing and, more particularly, to programmable units for metadata processing.

Today's computer systems are notoriously hard to secure. Conventional processor architectures, for example, allow various behaviors, such as buffer overflows, pointer forging and the like, which violate higher level abstractions. Closing the gap between programming language and hardware may be left to software, where the cost of enforcing airtight abstractions is often deemed too high.

Some recent efforts have demonstrated the value of propagating metadata during execution to enforce policies that catch safety violations and malicious attacks as they occur. These policies can be enforced in software but typically incur high, undesirable overheads, such as in performance and/or costs, that discourage their deployment or other motivate coarse approximations providing less protection. Hardware support for fixed policies may reduce overhead to acceptable levels and prevent a large portion of undesired code violations, such as may be performed by malicious code or malware attacks. For example, Intel recently announced hardware for bounds checking and isolation. While these mitigate many of today's attacks, fully securing systems will require more than memory safety and isolation. Attacks rapidly evolve to exploit any remaining forms of vulnerability.

SUMMARY OF INVENTION

Thus, there is a need for a flexible security architecture that can be quickly adapted to this ever-changing landscape. It would be desirable to have such an architecture provide support for software-defined metadata processing with minimal overhead. It is desirable that such an architecture is extensible to generally support and enforce any number and type of policies without placing a visible, hard bound on the number of bits allocated to metadata. Metadata may be propagated during execution to enforce policies and catch violation of such policies such as, for example, by malicious code or malware attacks.

In accordance with one aspect of the techniques described herein is a method of processing instructions comprising: receiving, for metadata processing, a current instruction with an associated metadata tag, said metadata processing being performed in a metadata processing domain isolated from a code execution domain including the current instruction; determining, in the metadata processing domain and in accordance with the metadata tag and the current instruction, whether a rule exists in a rule cache for the current instruction, said rule cache including rules on metadata used by said metadata processing to define allowed operations; and responsive to determining no rule exists in the rule cache for the current instruction, performing rule cache miss processing in the metadata processing domain comprising: determining whether execution of the current instruction is allowed; responsive to determining the current instruction is allowed to be executed in the code execution domain, generating a new rule for the current instruction; and responsive to writing to a register, inserting the new rule into the rule cache. First metadata used to select the rule for the current instruction may be stored in a first portion of a plurality of control status registers used by the metadata processing. The first portion of the plurality of control status registers may be used to communicate a plurality of metadata tags for the current instruction to the metadata processing domain. The plurality of metadata tags may be used as data in the metadata processing domain. The register may be a first control status register of a plurality of control status registers used by the metadata processing and a first portion of the plurality of control status registers may be used to communicate a plurality of metadata tags from the metadata processing domain to the rule cache. The plurality of metadata tags may be for the current instruction. The new rule may be inserted into the rule cache responsive to writing a second metadata tag to the first control status register. The second metadata tag may be placed on a result of the current instruction and the result may be any of a destination register or a memory location. The plurality of control status registers may include any one or more of: a bootstrap tag control status register including an initial metadata tag from which all other generated metadata tags are derived; a default tag control status register specifying a default metadata tag; a public untrusted control status register specifying a public untrusted metadata tag used to tag instruction and data classified as public and untrusted; an opgroup value control status register including data written to a table including information on opgroups and care information for different opcodes; an opgroup address control status register specifying a location in the table to which data of the opgroup value control status register is written; and a pumpflush control status register wherein a write to the pumpflush control status register triggers flushing of the rule cache. The plurality of control status registers may include a tag mode control status register denoting a current mode of metadata processing. The tag mode control status register may indicate when metadata processing is disengaged whereby rules of one or more defined policies are not enforced by metadata processing. The tag mode control status register may be set to one of a defined set of allowed states to denote the current mode of metadata processing, the allowed states including: an off state, a state whereby metadata processing writes a default tag on all results, and a state indicating that metadata processing is engaged and operational when instructions are executed in the code domain at one or more specified privilege levels. The rule cache miss processing may be performed in a first of the defined set of allowed states where metadata processing is disengaged. The allowed states may include a first state indicating that metadata processing is engaged only when instructions execute in the code domain at a user privilege level; a second state indicating that metadata processing is engaged only when instructions execute in the code domain at a user or supervisor privilege level; a third state indicating that metadata processing is engaged only when instructions execute in the code domain at a user, supervisor, or hypervisor privilege level; and a fourth state indicating that metadata processing is engaged when instructions execute in the code domain at a user, supervisor, hypervisor, or machine privilege level. Whether the metadata processing is engaged or disengaged may be determined in accordance with a current tag mode of the tag mode control status register in combination with a current privilege level of code executing in the code domain. Rules of one or more defined policies may not be enforced when metadata processing is disengaged and wherein the rules may be enforced when metadata processing is engaged. The plurality of control status registers may include an extended opcode control status register including additional opcode bits, if any, for the current instruction. The current instruction may be included in an instruction set having variable length opcodes. Each opcode of the instruction set may optionally include the additional opcode bits. The extended opcode control status register may include the additional opcode bits, if any, for the current instruction. A table may include information that maps an opcode of the instruction set to a corresponding opgroup and bit vector information. The opgroup may denote a group of associated opcodes treated similarly by the metadata processing domain. The bit vector information may denote whether particular inputs and outputs with respect to the metadata processing domain are used in connection with processing the opcode. The table may be indexed using a first portion of opcode bits less than a maximum number of allowable opcode bits. The maximum number may denote an upper bound on a number of bits of an opcode of the instruction set. For each opcode mapped using the table, there may be a result bit vector corresponding to the opcode. The result bit vector may denote what portion, if any, of the additional opcode bits in the extended opcode control status register are used with the opcode. The current instruction may be one of multiple instructions stored in a single word of memory associated with a single metadata tag and the single metadata tag may be associated with the multiple instructions included in the single word. The plurality of control status registers may include a subinstruction control status register indicating which of the multiple instructions stored in the single word is the current instruction. The single metadata tag may be a first pointer to a first memory location including a different metadata tag for each of the multiple instructions in the single word. At least a first metadata tag stored in the first memory location for a first instruction of the multiple instructions may include a second pointer to a second memory location including metadata tag information for the first instruction. The metadata tag information for the first instruction may include a complex structure where the complex structure may comprise at least one scalar data field and at least one pointer field to a third memory location. A first memory location may include multiple bytes of data and a single metadata tag may be associated with the first memory location. The first memory location may be a single word, and a plurality of control status registers used by the metadata processing may include a byte-enable control status register indicating which of the multiple bytes stored in the single word are any of read from, and written to, by the current instruction. The first memory location may be a single word, and a plurality of control status registers used by the metadata processing may include a bit-enable control status register indicating which one or more bits stored in the single word are any of read from, and written to, by the current instruction. The single metadata tag may be a pointer to a second memory location including tags for the multiple bytes of data. The second memory location may include a variable length structure comprising a first field denoting a number of subsequent tag fields of the variable length structure, and the subsequent tag fields may specify tags for the multiple bytes of data. The single metadata tag may be a pointer to a hierarchical structure including tags for the multiple bytes of data.

In accordance with another aspect of techniques herein is a non-transitory computer readable medium comprising code thereon that, when executed, perform a method of processing instructions comprising: receiving, for metadata processing, a current instruction with an associated metadata tag, said metadata processing being performed in a metadata processing domain isolated from a code execution domain including the current instruction; determining, in the metadata processing domain and in accordance with the metadata tag and the current instruction, whether a rule exists in a rule cache for the current instruction, said rule cache including rules on metadata used by said metadata processing to define allowed operations; and responsive to determining no rule exists in the rule cache for the current instruction, performing rule cache miss processing in the metadata processing domain comprising: determining whether execution of the current instruction is allowed; responsive to determining the current instruction is allowed to be executed in the code execution domain, generating a new rule for the current instruction; and responsive to writing to a register, inserting the new rule into the rule cache.

In accordance with another aspect of the techniques herein is a system comprising: a processor; and a memory comprising code stored thereon that, when executed by the processor, performs a method of processing instructions comprising: receiving, for metadata processing, a current instruction with an associated metadata tag, said metadata processing being performed in a metadata processing domain isolated from a code execution domain including the current instruction; determining, in the metadata processing domain and in accordance with the metadata tag and the current instruction, whether a rule exists in a rule cache for the current instruction, said rule cache including rules on metadata used by said metadata processing to define allowed operations; and responsive to determining no rule exists in the rule cache for the current instruction, performing rule cache miss processing in the metadata processing domain comprising: determining whether execution of the current instruction is allowed; responsive to determining the current instruction is allowed to be executed in the code execution domain, generating a new rule for the current instruction; and responsive to writing to a register, inserting the new rule into the rule cache. The processor may be a pipeline processor in a reduced instruction set computing architecture.

BRIEF DESCRIPTION OF THE DRAWINGS

Features and advantages of the techniques herein will become more apparent from the following detailed description of exemplary embodiments thereof taken in conjunction with the accompanying drawings in which:

FIG. 14 is a first table labeled "TABLE 1" providing a summary of investigated policies;

FIG. 15 is a second table labeled "TABLE 2" providing a summary of taxonomy of tagging schemes;

FIG. 16 is a third table labeled "TABLE 3" providing a summary of memory resource estimates for the baseline and the simple PUMP-extended processor;

FIG. 17 is a fourth table labeled "TABLE 4" providing a summary of PUMP parameter ranges used in experiments;

FIG. 18 is a fifth table labeled "TABLE 5" providing a summary of memory resource estimates for the PUMP-optimized processor;

FIG. 19 is a first algorithm labeled "Algorithm 1" providing a summary of the taint tracking miss handler;

FIG. 20 is a second algorithm labeled "Algorithm 2" providing a summary of the N-policy miss handler;

FIG. 21 a third algorithm labeled "Algorithm 3" providing a summary of the N-policy miss handler with HW support;

FIG. 25 is an example of control status registers (CSRs) in an embodiment in accordance with techniques herein;

FIG. 26 is an example of tagmodes in an embodiment in accordance with techniques herein;

FIG. 36-38 are examples illustrating subinstructions and associated techniques in an embodiment;

FIGS. 48-49 are examples illustrating memory location tagging or coloring in an embodiment in accordance with techniques herein;

FIGS. 51, 52, and 53 are tables of different runtime behaviors and associated preventive actions and mechanisms used to implement the preventive actions in an embodiment in accordance with techniques herein;

FIGS. 74, 75, 76 and 77 are examples illustrating aspects and features in connection with an I/O PUMP in an embodiment in accordance with techniques herein;

FIGS. 83 and 84 are examples illustrating control flow integrity and associated processing in an embodiment in accordance with techniques herein.

DETAILED DESCRIPTION

Figure 1:
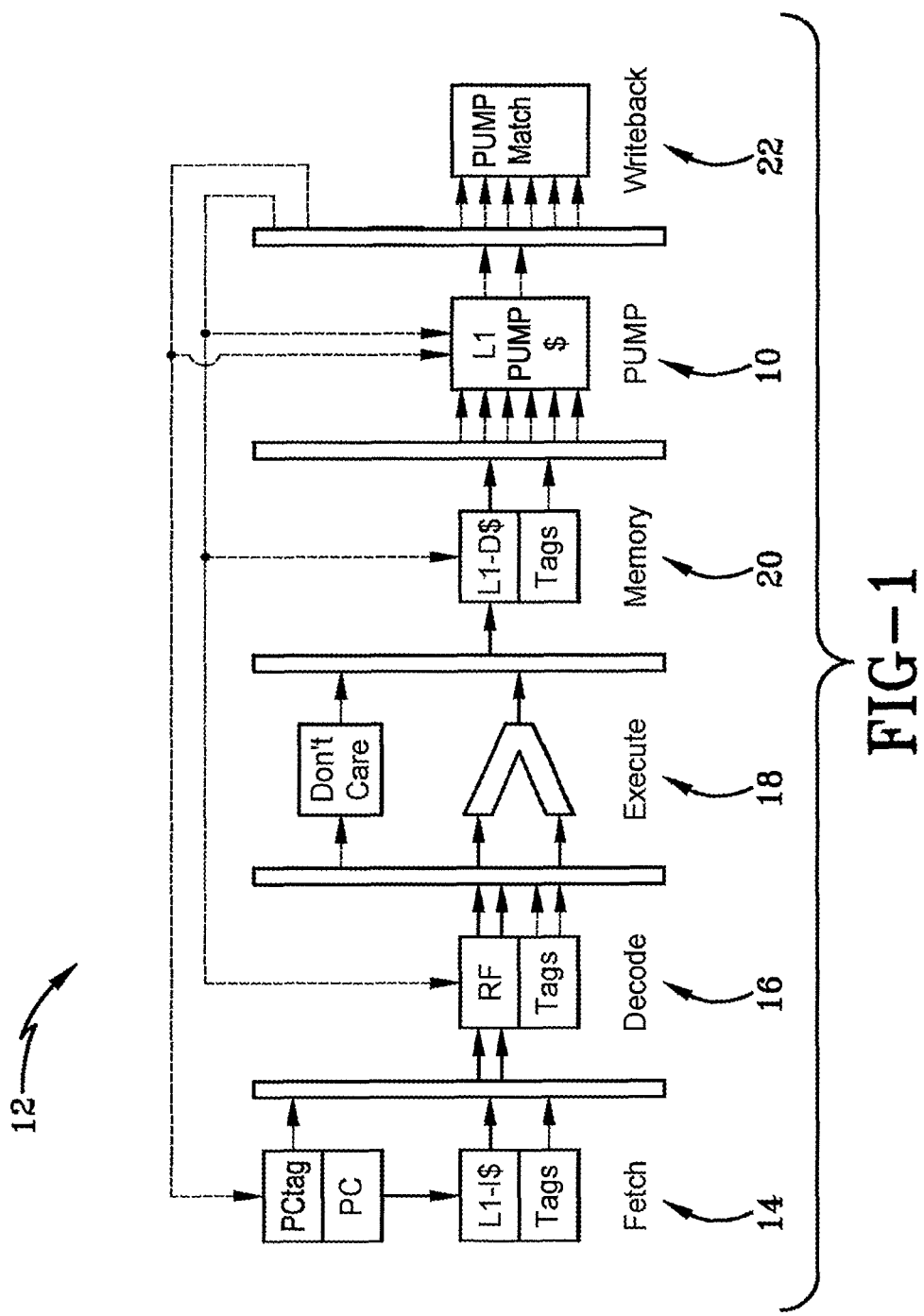
FIG. 1 is a schematic drawing showing an example of a PUMP cache integrated as a pipeline stage in a processor pipeline.

Described in following paragraphs are various embodiments and aspects of a Programmable Unit for Metadata Processing (PUMP) that indivisibly associates a metadata tag with every word in the system's main memory, caches, and registers. To support unbounded metadata, the tag is large enough to indirect to a data structure in memory. On every instruction, the tags of the inputs are used to determine if the operation is allowed, and if so to calculate the tags for the results. In some embodiments, the tag checking and propagation rules are defined in software; however, to minimize performance impact, these rules are cached in a hardware structure, the PUMP rule cache, that operates in parallel with the arithmetic logic unit (ALU) portion of a processor. In some embodiments, a miss handler, such as may be implemented using software and/or hardware, may be used to service cache misses based on the policy currently in effect.

In at least one embodiment using a composition of four different policies, the performance impact of the PUMP may be measured (See FIG. 14) that stress the PUMP in different ways and illustrate a range of security properties, such as, for example, (1) a Non-Executable Data and Non-Writable Code (NXD+NWC) policy that uses tags to distinguish code from data in memory and provides protection against simple code injection attacks; (2) a Memory Safety policy that detects all spatial and temporal violations in heap-allocated memory, extending with an effectively unlimited (260) number of colors ("taint marks"); (3) a Control-Flow Integrity (CFI) policy that restricts indirect control transfers to only the allowed edges in a program's control flow graph, preventing return-oriented-programming-style attacks (fine grained CFI is enforced, not coarse-grained approximations that are potentially vulnerable to attack); and (4) a fine-grained Taint Tracking policy (generalizing) where each word can potentially be tainted by multiple sources (libraries and IO streams) simultaneously.

The foregoing are examples of well-known policies that may be used in an embodiment in accordance with techniques herein. For such well known policies whose protection capabilities have been established in the literature, techniques herein may be used to enforce such policies while also reducing the performance impact of enforcing them using the PUMP. Except for NXD+NWC, each of these policies needs to distinguish an essentially unlimited number of unique items; by contrast, solutions with a limited number of metadata bits can, at best, support only grossly simplified approximations.

As illustrated and described elsewhere herein, one embodiment in accordance with techniques herein may utilize a simple, direct implementation of the PUMP which uses pointer-sized (64b or byte) tags to 64b words thereby at least doubling the size and energy usage of all the memories in the system. Rule caches add area and energy on top of this. For this particular embodiment, an area overhead of 190% (See FIG. 16) was measured and geomean energy overhead around 220%; moreover, runtime overhead may be over 300% on some applications. Such high overheads may discourage adoption, if they were the best that could be done.

However, as described in more detail below most policies exhibit spatial and temporal locality for both tags and the rules defined over them. Thus, an embodiment in accordance with techniques herein may significantly reduce the number of unique rules significantly by defining them over a group of similar (or even identical) instructions, reducing compulsory misses and increasing the effective capacity of the rule caches. Off-chip memory traffic can be reduced by exploiting spatial locality in tags. On-chip area and energy overhead can be minimized by using a small number of bits to represent the subset of the pointer-sized tags in use at a time. Runtime costs of composite policy miss handlers can be decreased by providing hardware support for caching component policies. Thus, an embodiment in accordance with techniques herein may include such optimizations to thereby allow the PUMP to achieve lower overheads without compromising its rich policy model.

An embodiment in accordance with techniques herein may enhance memory words and internal processor state with metadata that can be used to encode an arbitrary number of security policies that can be enforced either in isolation or simultaneously. An embodiment in accordance with techniques herein may achieves the foregoing by adding, to a "conventional" processor (e.g. RISC-CPU, GPU, Vector processor, etc.), a metadata processing unit (the PUMP) that works in parallel with the data flow to enforce an arbitrary set of policies; the present disclosure technique specifically makes the metadata unbounded and software programmable, such that the techniques herein may be adapted and applied to a wide range of metadata processing policies. For example, the PUMP may be integrated as a new/separate pipeline stage of a conventional (RISC) processor, or can be integrated as a stand-alone piece of hardware working on parallel with the "host" processor. For the former case, there may be an instruction level simulator, elaborated policies, implementation optimizations and resource estimates, and extensive simulations to characterize the design.

Existing solutions trying to enforce policies at the fine (i.e. instruction) granularity level cannot enforce an arbitrary set of policies. Commonly, only a small number of fixed policies can be enforced at the instruction level. Enforcing policies at a higher granularity level (i.e. thread) cannot prevent certain classes of Return Oriented Programming attacks, thus rendering that type of enforcement limited in its usefulness. In contrast, embodiments in accordance with techniques herein allow the expression of an unlimited number of policies (the only limit is the size address space, as the metadata is expressed in terms of address pointers that can point to any arbitrary data structures) that may be enforced at the instruction level singly or simultaneously.

It should be noted that various figures described in following paragraphs illustrate various examples, methods, and other example embodiments of various aspects of the techniques described herein. It will be appreciated that, in such figures, the illustrated element boundaries (e.g., boxes, groups of boxes, or other shapes) generally represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Referring to FIG. 1, a Programmable Unit for Metadata Processing (PUMP) 10 is integrated into a conventional Reduced Instruction Set Computing or Computer (RISC) processor 12 with an in-order implementation and a 5-stage pipeline suitable for energy-conscious applications, which effectively transforms into a 6-stage pipeline with the addition of PUMP 10. A first stage is a fetch stage 14, a second stage is a decode stage 16, a third stage is an execute stage 18, a fourth stage is a memory stage 20, and a fifth stage is a writeback stage 22. Pump 10 is interposed between the memory stage 20 and the writeback stage 22.

Various embodiments may implement the PUMP 10 using electronic logic that is a mechanism providing policy enforcement and metadata propagation. An embodiment of the PUMP 10 may be characterized by: (i) an empirical evaluation of the runtime, energy, power ceiling, and area impacts of a simple implementation of the PUMP 10 on a standard set of benchmarks under four diverse policies and their combination; (ii) a set of micro-architectural optimizations; and (iii) measurements of the gains from these optimizations, showing typical runtime overhead under 10%, a power ceiling impact of 10%, and typically energy over-head under 60% by using 110% additional area for on-chip memory structures.

Figure 10A:
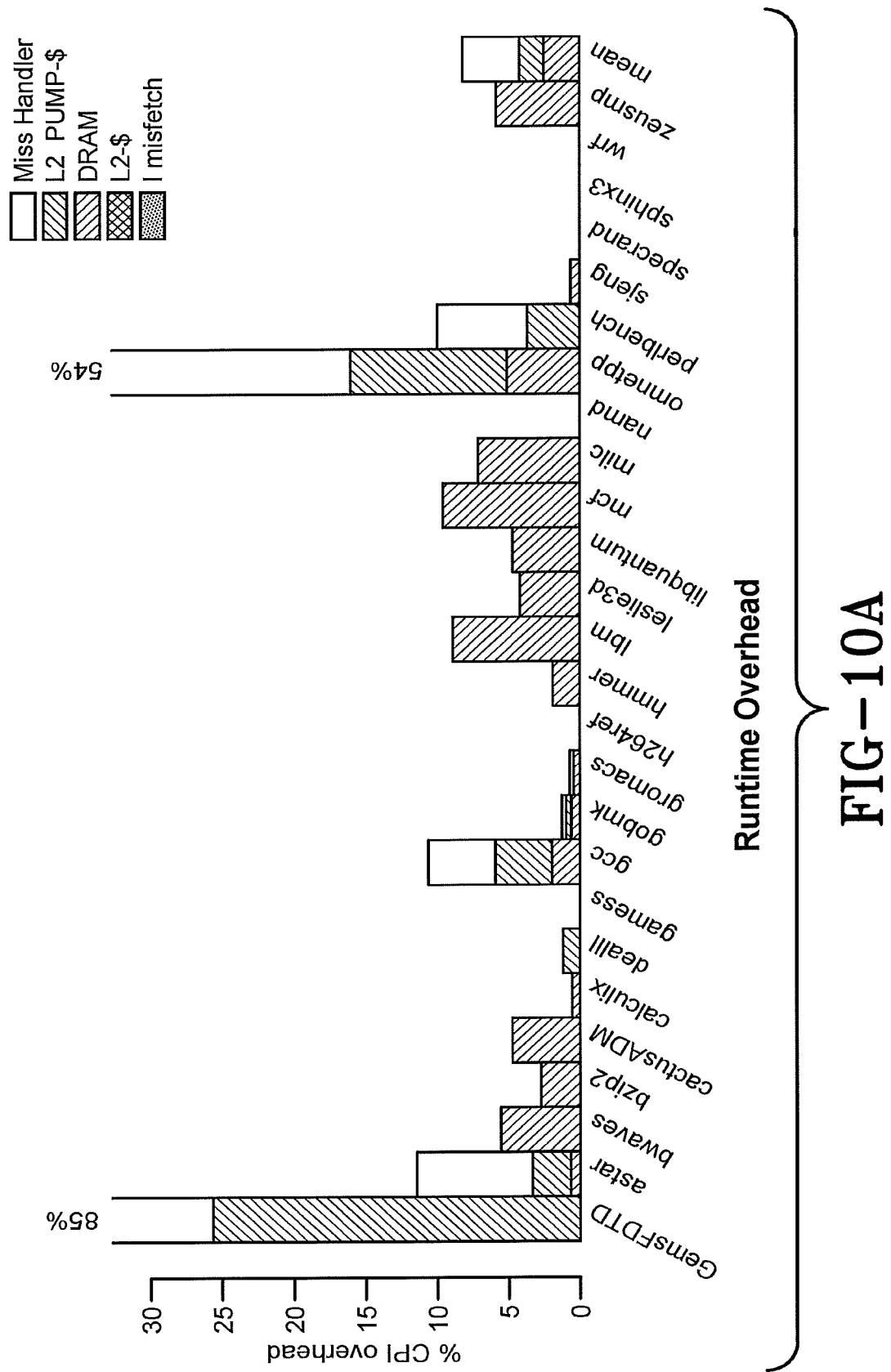
FIG. 10A is a series of graphs showing runtime overhead of optimized implementation.
Figure 10B:
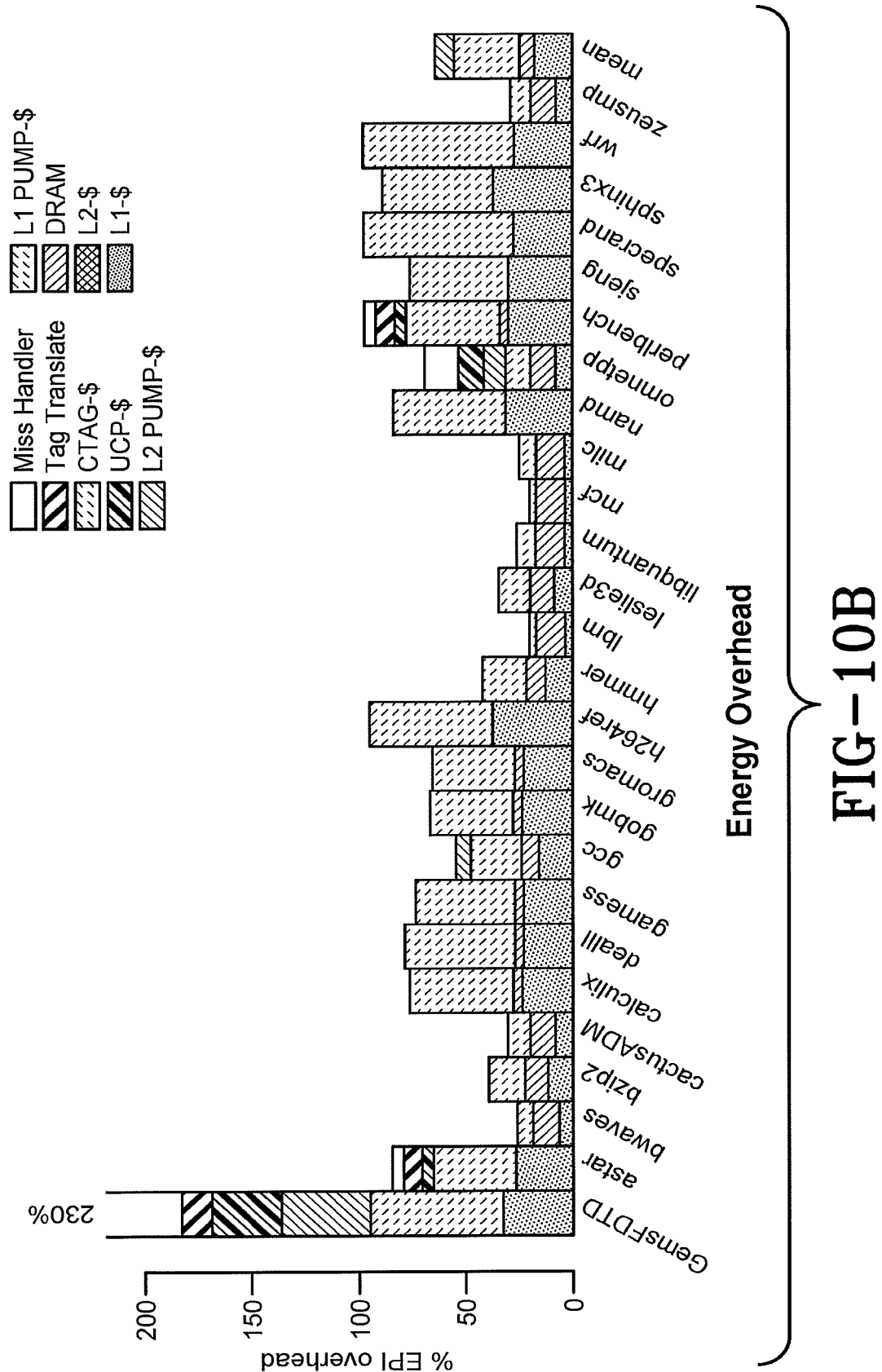
FIG. 10B is a series of bar graphs showing energy overhead of optimized implementation.
Figure 10C:
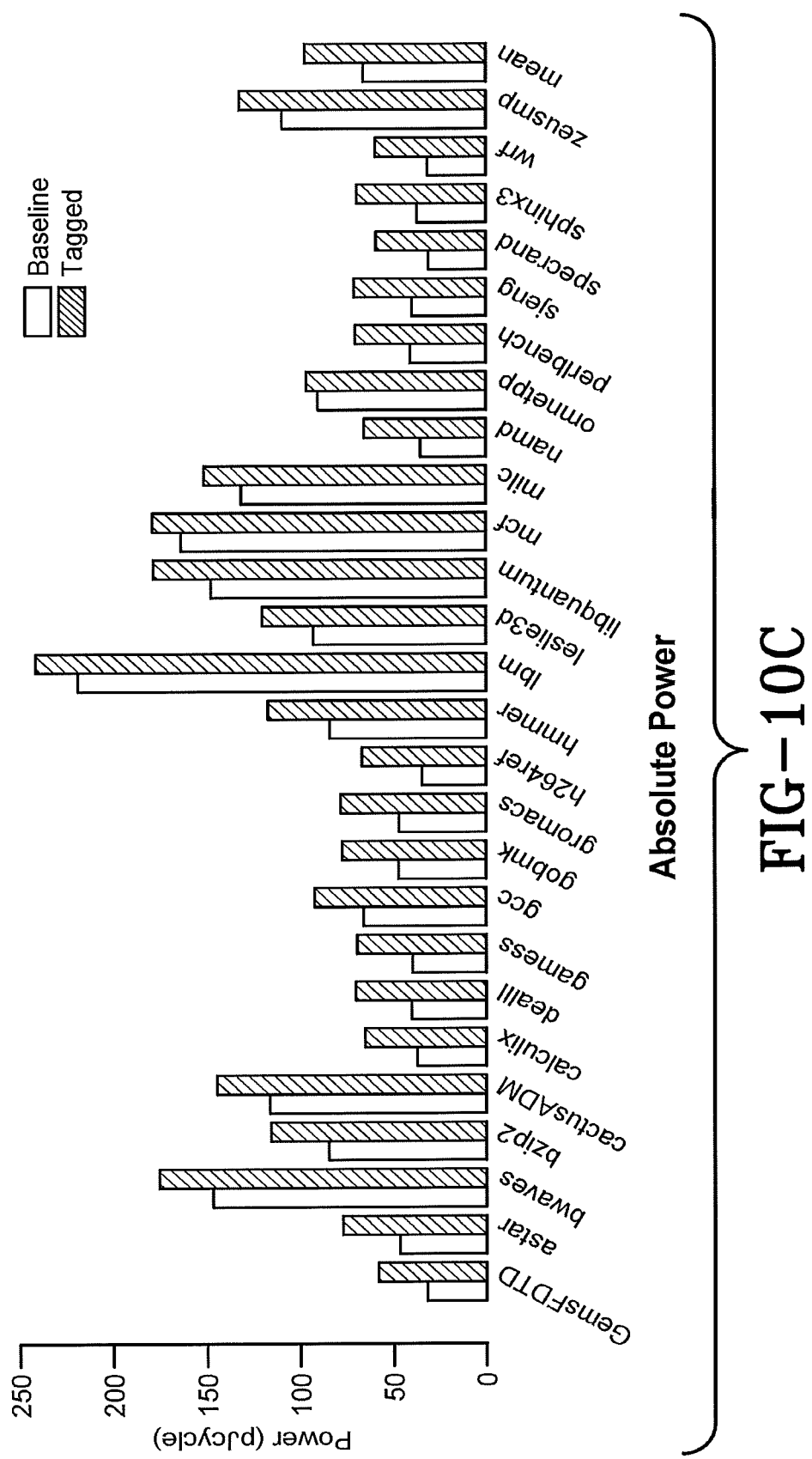
FIG. 10C is a series of bar graphs showing absolute power of optimized implementation compared to a baseline.

In computing, benchmarking may be characterized as the act of running a computer program, a set of programs, or other operations, in order to assess the relative performance of an object, normally by running a number of standard tests and trials against it. The term 'benchmark' used herein refers to benchmarking programs themselves. The types of benchmark programs used throughout this application and the Figures are GemsFDTD, astar, bwaves, bzip2, cactusADM, calculix, deall, gamess, gcc, gobmk, gromacs, h264ref, hmmer, lbm, leslie3d, libquantum, mcf, mile, namd, omnetpp, perlbench, sjeng, specrand, sphinx3, wrf, zeusmp, and mean. See, for example, FIGS. 10A, 10B, and 10C.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

In at least one embodiment in accordance with techniques herein, the PUMP 10 may be characterized as an extension to a conventional RISC processor 12. Following paragraphs provide further details of the ISA (instruction set architecture)-level extensions that constitute the PUMP's 10 hardware interface layer, the basic micro-architectural changes, and the accompanying low-level software that may be used in an embodiment in accordance with techniques herein.

In an embodiment in accordance with techniques herein, each word in a PUMP-enriched system may be associated with a pointer-sized tag. These tags are uninterpreted at the hardware level. At the software level, a tag may represent metadata of unbounded size and complexity, as defined by the policy. Simpler policies that need only a few bits of metadata may store the metadata directly in the tag; if more bits are required, then indirection is used to store the metadata as a data structure in memory, with the address of this structure used as the tag. Notably, these pointer-sized tags are one exemplary aspect of the present disclosure and are not to be considered limiting. The basic addressable memory word is indivisibly extended with a tag, making all value slots, including memory, caches, and registers, suitably wider. A program counter (PC) is also tagged. This notion of software-defined metadata and its representation as a pointer-sized tag extends previous tagging approaches, where only a few bits are used for tags and/or they are hardwired to fixed interpretations. Some exemplary taxonomies of tagging schemes are presented in Table 2 which is reproduced in FIG. 15.

Metadata tags are not addressable by user programs. Rather, the metadata tags are addressed by policy handlers invoked on rule cache misses as detailed below. All updates to tags are realized through PUMP 10 rules.

Besides unbounded metadata, another feature of an embodiment of the PUMP 10 in accordance with techniques herein is hardware support for single-cycle common-case computation on metadata. These computations are defined in terms of rules of the form opcode: (PC, CI, OP1, OP2, MR)⇒($PC_{new}$, R), which should be read: "If the current opcode is opcode, the current tag on the program counter is PC, the tag on the current instruction is CI, the tags on its input operands (if any) are OP1 and OP2, and the tag on the memory location (in case of load/store) is MR, then the tag on the program counter in the next machine state should be $PC_{new}$ and the tag on the instructions result (a destination register or a memory location, if any) should be R". This rule format, allowing two output tags to be computed from up to five input tags, is markedly more flexible than those considered in prior work, which typically compute one output from up to two inputs (see Table 2 in FIG. 15). Beyond previous solutions that only track data tags (OP1, OP2, MR, R), the present disclosure provides a current instruction tag (CI) that can be used to track and enforce provenance, integrity, and usage of code blocks; as well as a PC tag that can be used to record execution history, ambient authority, and "control state" including implicit information flows. The CFI policy exploits the PC tag for recording the sources of indirect jumps and the CI tag for identifying jump targets, NXD+NWC leverages the CI to enforce that data is not executable, and Taint Tracking uses the CI to taint data based on the code that produced it.

To resolve the rules in a single cycle in the common case, an embodiment in accordance with techniques herein may use a hardware cache of the most recently used rules. Depending on the instruction and policy, one or more of the input slots in a given rule may be unused. To avoid polluting the cache with rules for all possible values of the unused slots, the rule-cache lookup logic refers to a bit vector containing a "don't-care" (See FIG. 1) bit for each input slot-opcode pair, which determines whether the corresponding tag is actually used in the rule cache lookup. To handle these "don't care" inputs efficiently, they are masked out before presenting the inputs to the PUMP 10. The don't-care bit vectors are set by a privileged instruction as part of the miss handler installation.

FIG. 1 generally illustrates one embodiment in accordance with techniques herein with a revised 5-stage processor 12 pipeline that incorporates the PUMP 10 hardware. The rule cache lookup is added as an additional stage and bypass tag and data independently so that the PUMP 10 stage does not create additional stalls in the processor pipeline.

Placing the PUMP 10 as a separate stage (between memory stage 20 and writeback stage 22) is motivated by the need to provide the tag on the word read from memory (load), or to be overwritten in memory (store), as an input to the PUMP 10. Since rules are allowed that depend on the existing tag of the memory location that is being written, write operations become read-modify-write operations. The existing tag is read during the Memory stage 20 like a read rule, the read rule is checked in the PUMP 10 stage, and the write is performed during the Commit stage which may also be referred to as writeback stage 22. As with any caching scheme, multiple levels of caches may be used for the PUMP 10. As described in more detail below, an embodiment in accordance with techniques herein may utilize two levels of caches. The extension to multiple levels of caches is readily apparent to one having ordinary skill in the art.

In one non-limiting example, when a last-level miss occurs in the rule cache in the writeback stage 22, it is handled as follows: (i) the current opcode and tags are saved in a (new) set of processor registers used only for this purpose, and (ii) control is transferred to the policy miss handler (described in more detail below), which (iii) decides if the operation is allowed and if so generates an appropriate rule. When the miss handler returns, the hardware (iv) installs this rule into the PUMP 10 rule caches, and (v) re-issues the faulting instruction. To provide isolation between the privileged miss handler and the rest of the system software and user code, a miss-handler operational mode is added to the processor, controlled by a bit in the processor state that is set on a rule cache miss and reset when the miss handler returns. To avoid the need to save and restore registers on every rule cache miss, the integer register file may be expanded with 16 additional registers that are available only to the miss handler. Additionally, the rule inputs and outputs appear as registers while in miss handler mode (cf. register windows), allowing the miss handler (but nothing else) to manipulate the tags as ordinary values. Again, these are all non-limiting examples of the writeback stage 22.

A new miss-handler-return instruction is added to finish installing the rule into the PUMP 10 rule caches and returns to user code. In this particular non-limiting example, this instruction can only be issued when in miss-handler mode. While in miss-handler mode, the rule cache is ignored and the PUMP 10 instead applies a single, hardwired rule: all instructions and data touched by the miss handler must be tagged with a predefined MISSHANDLER tag, and all instruction results are given the same tag. In this way, the PUMP 10 architecture prevents user code from undermining the protection provided by the policy. Alternatively, the PUMP may be used to enforce flexible rules on miss-handler access. Tags are not divisible, addressable, or replaceable by user code; metadata data structures and miss handler code cannot be touched by user code; and user code cannot directly insert rules into the rule cache.

With reference to FIG. 19, Algorithm 1 illustrates the operation of the miss handler for a taint-tracking policy. To minimize the number of distinct tags (and hence rules), the miss handler uses a single tag for logically equivalent metadata by "canonicalizing" any new data structures that it builds.

Rather than forcing users to choose a single policy, multiple policies are enforced simultaneously and new ones are added later. An exemplary advantage to these "unbounded" tags is that they can enforce any number of policies at the same time. This can be achieved by letting tags be pointers to tuples of tags from several component policies. For example, to combine the NXD+NWC policy with the taint-tracking policy, each tag can be a pointer to a tuple (s, t), where s is a NXD+NWC tag (either DATA or CODE) and t is a taint tag (a pointer to a set of taints). The rule cache lookup is similar, however when a miss occurs, both component policies are evaluated separately: the operation is allowed only if both policies allow it, and the resulting tags are pairs of results from the two component policies. However, in other embodiments, it might be possible to express how the policies are to be combined (not simply as AND between all the constituent components).

Figure 4A:
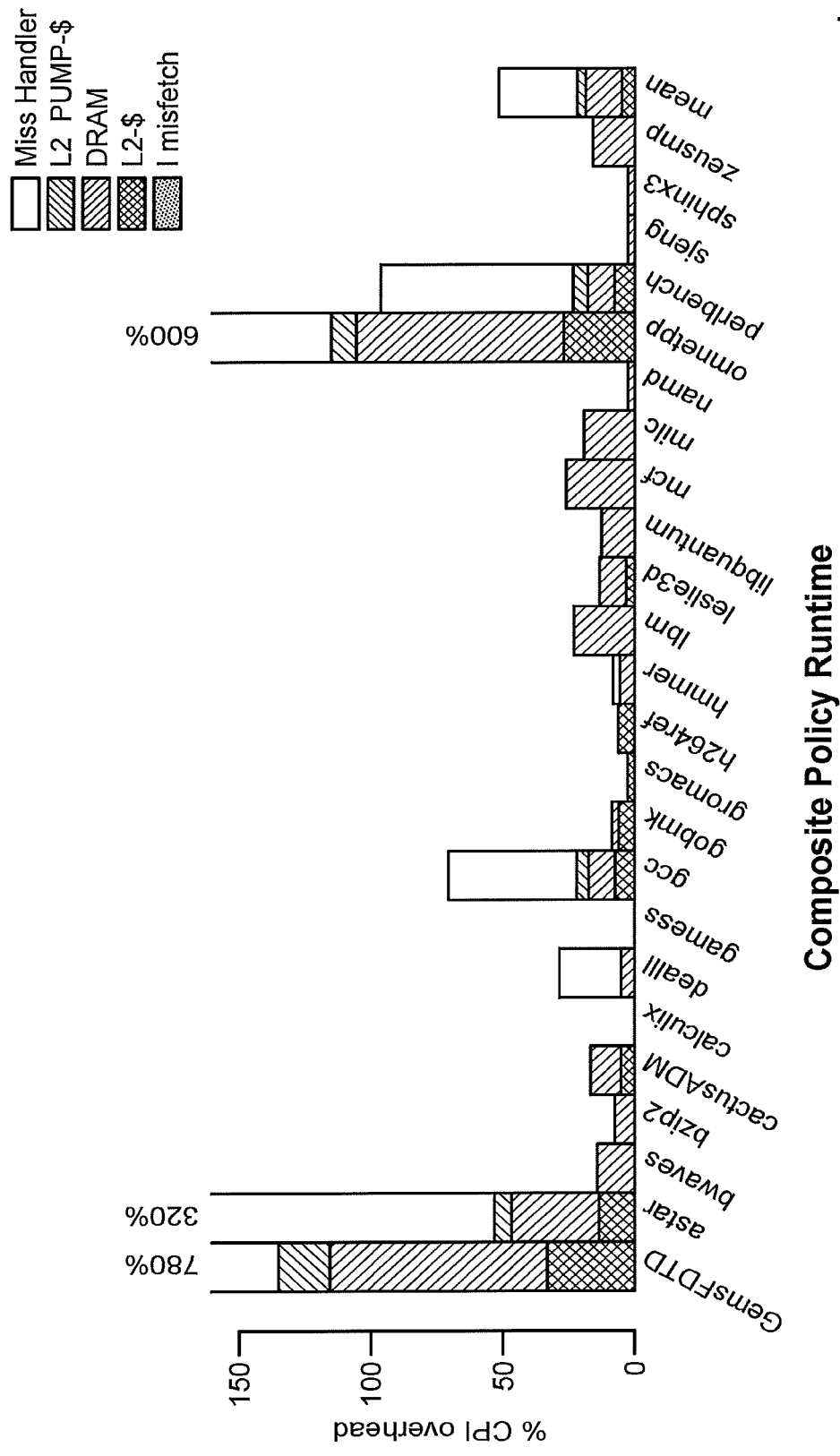
FIG. 4A is a series of bar graphs showing composite policy runtime overhead of simple implementation with 64b Tags, wherein the composite policy enforces simultaneously the following policies (i) spatial and temporal memory safety, (ii) taint tracking, (iii) control-flow integrity, and (iv) code and data separation.

With reference to FIG. 20, Algorithm 2 illustrates the general behavior of the composite miss handler for any N policies. Depending on how correlated the tags in the tuple are, this could result in a large increase in the number of tags and hence rules. In order to demonstrate the ability to support multiple policies simultaneously and measure its effect on working set sizes, a composite policy ("Composite") was implemented through experimentation and where the composite policy comprises all four policies described above. The Composite policy represents the kind of policy workloads that are supported which are described in further detail below. As seen in FIG. 4A and FIG. 20, the composite policy enforces simultaneously the following policies (i) spatial and temporal memory safety, (ii) taint tracking, (iii) control-flow integrity, and (iv) code and data separation Most policies will dispatch on the opcode to select the appropriate logic. Some policies, like NXD+NWC, will just check whether the operation is allowed. Others may consult a data structure (e.g., the CFI policy consults the graph of allowed indirect call and return ids). Memory safety checks equality between address color (i.e pointer color) and memory region colors. Taint tracking computes fresh result tags by combining the input tags (Alg. 1). Policies that must access large data structures (CFI) or canonicalize across large aggregates (Taint Tracking, Composite) may make many memory accesses that will miss in the on-chip caches and go to DRAM. On average across all of the benchmarks, servicing misses for NXD+NWC required 30 cycles, Memory Safety required 60 cycles, CFI required 85 cycles, Taint Tracking required 500 cycles, and Composite required 800 cycles.

If the policy miss handler determines that the operation is not allowed, it invokes a suitable security fault handler. What this fault handler does is up to the runtime system and the policy; typically, it would shut down the offending process, but in some cases it might return a suitable "safe value" instead. For incremental deployment with UNIX-style operating systems, assumed policies are applied per process, allowing each process to get a different set of policies. The recitation of being applied per process is non-limiting but rather exemplary and one having skill in the art recognizes this. It also allows us to place the tags, rules, and miss handling support into the address space of the process, avoiding the need for an OS-level context switch. Longer term, perhaps PUMP policies can be used to protect the OS as well.

The following details evaluation methodology for measuring runtime, energy, area, and power overheads and applies it on a simple implementation of the PUMP hardware and software, using 128b words (64b payload and 64b tag) and the modified pipeline processor 12 depicted in FIG. 1. It is useful to describe and measure the simple PUMP implementation first, even though the optimized implementation is the version to which the overheads (relative to the baseline processor) is ultimately desired. Both are described because it details basic versions of the key mechanisms before getting to more sophisticated versions.

To estimate the physical resource impact of the PUMP, memory costs were primarily focused on, since the memories are the dominant area and energy consumers in a simple RISC processor and in the PUMP hardware extensions. A 32 nm Low Operating Power (LOP) process is considered for the L1 memories (See FIG. 1) and Low Standby Power (LSTP) for the L2 memories and use CACTI 6.5 for modeling the area, access time, energy per access, and static (leakage) power of the main memory and the processor on-chip memories.

A baseline processor (no-PUMP) has separate 64 KB L1 caches for data and instructions and a unified 512 KB L2 cache. Delay-optimized L1 caches and an energy-optimized L2 cache were used. All caches use a writeback discipline. The baseline L1 cache has a latency around 880 ps; it is assumed that it can return a result in one cycle and set its clock to 1 ns, giving a 1 GHz-cycle target—comparable to modern embedded and cell phone processors. The parameters for this processor are presented in Table 3 in FIG. 16.

One embodiment of the PUMP rule cache 10 hardware implementation may include two parts: extending all architectural states in stages 14, 16, 20 with tags, and adding PUMP rule caches to the processor 12. Extending each 64b word in the on-chip memories with a 64b tag increases their area and energy per access and worsens their access latency. This is potentially tolerable for the L2 cache, which already has a multi-cycle access latency and is not used every cycle. But adding an extra cycle of latency to access the L1 caches (See FIG. 1) can lead to stalls in the pipeline. To avoid this, in this simple implementation the effective capacity of the L1 caches is reduced to half of those in the baseline design and then add tags; this gives the same single-cycle access to the L1 caches, but can degrade performance due to increased misses.

Figure 22:
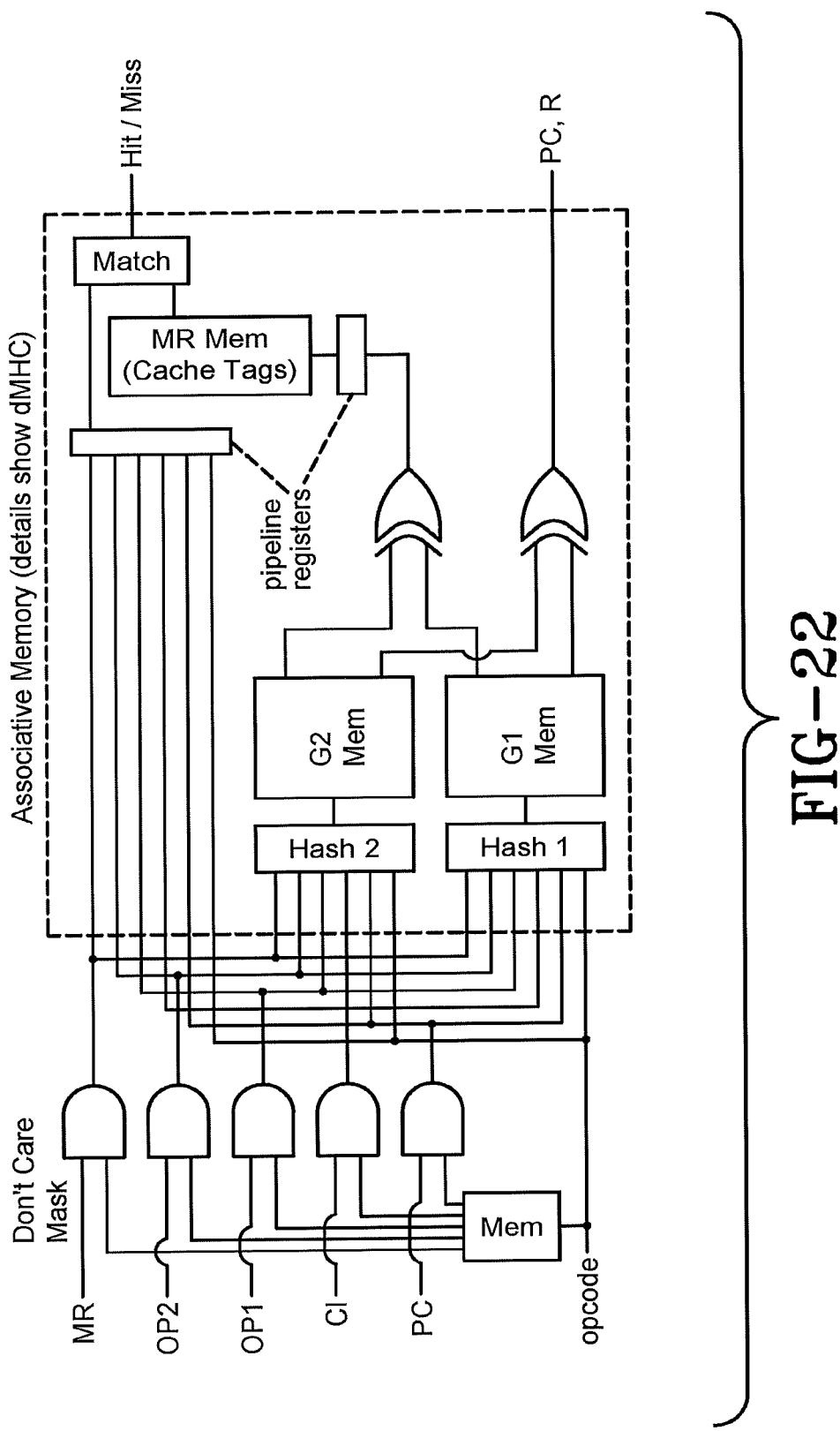
FIG. 22 is schematic view of the PUMP rule cache dataflow and microarchitecture.

In an embodiment in accordance with techniques herein, the PUMP rule cache 10 utilizes a long match key (5 pointer-sized tags plus an instruction opcode, or 328b) compared to a traditional cache address key (less than the address width), and returns a 128b result. In one embodiment, a fully associative L1 rule cache may be used but would lead to high energy and delay (See Table 3 in FIG. 16). As an alternative, an embodiment in accordance with techniques herein may utilize a multi-hash cache scheme inspired with four hash functions, as depicted in FIG. 22. The L1 rule cache is designed to produce a result in a single cycle, checking for a false hit in the second cycle, while the L2 rule cache is designed for low energy, giving a multi-cycle access latency. Again, Table 3 in FIG. 16 shows the parameters for 1024-entry L1 and 4096-entry L2 rule caches used in the simple implementation. When these caches reach capacity, a simple first-in-first out (FIFO) replacement policy is used, which appears to work well in practice for the current workloads (FIFO is within 6% of LRU here).

Figure 2:
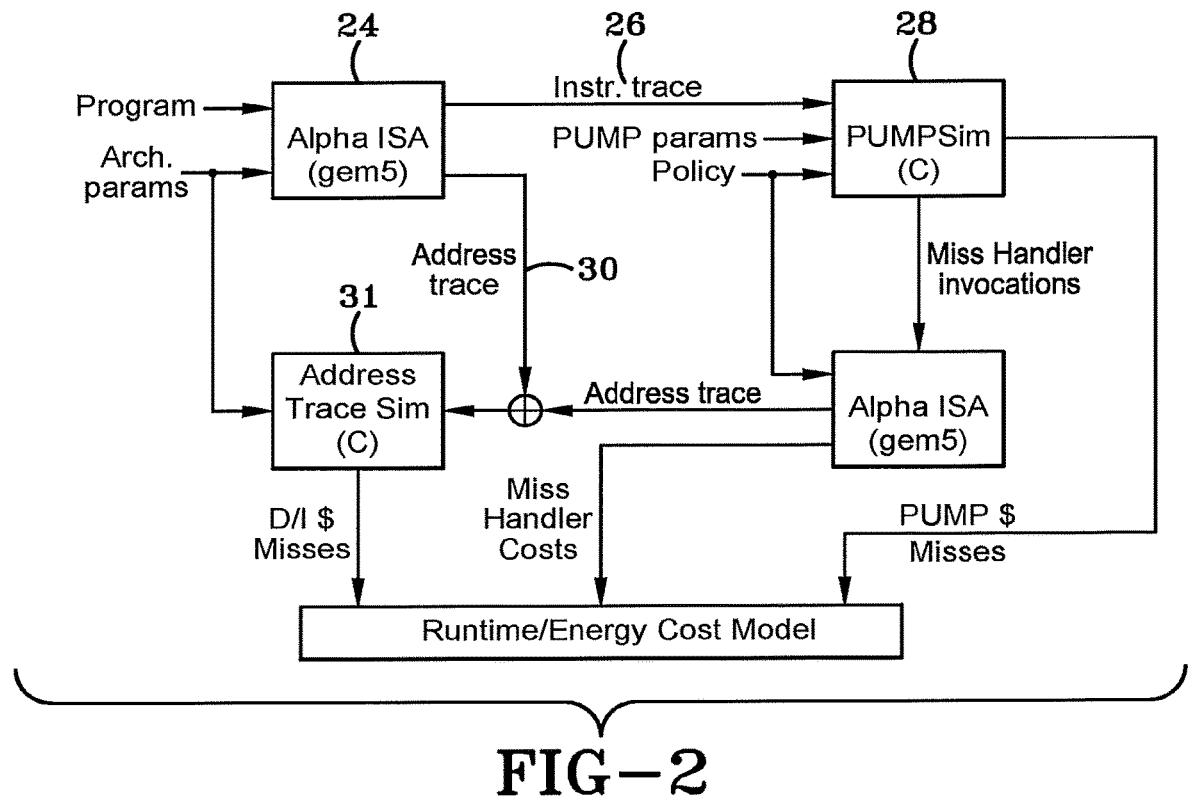
FIG. 2 is a schematic drawing showing a PUMP Evaluation Framework.

With reference to FIG. 2, the estimation of the performance impact of the PUMP identifies a combination of ISA, PUMP, and address-trace simulators. A gem5 simulator 24 generates instruction traces for the SPEC CPU2006 programs (omitting xalancbmk and tonto, on which gem5 fails) on a 64-bit Alpha baseline ISA. Each program simulates for each of the four policies listed above and the composite policy for a warm-up period of 1B instructions and then evaluates the next 500M instructions. In gem5 simulator 24, each benchmark is run on the baseline processor with no tags or policies. The resulting instruction trace 26 is then run through a PUMP simulator 28 that performs metadata computation for each instruction. This "phased" simulation strategy is accurate for fail-stop policies, where the PUMP's results cannot cause a program's control flow to diverge from its baseline execution. While address-trace simulations can be inaccurate for highly pipelined and out-of-order processors, they are quite accurate for the simple, in-order, 5- and 6-stage pipeline. On the baseline configuration, the gem5 instruction simulation and address trace generation 30 followed by custom address-trace simulations in address simulator 32 and accounting were within 1.2% of gem5's cycle-accurate simulations.

The PUMP simulator 28 includes miss-handler code (written in C) to implement each policy, and metadata tags are assigned on the initial memory depending on the policy. The PUMP simulator 28 allows captures the access patterns in the PUMP 10 rule caches and estimates the associated runtime and energy costs, accounting for the longer wait cycles required to access the L2 rule cache. Since the PUMP simulator 28 having miss handler code also runs on the processor, separate simulations for the miss handler on gem5 to capture its dynamic behavior. Since the miss-handler code potentially impacts the data and instruction caches, a merged address trace is created that includes properly interleaved memory accesses from both user and miss-handler code, which is used for the final address-trace simulation to estimate the performance impact of the memory system.

In following paragraphs, the evaluation of the simple PUMP implementation is provided in comparison to the no-PUMP baseline.

As one point of evaluation, it should be noted that the overall area overhead of the PUMP 10 on top of the baseline processor is 190% (See Table 3 in FIG. 16). The dominant portion of this area overhead (110%) comes from the PUMP 10 rule caches. The unified L2 cache contributes most of the remaining area overhead. The L1 D/I caches stay roughly the same, since their effective capacity is halved. This high memory area overhead roughly triples the static power, contributing to 24% of the energy overhead.

Figure 3A:
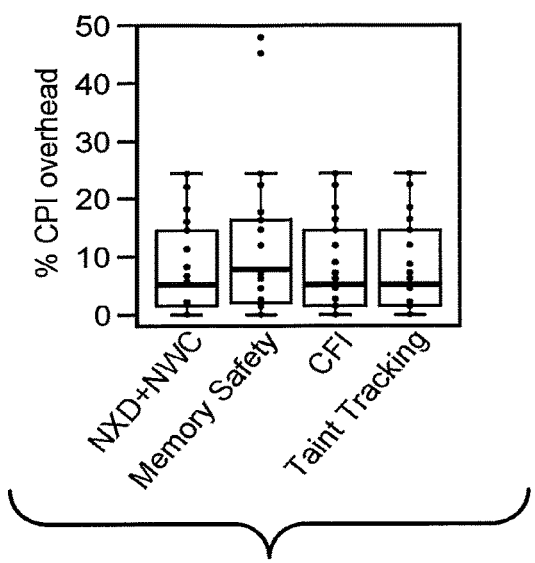
FIG. 3A is a graph showing performance results for a single runtime policy with simple implementation using the evaluation framework depicted in FIG. 2.

Another points of evaluation relates to runtime overhead. For all single policies on most benchmarks, the average runtime overhead of even this simple implementation is only 10% (see FIG. 3A and FIG. 3B; to read boxplots: bar is the median, box covers one quartile above and below (middle 50% of cases), dots represent each individual data point, whiskers denote full range except for outliers (more than 1.5× respective quartile)), with the dominant overhead coming from the additional DRAM traffic required to transfer tag bits to and from the processor. For the Memory Safety policy (FIG. 3A and FIG. 3B), there are a few benchmarks that exhibit high miss handler overhead, pushing their total overhead up to 40-50% due to compulsory misses on newly allocated memory blocks. For the Composite policy Runtime (labeled as "CPI" or "CPI Overhead" in the Figures), five of the benchmarks suffer from very high overheads in the miss handler (See FIG. 4A), with the worst case close to 780% in the GemsFTDT and the geomean reaching 50%. For the Composite policy Energy (labeled as "EPI" or "EPI Overhead" in the Figures) depicted in FIG. 4B, three of the benchmarks (i.e. GemsFTDT, astar, omnetpp) suffer from very high overheads in the miss handler, with the worst case close to 1600% in the GemsFTDT, 600% in the astar, and 520% in the omnetpp.

Two factors contribute to this overhead: (1) the large number of cycles required to resolve a last-level rule cache miss (since every component miss handler must be consulted), and (2) an explosion in the number of rules, which expands the working set size and increases the rule cache miss rate. In the worst case, the number of unique composite tags could be the product of the unique tags in each component policy. However, the total rules increase by a factor of 3×-5× over the largest single policy, Memory Safety.

Figure 3B:
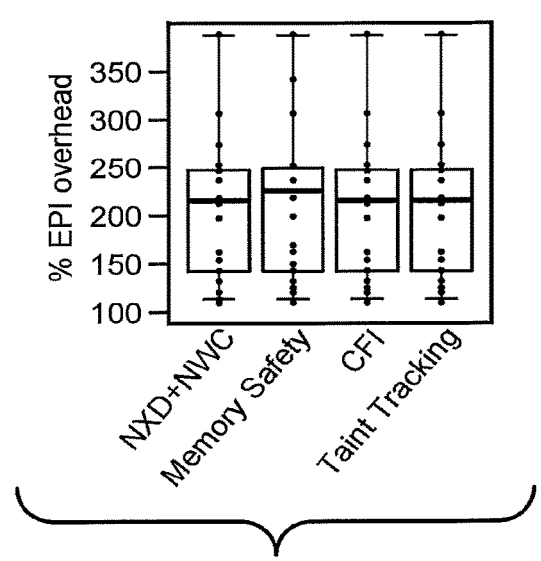
FIG. 3B is a graph showing performance results a single energy policy with simple implementation.
Figure 4B:
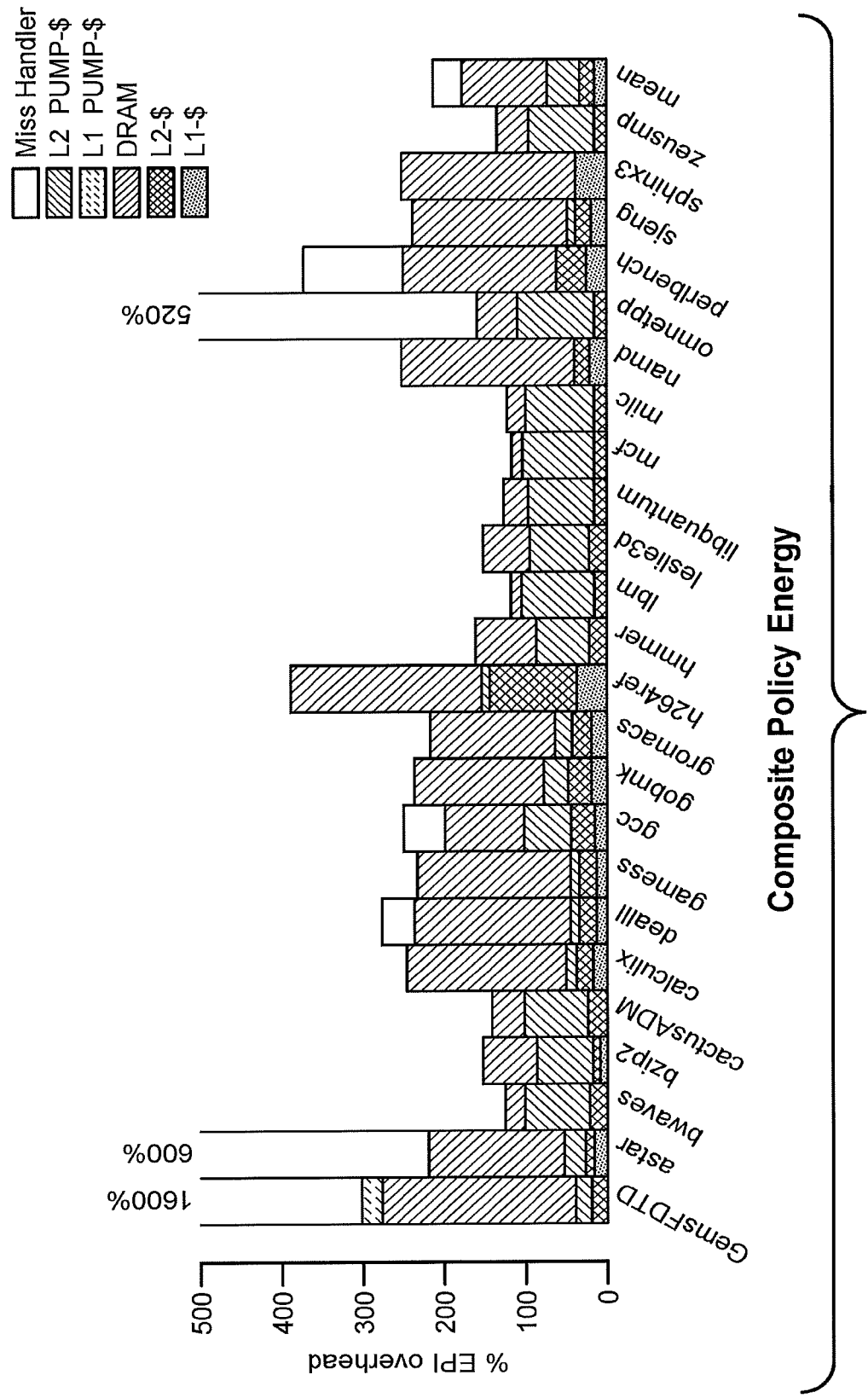
FIG. 4B is a series of bar graphs showing composite policy energy overhead of simple implementation with 64b Tags.

Another point of evaluation is energy overhead. Moving more bits, due to wider words, and executing more instructions, due to miss handler code, both contribute to energy overheads, impacting both the single and composite policies (FIG. 3B and FIG. 4B). The CFI and Memory Safety policies—and hence also the Composite policy—access large data structures that often require energy-expensive DRAM accesses. The worst-case energy overhead is close to 400% for single policies, and about 1600% for the Composite policy, with geomean overhead around 220%.

Figure 4C:
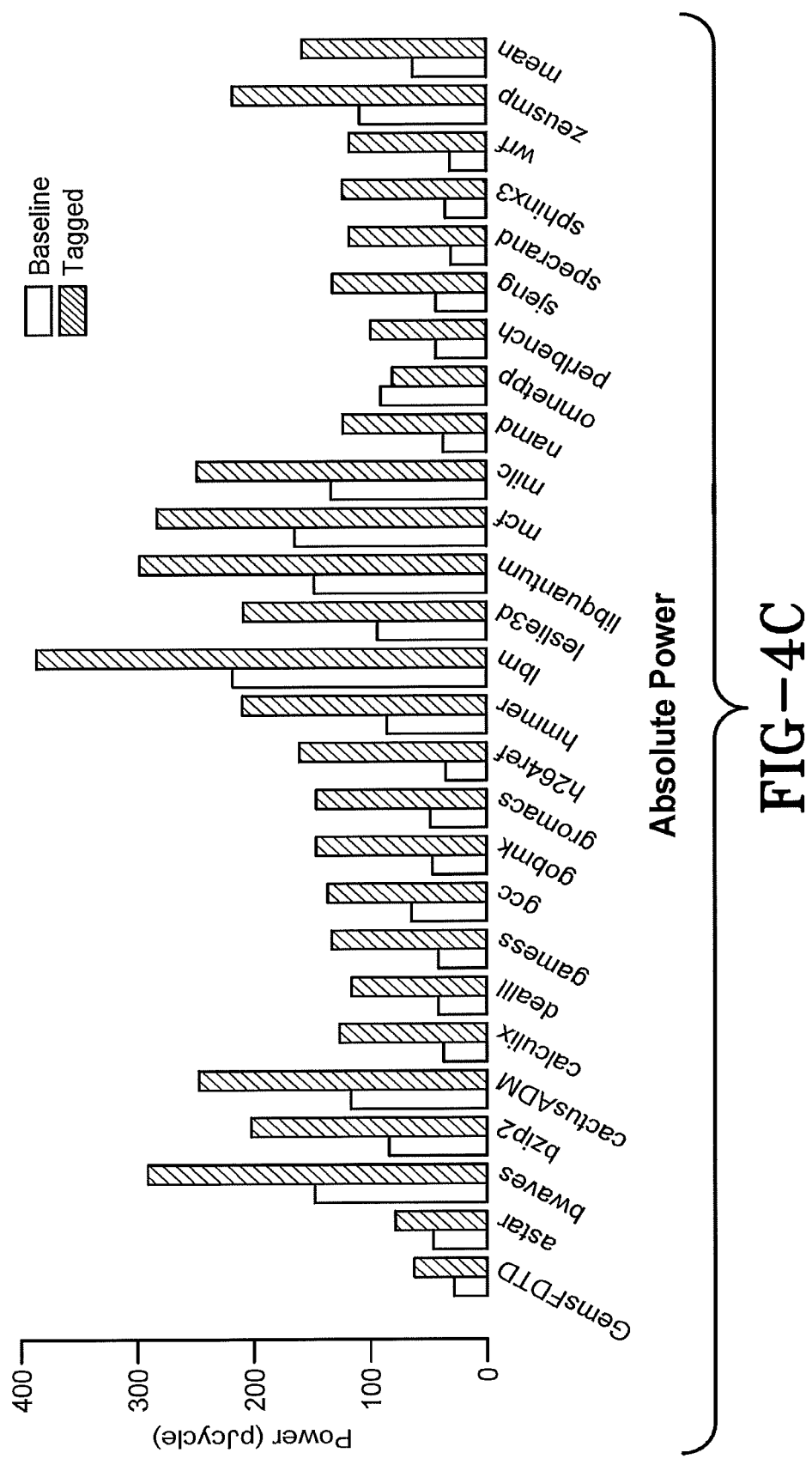
FIG. 4C is a series of bar graphs showing power ceilings with simple implementation compared to a baseline.

For many platform designs the worst-case power, or equivalently, energy per cycle, is the limiter. This power ceiling may be driven by the maximum current the platform can draw from a battery or the maximum sustained operating temperature either in a mobile or in a wired device with ambient cooling. FIG. 4C shows that the simple implementation raises the maximum power ceiling by 76% with lbm driving the maximum power in both the baseline and simple PUMP implementations. Note that this power ceiling increase is lower than the worst-case energy overhead in part because some benchmarks slow down more than the extra energy they consume and in part because the benchmarks with high energy overhead are the ones consuming the least absolute energy per cycle in the baseline design. Typically the data working set of these energy-efficient programs fits into the on-chip caches, so they seldom pay the higher cost of DRAM accesses.

An embodiment incorporating the foregoing implementation described above achieves reasonable performance on most benchmarks, the runtime overhead for the Composite policy on some of them and the energy and power overheads on all policies and benchmarks seem unacceptably high. To address these overheads, a series of targeted microarchitecture optimizations may be introduced and also incorporated into an embodiment in accordance with techniques herein. In Table 4 at FIG. 17, these optimizations are examined for the impact of the architectural parameters associated with the PUMP components on the overall costs. Groupings of opcodes with identical rules are used to increase the effective capacity of the PUMP rule caches, tag compression to reduce the delay and energy of DRAM transfers, short tags to reduce the area and energy in on-chip memories, and Unified Component Policy (UCP) and Composition Tag (CTAG) caches to decrease the overheads in the miss handlers.

Figure 5A:
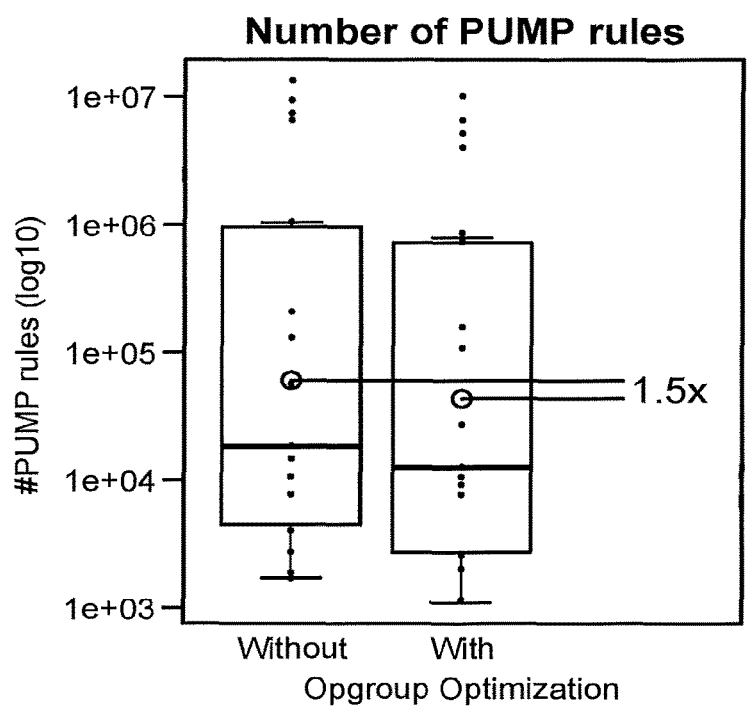
FIG. 5A is a comparative bar graph of the number of PUMP rules without opgroup optimization and with opgroup optimization.
Figure 5B:
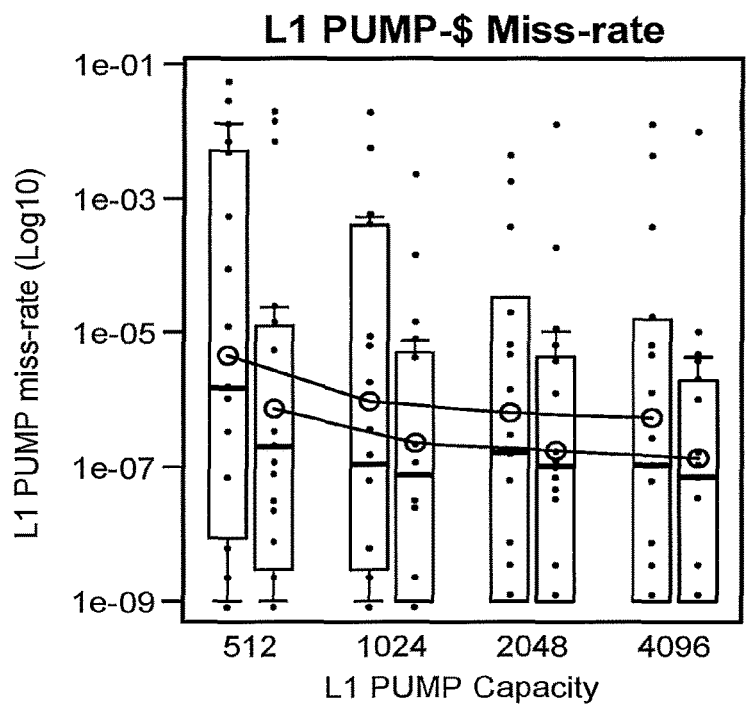
FIG. 5B is a series of graphs showing the impact of miss rates of different opgroup optimizations based on PUMP capacity.

What will now be described are "opgroups" as may be used in an embodiment in accordance with techniques herein. In practical policies, it is common to define similar rules for several opcodes. For example, in the Taint Tracking policy, the rules for the Add and Sub instructions are identical (See Algorithm 1 in FIG. 19). However, in the simple implementation, these rules occupy separate entries in the rule caches. Based on this observation, instruction operation codes ("opcodes") are grouped with the same rules into "opgroups", reducing the number of rules needed. Which opcodes can be grouped together depends on the policy; therefore the "don't-care" SRAM is expanded in the Execute stage 18 (FIG. 1) to also translate opcodes to opgroups before the rule cache lookup. For the Composite policy, over 300 Alpha opcodes are reduced to 14 opgroups and the total number of rules by a factor of 1.1×-6×, with an average of 1.5× (FIG. 5A measures this effect across all the SPEC benchmarks). This effectively increases the rule cache capacity for a given investment in silicon area. Opgroups also reduce the number of compulsory misses, since a miss on a single instruction in the group installs the rule that applies to every instruction opcode in the group. FIG. 5B summarizes the miss-rate across all the SPEC benchmarks for different L1 rule cache sizes for the Composite policy with and without opgrouping. FIG. 5B shows that both the range and the mean of the miss-rates are reduced by opgrouping. Particularly, a 1024-entry rule cache after opgroup optimization has a lower miss rate than a 4096-entry rule cache without it. A lower miss-rate naturally reduces the time and energy spent in miss handlers (See FIG. 12A and FIG. 12B) and smaller rule caches directly reduce area and energy.

Figure 6A:
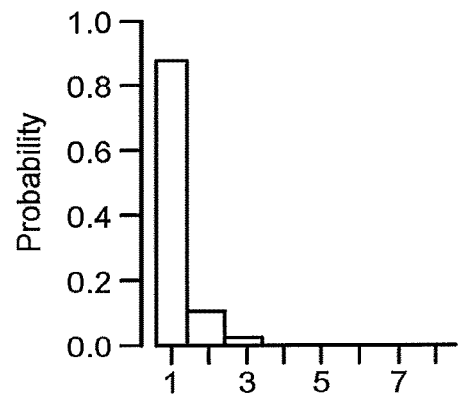
FIG. 6A is a graph of the distribution of unique tags for each DRAM transfer for the gcc benchmark with the composite policy, showing that most words have the same tag.

An embodiment in accordance with techniques herein may utilize main memory tag compression that will now be described. Using 64b tags on 64b words doubles the off-chip memory traffic and therefore approximately doubles the associated energy. Typically, though, tags exhibit spatial locality—many adjacent words have the same tag. For example, FIG. 6A plots the distribution of unique tags for each DRAM transfer for the gcc benchmark with the Composite policy, showing that most words have the same tag: on average there are only about 1.14 unique tags per DRAM transfer of an 8-word cache line. This spatial tag locality is exploited to compress the tag bits that must be transferred to and from the off-chip memory. Since data is transferred in cache lines, the cache lines are used as the basis for this compression. 128B per cache line are allocated in the main memory, to keep addressing simple.

Figure 6B:
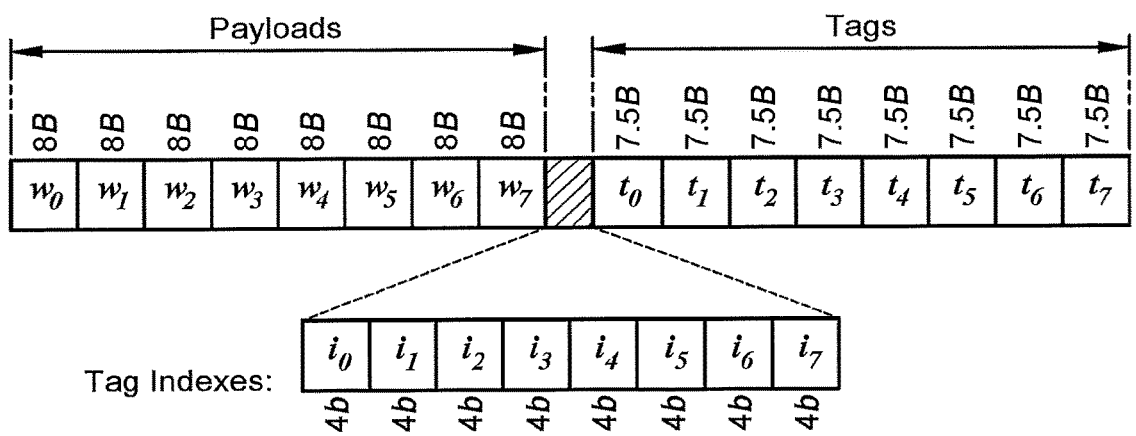
FIG. 6B is a diagram showing the main memory tag compression.

However, as depicted in FIG. 6B rather than storing 128b tagged words directly, eight 64b words (payloads) are stored, followed by eight 4b indexes, and then up to eight 60b tag. The index identifies which of the 60b tags goes with the associated word. The tag is trimmed to 60b to accommodate the indexes, but this does not compromise the use of tags as pointers: assuming byte addressing and 16B (two 64b words) aligned metadata structures, the low 4b of the 64b pointer can be filled in as zeros. As a result, after transferring the 4B of indexes, all that remains is the need to transfer the unique 7.5B tags in the cache line. For instance, if the same tag is used by all the words in the cache line then there is a transfer of 64B+4B=68B in a first read, then 8B in a second read for a total of 76B instead of 128B. The 4b index can be either a direct index or a special value. A special index value is defined to represent a default tag, so that there is no need to transfer any tag in this case. By compressing tags in this manner, the average energy overhead per DRAM transfer is reduced from 110% to 15%.

The compression scheme presented above may be utilized in embodiment in accordance with techniques herein, for example, due to its combination of simplicity and effectiveness at reducing off-chip memory energy. One having skill in the art clearly recognizes that additional alternative clever schemes for fine-grained memory tagging exist—including multi-level tag page tables, variable-grained TLB-like structures, and range caches—and these may also be used to reduce the DRAM footprint in an embodiment in accordance with techniques herein.

What will now be described is how tag translation may be performed in an embodiment in accordance with techniques herein. With reference again to FIG. 1, the simple PUMP rule caches are large (adding 110% area) since each cached rule is 456b wide. Supporting the PUMP 10 also required extending the baseline on-chip memories (RFs and L1/L2 caches) with 64b tags. Using a full 64b (or 60b) tag for each 64b word here incurs heavy area and energy overheads. However, a 64 KB L1-D$ holds only 8192 words and hence at most 8192 unique tags. Along with a 64 KB L1-I$, there may be at most 16384 unique tags in the L1 memory subsystem; these can be represented with just 14b tags, reducing the delay, area, energy, and power in the system. Caches (L1, L2) exist to exploit temporal locality, and this observation suggests that locality can be leveraged to reduce area and energy. If the tag bits are reduced to 14b, the PUMP rule cache match key is reduced from 328b to 78b.

Figure 7A:
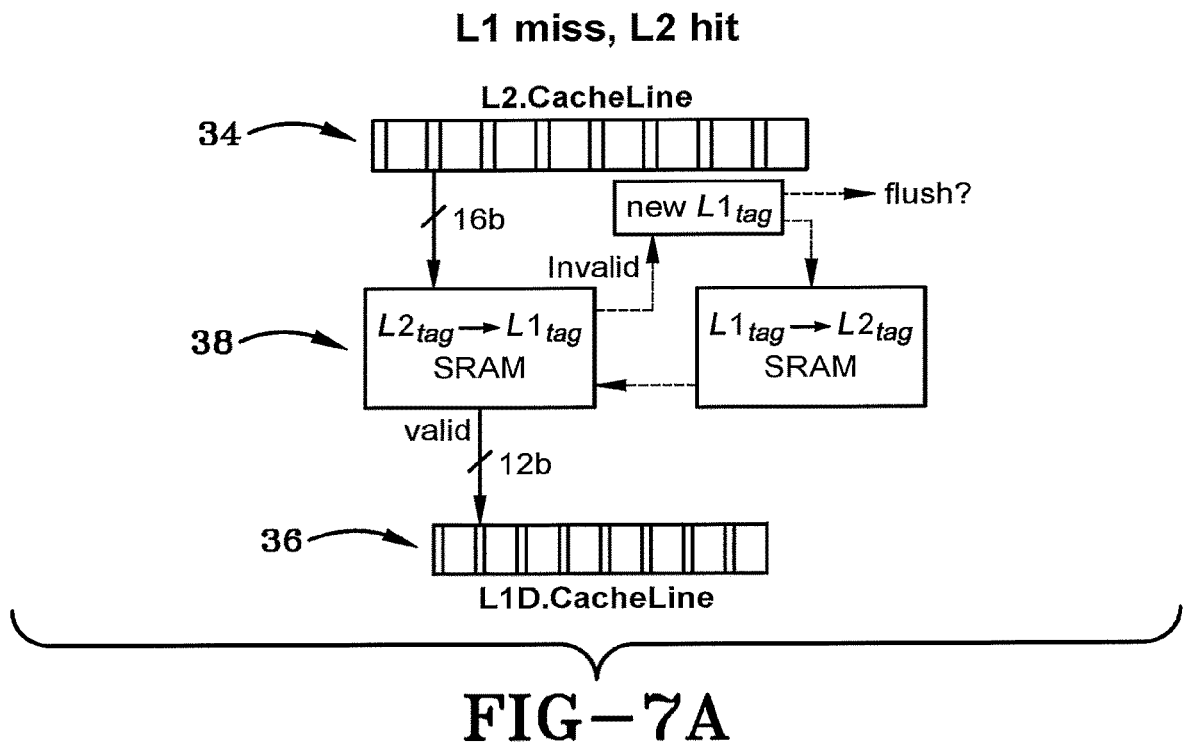
FIG. 7A is a schematic drawings showing translation between 16b L2 tags and 12b L1 tags.
Figure 7B:
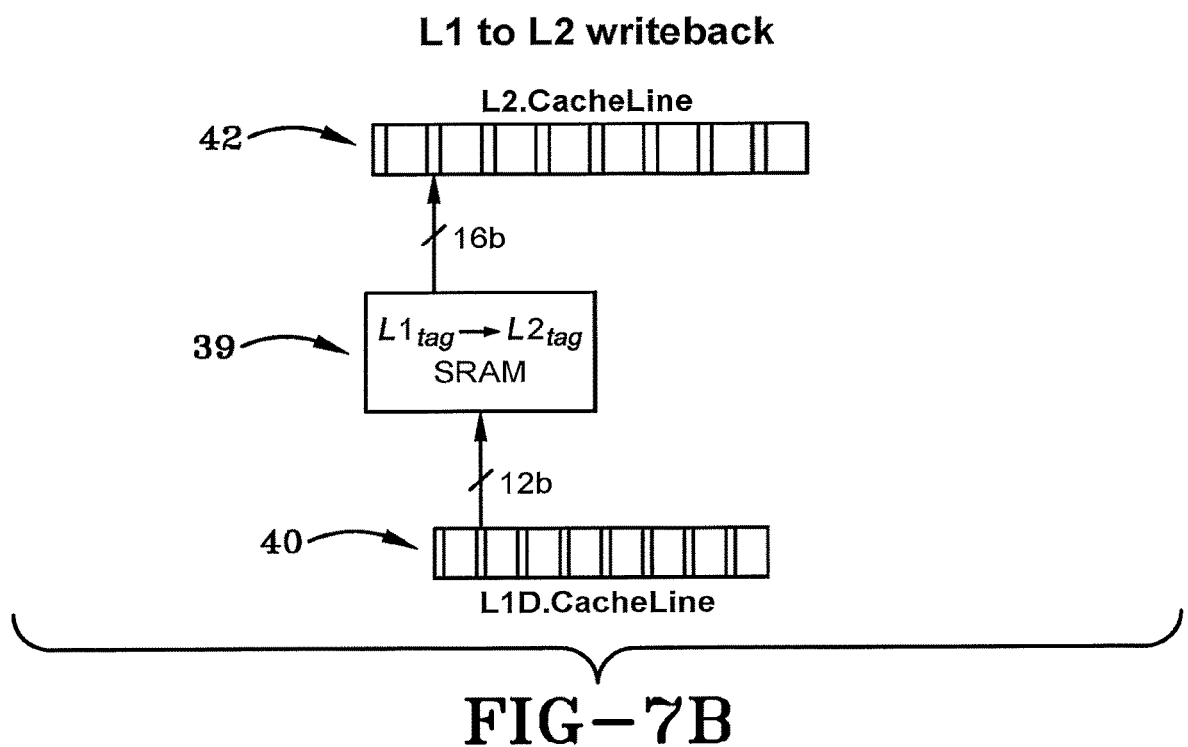
FIG. 7B is a schematic drawings showing translation between 12b L1 tags and 16b L2 tags.

To obtain the foregoing saving advantage without losing the flexibility of full, pointer-sized tags, different-width tags may be used for different on-chip memory subsystems and translate between these as needed. For example, one might use 12b tags in the L1 memories and 16b tags in the L2 memories. FIG. 7A details tag translation as may be performed between L1 and L2 memory subsystems. Moving a word from L2 cache 34 to L1 cache 36 requires translating its 16b tag to the corresponding 12b tag, creating a new association if needed. A simple SRAM 38 for the L2-tag-to-L1-tag translation, with an extra bit indicating whether or not there is an L1 mapping for the L2 tag. FIG. 7B details the translation an L1 tag 40 to L2 tag 42 (on a writeback or an L2 lookup) performed with a SRAM 39 lookup using the L1 tag as the address. A similar translation occurs between the 60b main memory tags and 16b L2 tags.

When a long tag is not in the long-to-short translation table, a new short tag is allocated, potentially reclaiming a previously allocated short tag that is no longer in use. There is a rich design space to explore for determining when a short tag can be reclaimed, including garbage collection and tag-usage counting. For simplicity, short tags are allocated sequentially and flush all caches above a given level (instruction, data, and PUMP) when the short tag space is exhausted, avoiding the need to track when a specific short tag is available for reclamation. Caches may be designed with suitable techniques that making cache flushes inexpensive. For example, in an embodiment in accordance with techniques herein, all caches may be designed with a lightweight gang clear, such as known in the art and described, for example, in K. Mai, R. Ho, E. Alon, D. Liu, Y. Kim, D. Patil, and M. Horowitz. Architecture and Circuit Techniques for a 1.1 GHz 16-kb Reconfigurable Memory in 0.18 um-CMOS. IEEE J. Solid-State Circuits, 40(1):261-275, January 2005, which is incorporated by reference herein.

In comparison to Table 3 (reproduced in FIG. 16), where each L1 rule cache access costs 51 pJ, techniques herein provide for a reduction down to 10 pJ with 8b L1 tags or 18 pJ with 16b L1 tags, with the energy scaling linearly with tag length between these points. The energy impact on the L1 instruction and data caches is small. Similarly, with 16b L2 tags, L2 PUMP access costs 120 pJ, down from 173 pJ with 64b tags. Slimming L1 tags also allows us to restore the capacity of the L1 caches. With 12b tags, the full-capacity (76 KB, effective 64 KB) cache will meet single-cycle timing requirements, reducing the performance penalty the simple implementation incurred from the reduced L1 cache capacity. As a result, L1 tag length exploration is limited to 12 bits or less. While even shorter tags reduce energy, they also increase the frequency of flushes.

Figure 8A:
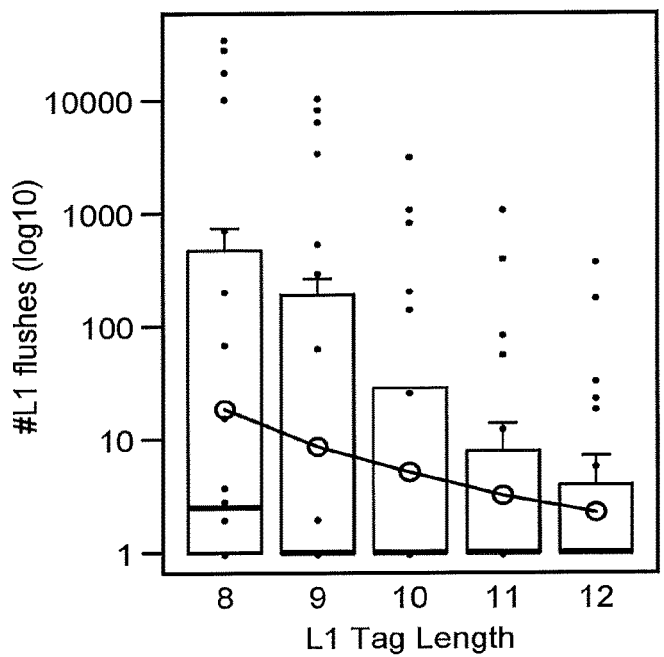
FIG. 8A is a schematic graph showing the impact of L1 tag length on L1 PUMP flushes (log 10)
Figure 8B:
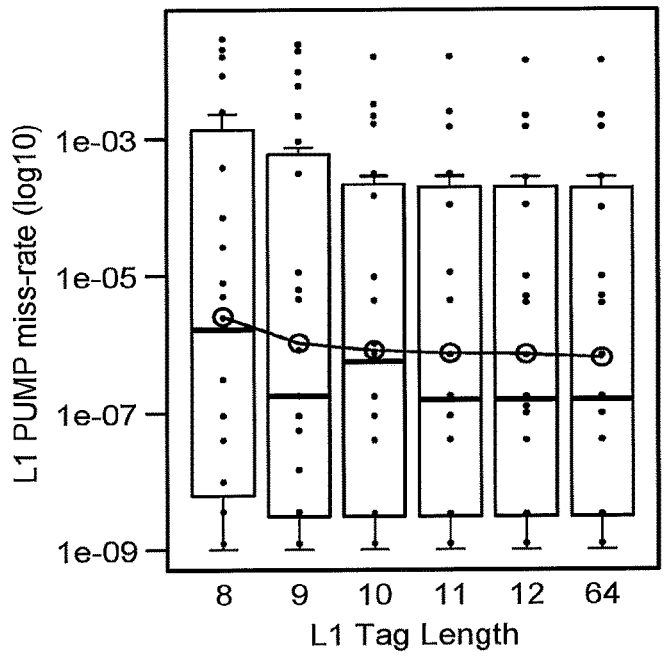
FIG. 8B is a schematic graph showing the impact of L1 tag length on L1 PUMP miss-rates.

FIG. 8A and FIG. 8B depict how flushes decrease with increasing L1 tag length, as well as the impact on the L1 rule cache miss-rate.

Figure 9A:
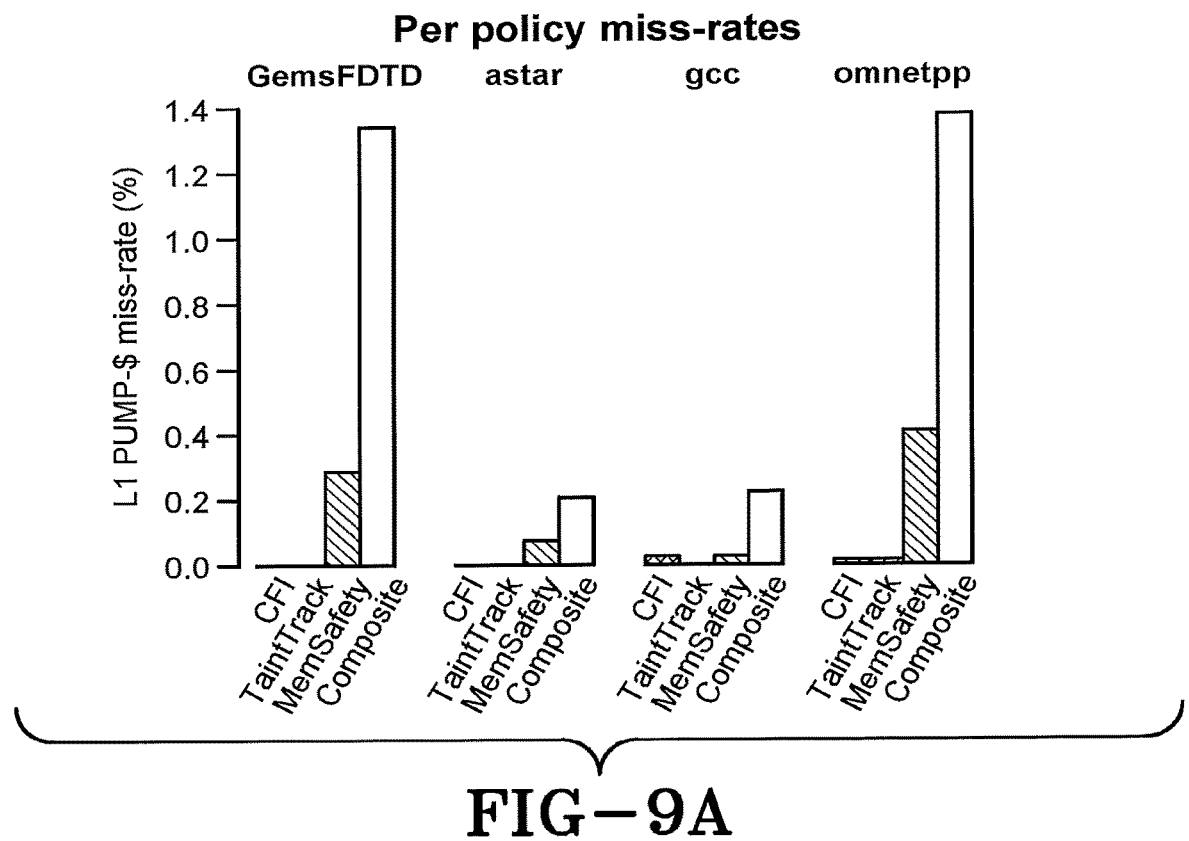
FIG. 9A is a series of bar graphs showing miss rates for different policies.

What will now be described are various techniques that may be used in connection with miss handler acceleration. An embodiment in accordance with techniques herein may combine four policies into a single Composite policy. With reference to FIG. 20, in Algorithm 2, each invocation of a N-policy miss handler has to take apart a tuple of tags and rules needed for the Composite policy increases the rule cache miss rates, which are identified in FIG. 9A. Even though the Taint Tracking and CFI policies individually have a low miss-rate, a higher miss-rate from the Memory Safety policy drives the miss-rate for the Composite policy high as well. The lower miss rates of the individual policies suggest that their results may be cacheable even when the composite rules are not.

Figure 23:
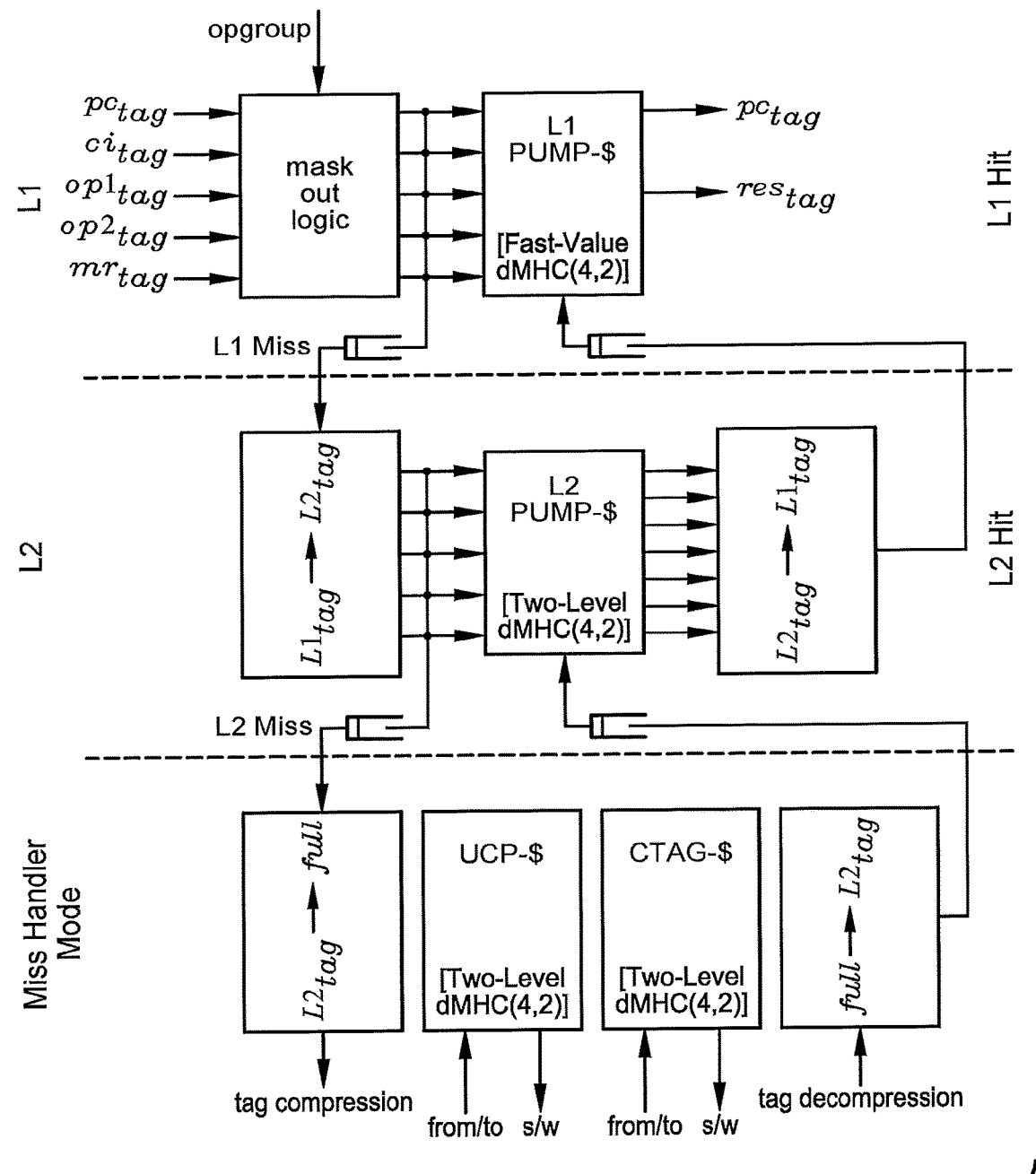
FIG. 23 is a schematic view of the PUMP microarchitecture.

In connection with various aspects of the PUMP microarchitecture such as illustrated in FIG. 23, hardware structures may be utilized to optimize composite policy miss handling. An embodiment in accordance with techniques herein may utilize a Unified Component Policy (UCP; see Algorithm 3 in FIG. 21) cache (UCP $) where the most recent component policy results are cached. In such an embodiment, the general miss-handler for composite policies is modified to perform lookups in this cache while resolving component policies (e.g., see Algorithm 3 of FIG. 21, such at line 3). When this cache misses for a component policy its policy computation is performed in software (and insert the result in this cache).

Figure 9B:
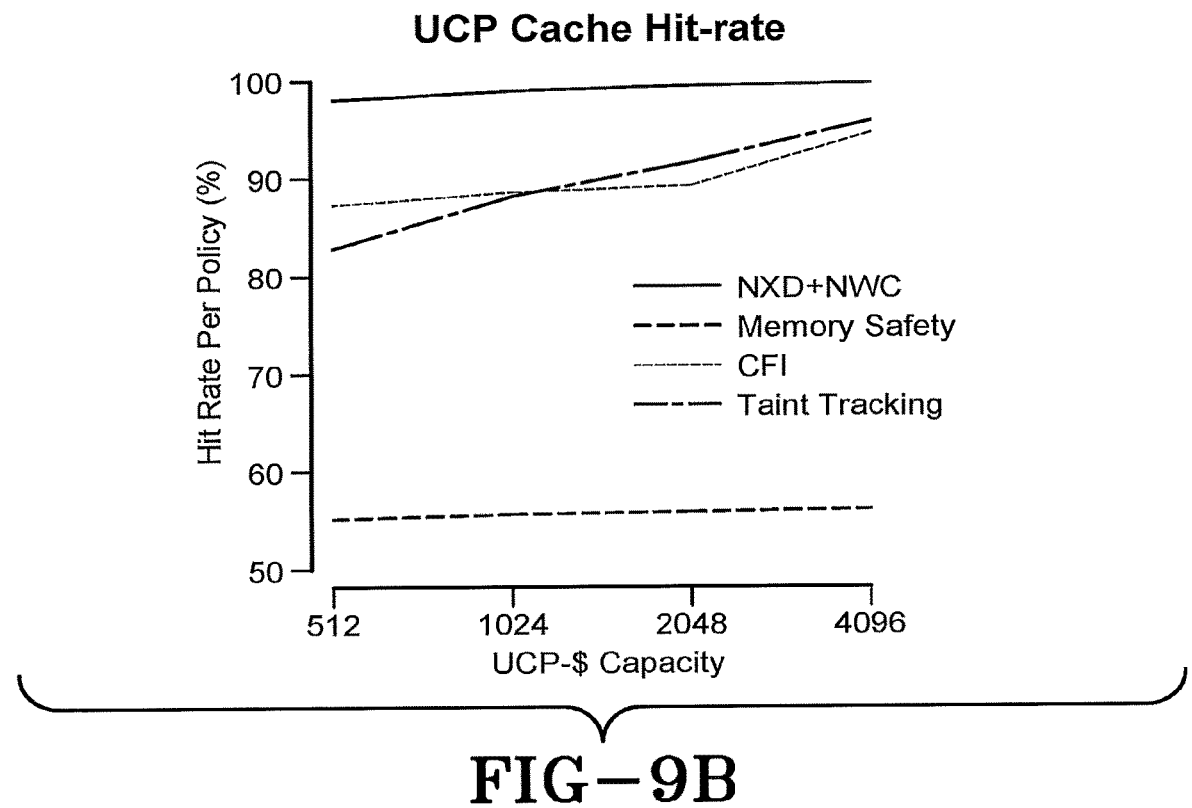
FIG. 9B is a line graph depicting a cache hit rate for four exemplary microarchitecture optimizations.
Figure 9C:
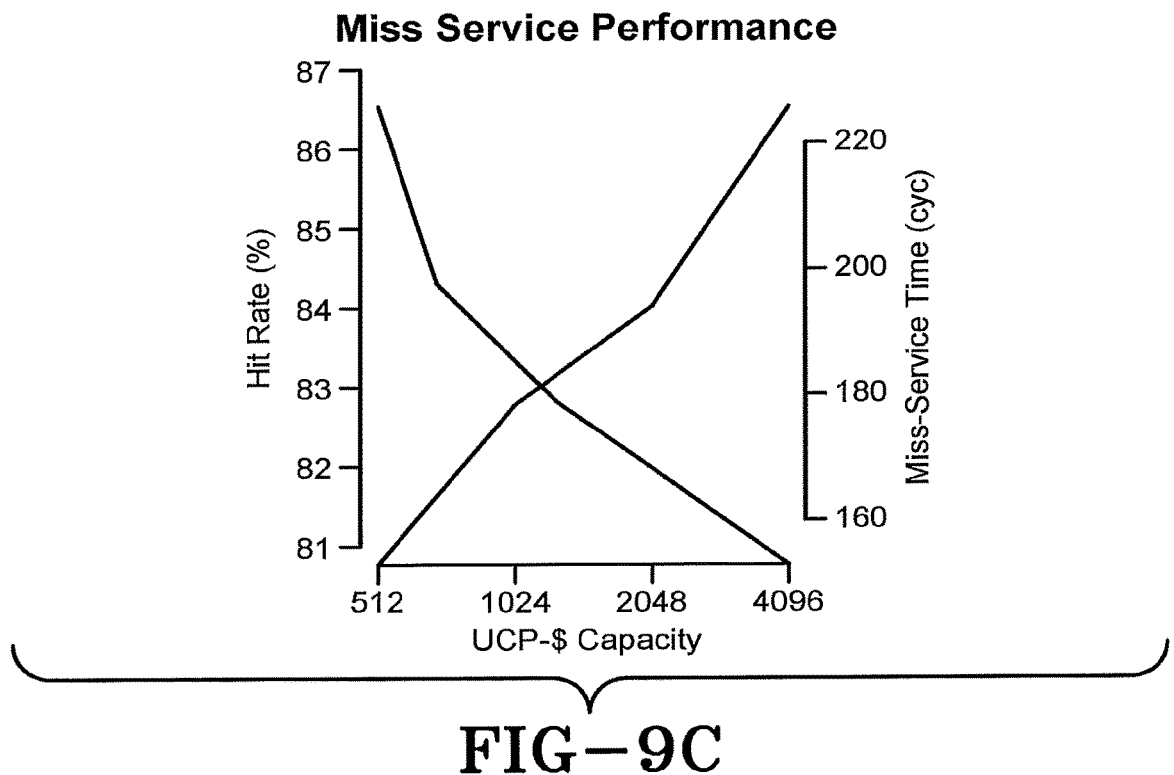
FIG. 9C is a line graph depicting miss service performance.
Figure 9D:
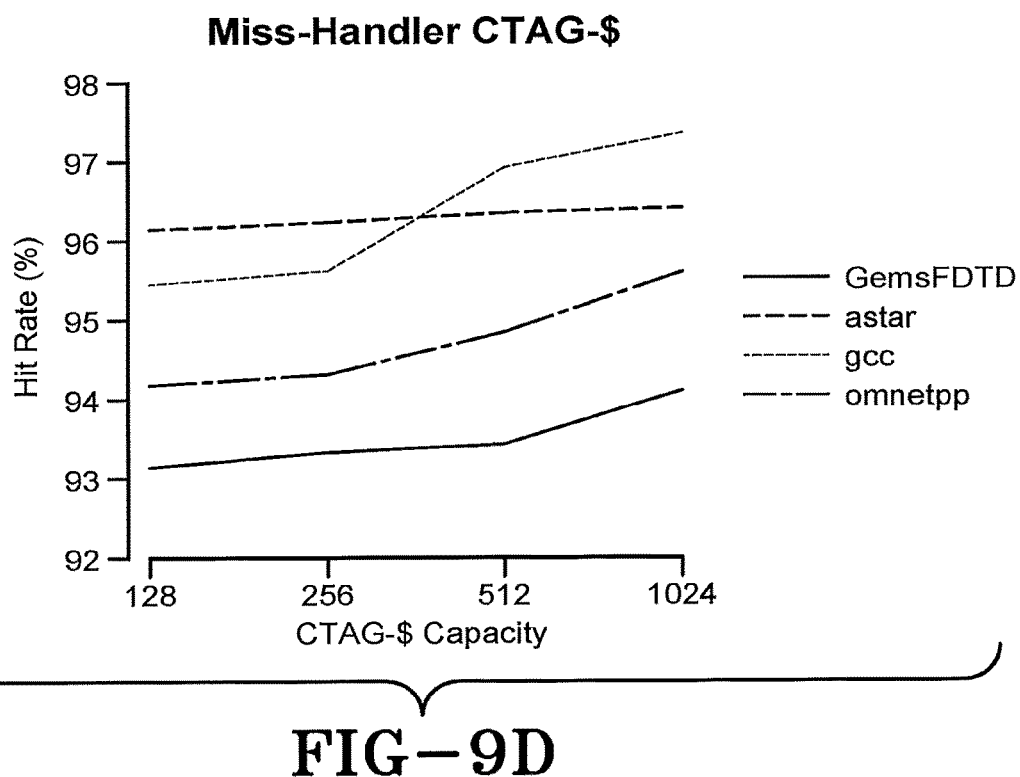
FIG. 9D is a line graph depicting miss handler hit rates based on capacity.
Figure 9E:
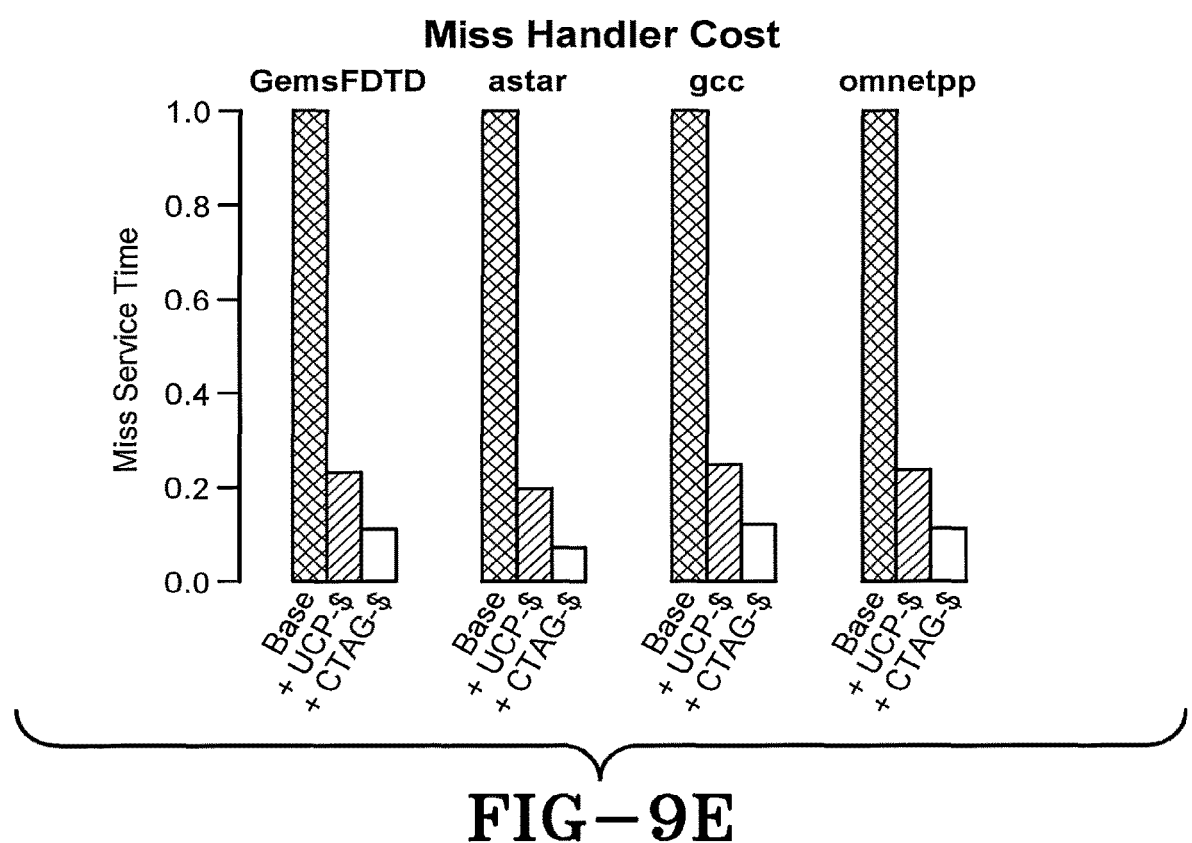
FIG. 9E is a series of bar graphs depicting the impact of optimizations for the composite policy.
Figure 24:
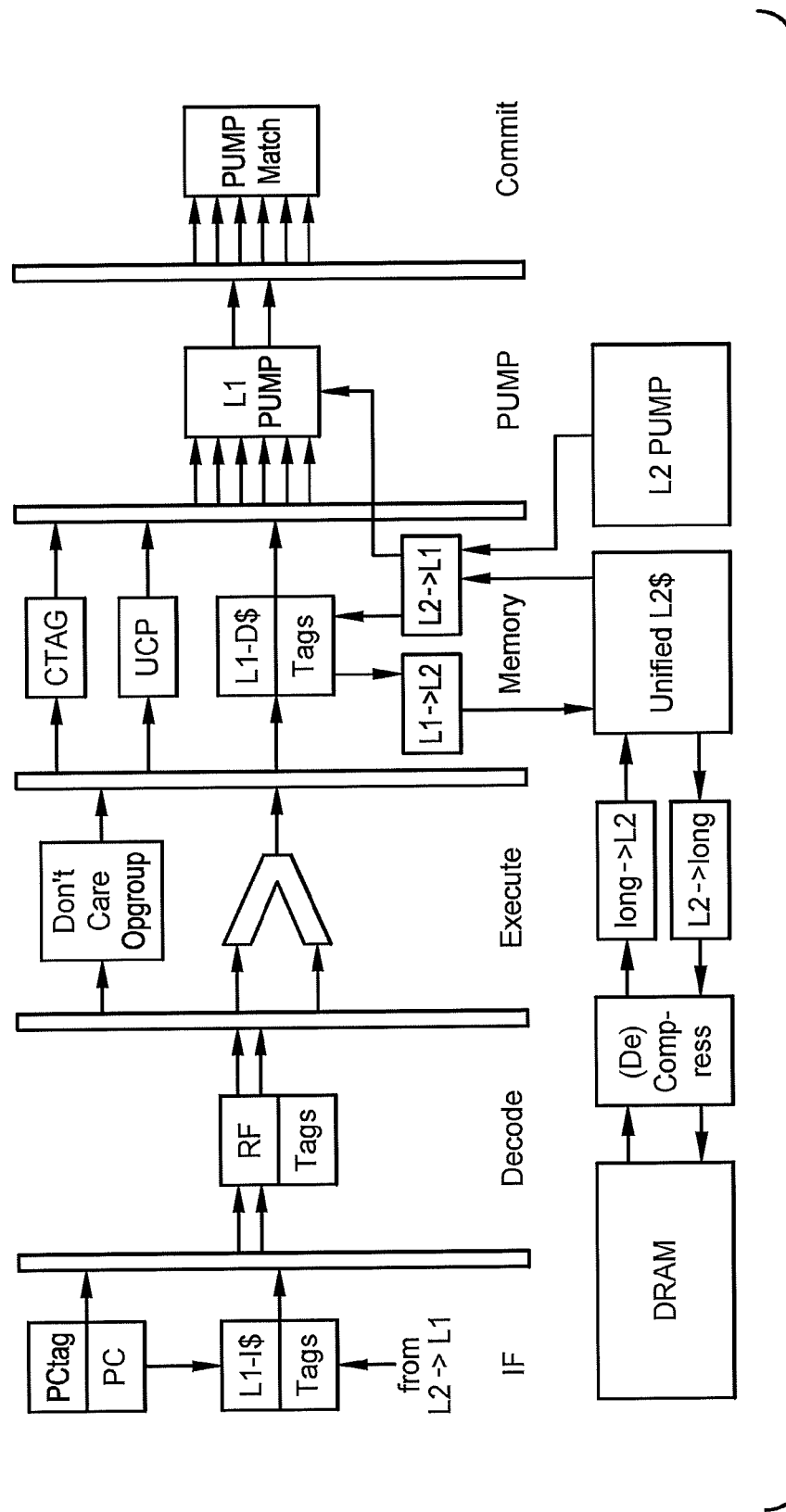
FIG. 24 is a schematic view, similar to FIG. 1, showing an exemplary PUMP cache integrated as a pipeline stage in a processor pipeline and its opgroup translation, UCP and CTAG caches.

As also illustrated in FIG. 24, the UCP cache may be implemented with the same hardware organization as the regular PUMP rule cache, with an additional policy identifier field. A FIFO replacement policy may be used for this cache, but it may be possible to achieve better results by prioritizing space using a metric such as the re-computation cost for the component policies. With modest capacity, this cache filters out most policy re-computations (FIG. 9B; the low hit rate for memory safety is driven by compulsory misses associated with new memory allocations). As a result, the average number of miss handler cycles are reduced by a factor of 5 for the most challenging benchmarks (FIG. 9E). It is possible for every policy to hit in the UCP cache when there is a miss in the L2 PUMP since the composite rules needed could be a product of a small number of component policy rules. For GemsFDTD, three or more component policies was hit about 96% of the time.

As also included in FIG. 23 and FIG. 24, a cache may be added to translate a tuple of result tags into its canonical composite result tag. The foregoing cache may be referred to as the Composition Tag (CTAG) cache (CTAG $) which is effective (FIG. 9D) because it is common for several component policy rules to return the same tuple of result tags. For example, in many cases the $PC_{tag}$ will be the same, even though the result tag is different. Furthermore, many different rule inputs can lead to the same output. For example, in Taint Tracking set unions are performed, and many different unions will have the same result; e.g., (Blue, {A, B, C}) is the composite answer for writing the result of both {A}∪{B, C} and {A, B}∪{B,C} (Taint Tracking) into a Blue slot (Memory Safety). A FIFO replacement policy is used for this cache. The CTAG cache reduces the average miss handler cycles by another factor of 2 (See FIG. 9E).

Taken together, a 2048-entry UCP cache and a 512-entry CTAG cache reduce the average time spent on each L2 rule cache miss from 800 cycles to 80 cycles.

An embodiment in accordance with techniques herein may also improve performance by prefetching one or more rules which are stored in one or more of the caches including rules. Thus, it is additionally possible to reduce the compulsory miss rate with precompute rules that might be needed in the near future. An exemplary instance has high value for the Memory Safety rules. For example when a new memory tag is allocated, new rules will be needed (initialize (1), add offset to pointer and move (3), scalar load (1), scalar store (2)) for that tag. Consequently, all of these rules may be added to the UCP cache at once. For the single-policy Memory Safety case, the rules may be added directly into the rule caches. This reduces the number of Memory Safety miss-handler invocations by 2×.

Figure 11A:
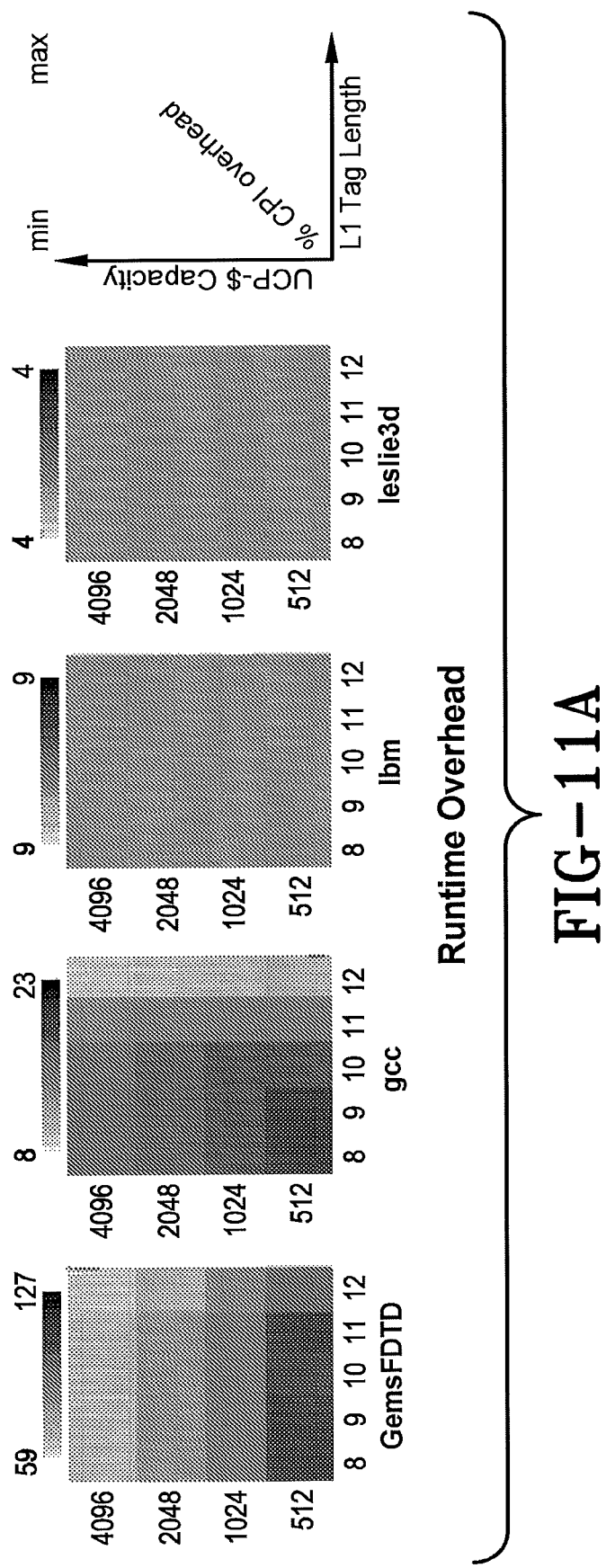
FIG. 11A is a series of shaded graphs depicting runtime overhead impact of tag bit length and UCP-Cache ($) capacity for different representative benchmarks.

In connection with an overall evaluation and with reference to FIG. 11A, the architecture parameters monotonically impact a particular cost, providing tradeoffs among energy, delay, and area, but not defining a minimum within a single cost criteria. There is the threshold effect that, once the tag bits are small enough, the L1 D/I caches can be restored to the capacity of the baseline, so that baseline is adopted as the upper bound to explore for L1 tag length, but beyond that point, decreasing tag length reduces energy with small impact on performance.

Figure 11B:
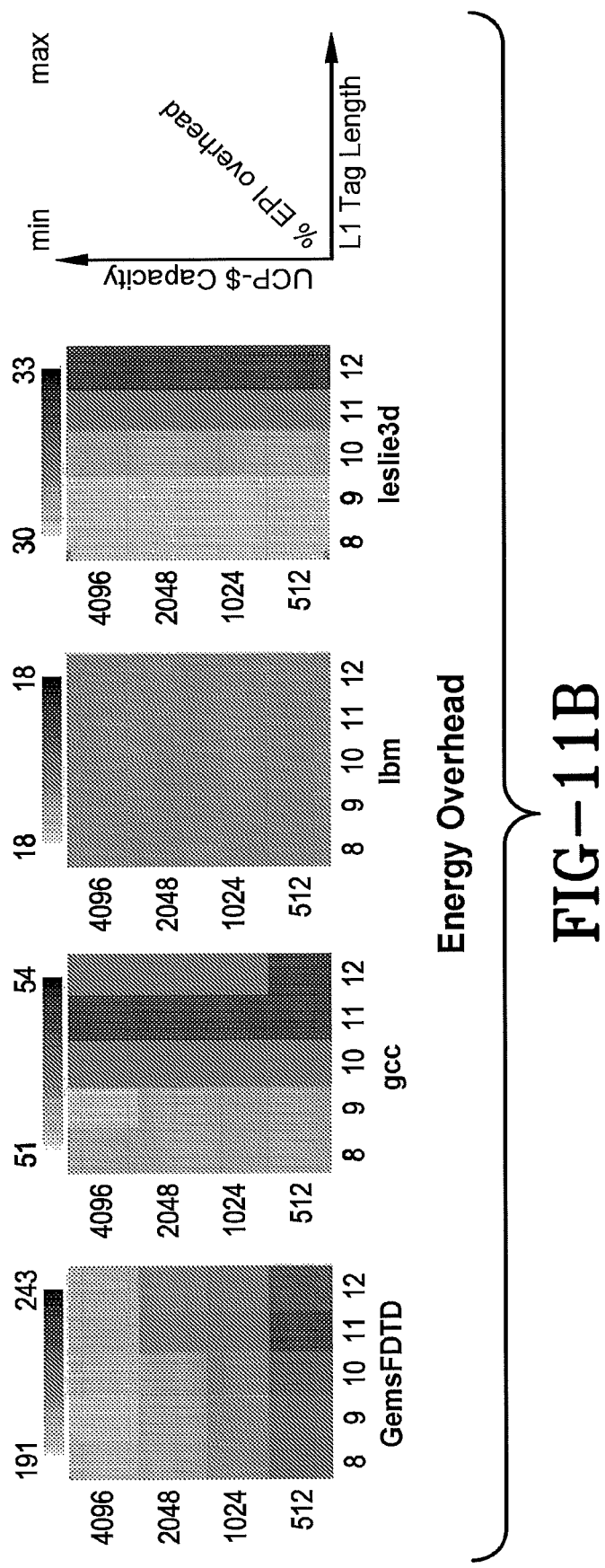
FIG. 11B is a series of shaded graphs depicting energy overhead impact of tag bit length and UCP-$ capacity for different representative benchmarks.

FIG. 11B depicts that reducing tag length is the dominant energy effect for most benchmark programs (e.g. leslie3d, mcf), with a few programs showing equal or larger benefits from increasing UCP cache capacity (e.g., GemsFDTD, gcc). Ignoring other cost concerns, to reduce energy, large miss handler caches and few tag bits are selected. Runtime overhead (see FIG. 11A) is also minimized with larger miss handler caches, but benefits from more rather than fewer tag bits (e.g., GemsFDTD, gcc). The magnitude of the benefits vary across benchmarks and policies. Across all benchmarks, the benefit beyond 10b L1 tags is small for the SPEC CPU2006 benchmarks, so 10b are used as the compromise between energy and delay and use a 2048-entry UCP cache and a 512-entry CTAG cache to reduce area overhead while coming close to the minimum energy level within the space of the architecture parameters explored.

Figure 12A:
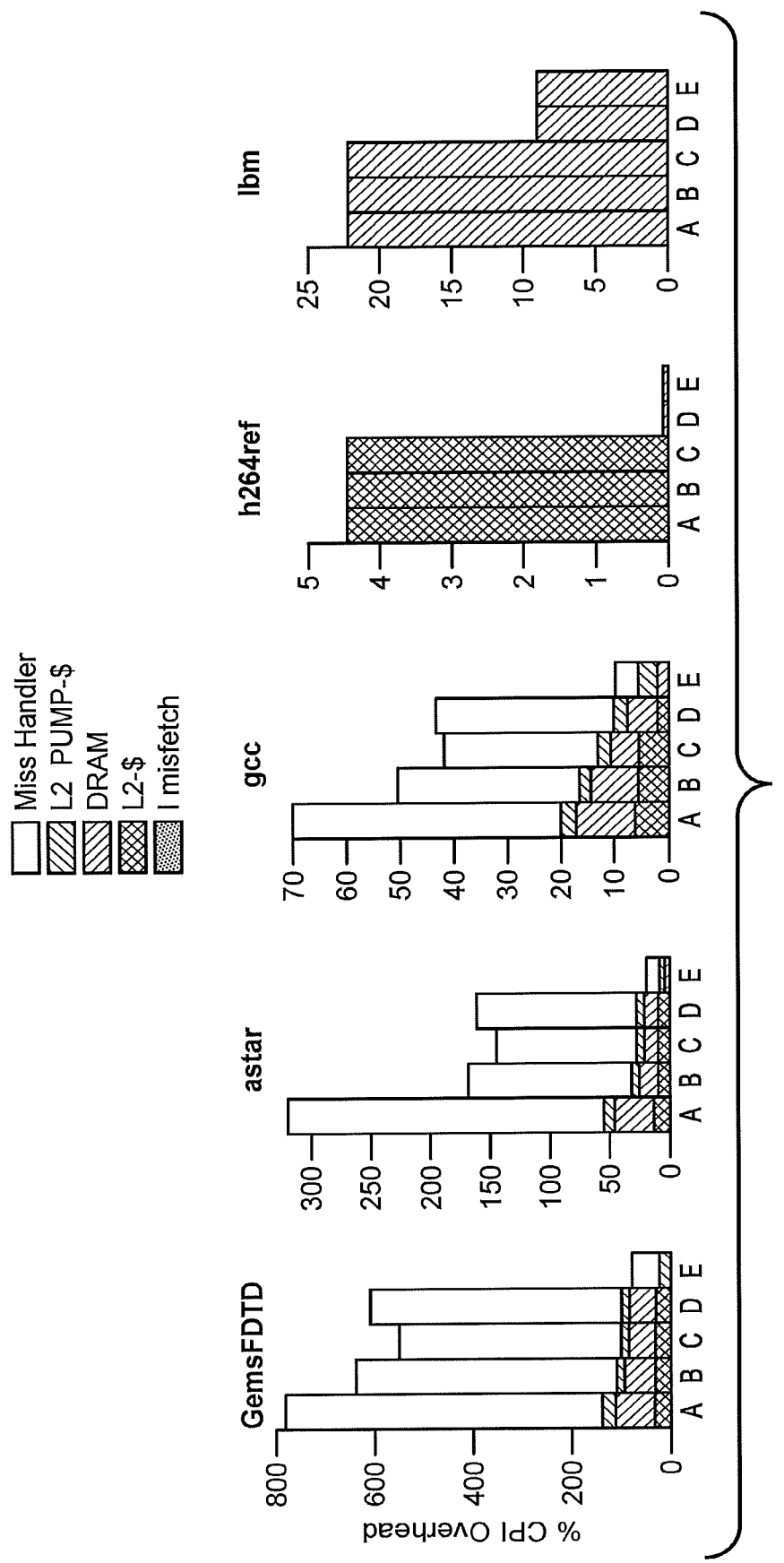
FIG. 12A is a series of graphs showing runtime impact of optimizations on representative benchmarks wherein A: Simple; B: A+Opgrouping; C: B+DRAM Compression; D: C+(10b L1, 14b, L2) short tags; E: D+(2048-UCP; 512-CTAG))
Figure 12B:
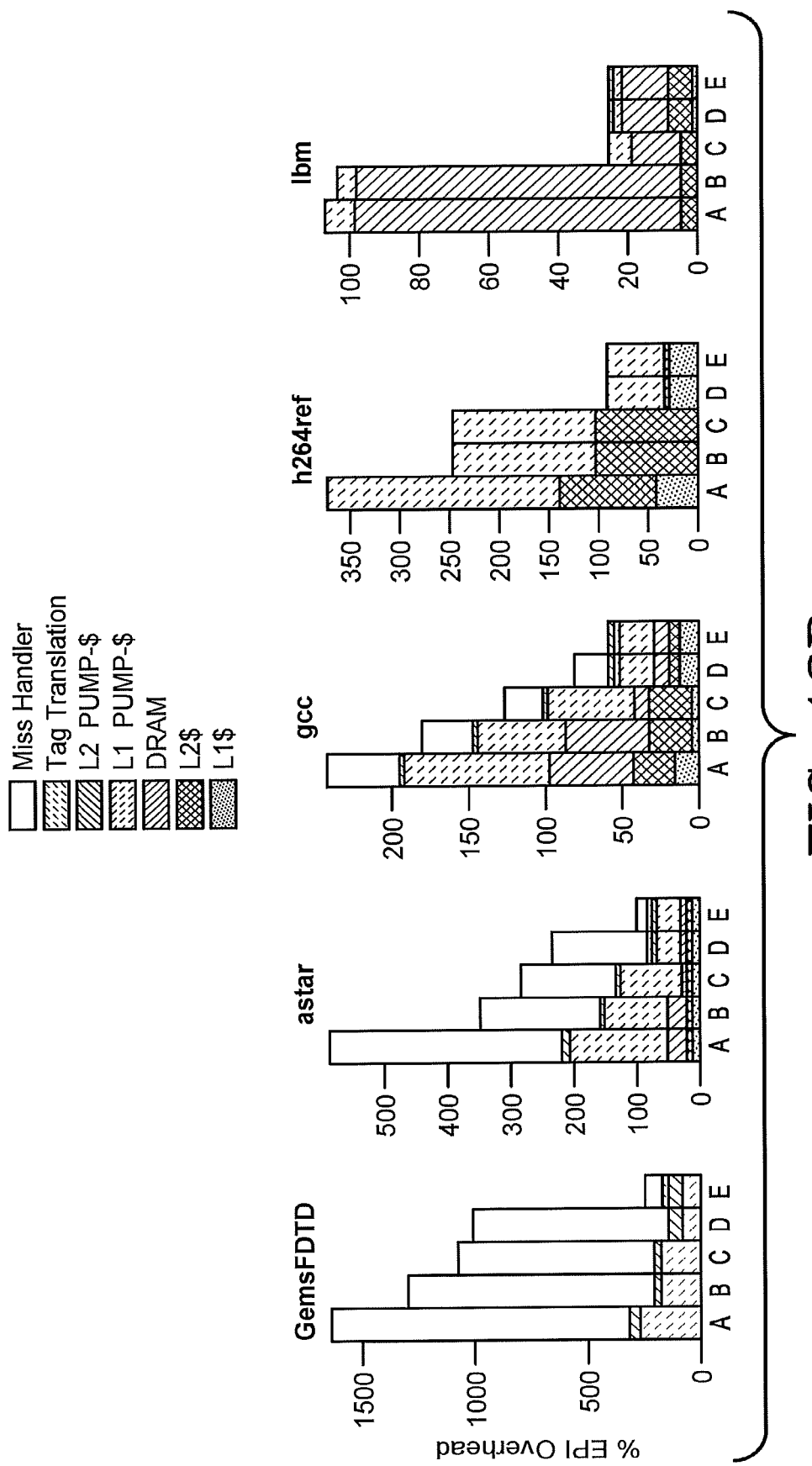
FIG. 12B is a series of graphs showing energy impact of optimizations on representative benchmarks wherein A: Simple; B: A+Opgrouping; C: B+DRAM Compression; D: C+(10b L1, 14b, L2) short tags; E: D+(2048-UCP; 512-CTAG))

FIG. 12A and FIG. 12B depict the overall impact on runtime and energy overheads of applying the optimizations. Every optimization is dominant for some benchmark (e.g., opgroups for astar, DRAM tag compression for lbm, short tags for h264ref, miss handler acceleration for GemsFDTD), and some benchmarks see benefits from all optimizations (e.g. gcc), with each optimization successively removing one bottleneck and exposing the next. The different behavior from the benchmarks follows their baseline characteristics as detailed below.

Applications with low locality have baseline energy and performance driven by DRAM due to high main memory traffic. The overhead in such benchmarks (e.g., lbm) trends to the DRAM overhead, so reductions in DRAM overhead directly impact runtime and energy overhead. Applications with more locality are faster in the baseline configuration, consume less energy, and suffer less from DRAM overheads; as a result, these benchmarks are more heavily impacted by the reduced L1 capacity and the tag energy in the L1 D/I and rule caches. DRAM optimization has less effect on these applications, but using short tags has a large effect on energy and removes the L1 D/I cache capacity penalty (e.g. h264ref).

The benchmarks with heavy dynamic memory allocation have higher L2 rule cache miss rates due to compulsory misses as newly created tags must be installed in the cache. This drove the high overheads for several benchmarks (GemsFDTD, omnetpp) in the simple implementation. The miss handler optimizations as described herein reduce the common case cost of such misses, and the opgroup optimization reduces the capacity miss rate. For the simple implementation, GemsFDTD took an L2 rule cache miss every 200 instructions and took 800 cycles to service each miss driving a large part of its 780% runtime overhead (See FIG. 4A). With the optimizations, the GemsFDTD benchmark services an L2 rule cache miss every 400 instructions and takes only 140 cycles on average per miss, reducing its runtime overhead to about 85% (See FIG. 10A).

Overall, these optimizations bring runtime overhead below 10% for all benchmarks except GemsFDTD and omnetpp (See FIG. 10A), which are high on memory allocation. The mean energy overhead is close to 60%, with only 4 benchmarks exceeding 80% (See FIG. 10B).

To illustrate, the performance impact of the PUMP may be measured using a composition of four different policies (See Table 1 at FIG. 14) that stress the PUMP in different ways and illustrate a range of security properties: (1) a Non-Executable Data and Non-Writable Code (NXD+NWC) policy that uses tags to distinguish code from data in memory and provides protection against simple code injection attacks; (2) a Memory Safety policy that detects all spatial and temporal violations in heap-allocated memory, extending with an effectively unlimited (260) number of colors ("taint marks"); (3) a Control-Flow Integrity (CFI) policy that restricts indirect control transfers to only the allowed edges in a program's control flow graph, preventing return-oriented-programming-style attacks (enforce fine-grained CFI, not coarse-grained approximations that are potentially vulnerable to attack); and (4) a fine-grained Taint Tracking policy (generalizing) where each word can potentially be tainted by multiple sources (libraries and IO streams) simultaneously. As noted elsewhere herein, these are well-known policies whose protection capabilities have been established in the literature and description herein may focus on measuring and reducing the performance impact of enforcing them using the PUMP. Except for NXD+NWC, each of these policies distinguishes an essentially unlimited number of unique items; by contrast, solutions with a limited number of metadata bits can, at best, support only grossly simplified approximations. As also noted above, a simple, direct implementation of the PUMP may be expensive. For example, adding pointer-sized (64b) tags to 64b words at least doubles the size and energy usage of all the memories in the system; rule caches add area and energy on top of this. For this simple implementation, the measured area overhead is about 190% and geomean energy overhead is around 220%; moreover, runtime overhead is disappointing (over 300%) on some applications. Such high overheads would discourage adoption, if they were the best that could be done.

The micro-architecture optimizations such as described herein may be included in an embodiment in accordance with techniques herein to reduce the impact on power ceiling to 10% (See FIG. 10C), suggesting the optimized PUMP will have little impact on the operating envelope of the platform. DRAM compression reduces the energy overhead for lbm to 20%; since it also slows down by 9%, its power requirement only increases by 10%.

The area overhead of the optimized design is around 110% (e.g., see Table 5 of FIG. 18) in comparison to 190% of the simple design (e.g., see Table 3 of FIG. 16). Short tags significantly reduce the area of the L1 and L2 caches (now adding only 5% over the baseline) and of the rule caches (adding only 26%). Contrarily, the optimized design spends some area to reduce runtime and energy overhead. The UCP and CTAG caches add 33% area overhead, while the translation memories for short tags (both L1 and L2) add another 46%. While these additional hardware structures add area, they provide a net reduction in energy, since they are accessed infrequently and the UCP and CTAG caches also substantially reduce the miss-handler cycles.

One goal of the model and optimizations as described herein is to make it relatively simple for an embodiment to add additional policies that are simultaneously enforced. The Composite policy on the simple PUMP design incurred more than incremental costs for several benchmarks due to the large increase in miss handler runtime, but these are reduced with the miss handler optimizations.

Figure 13A:
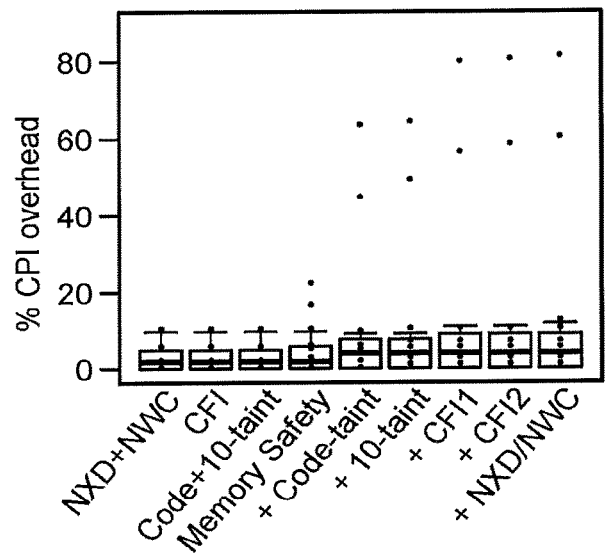
FIG. 13A is a series of graphs showing runtime policy impact in composition for a representative benchmark.
Figure 13B:
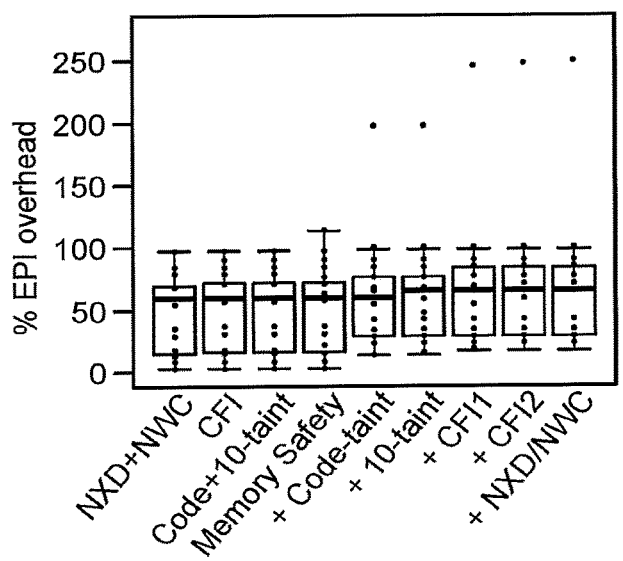
FIG. 13B is a series of graphs showing energy policy impact in composition.

FIG. 13A (for CPI overhead) and FIG. 13B (for EPI overhead) illustrate how incremental addition of policies impacts runtime overhead by first showing the overhead of each single policy, then showing composites that add policies to Memory Safety, the most complex single policy. The progression makes it clearer what overhead comes simply from adding any policy as opposed to adding a higher-overhead policy. To get a sense of scaling beyond the four policies here, the CFI policy (returns and computed-jumps/calls) and the taint tracking policy (code tainting and I/O tainting) are each broken into two parts. It is shown that the runtime overhead of additional policies tracks incrementally above the first complex policy (Memory Safety), with no appreciable runtime impact on the non-outliers (worst-case non-outlier rises from 9% to 10% overhead) and a larger increase (20-40%) in the two outliers as each new kind of policy is added due mostly to increased miss-handler resolution complexity. Energy follows a similar trend with modest impact (geomean rises from 60% to 70%) on the non-outlier policies, which account for everything except GemsFDTD.

A brief summary of related work is identified in Table 2 reproduced at FIG. 15.

In accordance with a policy programming model in accordance with techniques herein, a PUMP policy includes a set of tag values together with a collection of rules that manipulate these tags to implement some desired tag propagation and enforcement mechanism. Rules come in two forms: the software layer (symbolic rules) or hardware layer (concrete rules) of the system.

For example, to illustrate the operation of the PUMP, consider a simple example policy for restricting return points during program execution. The motivation for this policy comes from a class of attacks known as return-oriented programming (ROP), where the attacker identifies a set of "gadgets" in the binary executable of the program under attack and uses these to assemble complex malicious behaviors by constructing appropriate sequences of stack frames, each containing a return address pointing to some gadget; a buffer overflow or other vulnerability is then exploited to overwrite the top of the stack with the desired sequence, causing the snippets to be executed in order. One simple way of limiting ROP attacks is to constrain the targets of return instructions to well-defined return points. This is accomplished by using the PUMP by tagging instructions that are valid return points with a metadata tag target. Each time a return instruction is executed, the metadata tag on the PC is set to check to indicate that a return has just occurred. On the next instruction, the PC tag is check, verify that the tag on the current instruction is target, and signal a security violation if not. By making the metadata richer, it is possible to precisely control which return instructions can return to which return points. By making it yet richer, full CFI checking may be implemented.

From the point of view of the policy designer and the software parts of the PUMP 10, policies may be compactly described using symbolic rules written in a tiny domain-specific language. An exemplary symbolic rule and its program language is described, for example, in an APPENDIX attached hereto, entitled "PROGRAMMING THE PUMP, Hardware-Assisted Micro-Policies for Security".

Symbolic rules may compactly encode a great variety of metadata tracking mechanisms. At the hardware level, however, a rule is needed for representation that is tuned for efficient interpretation to avoid slowing down the primary computation. To this end, a lower level rule format, called concrete rules, may be introduced. Intuitively, each symbolic rule for a given policy can be expanded into an equivalent set of concrete rules. However, since a single symbolic rule might in general generate an unbounded number of concrete rules, this elaboration is performed lazily, generating concrete rules as needed while the system executes.

For policies with metadata tags (e.g., which are richer than ROP), the translation from symbolic to concrete rules follows the same general lines, but the details become a bit more intricate. For example, the taint-tracking policy takes tags to be pointers to memory data structures, each describing an arbitrarily sized set of taints (representing data sources or system components that may have contributed to a given piece of data). The symbolic rule for the load opgroup says that the taint on the loaded value should be the union of the taints on the instruction itself, the target address for the load, and the memory at that address. The symbolic rule and its program language is incorporated by reference from and is available for public inspection in the paper entitled "PROGRAMMING THE PUMP, Hardware-Assisted Micro-Policies for Security" which was previously identified.

To reduce the number of distinct tags (and, hence, pressure on the rule cache), metadata structures may be internally stored in canonical form and since tags are immutable, sharing is fully exploited (e.g., set elements are given a canonical order so that sets can be compactly represented sharing common prefix subsets). When no longer needed, these structures can be reclaimed (e.g., by garbage collection).

An embodiment may utilize composite policies. Multiple orthogonal policies may be simultaneously enforced by letting tags be pointers to tuples of tags from several component policies. (In general, multiple policies may not be orthogonal) For example, to compose the first return opgroup (ROP) policy with the taint-tracking policy, let each tag be a pointer to a representation of a tuple (r; t), where r is an ROP-tag (a code location identifier) and t is a taint tag (a pointer to a set of taints). The cache lookup process is exactly the same, but when a miss occurs the miss handler extracts the components of the tuple and dispatches to routines that evaluate both sets of symbolic rules. The operation is allowed only if both policies have a rule that applies; in this case the resulting tag is a pointer to a pair containing the results from the two sub-policies.

In connection policy system and protection, the policy system exists as a separate region of memory within each user process. The policy system may include, for example, the code for the miss handler, the policy rules, and the data structures representing the policy's metadata tags. Placing the policy system in the process is minimally invasive with the existing Unix process model and facilitates lightweight switching between the policy system and the user code. The policy system is isolated from user code using mechanisms described next.

Clearly, the protection offered by the PUMP would be useless if the attacker could rewrite metadata tags or change their interpretation. The techniques described herein are designed to prevent such attacks. The kernel, loader, and (for some policies) compiler is trusted. In particular, the compiler is relied on to assign initial tags to words and, where needed, communicate rules to the policy system. The loader will preserve the tags provided by the compiler, and that the path from the compiler to the loader is protected from tampering, e.g., using cryptographic signatures.

An embodiment in accordance with techniques herein may use a standard Unix-style kernel which sets up the initial memory image for each process. (It may be possible to use micro-policies to eliminate some of these assumptions, further reducing the size of the TCB). It is further assumed that, in such embodiments, the rule-cache-miss-handling software is correctly implemented. This is small, hence a good target for formal verification. One concern is to prevent user code running in a process from undermining the protection provided by the process's policy. User code should not be able to (i) manipulate tags directly—all tag changes should be performed in accordance with the policy/policies rules currently in effect; (ii) manipulate the data structures and code used by the miss handler; (iii) directly insert rules in the hardware rule cache.

In connection with addressing, to prevent direct manipulation of tags by user code, the tags attached to every 64b word are not, themselves, separately addressable. In particular, it is not possible to specify an address that corresponds only to a tag or a portion of a tag in order to read or write it. All user accessible instructions operate on (data, tag) pairs as atomic units—the standard ALU operating on the value portion and the PUMP operating on the tag portion.

In connection with the miss handler architecture in an embodiment in accordance with techniques herein, the policy system may only be activated on misses to the PUMP cache. To provide isolation between the policy system and user code, a miss-handler operational mode is added to the processor. The integer register file is expanded with 16 additional registers that are available only to the miss handler, to avoid saving and restoring registers. Note, the use of 16 additional registers is illustrative and in practice may need to expand the integer register file to less/more registers. The PC of the faulting instruction, the rule inputs (opgroup and tags), and the rule outputs appear as registers while in miss handler mode. A miss-handler-return instruction is added, which finishes installing a concrete rule into the cache and returns to user code.

In an embodiment in accordance with techniques herein, the normal behavior of the PUMP 10 is disengaged while the processor 12 is in miss-handler mode. Instead, a single hardwired rule is applied: all instructions and data touched by the miss handler must be tagged with a predefined miss-handler tag that is distinct from the tags used by any policy. This ensures isolation between miss handler code and data and the user code in the same address space. User code cannot touch or execute policy system data or code, and the miss handler cannot accidentally touch user data and code. The miss-handler-return instruction can only be issued in miss-handler mode, preventing user code from inserting any rules into the PUMP.

While previous work has used clever schemes to compactly represent or approximate safety and security policies, this is often a compromise on the intended policy, and it may trade complexity for compactness. As described herein, it is possible to include richer metadata that captures the needs of the security policies both more completely and more naturally with little or no additional runtime overhead. Rather than imposing a fixed bound on the metadata representation and policy complexity, the PUMP 10 provides a graceful degradation in performance. This allows policies to use more data where needed without impacting the common case performance and size. It further allows the incremental refinement and performance tuning of policies, since even complex policies can easily be represented and executed.

With evidence mounting for the value of metadata-based policy enforcement, the present disclosure defines an architecture for software-defined metadata processing and identifies accelerators to remove most of the runtime overhead. An architecture is introduced and described herein with no bounds (i.e., free from any bound) on the number of metadata bits or the number of policies simultaneously supported along with four microarchitecture optimizations (opgroups, tag compression, tag translation, and miss handler acceleration) that achieve performance comparable to dedicated, hardware metadata propagation solutions. The software defined metadata policy model and its acceleration will be applicable to a large range of policies beyond those illustrated here, including sound information-flow control, fine-grained access control, integrity, synchronization, race detection, debugging, application-specific policies, and controlled generation and execution of dynamic code.

Some non-limiting advantages of the various aspects and embodiments described herein provide (i) a programming model and supporting interface model for compactly and precisely describing policies supported by this architecture; (ii) detailed examples of policy encoding and composition using four diverse classes of well-studied policies; and (iii) quantification of the requirements, complexity, and performance for these policies.

The programming model of an embodiment as described herein may encode a host of other policies. Information-flow control is richer than the simple taint tracking models here, but tracking implicit flows can be supported either with RIFLE-style binary translation or by using the PC tag along with some support from the compiler. Micro-policies can support lightweight access control and compartmentalization. Tags can be used to distinguish unforgeable resources. Unique, generated tokens can act as keys for sealing and endorsing data, which in turn can be used for strong abstraction—guaranteeing that data is only created and destructured by authorized code components. Micropolicy rules can enforce data invariants such as immutability and linearity. Micro-policies can support parallelism as out-of-band metadata for synchronization primitives such as full/empty bits for data or futures or as state to detect race conditions on locks. A system architect can apply specific micro-policies to existing code without auditing or rewriting every line.

The PUMP 10 design as described herein offers an attractive combination of flexibility and performance, supporting a diverse collection of low-level, fine-grained security policies with single policy performance comparable to dedicated mechanisms in many cases while supporting richer and composite policies with mostly graceful performance degradation as rule complexity grows. Further, the mechanisms provided by the PUMP may be used to protect its own software structures. An embodiment in accordance with techniques herein may replace the special miss-handler operational mode by implementing a "compartmentalization" micro-policy using the PUMP 10 and using this to protect the miss-handler code. Finally, as described herein, orthogonal sets of policies may be combined, where the protections provided by each one are completely independent of the others. But policies often interact: for example, an information-flow policy may need to place tags on fresh regions being allocated by a memory safety policy. Policy composition requires analysis in connection with both in expression and in efficient hardware support.

What will now be described is a further example illustrating implementation of a memory safety policy in an embodiment in accordance with techniques herein that identifies all temporal and spatial violations in heap-allocated memory. In at least one embodiment, for each new allocation processing may be performed to make up a fresh color-id, c, and write c as the tag on each memory location in the newly created memory block (e.g., such as via memset). The pointer to the new block is also tagged c. Later, when processing is performed to dereference a pointer, processing may include checking that the pointer's tag is the same as the tag on the memory cell to which the pointer references or points. When a block is freed, the tags on all cells of the block may be modified to a constant F representing free memory. The heap may be initially tagged F. A special tag, $\perp$, may be used for non-pointers. Thus, generally, an embodiment may write a tag t for a memory location that is either a color c or $\perp$.

Because memory cells may contain pointers, in general each word in memory may be associated with two tags. In such an embodiment, the tag on each memory cell be a pointer to a pair (c, t), where c is the id of the memory block in which this cell was allocated and t is the tag on the word stored in the cell. An embodiment may use domain-specific language based on the rule function described elsewhere herein for specifying a policy in terms of symbolic rules. The rules for load and store take care of packing and unpacking these pairs, along with checking that each memory access is valid (i.e., the accessed cell is within the block pointed to by this pointer):

load: $(-, -, c_1, -, (c_2, t_2))$
$\rightarrow (-, t_2)$ if $c_1 = c_2$
store: $(-, -, t_1, c_2, (c_3, t_3))$
$\rightarrow (-, (c_3, t_1))$ if $c_2 = c_3$ The checking performed in the foregoing and other rules shows up as conditions under which the symbolic rule is valid (e.g., $c_2 = c_3$ above in the store rule). The "-" symbol indicates the don't care fields in the rule.

Address arithmetic operations preserve the pointer tag:
add: $(-, -, c, \perp, -) \rightarrow (-, c)$ To maintain the invariant that tags on pointers can only originate from allocation, operations that create data from scratch (e.g., loading constants) set its tag to $\perp$.

In an embodiment implementing the memory safety policy, operations such as malloc and free may be accordingly modified, for example, to tag memory regions using the tagged instructions and ephemeral rules (e.g., which may be deleted from the cache once they are used). In connection with malloc, processing may generate a fresh tag for the pointer to a new region via an ephemeral rule. For example, the rule for move may be an ephemeral rule such as:

move: $(-, t_{malloc}, t, -, -) \rightarrow^1 (-, t_{newtag})$

The arrow with the superscript of 1 (e.g., $\rightarrow^1$) may denote an ephemeral rule. The newly tagged pointer may then be used to write a zero to every work in the allocated region using a special store rule:

store: $(-, t_{mallocinit}, t_1, c_2, F) \rightarrow (-, (c_2, t_1))$ prior to returning the tagged pointer. At a later point in time, free may use a modified store instruction to retag the region as unallocated:

store: $(-, t_{freeinit}, t_1, c_2, (c_3, t_4))$ $(-, F)$ prior to returning the region to the free list.

In such an embodiment using the memory safety policy, opgroups may be used to describe the rule set as follows:
(1) nop, cbranch, ubranch, ijump, return: $(-, -, -, -, -) \rightarrow (-, -)$
(2) ar2sld: $(-, -, \perp, \perp, -) \rightarrow (-, \perp)$
(3) ar2sld: $(-, -, c, \perp, -) \rightarrow (-, c)$
(4) ar2sld: $(-, -, \perp, c, -) \rightarrow (-, c)$
(5) ar2sld: $(-, -, c, c, -) \rightarrow (-, \perp)$
(6) ar1sld: $(-, -, t, -, -) \rightarrow (-, t)$
(7) ar1ld, dcall, icall, flags: $(-, -, -, -, -) \rightarrow (-, \perp)$
(8) load: $(-, -, c_1, -, (c_2, t_2)) \rightarrow (-, t_2)$ if $c_1 = c_2$
(9) store: $(-, -, t_1, c_2, (c_3, t_3)) \rightarrow (-, (c_3, t_1))$ if $c_2 = c_3$ $\wedge c_i \notin \{t_{mallocinit}, t_{freeinit}\}$
(10) store: $(-, t_{mallocinit}, t_1, c_2, F) \rightarrow (\rightarrow, (c_2, t_1))$
(11) store: $(-, t_{freeinit}, t_1, c_2, (c_3, t_4)) \rightarrow (\rightarrow, F)$
(12) move: $(-, t_{malloc}, t, -, -) \rightarrow^1 (-, t_{newtag})$
(13) move: $(-, t_{malloc}, t, -, -) \rightarrow (-, t)$ The symbolic rules used above for policy specification may be written using variables, allowing a few symbolic rules to describe the policy over an unbounded universe of distinct values. The concrete rules stored in the rule cache, however, refer to specific, concrete tag values. For example, if 23 and 24 are valid memory block colors, an embodiment may use concrete rules with concrete instances of symbolic Rule (3) above in the PUMP rule cache for c=23 and c=24. Assuming, for example, an embodiment encodes $\perp$ as 0 and marks don't care fields as 0, the concrete rules are for symbolic rule (3) above are:

ar2s1d: $(0, 0, 23, 0, 0) \rightarrow (0, 23)$
ar2s1d: $(0, 0, 24, 0, 0) \rightarrow (0, 24)$ Consistent with discussion elsewhere herein, in at least one embodiment, the miss handler may obtain the concrete input tags and execute code compiled from the symbolic rules to produce the associated concrete output tags in order to insert rules into the PUMP rule cache. When the symbolic rule identifies a violation, control transfers to an error handler and no new concrete rules are inserted into the PUMP rule cache.

What will now be described is an embodiment in accordance with techniques herein based on the RISC-V architecture further extended with metadata tags and the PUMP to support software defined metadata processing (SDMP) consistent with discussion herein. RISC-V may be characterized as an open source implementation of reduced instruction set computing (RISC) instruction set architecture (ISA). In such an embodiment, metadata tags are placed on both instructions and data for each word. In the RISC-V architecture, words are 64 bits. The RISC-V architecture provides different word size variants—RV64 with a word size of 64 bits and RV32 with a word size of 32 bits. The width or size of the registers and user address space may vary with the word size. Tag size or width may be independent of word size or width but may more typically be the same in an embodiment. As known in the art, the RISC-V architecture has 32 bit instructions and thus an embodiment supporting and operating using the 64 bit word size may store 2 instructions in a single tagged word. The foregoing and other aspects of the RISC-V architecture are discussed elsewhere herein in connection with use of different techniques and features in connection with extending the RISC-V architecture for use with metadata tags, the PUMP and SDMP.

The RISC-V architecture includes user-level instructions as described, for example, in "The RISC-V Instruction Set Manual Vol. I, User-Level ISA, Version 2.0", May 6, 2014, Waterman, Andrew, et. al., (also referred to as the "RISC-V user level ISA") which is incorporated by reference herein, and is publically available, for example, at the RISCV.ORG website, and through the University of California at Berkeley as Technical Report UCB/EECS-2014-54. The RISC-V architecture also incorporates a privileged architecture including privileged instructions and additional functionality needed for running operating systems, attached external devices, and the like, as described, for example, in "The RISC-V Instruction Set Manual Volume II: Privileged Architecture, Version 1.7", May 9, 2015, also referred to as the "RISC-V privileged ISA") which is incorporated by reference herein, and is publically available, for example, at the RISCV.ORG website, and through the University of California at Berkeley as Technical Report UCB/EECS-2015-49.

An embodiment of the RISC-V architecture may have four RISC-V privilege levels as follows: level 0 for user/application (U) privilege level, level 1 for supervisor (S) privilege level, level 2 for hypervisor (H) privilege level, and level 3 for machine (M) privilege level. In the foregoing, RISC-V privilege levels may be ranked, highest to lowest, from 0 to 3 where level 0 denotes the highest or greatest level of privilege and level 3 denotes the lowest or minimum privilege level. Such privilege levels may be used to provide protection between different components and attempts to execute code that perform operations not permitted by the current privilege level or mode will cause an exception to be raised such as traps into an underlying execution environment. Machine level has the highest privileges and is the only mandatory privilege level for a RISC-V hardware platform. Code run in machine-mode (M-mode) is inherently trusted, as it has low-level access to the machine implementation. User-mode (U-mode) and supervisor-mode (S-mode) are intended for conventional application and operating system usage respectively, while hypervisor-mode (H-mode) is intended to support virtual machine monitors. Each privilege level has a core set of privileged ISA extensions with optional extensions and variants. It should be noted that an implementation of the RISC-V architecture must support at least the M-mode and most implementations support at least U-mode and M-mode. S-mode may be added to provide further isolation between code of supervisor-level operating system and other more privileged code executing in M-mode. User or application code may typically execute in U-mode until a trap (e.g., supervisor call, page fault) or interrupt occurs forcing a transfer of control to a trap handler which runs at one of the supported higher privilege modes or levels (e.g., H, S or M mode). Code of the trap handler is then executed and control may then be returned to the original user code or application which caused the trap. Such execution of the user code or application may resume at or after the original trapped instruction in U-mode that triggered the trap handler invocation. Various combinations of supported modes in a RISC-V implementation may include only: the single M mode, two modes—M and U, three modes—M, S and U, or all four modes M, H, S, U. In at least one embodiment described herein, all 4 of the foregoing privilege levels may be supported. At a minimum, an embodiment in accordance with techniques herein may support M AND U modes.

The RISC-V architecture has control status registers (CSRs) that may be atomically read and modified by one or more associated privilege levels. Generally, a CSR may be accessible at a first of the four privilege levels and any other of the four privilege levels higher than the first. For example, assume a program is executing in U-mode (level 3) and a trap, such as a rule cache miss, occurs whereby control is transferred to a trap handler, such as the rule cache miss handler code, running at a higher privilege or mode (e.g., any of levels 0-2). Upon the occurrence of the trap, information may be placed in CSRs accessible to the trap handler executing in M-mode, for example, that are not otherwise accessible to any other code executing at a lower privilege level (e.g., not accessible to code in H, S or U mode). In at least one embodiment, the rule cache miss handler may run at a privilege level above the level of PUMP protection (e.g., may run in H-mode, S-mode, or M-mode). In such an embodiment, as described elsewhere herein, the tag definitions and policies may be global across an operating system (e.g., per virtual machine) at the rule cache miss handler level whereby the same tag definitions and policies may be applied across all executing code. In at least one embodiment, per application or process policies may be supported where such policies are installed globally and the PC (program counter identifying the current instruction) and/or code may be tagged to distinguish process or application-specific rules. In an embodiment where virtual machines (VMs) do not share memory, policies may be defined at a per-VM basis.

Consistent with discussion elsewhere herein, the PUMP may be characterized as a rule cache for SDMP. There may be a mapping between a set of tags on the instruction and instruction inputs and tags for the result of the operation. Tag processing is independent and parallel from the normal operations of the instruction. In at least one embodiment, the PUMP runs in parallel with the normal RISC-V operations, supplying the tags for the results of the operation. Since the PUMP is a cache, rule cache misses occur the first time the PUMP receives a particular instruction, and thus a particular corresponding set of PUMP inputs (e.g., compulsory) or when the PUMP was unable to retain a rule in cache (e.g., capacity of cache exceeded therefore the rule was evicted from the rule cache, or perhaps conflict). Rule cache misses cause a miss trap that is then handled by code of a miss handler system (e.g., rule cache miss handler). Inputs may be communicated to the miss handler through PUMP CSRs and rule insertion may be provided back to the PUMP also through CSRs. This is discussed in more detail below. A first embodiment is discussed elsewhere herein where there are 5 PUMP input tags. As a variation, an embodiment may include a different number of tags and other PUMP inputs. The particular number of PUMP tag inputs may vary with the instruction set and operands. For example, the following may be included as PUMP inputs in one embodiment based on the RISC-V architecture:

1. Opgrp—denotes particular opgroup include a current instruction. Generally, an opgroup is an abstraction of a group of instructions and is discussed elsewhere herein.
2. PCtag—tag on the PC
3. CItag—tag on the instruction
4. OP1tag—tag on RS1 input to instruction
5. OP2tag—tag on RS2 input to instruction (or tag on CSR when a CSR instruction)
6. OP3tag—tag on RS3 input to instruction
7. Mtag—tag on memory input to instruction or memory target of an instruction
8. funct12 (funct7)—extended opcode bits that occur in some instructions as described elsewhere herein.
9. subinstr—when there are multiple instruction packed in a word, this input identifies which instruction in the word is the current instruction being operated upon by the PUMP.

The following may be included as PUMP outputs in one embodiment based on the RISC-V architecture:
1. Rtag—tag on result: destination register, memory, or CSR
2. newPCtag—tag on the PC after this operation (e.g., sometimes referred to herein as PCnew tag).

Information may be communicated, for example, from user code executing in U-mode at the time of the trap occurrence to a trap handler, such as the rule cache miss handler, executing in M-mode via CSRs. In a similar manner, information may be communicated between the trap handler in M-mode when resuming program execution in U-mode via CSRs where information in the CSRs may be placed in corresponding registers accessible in U-mode. In this manner, there may be mapping between the CSRs at one privilege level and registers at other privilege levels. For example, in an embodiment in accordance with techniques herein, a CSR may be defined that is accessible to the M-mode handler and PUMP where a particular instruction operand tag is written to the CSR upon the occurrence of a trap to communicate the tag to the PUMP and rule cache miss handler as an input. In a similar manner, the CSR may be used to communicate information from the trap handler and/or PUMP (operating at a privilege level higher than U-mode) to other code executing in U-mode such as when resuming program execution after a rule cache miss (e.g., where rule cache miss occurs when a matching rule is not found in the PUMP rule cache for a current instruction). For example, a CSR may be used to output or propagate PUMP output tags for PCnew and RD. Additionally, CSRs may be defined where different actions may occur responsive to writing to a particular CSR. For example, the rule cache miss handler code may write/insert a new rule into the rule cache of the PUMP by writing to a particular CSR. The particular CSRs defined may vary with embodiment.

Referring to FIG. 25, shown is an example of CSRs that may be defined and used in one embodiment in accordance with techniques herein. The table 900 includes a first column 902 with the CSR address in hexadecimal, a second column 904 of privilege, a third column 906 denoting the CSR name, and a fourth column 908 with a description of the CSR. Each line of the table 900 may identify information for a different defined CSR. Different ones of the CSRs in 900 are also described elsewhere herein in more detail in connection with additional features that may be included in an embodiment.

Rows 901a-c identify CSRs having special tag values used for tagging code and/or instructions by the PUMP. In at least one embodiment, the sboottag CSR defined by entry 901a may include a first initial or starting tag value used in a system. The foregoing starting tag value may be referred to as a bootstrap tag value. In one aspect, the bootstrap tag value may be characterized as a "seed" from which all other tags may be derived or based on. Thus, the bootstrap tag may be used in one embodiment as a starting point for generating all other tags. In a manner similar to initial loading of a starting location of bootstrap code in the operating system, hardware may be used to initialize the CSR 901a to the particular predefined tag value used as the bootstrap tag. Once the bootstrap tag has been read as part of booting a system in accordance with techniques herein, the sboottag CSR may be cleared. For example, a privileged portion of operating system code may include instructions which invoke rules performing initial tag propagation using the bootstrap tag value. Use of the bootstrap tag and tag generation and propagation are further described elsewhere herein. Row 901b identifies a CSR containing the tag value used for tagging data from a public untrusted source as described elsewhere herein. For Row 901c identifies a CSR containing a default tag value that may be used as a default tag value when tagging data and/or instructions.

Rows 901d and e, respectively, denote the address and data for writing to the opgroup/care table (e.g., also referred to elsewhere herein as a mapping or translation table including opgroups and care/don't care bits for opcodes). Writing to the CSR denoted by row 901e triggers a write to the opgroup/care table. Row 901f identifies a CSR that may be written to in order to flush the PUMP rule cache. Rows 901g-901m identify CSRs providing tag inputs for a current instruction to the PUMP and rule cache miss handler. Rows 901j-m each denote a different operand tag for an operand of the current instruction being processed causing the rule cache miss whereby an instruction may include up to 4 such operands (with 3 of the 4 operands being registers (CSRs 901j-1) and a 4$^{th}$ operand being a memory location with a tag stored in the CSR denoted by row 901m). Row 901n identifies a CSR holding the extended opcode bits when the opcode of the current instruction uses the extended func12 field as described elsewhere herein. Row 901o identifies a CSR indicating which subinstruction in a word is the current instruction being referenced. As discussed elsewhere herein, a single tagged word may be 64 bits and each instruction may be 32 bits whereby two instructions may be included in a single tagged word. The CSR denoted by row 901o identifies which of the two instructions is being processed by the PUMP. Rows 901p-q identify CSRs including PUMP output tags, respectively, of the new PC (e.g., new PC tag for the next instruction) and the RD (destination register, address for result of the current instruction). Writing to the CSR denoted by 901q causes a write of the rule (e.g., matching a current instruction that triggered a PUMP rule cache miss) into the PUMP rule cache. Row 901r identifies a tagmode for PUMP operation. Tagmodes are described in more detail elsewhere herein.

In at least one embodiment, the one or more tables (e.g. opgroup/care table) used to store opgroups and care/don't care bits may be populated by writing to CSR sopgrpvalue denoted by 901e where the contents of the foregoing CSR 901e is written to the address stored in the sopgrpaddr CSR denoted by 901d. A rule may be written or installed into the PUMP rule cache responsive to writing to the srtag CSR define by entry 901q. The rule written is the rule specifying tag values matching the opcode (or more specifically the opgroup for the opcode) and tag values for the current instruction as input to the PUMP via PUMP CSRs (e.g., based on PUMP CSR inputs 901g-o).

To allow tagging and tag protection on CSR operations, the dataflow allows CSR tags to be inputs to, and outputs from the PUMP. In accordance with the RISC-V architecture, there are read and write instructions, respectively, to read from, and write to, CSRs. In connection with a CSR instruction with the PUMP, the R2tag input to the PUMP is the current CSR tag. The CSR read/write instructions (e.g., csrrc, csrrci, csrrs, csrrsi, csrrw, csrrwi) write two outputs: (1) RD, and (2) the CSR referenced by the instruction. In this case, the PUMP output R tag (or RD tag of the destination) specifies the CSR tag output by the PUMP and copying the CSRtag directly to the register destination tag:

RDtag←CSRtag
CSRtag←Rtag

In connection with privilege denoted by column 904, CSR mtagmode, defined by row 901r, is accessible for read/write by code executing at the machine or M-mode level. The remaining CSRs defined by rows 901a-q are accessible for read/write by code executing at least at the supervisor or S-mode level. Thus, the privileges indicated in column 904 for the various CSRs denote a minimum RISC-V privilege level of executing code in order for the code to access the particular CSR. An embodiment may assign different RISC-V privilege levels with CSRs used in an embodiment than as illustrated in the example 900.

An embodiment in accordance with techniques herein may define multiple tag modes affecting tag propagation performed by the PUMP. The current tag mode is identified by the value at a current in point in time stored in the CSR mtagmode as defined by row 901r. In at least one embodiment, tag mode may be used in combination with the RISC-V defined privileges (e.g., M, H, S and U modes described above) to define a CSR protection model used in connection with the PUMP.

In order to allow the rule cache miss handler placement to be configurable, a protection model may be utilized that further extends the RISC-V privileges. Rather than defining PUMP CSR access entirely by privilege level, CSR access may be further defined relative to the current tag mode in combination with the RISC-V privilege levels. Thus, in at least one embodiment in accordance with techniques herein, whether executing code is allowed to access a CSR may depend on the minimum RISC-V privilege level of the CSR, the current tag mode and the current RISC-V privilege level of the executing code. Tag modes are discussed below in more detail.

Referring to FIG. 26, shown is an example of tag modes that may be used in an embodiment in accordance with techniques herein. The table 910 includes the following columns—912 mtagmode bit encoding, 914 operation and 916 tag results. Each row of table 910 denotes information for a different possible tag mode. When tag mode is 000 as denoted by 911a, the PUMP is off and is not in use and does not generate any tag results. When tag mode is 010, the PUMP writes the default tag on all results (e.g., Rtag for destination or result register or memory location).

In connection with rows 911c-f, denoted are different tag modes that may be specified for engaging or disengaging the PUMP for code executing at different RISC-V privilege levels. When the PUMP is engaged, the PUMP may be characterized as active, enabled and providing protection when code is executed whereby the rules of its policies are enforced during code execution. In contrast, when the PUMP is disengaged, the PUMP may be characterized as inactive, disabled and not providing protection when code is executed whereby rules of its policies are not enforced during code execution. When the PUMP is disengaged, tags may be propagated using one or more default tag propagation rules rather than have tags propagated based on evaluation of a rule with tag values matching those of the current instruction. Whether the PUMP is engaged or disengaged may vary with the particular assumed level of trust and desired level of protection attributed to code that executes at different RISC-V privilege levels.

In connection with tag modes 911c-f, all PUMP CSRs of the example 900, except for the mtagmode CSR denoted by 901r, may be accessible only when the PUMP is disengaged. That is, PUMP CSRs of the example 900, except for the mtagmode CSR denoted by 901r, are only accessible to code executing at a current RISC-V operating privilege or mode that is more privileged than the highest ranked PUMP privilege denoted by the tag mode (e.g., highest ranked privilege denoted by 911c is U mode, highest ranked privilege denoted by 911d is S mode, highest ranked privilege denoted by 911e is H mode, and highest ranked privilege denoted by 911f is M mode).

When tag mode is 100 as denoted by 911c, the PUMP is disengaged and not operational when the RISC-V privilege level denotes a higher or more elevated privilege level than U-mode. Thus, tag mode 911c indicates that the PUMP and its rules providing protection are only engaged and enforced when code executes at U-mode thereby indicating that code executing at a privilege level higher than U-mode (e.g., at S, M, or H mode) is trusted. When tag mode is 100 as denoted by 911c and the RISC-V protection level of executing code is S, M, or H mode, the PUMP is disengaged and its CSRs are accessible to code that executes only in the S, M or H mode (e.g., CSRs are not accessible to code executing in U-mode).

When tag mode is 101 as denoted by 911d, the PUMP is disengaged and not operational when the RISC-V privilege level denotes a higher or more elevated privilege level than S-mode. Thus, tag mode 911d indicates that the PUMP and its rules providing protection are only engaged and enforced when code executes at S-mode and U-mode thereby indicating that code executing at a privilege level higher than S-mode (e.g., at M or H mode) is trusted. When tag mode is 101 as denoted by 911d and the RISC-V protection level of executing code is M or H mode, the PUMP is disengaged and its CSRs are accessible to code that executes only in the M or H mode (e.g., CSRs are not accessible to code executing in S or U mode).

When tag mode is 110 as denoted by 911e, the PUMP is disengaged and not operational when the RISC-V privilege level denotes a higher or more elevated privilege level than H-mode. Thus, tag mode 911e indicates that the PUMP and its rules providing protection are only engaged and enforced when code executes at H-mode, S-mode and U-mode thereby indicating that code executing at a privilege level higher than H-mode (e.g., at M mode) is trusted. When the tag mode is 110 as denoted by 911e and the RISC-V protection level of executing code is M mode, the PUMP is disengaged and its CSRs are accessible to code that executes only in the M mode (e.g., CSRs are not accessible to code executing in U, H or S mode).

When tag mode is 111 as denoted by 911f, the PUMP is always engaged and operational for all the RISC-V privilege levels of M, H, S and U. Thus, tag mode 911f indicates that the PUMP and its rules providing protection are engaged and enforced when code executes at any of M-mode, H-mode, S-mode and U-mode thereby indicating that no code is inherently trusted. With tag mode=111 as denoted by 911f, the PUMP is never disengaged and its CSRs are not accessible to any executing code.

In connection with tag modes denoted by rows 911c-f, when the current RISC-V privilege level of executing code is higher than the highest engaged PUMP level denoted by tag mode, the PUMP may be disengaged and tags may be propagated using one or more default tag propagation rules.

When the tag mode has an encoding of 000 as denoted by row 911a (indicating the PUMP is off) or when the tag mode has an encoding of 010 as denoted by row 911b (indicating write default mode), all CSRs of table 900 may only be accessible by code executing in M mode.

Thus, in at least one embodiment in accordance with techniques herein, whether executing code is allowed to access a CSR may depend on the minimum RISC-V privilege level of the CSR (such as specified in column 904 of table 900), the current tag mode, and the current RISC-V privilege level of the executing code. For example, in the RISC-V architecture without considering tag mode, code executing at U-mode is not allowed to access any of the CSRs defined in 900 due to the minimum privilege levels denoted by 904 for all such CSRs. However, without considering tag mode, code executing with a privilege of at least H-mode is allowed access to all CSRs of 900 except for 901r and code executing in M mode is allowed to access all CSRs of 900. Now consider determining CSR access for CSRs of 900 in accordance with the minimum RISC-V privilege of 904 and tag mode. For example, consider code portion A executing at H-level. Code portion A is allowed to access CSRs 901a-q (of table 900) when the tag mode is 100 as denoted by 911c or when the tag mode is 101 as denoted by 911d. Code portion B executing in S mode, however, may not be allowed access to CSRs 901a-q since it does not have the minimum privilege level specified by the defined CSR privilege level in 904 for such CSRs. Thus, for example, code portion A may be the cache miss handler in one embodiment executing at H-level using CSRs as defined in table 900. As a second example, assume the minimum RISC-V privilege defined for CSRs 901a-q is SRW (denoting S mode as the minimum privilege level to access such CSRs). Code portion A executing in H mode is allowed to access CSRs 901a-q when the tag mode is 100 as in 911c and when the tag mode is 101 as in 911d, and code portion B executing in S mode is allowed to access CSRs 901a-q when the tag mode is 100 as in 911c. Thus, code portion A or B may be code of the cache miss handler.

In at least one embodiment, the off tag mode of 911a may be current tag mode when the PUMP is off such as during appropriate parts of the boot up process. The default tag mode of 911b may be the current tag mode when initializing memory locations to have the same default tag (e.g., as denoted by CSR 901c). Generally, although 4 privilege modes are specified in the RISC-V architecture, an embodiment may alternatively use a different number of privilege modes where a first privilege level denotes a user mode or unprivileged mode and a second privilege level denotes an elevated or privileged mode of execution (e.g., similar to kernel mode in a UNIX based operating system). In such an embodiment, the PUMP may be engaged and enforcing policy rules when executing code in user or unprivileged mode and the PUMP may be disengaged (e.g., PUMP protection off or not enforcing rules) when executing code in the second elevated privilege mode. In this manner, an embodiment may disengage the PUMP when executing trusted or elevated privilege code such as a miss handler to store a new rule in the PUMP rule cache.

As noted above, an embodiment may use default propagation rules to determine PUMP outputs new PC tag and R tag, for example, when the PUMP is disengaged and/or when the rule specifies don't care for the PUMP outputs new PC tag and R tag (e.g., such don't care values may be indicated by the care vector for a particular opcode of the current instruction). In one embodiment, the following may denote logic embodied in default propagation rules used.

newPCtag is PCtag for default propagation
Rtag is RS1tag for CSR read and write operations; RDtag
  is assigned RS2tag (CSRtag)
  allows tags to swap along with data values
  RDtag←RS2tag←original CSRtag
  CSRtag←Rtag←original RS1tag
Rtag is RS2tag (CSRtag) for CSRR?I, CSRRS, CSRRC
  keeps CSRtag unchanged
  RDtag←RS2tag←original CSRtag
  CSRtag←Rtag←original RS2tag←original CSRtag
Rtag is PCtag for JAL and JALR instructions (this is for the return address)
Rtag is PCtag for AUIPC instruction. In RISC-V, the AUIPC (add upper immediate to PC) instruction is used to build PC-relative addresses and uses the U-type format. AUIPC forms a 32-bit offset from the 20-bit U-immediate, filling in the lowest 12 bits with zeros, adds this offset to the PC, then places the result in register rd.
Rtag is CItag for LUI instruction. In RISC-V, the LUI (load upper immediate) instruction is used to build 32-bit constants and uses the U-type format. LUI places the U-immediate value in the top 20 bits of the destination register RD, filling in the lowest 12 bits with zeros.
Rtag is RS1tag for non-memory, non-CSR, non-JAL(R)/ AUIPC/LUI operations
Rtag is RS2tag for memory write operations
Rtag is Mtag for memory load operations In at least one embodiment of techniques herein based on the RISC-V architecture, a new PUMP miss trap may be defined for a rule cache miss occurrence. The PUMP miss trap may have a lower priority than virtual memory fault or illegal instructions.

In at least one embodiment in accordance with techniques herein using the RISC-V architecture, strict separation and isolation between data and metadata may be maintained where there is separation and isolation between tag metadata processing and normal instruction processing. Thus, separate execution domains between metadata rule processing and normal or typical program instruction execution may be maintained. Metadata processing performed using the PUMP for tags associated with instructions and data of executing code may be performed. A PUMP rule cache miss results in a trap causing transfer of control to a rule cache miss handler that generates or retrieves a rule matching the current instruction and stores the rule in the PUMP rule cache. Information may be communicated between the above-noted execution domains using CSRs. When switching from the instruction execution domain of an executing program to the metadata rule processing domain (such as when the rule cache miss handler is triggered via rule cache miss trap), tags and other information relevant to the instruction (causing the trap) may be provided as inputs to the PUMP and also the miss handler using CSRs. In a similar manner, when transferring control from the metadata rule processing domain to the instruction execution domain of an executing program (such as when returning from the rule cache miss handler after handling a rule cache miss trap), PUMP outputs may be communicated using CSRs where the contents of the CSRs are then stored in corresponding mapped registers in the instruction execution domain. Consistent with discussion herein, an instruction which does not map to a rule (e.g., no matching rule for the instruction is located in the cache and the cache miss handler determines that no such matching rule exists for the current instruction) indicates that the rule is not allowed to execute whereby a trap or other event is triggered. For example, the processor may stop execution of the current program code.

In this manner, there may be strict separation between the foregoing domains and associated data paths even though the same RISC-V processor and memory may be used in both domains. Using techniques herein, no instructions of executing code are allowed to read or write metadata tags or rules. All metadata transformations including tagging instructions and data may be done through the PUMP. Similarly, rule insertion into the PUMP cache may be performed only by the rule cache miss handler of the metadata subsystem. In connection with processing performed by the metadata subsystem or processing system, the metadata tags of the executing code are placed in PUMP CSRs and become the "data" input to, and operated upon, by the metadata system (e.g., pointers are into metadata memory space). The metadata subsystem reads the PUMP inputs via the PUMP input CSRs for processing in accordance with rules. If the instruction is allowed to proceed via the rules, the PUMP writes tag results (e.g., such as for PC new and R tag) to defined PUMP output CSRs. Rule insertion into the rule cache may be triggered responsive to writing to a particular CSR (e.g., such as the srtag CSR in 901$q$). In this manner, all tag updates are done through rules in the PUMP and controlled by the metadata subsystem. Only the metadata subsystem can insert rules into the PUMP cache via the cache miss handler invoked upon occurrence of a rule cache miss. Additionally, in at least one embodiment as described herein using the RISC-V architecture, the foregoing separation between metadata processing and normal instruction processing may be maintained without adding any new instructions beyond those in the "RISC-V user level ISA" and the "RISC-V privileged ISA". Consistent with discussion elsewhere herein, an embodiment in accordance with techniques herein may maintain strict separation and isolation between data and metadata whereby there is separation between metadata processing based on tags and normal instruction processing. In at least one embodiment, such separation may be maintained by having a separate physical metadata processing subsystem with a separate processor and a separate memory. Thus, a first processor and a first memory may be used when processing instructions of an executing program and a second processor and a second memory may be included in the metadata processing subsystem for use with performing metadata processing such as when executing code of the rule cache miss handler.

Figure 27:
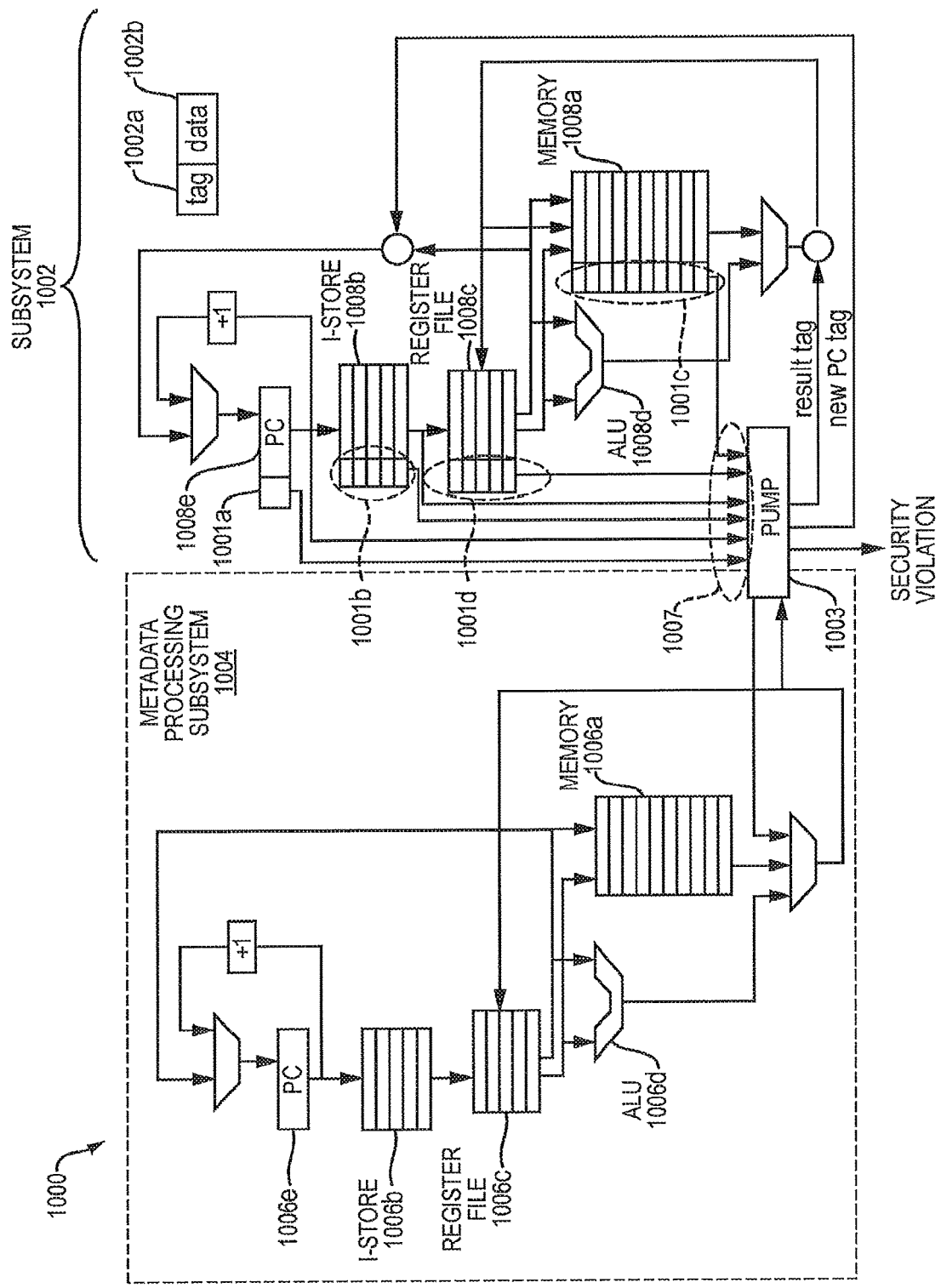
FIG. 27 is an example illustrating a separate metadata processing subsystem/domain with a separate processor in an embodiment in accordance with techniques herein.

Referring to FIG. 27, shown is an example 1000 of components that may be included in an embodiment in accordance with techniques herein. The example 1000 includes a first subsystem or processor 1002 used in connection with normal processing for an executing program and a metadata processing subsystem or processor 1004. The first subsystem 1002 may be characterized as a program execution subsystem used in connection with normal program execution. The subsystem 1002 is a processor that includes components used in connection with executing program code and using data where such code and data includes tags as described elsewhere herein for use with the metadata processing subsystem 1004. The subsystem 1002 includes memory 1008$a$, instruction or I-store 1008$b$, ALU (arithmetic and logic unit) 1008$d$, and program counter (PC) 1008$e$. It should be noted that the PUMP 1003 may be used in connection with execution of code in subsystem 1002 but may be considered as part of the metadata processing subsystem 1004. All code and data in the subsystem 1002 may be tagged such as generally illustrated by tag 1002$a$ associated with data 1002$b$ where 1002$a$ and 1002$b$ may be stored in memory 1008$a$. Similarly, element 1001$a$ denotes a tag on an instruction of the PC 1008$e$, 1001$b$ denotes tags of instructions 1008$b$, 1001$c$ denotes tags of memory locations 1008$a$, and 1001$d$ denotes tags of registers 1008$c$.

Metadata processing subsystem 1004 is a processor (also referred to as the metadata processor) that includes components used in connection with metadata rule processing using tags of a current instruction and associated data provided as inputs to the PUMP 1003. The PUMP 1003 may be as described elsewhere herein and includes a rule cache. For example, in at least one embodiment, the PUMP 1003 may include the components illustrated in FIG. 22. More detailed illustration and example of components of the PUMP 1003, associated PUMP CSRs used for PUMP inputs and outputs and associated logic that may be included in at least one embodiment in accordance with techniques herein are described in more detail below and elsewhere herein. The subsystem 1004 is a separate processor used for metadata processing and includes components similar to those of subsystem 1002. The subsystem 1004 includes memory 1006$a$, I-store 1006$b$, register file 1006$b$, and ALU 1006$d$. Memory 1006$a$ may include metadata structures used in connection with metadata rule processing. For example, memory 1006$a$ may include the structures or data that is pointed to by a tag that is a pointer. Examples of a pointer tag and structures/data pointed to by the pointer tag are described elsewhere herein such as in connection with a CFI policy. I-store 1006$b$ and memory 1006$a$ may include instructions or code such as the miss handler that performs metadata processing. The metadata processor 1004 does not need access to other components of 1002, such as data memory 1008$a$ used in connection with program execution, since the metadata processor 1004 only performs metadata processing (e.g., based on tags and rules). The subsystem 1004 includes its own components, such as a separate memory 1006$a$, and does not need to store metadata processing code and data in the subsystem 1002. Rather, any information, such as tags of a current instruction that may be used by the PUMP 1003 are provided as inputs (e.g., PUMP inputs 1007) to the metadata processing subsystem 1004.

The example 1000 illustrates an alternative embodiment having a separate metadata processing subsystem 1004 rather than performing metadata processing on the same subsystem as used for normal program execution as described elsewhere herein. For example, rather than have a separate metadata processor or subsystem 1004, an embodiment may include only the PUMP 1003 and subsystem 1002. In such an embodiment with a single processor, CSRs may be used as described herein to communicate information between the metadata processing and normal processing mode executing a user program to thereby provide isolation and separation. In such an embodiment with a single processor rather than a separate metadata processor, code of the miss handler may be stored in the single memory in a manner so that it is protected. For example, without a separate metadata processor or subsystem, the code of the miss handler may be protected using tags as described elsewhere herein to limit access, may be mapped to a portion of memory that is not addressable by user code, and the like.

What will now be described are further details regarding PUMP I/O (input/output). It should be noted that PUMP I/O described below applies to embodiments of the PUMP which may use the same processor or subsystem as for normal code execution as well as those which may use separate processors or subsystems such as in the example 1000. Furthermore, the PUMP I/O described below may be used with an embodiment based on the RISC-V architecture and may be generalized for use with other processor architectures.

Figure 28:
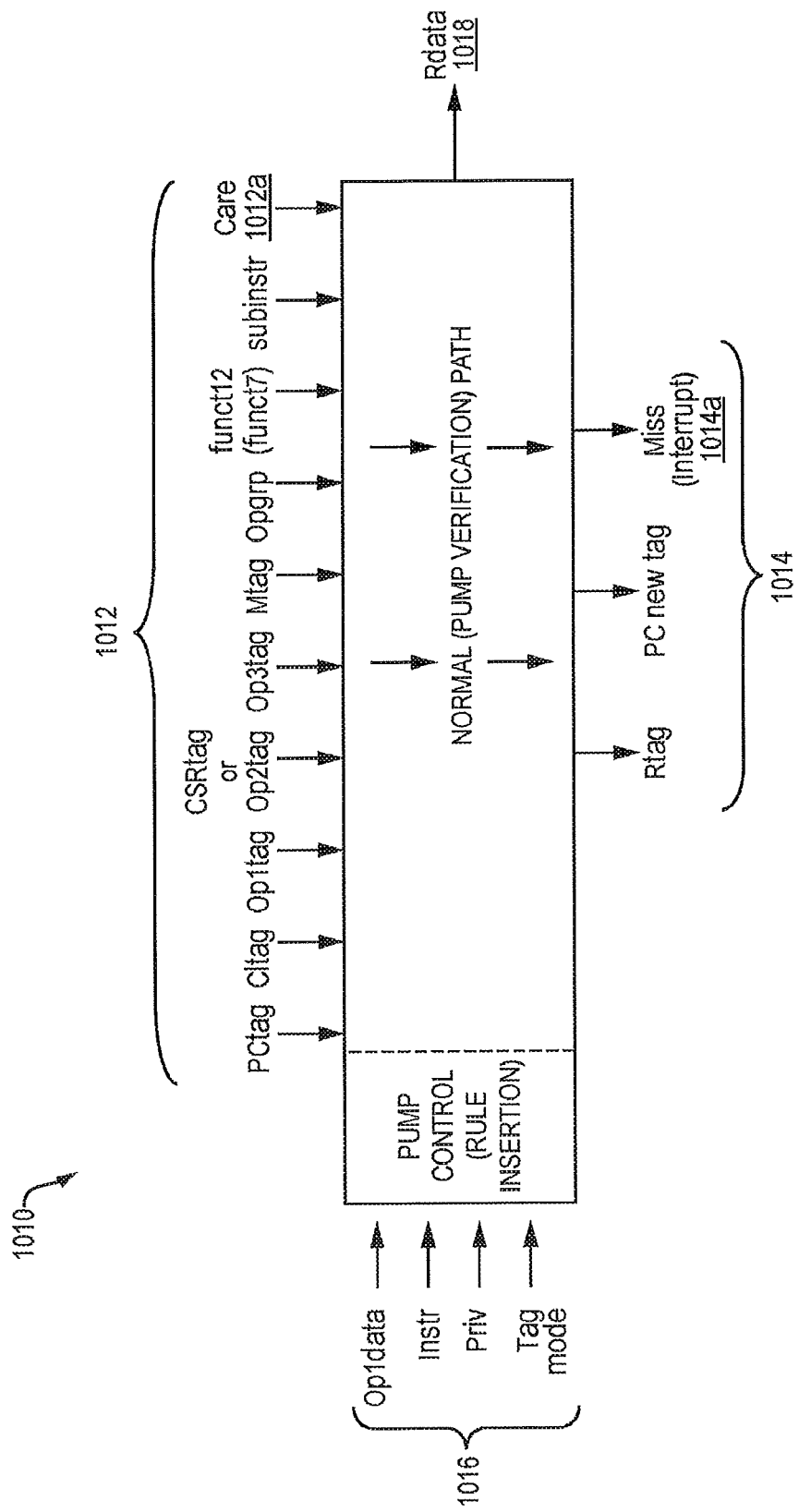
FIG. 28 illustrates PUMP inputs and outputs in an embodiment in accordance with techniques herein.

Referring to FIG. 28, shown is an example 1010 summarizing PUMP I/O in an embodiment in accordance with techniques herein. As described elsewhere herein such as in connection with FIGS. 1 and 24, the PUMP operates in stages 5 and 6. The PUMP inputs are used in connection with normal PUMP verification (e.g., verify whether current instruction is allowed using policy rules) to find a matching rule, if any, in the rule cache of the PUMP for the current instruction. The normal PUMP verification may occur for every instruction such as part at stage 5 as described elsewhere herein with a 6 stage pipeline. Additionally, the PUMP inputs may be used in connection with controlling rule insertion into the rule cache such as may occur in stage 6 of the 6 stage pipeline. The PUMP I/O associated with normal PUMP verification is denoted in the example 1010 by inputs and outputs in the vertical direction from top (inputs 1012) to bottom (outputs 1014). The PUMP I/O associated with controlling rule insertion into the PUMP rule cache is denoted in the example 1010 by inputs and outputs in the horizontal direction from left (inputs 1016) to right (output 1018) Additionally, element 1012 denotes additional inputs also used in connection with rule insertion, as described elsewhere in more detail.

First, consider the PUMP I/O associated with normal PUMP verification processing. PUMP inputs 1012 may include tags, such as the PC tag, the CI tag, instruction operand tags (e.g., OP1 tag, OP2 tag or CSR tag (for CSR-based instructions in RISC-V), OP3 tag, M Tag (for a memory location tag for memory instructions. Note that Mtag may also be referred to herein as the MR tag for a memory instruction), opcode information (e.g., op group denoted by Opgrp input, funct12 (funct7) input for RISC-V for extended opcodes, subinstr input providing an indicator of which instruction is the current instruction in an instruction word including multiple instructions such as in examples 200 and 220) and care input bits. The Opgrp may be the opgroup for the current instruction where Opgrp may be an output of a prior stage (e.g., stage 3 or stage 4) as described elsewhere herein. Funct 12 (funct7) PUMP input may be the additional opcode bits, if any, for those RISC-V opcodes using additional bits of the instruction word (e.g., example 400). PUMP outputs 1014 may include Rtag (e.g., tag for the instruction result register or destination memory location), PC new tag (denoting the propagated tag placed on the PC used for the next instruction), and an indicator 1014a denoting whether there has been a PUMP rule cache miss resulting in a trap to the miss handler in stage 6.

The care bits 1012a may denote which PUMP inputs 1012 and which PUMP outputs 1014 are cared/not care about (e.g., ignored) for a particular instruction. Care bits regarding PUMP inputs may include a care bit for funct12 and a second care bit for funct7. As described elsewhere herein, both of the foregoing care bits denote whether the particular opcode of the current instruction includes any bits for the extended 12 opcode bit portion for a RISC-V instruction (e.g. 404a of the example 400). If both funct12 and funct7 care bits are "don't care", then all 12 bits of the extended 12 opcode bit portion are masked out. If funct7 indicates "care", then all the bottom 5 bits of the extended 12 opcode bit portion are masked out. If funct12 indicates "care", then there is no masking of the extended 12 opcode bit portion.

Now consider the PUMP I/O associated with controlling rule insertion into the PUMP rule cache. PUMP inputs 1016 may be used in combination with inputs 1012 in connection with the PUMP cache rule insertion. PUMP inputs 1016 may include Op1data (an output from the metadata processor or subsystem), the instruction (from stage 6), and the tag mode (an output from the metadata processor or subsystem) and privilege (priv denoting the RISC-V privilege). The tag mode and priv inputs of 1016 are used by the metadata processor or subsystem to determine whether code, such as the miss handler or other code, executing in the metadata processor has sufficient privilege to access the CSRs described below and elsewhere herein providing the various inputs to the metadata processor (e.g., such as inputs 1012). Rdata 1018 is an input to the metadata processor or subsystem for use in stage 6 (e.g., cache miss handler processing input). It should be noted that Op1data, R data, and other items of the example 1010 are described in more detail in following paragraphs and figures.

Thus generally, in the example 1010, element 1012 denotes inputs to the PUMP and metadata processor from the processor executing user code (e.g. non-metadata processor or subsystem such as 1002), element 1014 denotes outputs generated by the metadata processor, element 1016 denotes outputs generated by the metadata processor input to the PUMP, and element 1018 denotes an input to the metadata processor.

Figure 29:
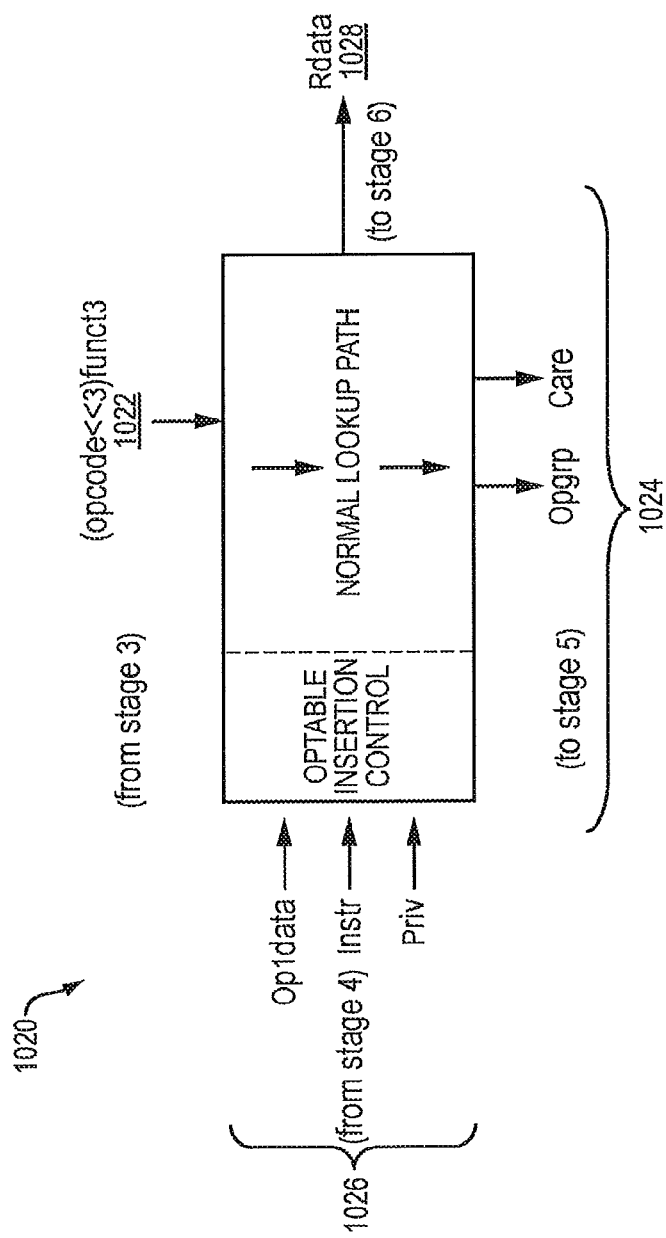
FIG. 29 illustrates inputs and outputs in connection with the opgroup table that in an embodiment in accordance with techniques herein.

Referring to FIG. 29, shown is an example 1020 summarizing the I/O in connection with the opgroup/care table (e.g., element 422 of example 420) in an embodiment in accordance with techniques herein. As described elsewhere herein, the opgroup/care table may be used for each instruction to lookup and output an opgroup and care bits for the opcode of the current instruction. This first flow of I/O is illustrated in 1020 by inputs and outputs in the vertical direction from top (input 1022) to bottom (outputs 1024). As described elsewhere herein, the input 1022 may be the opcode or a portion thereof (e.g., such as described in connection with example of the opcode portion in the example 420) used an index into the opcode/care table. Input 1022 may be from stage 3. The outputs 1024 may be the opgroup (opgrp) and care bits for the particular opcode. The outputs 1024 are inputs to stage 5 (e.g., two of the PUMP inputs oprgrp and care as included in 1012).

A second flow of I/O is illustrated in 1020 by inputs and outputs in the horizontal direction from left (inputs 1026) to right (output 1028). The second flow of I/O in 1020 is illustrative of processing performed in connection with controlling the selection of PUMP output Rdata 1028 which is input to the metadata processor or stage 6. The inputs 1026 are as described above in connection with 1016. The output 1028 is as described above in connection with 1018.

Figure 30:
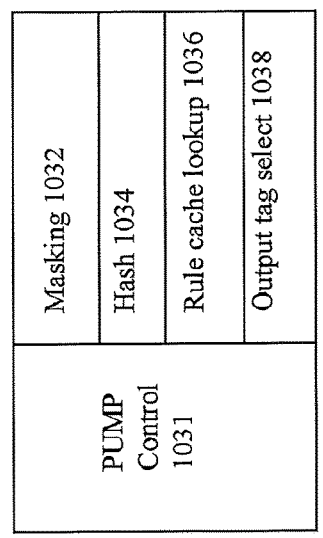
FIG. 30 illustrates processing performed by the PUMP in an embodiment in accordance with techniques herein.

Referring to FIG. 30, shown is an example 1030 abstractly representing processing performed by the PUMP in an embodiment in accordance with techniques herein. The example 1030 includes PUMP control 1031 which corresponds to the PUMP control for rule insertion described above in connection with the horizontal PUMP I/O flow in the example 1010 (e.g., elements 1012, 1016 and 1018). The example 1030 includes masking 1032, hash 1034, rule cache lookup 1036 and output tag selection 1038 which corresponds to the normal PUMP verification path I/O flow performed for each instruction as described above in connection with the vertical PUMP I/O flow in the example 1010 (e.g., elements 1012 and 1014). The masking 1032 denotes applying the care bits of 1012 to mask out unused PUMP inputs of 1012. The hash 1034 denotes computation of the hash used during the rule cache lookup denoted by 1036. Components that may be used in implementing the logic denoted by 1032, 1034 and 1036 in one embodiment are illustrated and described in connection with FIG. 22. The output tag select 1038 denotes selection of PUMP outputs Rtag and PC new tag as included in 1014 based on the care vector bits (care included in inputs 1012) and the htagmode CSR (denoting the current tag mode).

Figure 31:
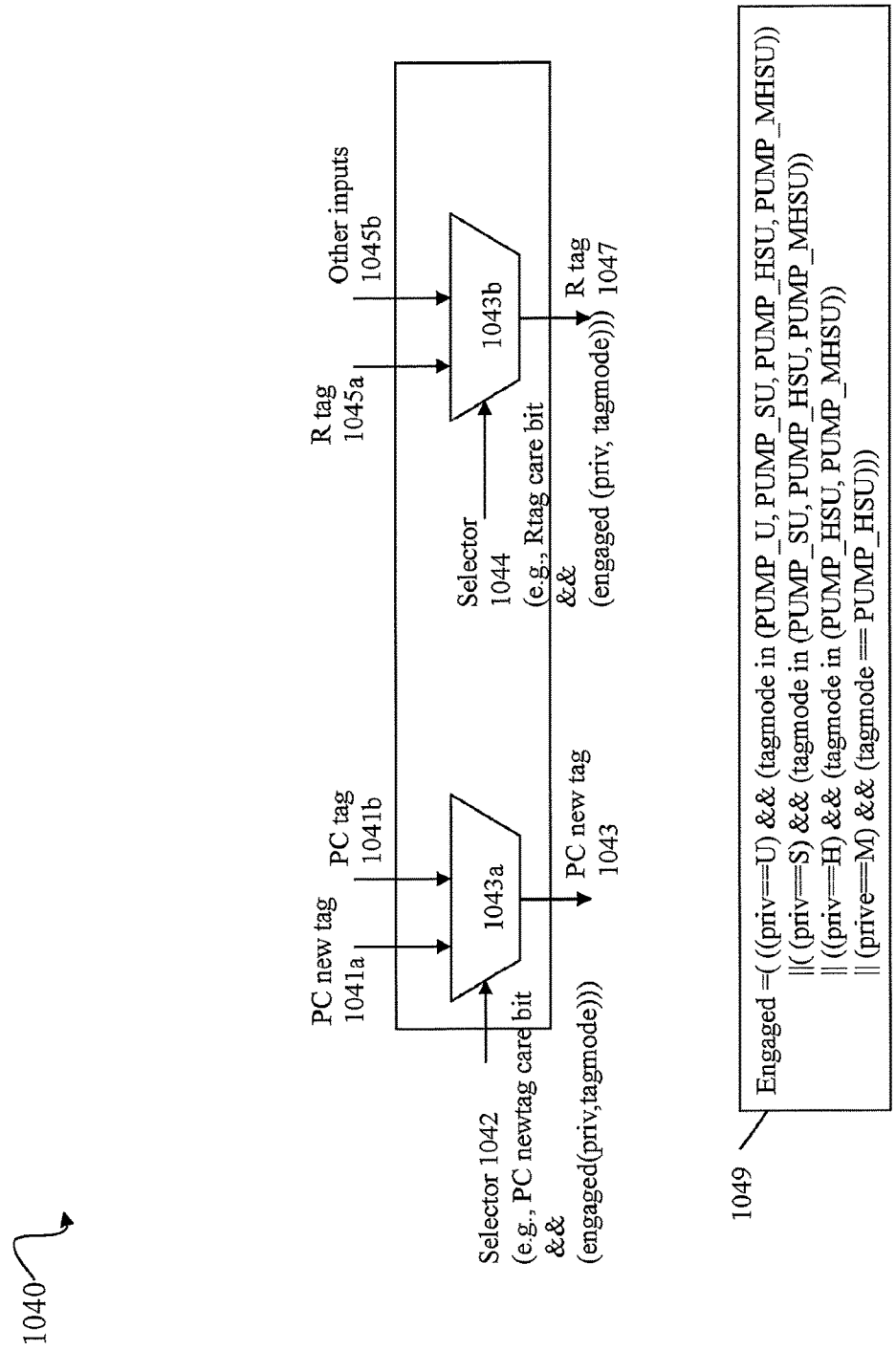
FIGS. 31 and 32 provide additional detail regarding control and selection of PUMP inputs and outputs in an embodiment in accordance with techniques herein.

Referring to FIG. 31, shown is an example 1040 denoting components that may be used to implement logic of the output tag select 1038 of the PUMP in an embodiment in accordance with techniques herein. The example 1040 includes multiplexers (MUXs) 1043a-b. Generally, MUX 1043a may be used to select the final tag value for PC new tag 1043 as output by the PUMP (e.g., PC new tag of 1014), and MUX 1043b may be used to select the final tag value for R tag 1047 as output by the PUMP (e.g., R tag of 1014). Element 1042 denotes the inputs used as the selector for MUX 1043a. The inputs 1042 are used are used to select either 1041a or 1041b as the PC new tag 1043. The inputs 1042 may include the PCnew tag care bit (e.g., from care bits of 1012) logically ANDed (&&) with engaged (a Boolean denoting whether or not the PUMP is engaged). Element 1043 denotes the inputs used as the selector for MUX 1043b. The inputs 1043 are used to select one of the inputs denoted by 1045a-1045b as the R tag 1047. The inputs 1043 may include the Rtag care bit (e.g., form care bits of 1012) logically ANDed (&&) with engaged. Thus, generally the care bits included in the PUMP inputs 1012 identify which PUMP inputs are don't cares (are masked out) and which PUMP outputs (Rtag and PCnew tag) are don't cares (are masked out). Also, outputs 1043 and 1047 are treated as "don't care" values when the PUMP is disengaged because the processor is running at a higher privilege level than the current tagmode specifies as the threshold for PUMP operation.

Element 1049 denotes how the Boolean engaged is determined as a function of current RISC-V privilege and the current tagmode. Element 1049 includes a logical expression using standard notation known in the art whereby "A==B" denotes if a logical test for equality between A and B, "A && B" denotes a logical AND operation of A and B, and "A||B" denotes a logical inclusive OR operation between A and B.

Element 1041a and 1045a denote inputs to 1043a which are outputs from the rule cache lookup 1036. PC tag 1041b is the PC tag included in the PUMP inputs 1012. Other inputs 1041b generally denote multiple other inputs that may be possibly selected as the final R tag 1047 output by the PUMP. For example, in one embodiment, other inputs 1041b may include M tag, PC tag, CI tag, OP1 tag, OP2 tag, OP3 tag, and possibly others depending on the instruction. The particular R tag output 1047 may vary with the particular RISC-V instruction/opcode.

The following may summarize particular values for R tag 1047 and PC new tag 1043 generated as PUMP output values in one embodiment. It should be noted that following indicates particular R tag output values for different RISC-V instructions. Thus, the particular R tag values output as the final PUMP R tag value may vary with the instructions that utilize such PUMP outputs in connection with subsequent metadata processing.

Figure 32:
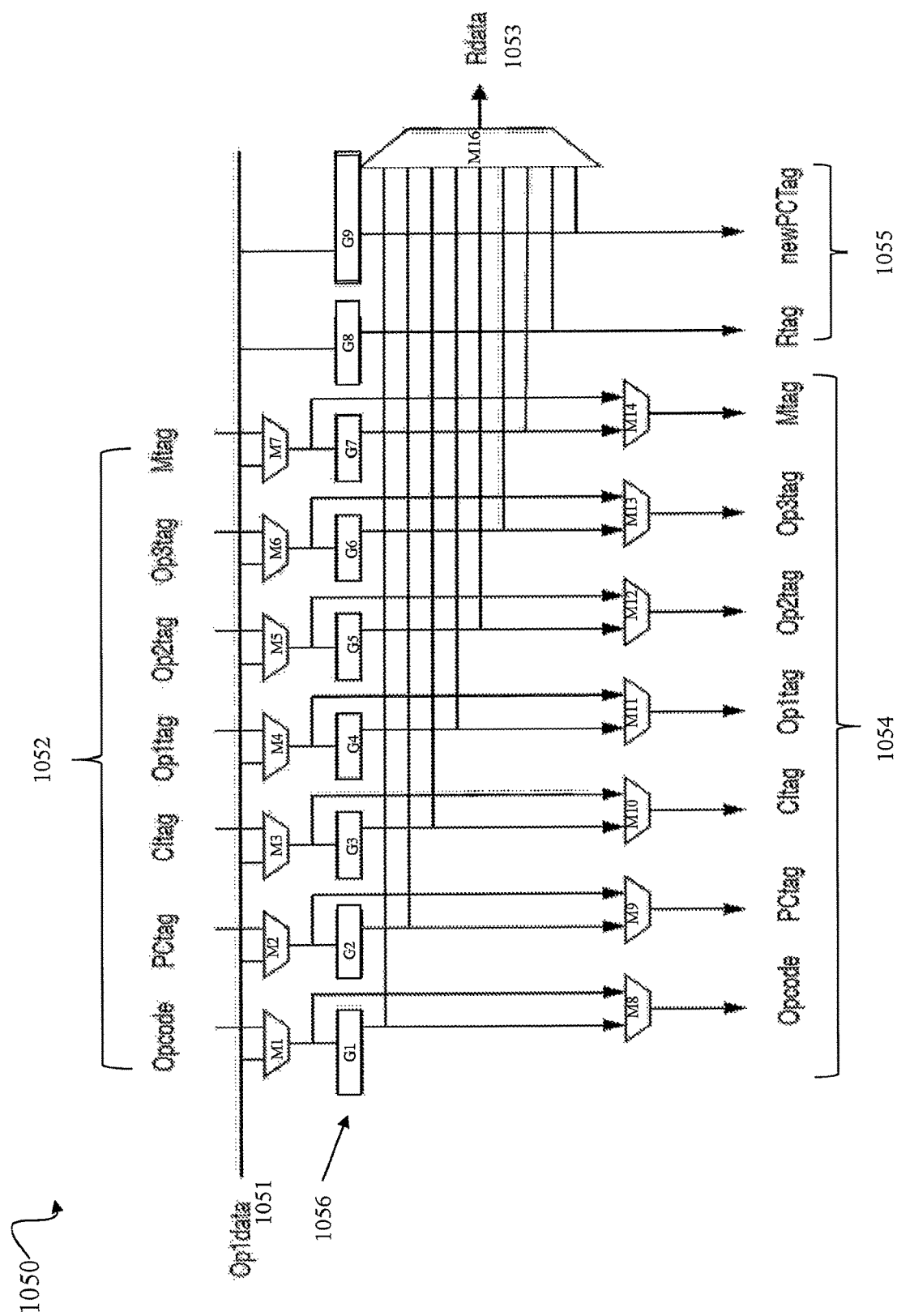

1. PCtag does not change when output care bit is off for PC new tag
2. Rtag is Op1tag for CSRRW operations
3. Rtag is Op2tag (CSRtag) for CSRR?I, CSRRS, CSRRC operations
4. Rtag is PCtag for JAL and JALR instructions
5. Rtag is PCtag for AUIPC instruction
6. Rtag is CItag for LUI instruction
7. Rtag is Op1tag for non-memory, non-CSR, non-JAL(R)/AUIPC/LUI operations when output care bit is off (indicates care for Rtag).
8. Rtag is Op2tag for memory write operations when output care bit is off
9. Rtag is Mtag for memory load operations when output care bit is off Referring to FIG. 32, shown is an example 1050 of components that may be used to control PUMP I/O in an embodiment in accordance with techniques herein. Generally, referring back to the example 1030, the components of 1050 may comprise another layer logically on top of 1032 (e.g., interfacing with components of FIG. 22). Elements M1-M14 denote multiplexers used for selection of various inputs thereto. Element 1052 generally denotes the inputs opcode, PC tag, CI tag, Op1 tag, Op2 tag, Op3 tag, and M tag from 1012 for the current instruction. Element 1056 generally refers to a row of registers used to store the selected outputs of multiplexers M1-M7. In one embodiment based on the RISC-V architecture, each of the boxes in row 1056 may be a register, and in particular, a CSR containing a particular value as described elsewhere herein (e.g. the example 900 denoting CSRs that may be used in one embodiment).

It should be noted that element 1052 of the example 1050 does not include all of the inputs of 1012. For example, funct12 (funct7) and subinstr inputs of 1012 are not illustrated in the example 1050 for purposes of simplicity. However, one of ordinary skill in the art appreciates that the inputs funct12 (funct7) and subinstr from 1012 may also be included in 1052. More generally, the inputs 1052 may be adapted for the particular inputs to metadata rule processing that may be used in an embodiment.

When the PUMP is performing processing for an instruction for normal PUMP verification (e.g., verify whether current instruction is allowed using policy rules), the inputs 1052 may simply pass through as the outputs 1054. The outputs 1054 in this case flow through to the PUMP as inputs such as inputs to components of FIG. 22 (or more generally pass through to the metadata processor or subsystem) for metadata processing. With normal PUMP verification, the PUMP may then produce outputs 1014 (e.g., Rtag and PC new tag if a matching rule for the current instruction is found in the rule cache and otherwise generating a cache miss 1014a).

Upon the occurrence of a rule cache miss, as a first step, the current values from 1052 for the current instruction are loaded into registers G1-G7 of 1056. Thus, G1-G7 includes a snapshot of the opcode and tag values for the current instruction that caused the rule cache miss and such values may now be used in connection with subsequent processing by the cache miss handler reading out the one or more desired values of G1-G7 as needed for such processing.

Thus, in a second step, the cache miss handler executes, reads as inputs values from G1-G7 and generates the new rule for the current instruction. Multiplexer M16 may be used to control selection of the various possible inputs from G1-G7 where the selected output from M10 is denoted as R data 1053 for processing by the cache miss handler (e.g. which may execute on either the same processor as when executing program code or may otherwise executed on a separate metadata processor such as in the example 1000). Given the inputs G1-G7 for the current instruction causing the rules cache miss, the cache miss handler performs processing to determine the new rule to be inserted into the cache. The cache miss handler generates outputs R tag and PC new tag for the new rule just determined, writes the Rtag to the Rtag CSR G8, and writes the PC new tag to the PC new CSR G9. In the example 1050, Op1data 1051 denotes the outputs generated by the metadata processor such as the outputs Rtag and PC new tag for the new rule where such outputs are then stored in CSRs G8 and G9 as described.

At this time, the values in CSRs G1-G9 are the tag values for the new rule just generated by the cache miss handler and may be inserted/written to the rule cache as the new rule in a third step. In at least one embodiment using techniques herein with the RISC-V architecture, writing to the R tag CSR denoted by G8 triggers writing of the new rule (e.g., contents of CSRs G1-G9) to the rule cache. In connection with rule insertion, CSRs G1-G7 are provided as output 1052 and CSRs G8 and G9 are provided as output 1055 to the PUMP for storing into the rule cache. More specifically, in one embodiment, the outputs 1052 and 1055 may be provided to the components of FIG. 22 for rule insertion.

In the simple case, an embodiment may insert one new rule to satisfy the current rule miss by writing the contents of CSRs G1-G9 for the new rule to the PUMP rule cache as just described (e.g., via outputs 1052 and 1055). In such an embodiment, the multiplexers M1-M7 are not needed since Op1data 1051 output by the metadata rule processor executing the cache miss handler only generates R tag and PC new tag for the new rule. However, an embodiment may also allow for rule prefetching or inserting multiple rules into the rule cache. For example, upon the occurrence of a rule cache miss, the cache miss handler may determine multiple rules to be written to/inserted into the rule cache rather than just a single new rule for the current instruction. In this case, the Op1data 1051 may include additional new values for the opcode, PCtag, CItag, Op1tag, Op2tag, Op3tag and Mtag (written to CSRs G1-G7) as well as new values for the Rtag and PC new tag (as written to CSRs G8 and G9). In such a case, multiplexers M1-M7 may be used to select the foregoing new values from Op1data 1051 as inputs, respectively, for CSRs G1-G7.

Generally, Op1data 1051 denotes output from the metadata processor to the PUMP and R data 1053 denotes output from the PUMP to the metadata processor. Also, element 1052 denotes inputs to the PUMP from the processor executing user code (e.g., as part of normal instruction processing) where values for element 1054 are equal to those as in 1052 when performing normal PUMP verification (e.g., verify whether current instruction is allowed using policy rules).

Figure 33:
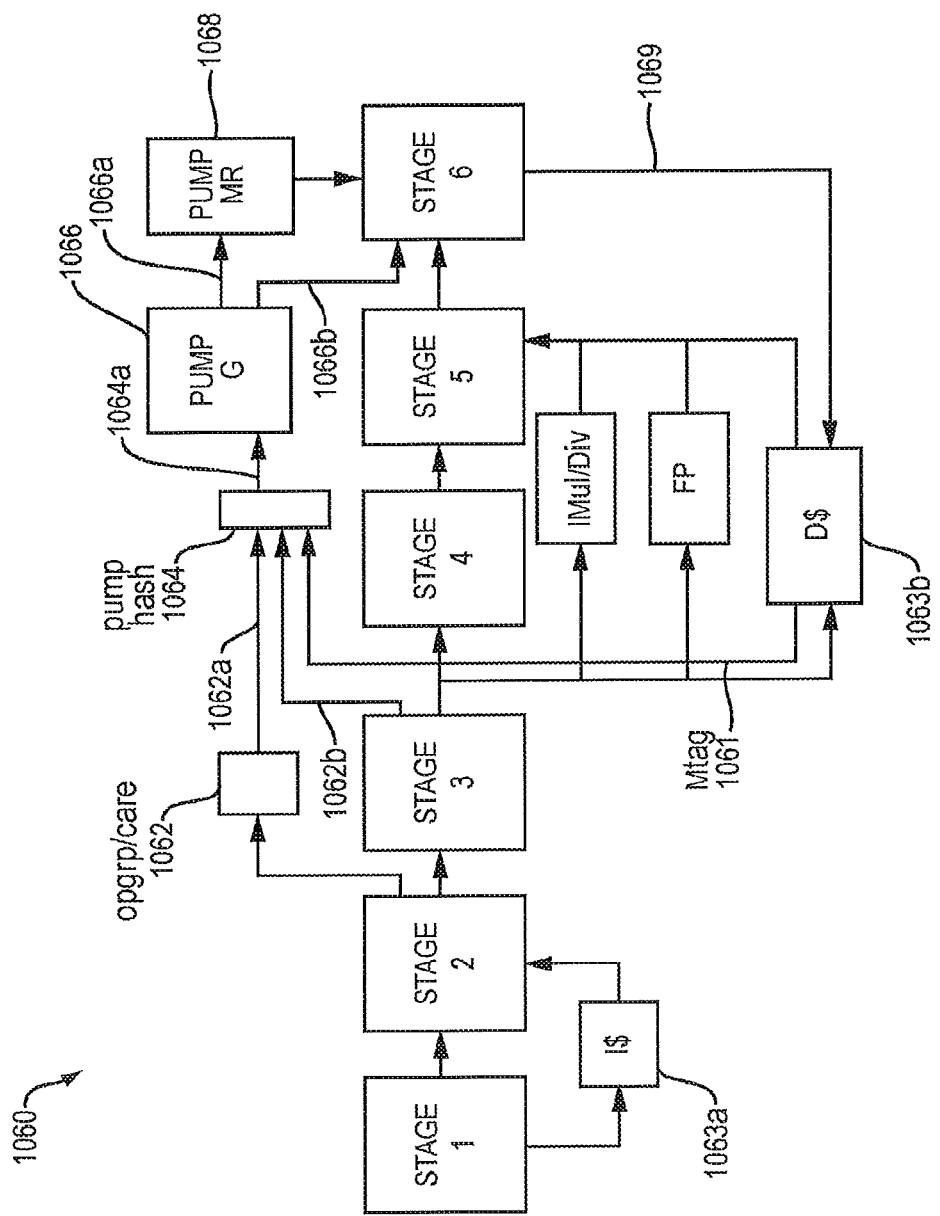
FIG. 33 is an example illustrating a 6 stage processing pipeline in an embodiment in accordance with techniques herein.

Referring to FIG. 33, shown is an example 1060 illustrating PUMP processing stages in combination with a 6 stage processor pipeline in one embodiment in accordance with techniques herein with a RISC-V architecture with branch prediction. The example 1060 illustrates a 6 stage pipeline with stage 1 including fetching the next instruction to be executed (e.g., storing fetched instruction in I cache 1063*a*) and branch prediction, stage 2 denoting the decode instruction stage, stage 3 including obtaining values from registers (e.g., register read) and branch resolution for the current instruction, stage 4 including instruction execution (e.g., execute fast ALU operations and launch multi-stage operations such as floating point (FP), integer multiplication and division), stage 5 including receiving responses to multi-stage operations and requesting memory operands, and stage 6 including committing instructions (e.g., storing result to destination and in data cache 1063*b* as denoted by 1069), and handling exceptions, traps and interrupts. Also shown in the example 1060 are the PUMP processing stages. Element 1062 indicates that the opgrp/care table lookup may be performed in stage 3 with the output 1062*a* provided as an input in stage 4 to the PUMP hash 1064. Other inputs to PUMP hash 1064 include the Mtag 1061 (e.g., tag of memory location that is an operand for the current instruction) and other tag values 1062*b* whereby inputs 1061 and 1062*a-b* are used to determine output 1064*a* denoting a cache address or location in the PUMP rule cache 1066. Examples of other tag values 1062*b* of instruction operands, the PC, current instruction, and the like, are described elsewhere herein and may be used in connection with determining a location in the rule cache 1066 for the current instruction (e.g., FIG. 22). Element 1068 denotes cache rule miss detection based on outputs 1066*a* of the PUMP processing from stage 5. Outputs 1066*a* may include an indicator as to whether there was a rule cache miss for the current instruction. If 1066*a* reports a potential hit, 1068 determines if the hit is a true hit or a false hit, turning false hits into misses. Element 1066*b* denotes the PUMP outputs to stage 6 in the case where there is no rule cache miss and there is a rule in cache matching the current instructions. Outputs 1066*b* may include PC new tag and R tag. It should be noted that the PUMP stages of the example 1060 may be varied. For example, the opgroup/care lookup 1062 may be performed in stage 4 rather than stage 3 with determination of a PUMP rule cache location and lookup both done in stage 5 (e.g., depending on the particular PUMP rule cache implementation).

In connection with non-memory operations, the Mtag is not needed as an input to the PUMP stage and the PUMP may continue performing processing without it. In the case of a memory operation instruction, the PUMP stalls until the Mtag has been retrieved from memory. Alternatively, an embodiment may perform Mtag prediction as described elsewhere herein. Consistent with discussion elsewhere herein, the PC new tag needs to provided back to the stage 1 such as illustrated and described in connection with FIG. 1. As long as the instruction commits, the PC new tag is the appropriate PC tag for the next instruction. If the current instruction does not commit (e.g., no rule cache hit), the PC new tag (as passed back to stage 1) is determined by the rule cache miss handler. When a trap handler starts or a context switch is performed (e.g., PC restore), the tag comes from saved PC.

As described herein, an embodiment may associate a single tag with each word. In at least one embodiment, the word size associated with each tag may be 64 bits. The contents of the tagged word may contain, for example, an instruction or data. In such an embodiment, the size of a single instruction. However, an embodiment may also support instructions which are a different size other than 64 bits. For example, an embodiment may be based on the RISC-V architecture which, as described in more detail elsewhere herein, is an open source instruction set architecture (ISA) based on established reduced instruction set computing (RISC) principles. An embodiment using the RISC-V architecture may include instructions of multiple different sizes such as, for example, 32 bit instructions as well as 64 bit instructions. In such a case, an embodiment in accordance with techniques herein may associate a single tag with a single 64 bit word where the single word may therefore include one 64 bit instruction or two 32 bit instructions.

Figure 34:
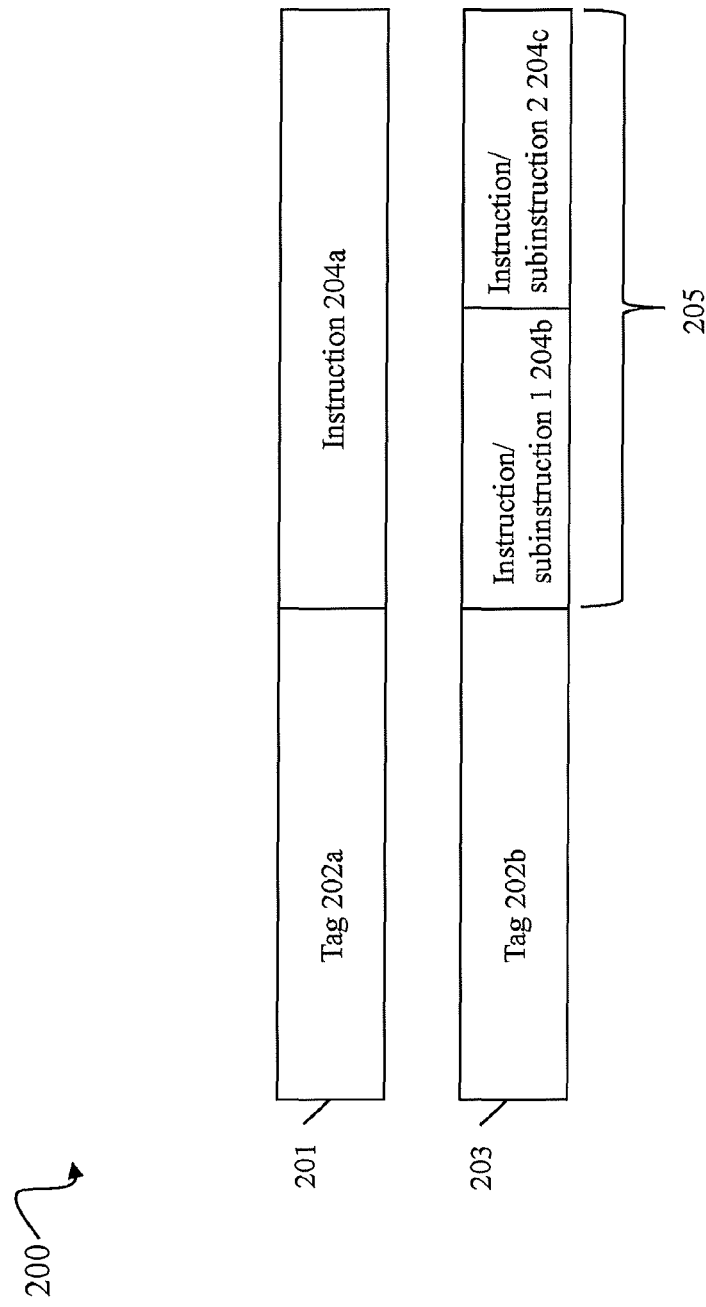
FIGS. 34-38 are examples illustrating subinstructions and associated techniques in an embodiment.

Referring to FIG. 34, shown is an example 200 of tags that may be associated with instructions in an embodiment in accordance with techniques herein. Element 201 illustrates the case noted above where a single tag 202a is associated with a single instruction 204a. In at least one embodiment, the size of each of 202a and 204a may be a 64 bit word. Element 203 illustrates an alternative also noted above where a single tag 202b is associated with two instructions 204b and 204c. In at least one embodiment, the size of 202b may be a 64 bit word, and the instructions 204b and 204c may each be 32 bit instructions included in the same 64-bit instruction word 205 associated with tag 202b. More generally, it should be noted that there may be more than 2 instructions in a single tagged instruction word depending on the instruction size(s) used in an embodiment. If, as illustrated by element 203, the granularity of tagging does not match the granularity of instructions, then multiple instructions are associated with a single tag. In some instances, the same tag 202b may be used for each of the instructions 204b 204c. However, in some instances, the same tag 202b may not be used for each of the instructions 204b, 204c. In following paragraphs, each of the multiple instructions, such as 204b and 204c, included in a single instruction word associated with a single tagged word may also be referred to as a subinstruction.

Thus what will now be described are techniques that may be used in an embodiment in connection with multiple subinstructions in the same instruction word whereby a different tag may be used in connection with each of the multiple subinstructions.

Figure 35:
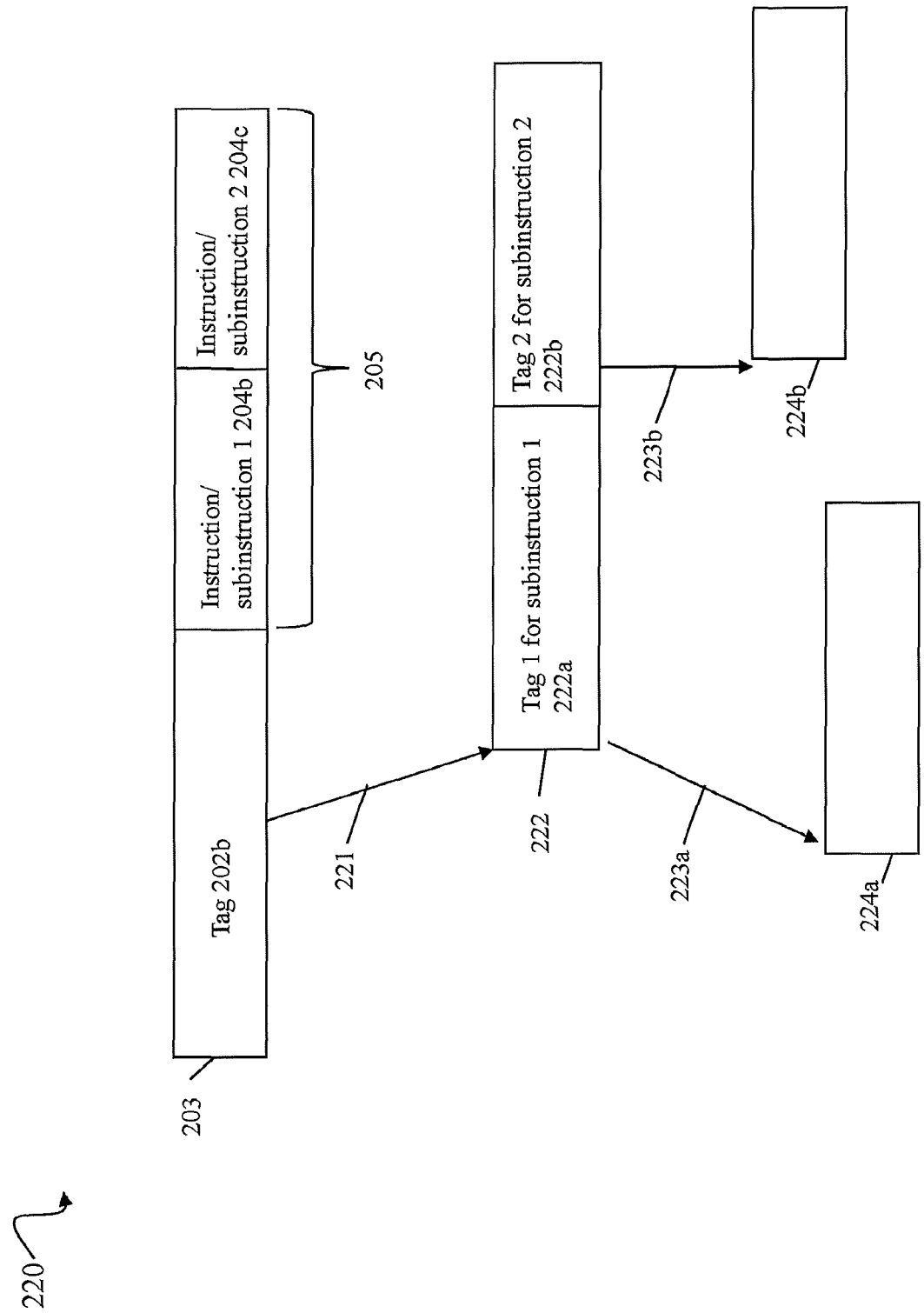

Referring to FIG. 35, shown is an example illustrating instructions and tags that may be used in an embodiment in accordance with techniques herein. The example 220 includes a single 64-bit instruction word 205 that includes two 32 bit subinstructions 204b and 204c. Tag 202b may be the tag on the instruction word 205 as described above in the example 200. In at least one embodiment in accordance with techniques herein, the tag 202b of the instruction word 205 may be a pointer 221 to another memory location 222 that includes a pair of tags where the pair includes a tag for each of the subinstructions 204b-c of the instruction word 205. In this example 220, the pair of tags 222 includes 222a denoting a first tag, tag1, for substruction1 204b, and also includes 222b denoting a second tag, tag2, for substruction2 204c. In at least one embodiment, each tag 222a-222b of the pair 222 may be a non-pointer tag (e.g., scalar), may be a pointer tag to yet another memory location including information used by the PUMP for processing as described herein, or may otherwise be a more complex structure including one or more non-pointer fields and/or one or more non-pointer fields. For example, tag 1 222a may be a pointer tag for subinstruction 1 204a and tag2 222b may be a pointer tag for subinstruction 2 204b. As illustrated in 220, element 223a denotes tag1 222a pointing to or identifying another memory location 224a including information used by the PUMP for processing subinstruction1 204b, and element 223b denotes tag2 222b pointing to or identifying another memory location 224b including information used by the PUMP for processing subinstruction2 204c. It should be noted that, depending on the embodiment and the subinstructions, each of 224a and 224b may be a non-pointer, may be yet another pointer to a memory location, or may be complex structure including some combination of one or more pointers and one or more non-pointers.

In an embodiment having multiple subinstructions within the same instruction word 205, an additional input may be provided to the PUMP indicating which of the subinstructions included in the instruction word 205 is being executed at a point in time. For example, where there are 2 subinstructions 204b-c in the instruction word 205, the additional input to the PUMP may be 0 or 1 indicating, respectively, whether subinstruction 1 204b or subinstruction2 204c is being executed at a particular point in time. In at least one embodiment consistent with discussion elsewhere herein based on the RISC-V architecture, a CSR (such as the ssubinstr CSR described elsewhere herein) may be defined which records or stores the additional input (denoting which subinstruction is being executed) to the PUMP. In at least one embodiment, the PUMP may normally receive the foregoing additional input from the data path (e.g., from the code execution domain) without use of a CSR. However, on a rule miss, the foregoing additional input may be recorded in a CSR so that the metadata processing domain in which the rule miss handler is executing may obtain the foregoing additional input (e.g., the CSR value for the foregoing additional input is provided to the PUMP on a rule insertion).

Figure 36:
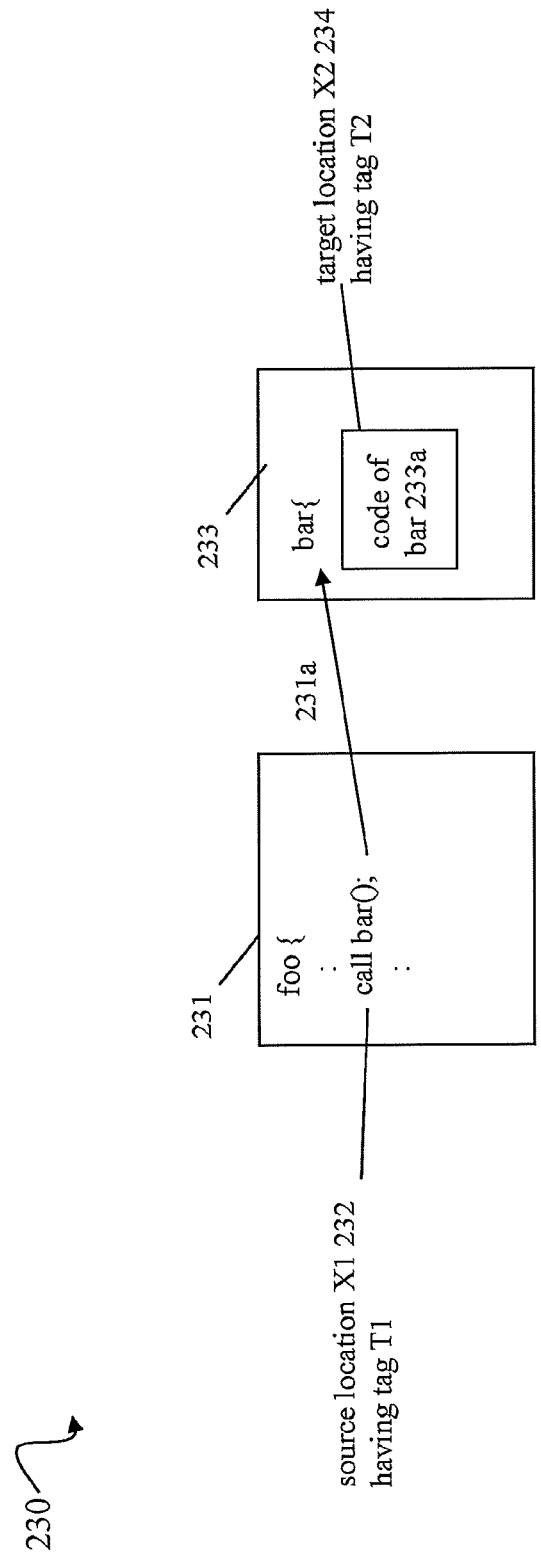

To further illustrate, an embodiment may include subinstructions which provide for transfer of control between two locations in a program. Examples of such subinstructions may be those that provide for jumping, branching, returning or more generally transferring control from a source location in the code to a target (e.g., sink or destination) location in the code. In connection with CFI or control flow integrity described elsewhere herein, it may be desirable to have the PUMP implement rules of a CFI policy to limit or control transfers between locations to only those supported by the program. For example, consider a case where a transfer of control is made from a source location in code having tag T1 to a target location in code having tag T2. Information used by the PUMP in enforcing the CFI policy may be a list of valid source locations which are allowed to transfer control to T2. In an embodiment of the CFI policy, two rules may be used to provide two checks of two instructions or opcodes when transferring control from the source to the target location. Consider a pseudo-code representation of the transfer or call as illustrated in the example 230 of FIG. 36. In the example 230, a call may be made transferring control 231a from a source location in foo routine 231 to a target location in routine bar 233. Specifically, control may be transferred 231a from the source location X1 232 having tag T1 to the target location X2 234 having tag T2. The target location X2 may be a first instruction in the body of code 233a of routine bar. The rules of the CFI policy may be used to check with the transfer from 232 to 234 is allowed or valid. In at least one embodiment, 2 rules of the CFI policy may be used each performing a check to ensure the transfer of control from 232 to 234 is valid. The instruction at the source location X1 is a branch point or source point from which control is transferred to the target. At the source (e.g., prior to executing the instruction at the source location X1 232), a first rule may be used to mark or set the tag of the PC to denote the source location. For example, the first rule may mark or set the tag of the PC to be the address X1 to denote the source location. Subsequently, prior to executing the instruction at the target location X2 234), a second rule may be used to check whether the source location X1 is a valid source location from which control is allowed to be transferred to the target location X2.

In at least one embodiment, the check of the second rule may be performed by determining whether the marked tag of the PC (as set by the first rule) identifying the source location 232 (e.g., which denotes the source location address X1) identifies a valid source location from which control may be transferred to target location 234. In such an embodiment, the second rule may be supplied with a defined list denoting all valid source locations which are allowed to transfer control to the target location 234. In at least one embodiment, the defined list may identify valid source locations, for example, by their addresses such as X1 noted above.

Figure 37:
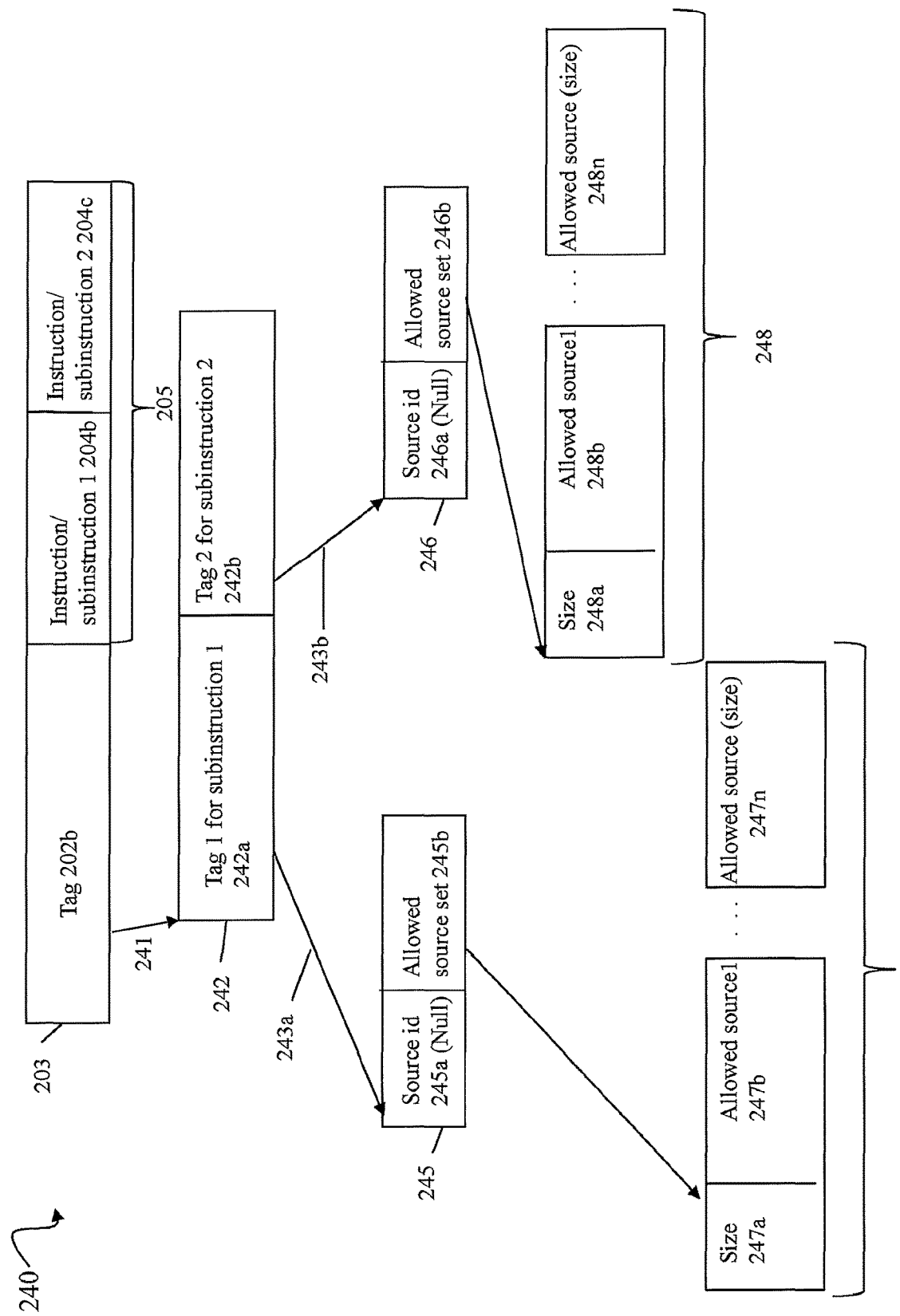

Referring to FIG. 37, shown is an example 240 illustrating tags that may be used in connection with subinstructions of source and target locations in an embodiment in accordance with techniques herein. The example 240 includes element 203 denoting the single tag 202b specified for 2 subinstructions 204b-c of a single instruction word as described above. The tag 202b on the instruction word may point to the tag pair 242 denoting the two tags 242a-b, respectively, for the two subinstructions 204 b-c. Each of two tags 242a-b may generally be a pointer to information used by PUMP rules for CFI validation in connection with the source or target location depending on the particular subinstruction associated with each of the two tags 242a-b.

The example 240 illustrates structures in one embodiment where the two subinstructions 204b-c are target locations. The subinstruction tag 242a points 243a to a location of a structure 245 including a source id field 245a and an allowed source set field 245b. The source id field 245a may be null in the case where the subinstruction 204b is not a source location, such as the case here with subinstructions 204b is a target location. The source set field 245b may be a pointer to a location including a list structure 247 identifying one or more valid source locations which are allowed to transfer control to the particular target location including subinstruction 204b. In at least one embodiment, the list structure 247 may include a first element denoting a size or number of valid source locations. Thus size 247a of "n" (n being an integer greater than 0) denotes the number of source locations denoted by elements 247b-n in the list 247. Each of elements 247b-n may identify a different valid source location which can transfer control to the target location including subinstruction 204b. In at least one embodiment, each of the allowed sources 247b-n may be a scalar or non-pointer that is, for example, the address of one of the valid source locations.

In the example 240, elements 243b, 246 and 248 used with subinstruction 2 204c are respectively similar to elements 243a, 245 and 247 as used with subinstruction 1 204b. Generally, in such an embodiment using the structures of 240, any item that does not exist may be assigned a null or zero value. If the instruction word 205 includes a pair of subinstructions 204b-c that are neither source nor destination locations, the tag 202b may be null (e.g., or otherwise identify a non-pointer or other pointer that does not point to a structure 242). If one of the subinstructions 204b-c is neither a source nor a target location of a transfer, its associated tag in 242 is null. For example, if subinstruction 204b is neither a source nor a target location but subinstruction 204 is a target, then 242a may be null and 242b may be as illustrated in the example 240. If a subinstruction 204b-c is not a source location, its source id is null (e.g., since 204b-204c in the example 240 are target locations, both 245a and 236a are null). If a subinstruction 204b-c is not a target location, its allowed source set field pointer is null. For example, if subinstruction 204b identified a source location rather than a target location, source id 245a would identify the address of the source location instruction and 245b would be null.

Figure 38:
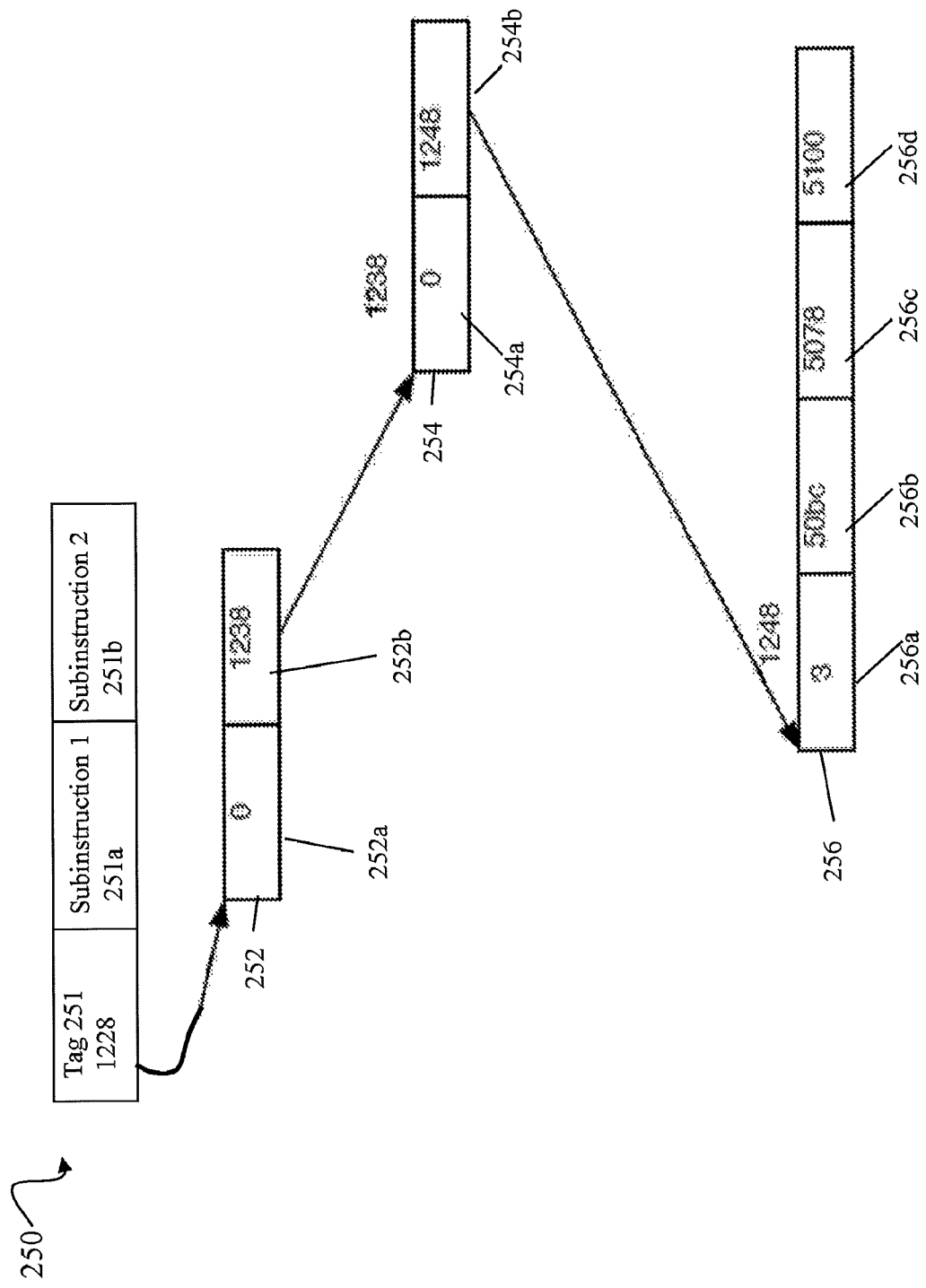

To further illustrate, reference is made to FIG. 38 to another example 250 using the structures such as described in the example 240 with the difference that 251a, a first of the subinstructions, is neither a source nor a target location, and 251b, a second of the subinstructions, is a target location where control may be transferred from any of 3 valid source locations. Elements 251a-b may denote two 32 bit subinstructions included in a single tagged word having tag 251. The tag 251 may be pointer 1228 identifying a location in memory including the structure 252 with a pair of tags for the subinstructions 251a-b. Element 252 may be similar to 242 of the example 240. Element 252a may be a tag pointer for the subinstruction 251a and element 252b may be a tag pointer for sub instruction 251b. Since subinstruction 251a is neither a source nor a target location, 252a is null as denoted by the zero. Since subinstruction 251b is a target location, 252b is a pointer 1238 to structure 254. Element 254 may be similar to 246 of the example 240. Element 254a is a source id field (like 246a) and element 254b is an allowed source set field (like 246b) including a pointer (address 1248) to an allowed source set structure 256 (similar to 248 of example 240). Since subinstruction 251b is only a target location and not a source, 254a source id is null. Element 256 may be similar to 248 of the example 240. Element 256a may be a size field (like 248a) denoting a number of valid source locations. Element 256b-d may denote the valid source ids which may be, for example, addresses of valid source location instructions. In this example, 256a indicates that there are 3 valid source locations having addresses 50bc, 5078, 5100 stored, respectively, in entries 256b-d. In connection with the foregoing, it should be noted that generally an instruction may be both a target and a source so that being a target does not mean that source id will always be null. If, for example, an instruction is both a target and a source, source id will not be null and the instruction's tag would include the list of allowable/allowed sources.

It should be noted that the addresses of the source locations such as in entries 256b-d, and more generally, in any allowed source of the allowed source set (e.g., any of 248b-n of 248 of the example 240) may be a byte level address granularity.

In a manner similar to that just described for multiple instructions (also referred to as subinstructions) included in a single tagged word, an embodiment may allow access to data portions which are less than a single tagged word of data. For example, an embodiment may include instructions which access data at the byte level and it may be desirable to provide byte level tagging so that each byte may have its own associated tag in manner similar to providing a different tag for each of the multiple subinstructions included in a single tagged word. In following examples, reference is made to providing byte level tagging where each of 8 bytes included in a 64 bit word may have its own associated tag. However, more generally, techniques herein may be used to provide for sub-word tagging for any number of multiple data items included in a single tagged word. In such cases, the tag associated with the tagged data word may be a pointer to a structure identifying the byte level tags for the bytes of the tagged data word.

Figure 39:
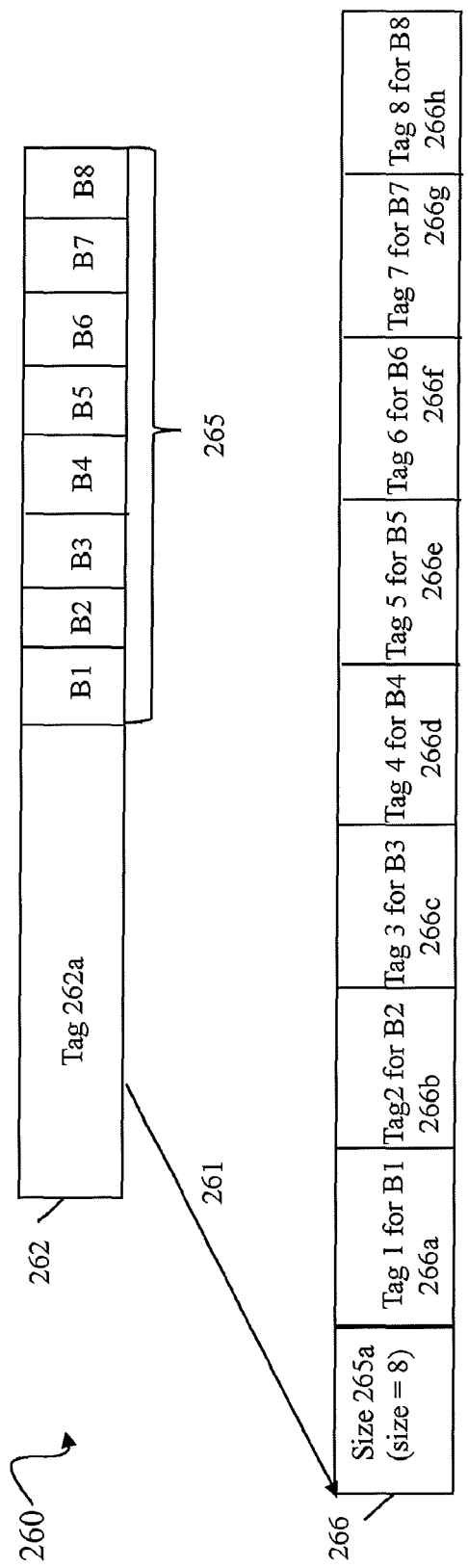
FIGS. 39-42 are examples illustrating byte level tagging and associated techniques in an embodiment.

Referring to FIG. 39, shown is an example 260 of byte level tagging that may be used in an embodiment in accordance with techniques herein. Element 262 denotes a tag 262a associated with a tagged 64 bit word 265 where the word 265 includes 8 bytes denoted as B1-B8. Tag 262a may be a pointer pointing 261 to a memory location of structure 266 including tags for each of the bytes B1-B8 of the data word 265. The structure 266 may include a first field 265a that is a size field indicating a number of remaining entries in the structure. Each subsequent entry in the structure may include a tag value and denote the one or more bytes of the word 265 having that particular tag value. In this example, size 265a is 8 where each of the bytes B1-B8 of 265 have a different tag value. Element 266a-h respectively denote tag values for bytes B1-B8 of the word 265.

Figure 40:
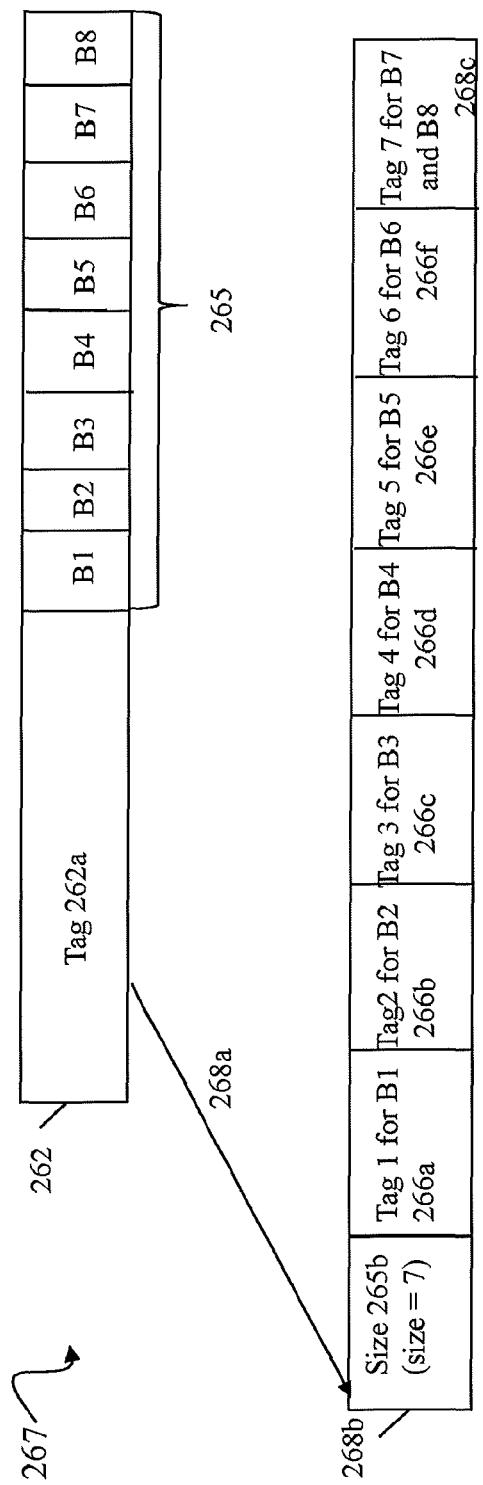

Referring to FIG. 40, shown is a second example 267 of byte level tagging that may be used in an embodiment in accordance with techniques herein. Element 262 denotes a tag 262a associated with a tagged 64 bit word 265 where the word 265 includes 8 bytes denoted as B1-B8. Tag 262a may be a pointer pointing 268a to a memory location of structure 268b including tags for each of the bytes B1-B8 of the data word 265. The structure 268b may include a first field 265b that is a size field indicating a number of remaining entries in the structure. Thus, 265b is similar to 265a of FIG. 39. Each subsequent entry in the structure 268b may include a tag value and denote the one or more bytes of the word 265 having that particular tag value. In this example, size 265b is 7 denoting the 7 subsequent entries 266a-226f and 268c. Element 266a-f are as described in connection with the example 260 of FIG. 39. Element 268c indicates that tag 7 is the tag for both bytes B7 and B8. Thus, the structure 268b includes one less entry than the structure 266 of FIG. 39 since, in the example 267, both bytes B7 and B8 have the same tag value of tag 7. In this manner, the structure (e.g., 268b) pointed to by a tag (e.g., 262a) of a data word may have a varying number of entries as needed depending on the particular byte level tags.

It should be noted that the particular level of data access granularity may vary with the particular architecture and instruction set in an embodiment. The foregoing may be used to provide byte level tagging in an embodiment which allows byte level data access. As a variation, an embodiment may support data access at a different level of granularity and techniques herein may be readily extended to any subword tagging level of granularity.

Similarly, the examples 260 and 267 illustrate one example of a data structure that may be used to hold the byte level or other sub word data tagging. As a variation, an embodiment may use a tree or other hierarchical structure to specify byte level tags for bytes of a single tagged data word. The tree or other hierarchical structure representing the byte level tags may be similar the hierarchical structure described herein with for storing word-level tags, for example, in connection with elements 100, 120, 130 and 140, respectively of FIGS. 78-81 described elsewhere herein.

Figure 41:
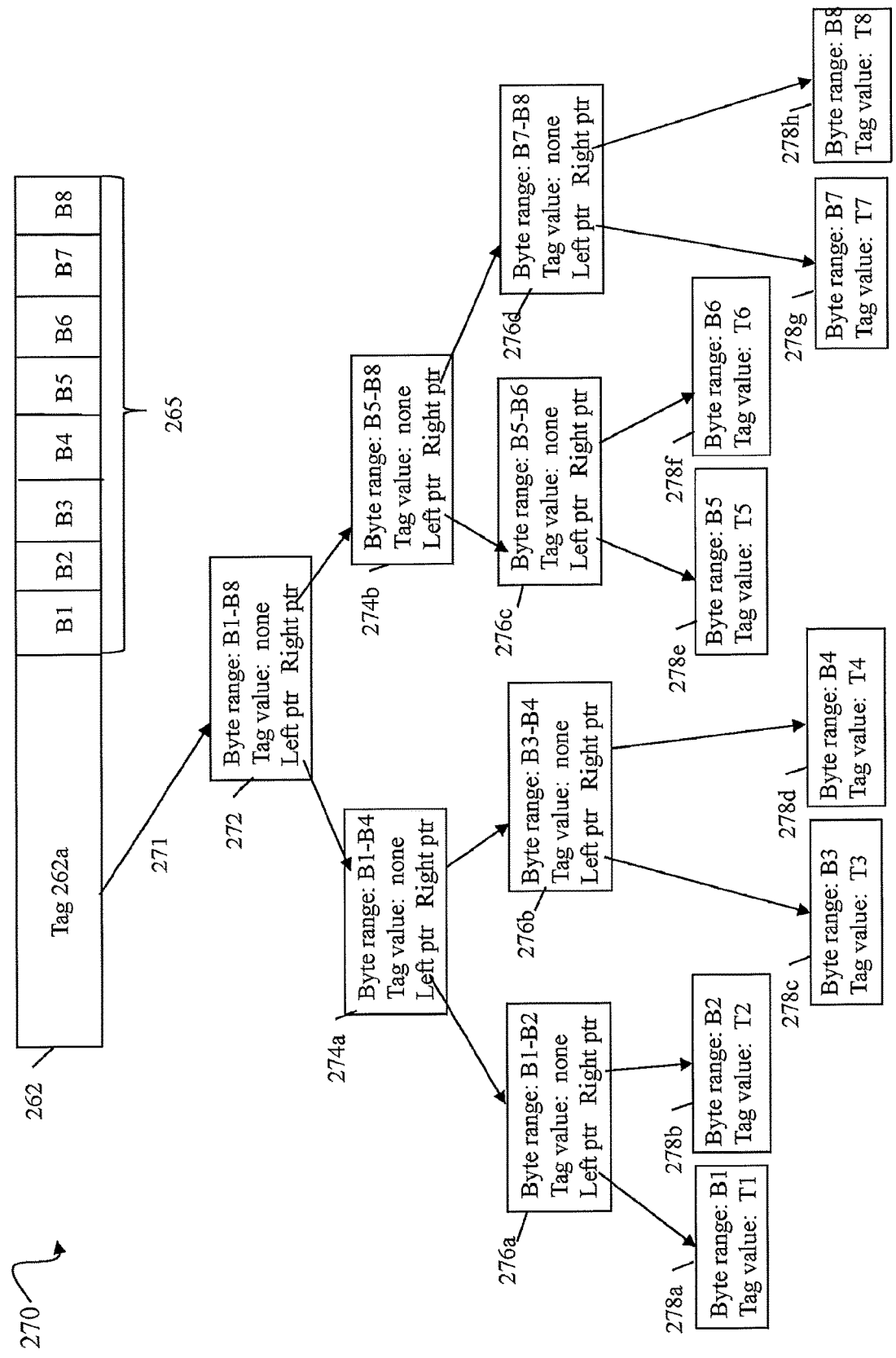

To further illustrate, an embodiment may use a tree structure to represent byte level tags as in the example 270 of FIG. 41. In the example 270, element 262 may denote a tag 262a associated with tagged word 265 including bytes B1-B8. Tag 262a may be a pointer or address to a tree structure representing byte level tags for B1-B8 265. For example, tag 262a may point to a location of root node 272 of the tree structure. The tree structure in this example may include root node 272 at level 1, nodes 274a-b at level 2, nodes 276a-d at level 3 and nodes 278a-h at level 4. Each node of the tree may be associated with a byte range of one or more bytes. The leaves of the tree may denote the byte level tags for the bytes B1-B8. A non-leaf node of the tree therefore does not specify a tag value but rather indicates that one or more descendant nodes at one or more lower levels need to be consulted to determine the byte level tags for the byte range associated with the non-leaf node. A leaf node may denote a homogenous or same tag value for a range of multiple bytes of 265. Each non-leaf node may include a left pointer to the non-leaf node's left child node and a right pointer to the non-leaf nodes' right child node. Each of the child nodes of a parent node may represent a partitioning of the byte range associated with the parent node.

Figure 42:
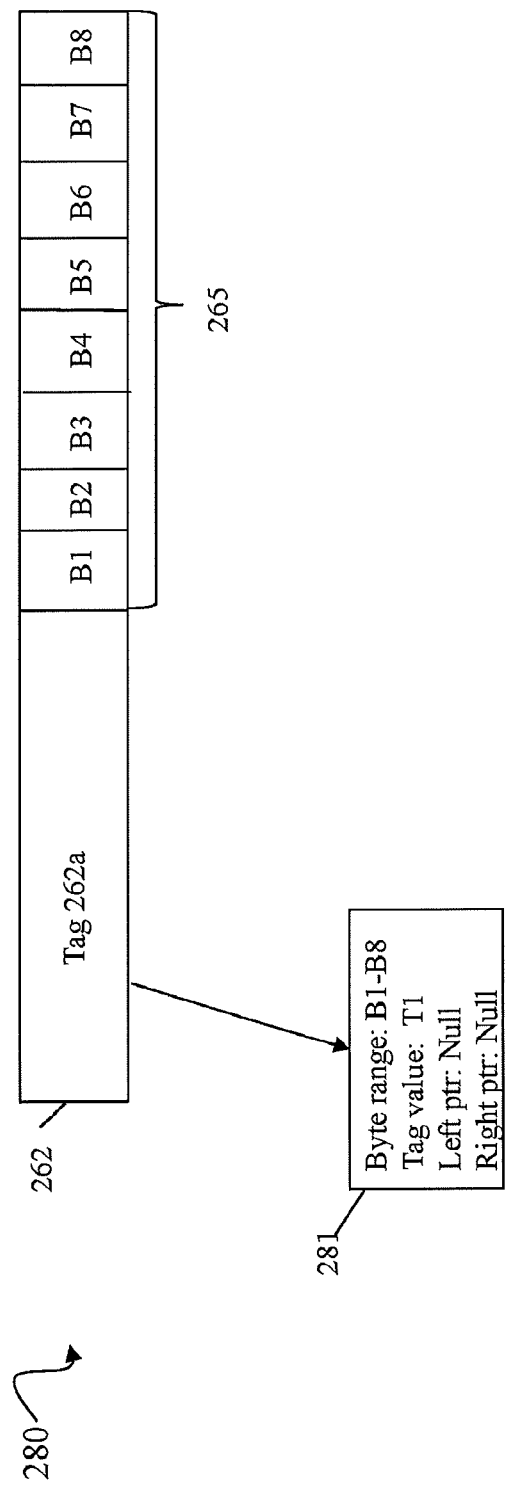

The example 270 illustrates a tree structure where there are no homogeneous byte level tags and each of the bytes B1-B8 of 265 has a different tag value. In a manner consistent with discussion elsewhere herein (e.g., with elements 100, 120, 130 and 140, respectively of FIGS. 78-81), an embodiment may omit descendant nodes from a subtree if the subtree has as its root a first node denoting a homogeneous tag value for the byte range associated with the first node. For example, to further illustrate, reference is made to FIG. 42. In the example 280, element 262 may denote a tag 262a associated with tagged word 265 including bytes B1-B8 as descried above. Tag 262a may be a pointer or address to a tree structure representing byte level tags for B1-B8 265. In this example 280, each of the bytes B1-B8 has the same tag T1 and therefore the tree structure need only include the root node 281. As byte level tags for bytes B1-B8 may be modified or changed over time, the tree structure or other structure pointed to by tag 262a may be accordingly updated to reflect such byte level tag modifications.

In an embodiment providing byte level tagging, or more generally subword tagging, within the same data word 265, an additional input may be provided to the PUMP indicating which one or more byte level tags (corresponding to which one or more of the bytes included in the word 265) are being referenced. For example, with byte level tagging where there are 8 bytes B1-B8 in a single tagged data word 265, the additional input to the PUMP may be a bitmask of 8 bits where each of the 8 bits is associated with a different one of the bytes B1-B8 and denotes whether to use the byte level tag for the particular byte of the word 265. As a variation, an embodiment may denote the one or more bytes by specifying a byte range, such as starting byte and length or size (e.g., bytes B4-B8 by specifying starting byte B4 and denoting a size or length of 5). In at least one embodiment consistent with discussion elsewhere herein based on the RISC-V architecture, a CSR may be defined which records or stores the additional input denoting which one or more byte level tags for the one or more bytes B1-B8 are to be used by the PUMP. The additional input may be, for example, the bitmask or other suitable representation identifying the particular byte level tags used by the PUMP. In at least one embodiment, the PUMP may normally receive the foregoing additional input denoting which one or more bytes are to be used as an input from the data path (e.g., from the code execution domain) without use of a CSR. However, on a rule miss, the foregoing additional input may be recorded in a CSR so that the metadata processing domain in which the rule miss handler is executing may obtain the foregoing additional input (e.g., the CSR value for the foregoing additional input is provided to the PUMP on a rule insertion).

As discussed elsewhere herein, at the policy level many instructions may be treated in a similar manner. For example, add and subtract instruction operation codes or opcodes may typically treat their metadata the same whereby both opcodes may behave similarly at the rule level for a particular policy by considering the same tag inputs to the PUMP and the same tag outputs propagated by the PUMP. In such a case, add and subtraction opcodes may be grouped together in a single operation group or "opgroup" so that the same set of rules may be used for all opcodes in that particular opgroup. How opcodes are grouped together is policy dependent and thus may vary with policy. In one embodiment, a translation or mapping table may be used which maps a particular opcode to its associated opgroup on a per policy level. In other words, a different mapping table may be created for each policy (or specified group of multiple policies having the same opcode to opgroup mappings) since the mappings may vary per policy.

For a particular opcode, the translation or mapping table may determine the opgroup as noted above and may also determine additional information for the particular opcode. Such additional information may include the care/don't care bit vectors as also discussed elsewhere herein which may indicate which PUMP inputs and PUMP outputs (e.g., input tags and propagated output tags) are, respectively, actually used as inputs for rule processing and propagated as a relevant output of rule processing for a particular opcode. The don't care bit vectors may be determined with respect to any PUMP input and output in an embodiment. In one embodiment, the don't care bit vector may indicate which input tags and output tags are relevant and may also indicate which particular opcode bits are actually used for a particular opcode. This is described below in more detail with respect to the RISC-V architecture and instruction formats but may also be more generally used in connection with other suitable instruction formats of different architectures. The forgoing translation or mapping table including opgroups and care/don't care bits for particular opcodes (e.g., element 422 of example 420 discussed below) may also be referred to as the opgroup/care table elsewhere herein.

Figure 43:
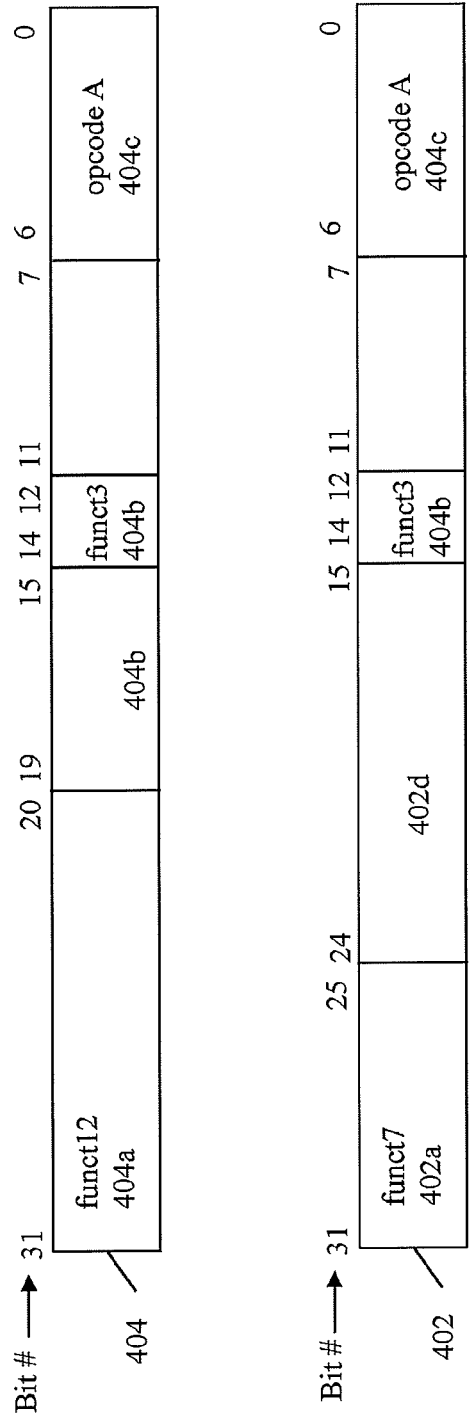
FIG. 43 is an example illustrating variable length opcodes in an embodiment in accordance with techniques herein.

RISC-V has multiple different instruction formats each using a different set of instructions bits for the opcode. Referring to the example 400 of FIG. 43, shown are bits of an instruction that may be included in different bit encodings for different opcodes in an embodiment using instructions of the RISC-V architecture. Generally, the RISC-V architecture includes multiple instruction formats where different bits of the instruction may be used as part of the opcode encoding. With a 32 bit instruction, a total of up to 22 bits may be used to represent an encoding of an opcode. Element 404 represents portions of an instruction in the RISC-V architecture that may be used to represent a bit encoding for a particular opcode depending on the instruction format. Element 404 includes 3 fields of bits—404a-404c—that may be used in encoding a particular opcode. Element 404a indicates a first opcode field, opcode A, of 7 bits. Element 404b indicates a second opcode field, funct3, of 3 bits. Element 404a indicates a third opcode field, funct12, of 12 bits. Depending on the instruction (e.g., such as with system calls), the opcode encoding may include up to all 22 of the bits denoted by 404a-c. More specifically, in RISC-V, an opcode may be encoded using just the 7 bits of 404c, using 10 bits of only 404b and 404c (exclude 404a), or using all 22 bits of 404a-c. As a further variation, an instruction of the RISC-V architecture may have an opcode encoding using fields as denoted by 402. Element 402 includes the two fields of bits 404b and 404c as discussed above. Additionally, rather than use all 12 bits of funct12 404a in the opcode encoding, an instruction may use only 7 of the 12 bits as denoted by funct7 402a. Thus, as yet another possibility, an opcode may have an encoding using fields 402, 404b and 404c as illustrated by element 402.

Figure 44:
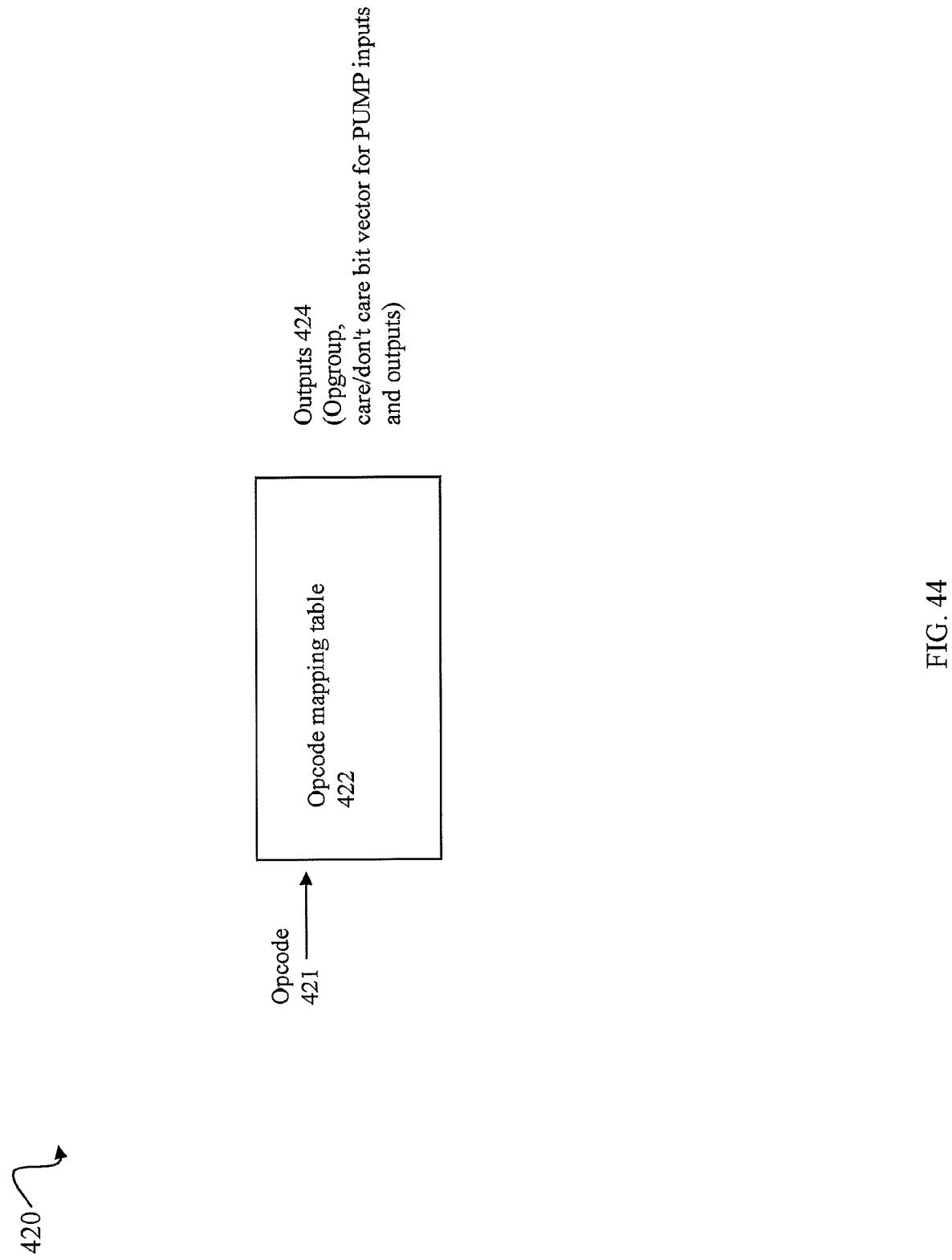
FIG. 44 is an example illustrating an opcode mapping table in an embodiment in accordance with techniques herein.

Illustrated in FIG. 44 is an example 420 illustrating a mapping or translation table that may be used in an embodiment in accordance with techniques herein. As discussed above, an opcode 421 may be provided as an input or index into the opcode mapping table 422 to lookup or determine mapped outputs 424 for the opcode 421. The mapped outputs 424 may include the opgroup and care/don't care bit vectors for PUMP inputs and outputs for the particular opcode 421. In an embodiment based on the RISC architecture and instruction formats, the opcode may potentially have up to a 22 bit encoding. However, using such a large 22 bit opcode as an index into the table is unreasonable due to the large number of entries needed to accommodate the 22 bit opcode (e.g. table may include an entry for each opcode indicating its associated opgroup and care/don't care bit vector information resulting in millions of entries for the 22 bit opcode). To reduce the size of the table 422 in such an embodiment, the table 422 may be indexed using only a portion of the 22 bit opcode fields. For example, in at least one embodiment, the opcode 421 input may be 10 bits of the opcode as denoted by elements 404b and 404c in the example 400. Thus, table 422 may be indexed using opcode bits of 404b and 404c of an opcode to determine the opcode's opgroup and associated care/don't care bit vectors.

In such an embodiment, the remaining 12 opcode bits of funct 12 404a of an instruction may be provided as an input to the PUMP where appropriate portions of 404a are masked for the particular opcode. Information regarding which particular bits of funct12 404a should/should not be masked for a particular opcode may be included in the care/don't care bit vector information output from the mapping table 422 lookup for the opcode. In at least one embodiment based on the RISC-V architecture, the care/don't care bit vector information may indicate one of the following with respect to the 12 opcode bits of funct 12 404a for an opcode:

1. all 12 bits may be masked since no bits of 404a are used;
2. 7 of the 12 bits, as denoted by 402a, are used where the bottom most 5 bits of 404a (e.g., bits 20-25) are masked out; or
3. all 12 bits of 404a are used and therefore there is no masking of an bits of 404a.

Also, in such an embodiment, the 12 opcode bits of funct12 404a may be recorded or stored in a CSR, such as sfunct12 CSR described elsewhere herein, provided as a PUMP input in connection with performing rule insertion into the PUMP. In at least one embodiment, the PUMP may normally receive the foregoing opcode bits from the data path (e.g., from the code execution domain) without use of a CSR. However, on a rule miss, the foregoing may be recorded in a CSR so that the metadata processing domain in which the rule miss handler is executing may obtain the foregoing as an input (e.g., the CSR value is provided as an input to the PUMP on a rule insertion).

In at least one embodiment in accordance with techniques herein, multiple user processes may execute using a virtual memory environment where physical pages are mapped into a user process address space. Techniques herein may be utilized to allow sharing of physical pages of memory among multiple user processes where the same set of one more physical pages that may be simultaneously mapped into multiple user process address spaces. In at least one embodiment, tags used by such processes for which the sharing is allowable may be characterized as global having the same value and meaning or interpretation across user process address spaces.

Figure 45:
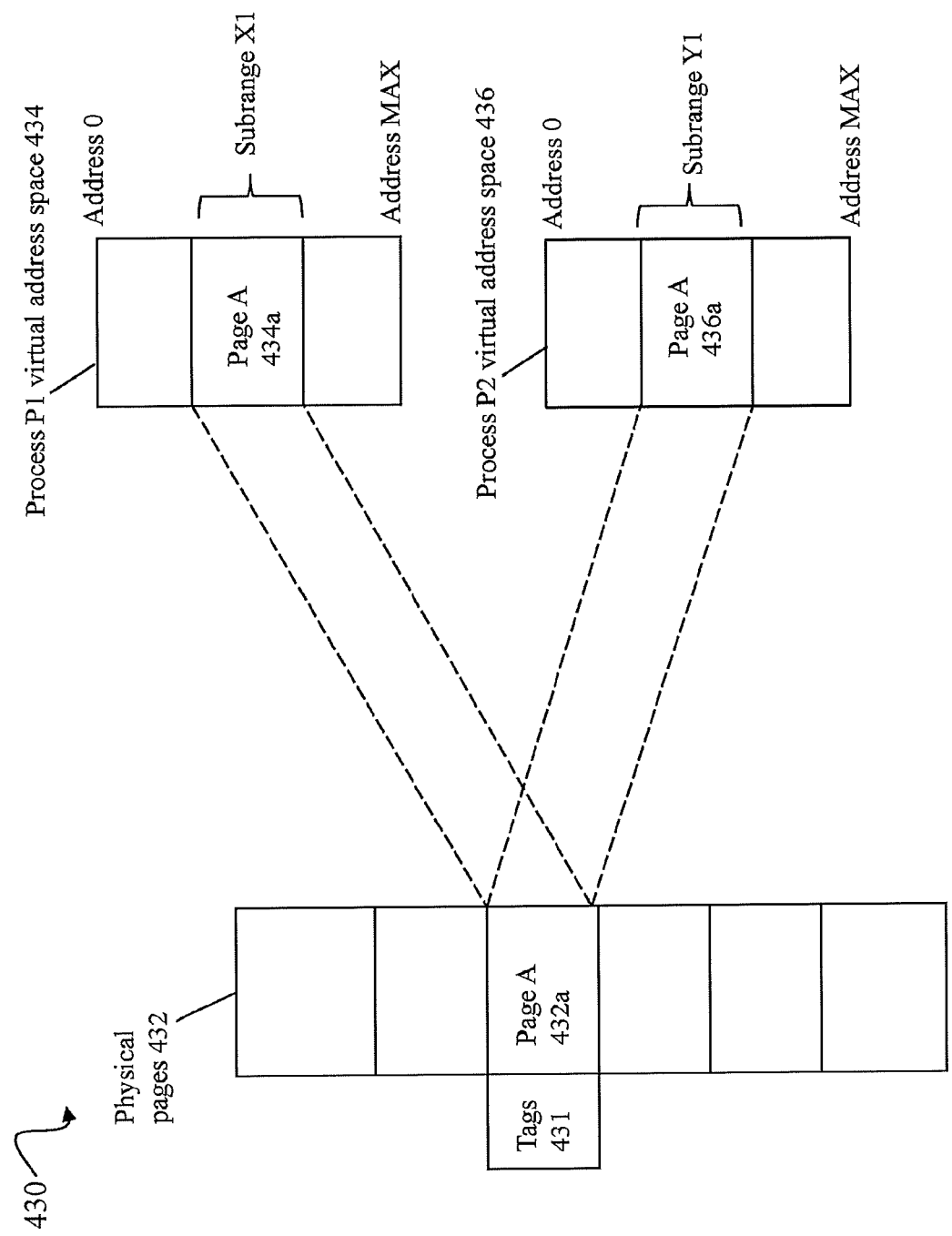
FIG. 45 is an example illustrating shared pages in an embodiment in accordance with techniques herein.

Referring to FIG. 45, shown is an example 430 illustrating sharing of physical pages between processes in an embodiment in accordance with techniques herein. The example 430 includes process P1 having address space 434 and process P2 having address space 436. Element 434 may denote the virtual memory process address space or range 0 through MAX, where MAX denotes the maximum virtual memory address used by P1 and 0 denotes the minimum virtual address used by P1. As known in the art, physical pages of memory 432 may be mapped into a virtual address space such as 434 where the contents of the mapped physical page may be accessed by P1 using the mapped virtual addresses of such mapped physical pages. For example, physical page A 432a may be mapped into a subrange X1 of P1's virtual address space. Process P1 may, for example, read a data item or instruction from a location in page A 432a by referencing a particular virtual address in the subrange X1.

Similarly, physical pages of memory 432 may be mapped into virtual address space 436 where the contents of the mapped physical page may be accessed by P2 using the mapped virtual addresses of such mapped physical pages. For example, physical page A 432a may be mapped into a subrange X2 of P2's virtual address space. Process P2 may, for example, read a data item or instruction from a location in page A 432a by referencing a particular virtual address in the subrange X2.

The tags 431 may denote the tags on the memory locations of page A 432 where such tags may be used by the PUMP in connection with rule processing as described herein. Since page A 432 is shared by both P1 and P2 via the mapping as illustrated, the same set of tags 431 are also used by the PUMP in connection with executing instructions of both P1 and P2. In such an embodiment, the tags 431 may be characterized as global tags shared by both P1 and P2. Additionally, in at least one embodiment, the global tags 431 shared by multiple processes P1 and P2 are interpreted in a similar manner such as using the same rules and policies. For example, a first tag having a value of 100 may be associated with a first memory location in 432a. The first tag may denote a value representing a coloring of the first memory location used in connection with rules of policy which determine whether it is allowable for a particular executing instruction to perform an operation referencing the first memory location, or its contents. The first tag may be interpreted as the same color by the rules in connection with instruction execution of both P1 and P2. For example, the tag value of 100 needs to be interpreted as the same color by the rules in connection with both P1 and P2. Furthermore, the same set or instance of policies and rules may be used by the PUMP for both P1 and P2.

In such an embodiment which uses global tags on shared memory as described above, it may be desirable to also allow for further differentiating or allowing different access, authority or operations on a per process basis. For example, assume that page A 432a includes data shared by both P1 and P2. However, it may be desirable to allow different operations or access with respect to the shared data of 432a on a per process basis even though global tags are used to tag the shared page A 432a. For example, process P1 may have write access to page 432a and process P2 may have read-only access to page 432a. However 432a may be a shared memory page tagged with global tags. In such an embodiment with global tags on the shared page, the same policy and set of rules may be used in connection P1 and P2 where different read and write access capabilities for each process may be differentiated using different tag values on the PC. For example, process P1 may be include a first instruction which performs a write to a memory location in 432a and the current PC tag has a value of X. Rules of an access policy may perform the following logic:

if PCtag=X, then allow write
    if PCtag=Y then allow read-only

In such a case, the PC tag has a value of X which is interpreted by the rules to allow write access for process P1 and thus P1 is allowed to execute the first instruction. Process P2 may be executing a second instruction which performs also performs a write to a memory location in 432a and the current PC tag has a value of Y. In such a case, the PC tag has a value of Y which is interpreted by the rules to not allow write access and rather allow read-only access for process P2 and thus P2 is not allowed to execute the second instruction.

Thus, in at least one embodiment, the PC tag may be used to encode privilege, access or authority that may differ per process whereby the particular allowed privilege, access or authority may be represented by different PC tag values.

An embodiment may specify a particular PC tag value to be used for each process in any suitable manner. For example, privileged code may execute as part of operating system startup or initialization which initially specifies a PC tag value to be used for a particular process. As a variation, an embodiment may perform a mapping operation as part of mapping the shared page A 432a into a process address space. The rules applied by the operating system when performing the mapping may propagate or produce a particular PC tag as an output that denotes a desired access, privilege or authority based on the particular process.

In this manner, the same set of rules may be used with shared pages having global tags where the rules encode the logic for the difference in access, authority or privilege based on the PC tag. It should be noted that the PC tag may also be a pointer to a memory location whereby the pointer tag points to a structure including different tag values for different policies in a manner as described herein in connection with other tags. In this manner, the same set of PC tag values may be used to denote different capabilities for a process that may vary with policy. For example, the PC tag value of X as described above with P1 may have a first use as described above with a memory safety policy or data access policy for shared regions. The same PC tag value of X may have a second use and meaning imparted by rules of a second different policy, such as control flow integrity (CFI).

Figure 46:
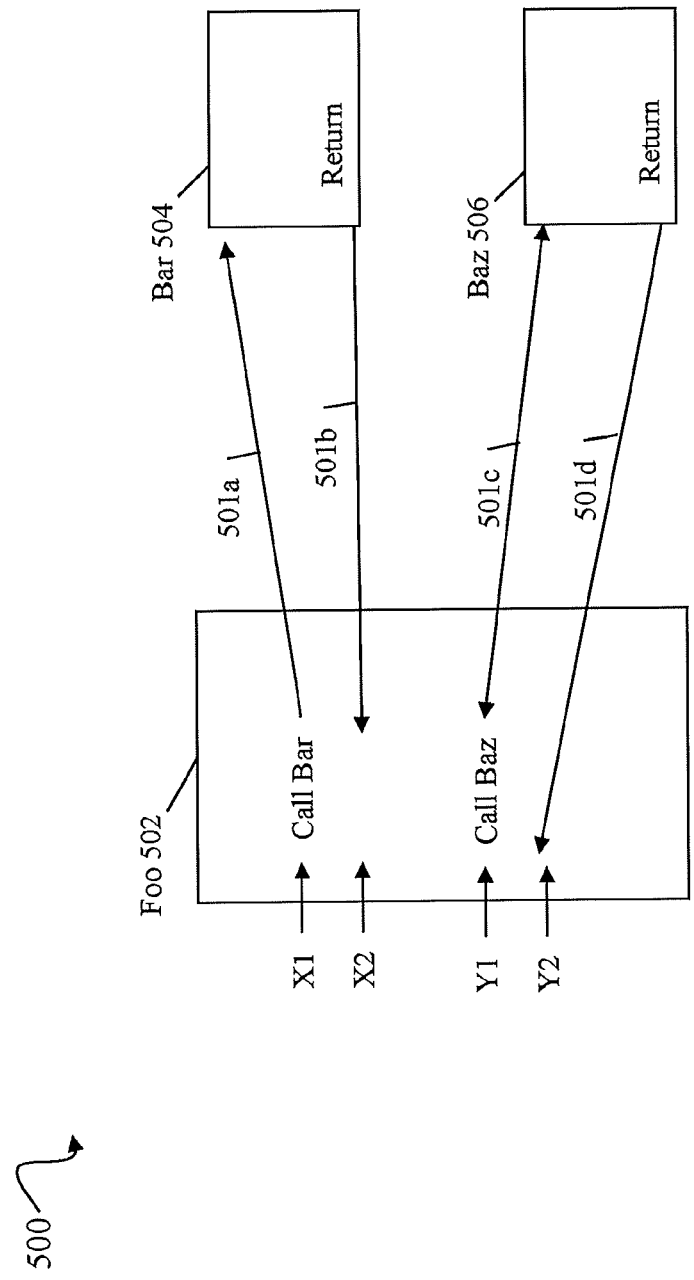
FIG. 46 is an example illustrating transfer of control points in an embodiment in accordance with techniques herein.

Aspects of the CFI policy are described herein that may be used in connection with restricting control transfers based on a static definition of allowable calls, jumps, return points, and the like. However, an additional aspect or dimension that may be included in a CFI policy relates to enforcement of dynamic or runtime call information thereby further refining the conditions under which a control transfer that is a return may be made. To further illustrate, reference is made to the example 500 of FIG. 46 which includes routines foo 502, bar 504 and baz 506. Routine Foo 502 may include a call instruction at address X1 that calls routine bar resulting in a runtime transfer 501a of control to bar 504. Routine bar 504 then includes a return instruction which returns 501b control to routine bar to address X2. Thus, X2 denotes the return point address or location of the instruction in routine foo following the call to routine bar at X1. Routine Foo 502 may include a second call instruction at address Y1 that calls routine baz 506 resulting in a runtime transfer 501c of control to baz 506. Routine baz 506 then includes a return instruction which returns 501d control to routine bar to address Y2. Thus, Y2 denotes the return point address or location of the instruction in routine foo following the call to routine baz at Y1.

A static CFI policy may, for example, allow all potential control flows between any two transfer points without further restricting control flows or transfers based on the current runtime stack or call chain reflecting the dynamic runtime control flow aspects. For example, if foo 502 can call bar 504 as illustrated in 500, there is a statically allowed control flow from bar back to address X2 of the instruction after the call of bar at X1 in foo. However, if foo has not been invoked, or has only, so far, invoked another call to something that should return before the bar call, it should not be possible to exercise the return link to return to X2. As another example with the runtime execution as illustrated in the example 500, it should not be possible for a call to Bar 504 through 501a to return to Foo 502 at Y2 through 501d.

What will now be described are techniques that may be used in connection with extending rules of a CFI policy to enforce a dynamic CFI return policy controlling return flow path control. For the dynamic CFI return policy to ensure that a return to a particular return location such as X2 is valid only when made subsequent to a particular call or invocation, such as the call to bar at X1, the dynamic CFI return policy may store information, such as in one or more tags, when the call is made in order to rule out an invalid return. As known in the art, when a call is made, such as using a JAL (jump and link) instruction of the RISC-V instruction set, a return address is saved in a return address register, RA. The RISC-V instruction set also includes a JALR (jump and link register) instruction which is an example of a return instruction. In one aspect, the saved return address in RA register from a JAL may be characterized as a "capability" to return to that point. In at least one embodiment, the JAL instruction may be tagged with a tag that causes a rule to push a suitable tag capability onto the resulting return address. For example, with RA as the return address register, a rule may place a tag on the RA register which indicates that the RA register includes a valid or suitable return address and, at a later point, the address of the RA register may be used as a return point to which control may be transferred. In other words, the tag on the RA register gives permission for the address in RA to be used as a return address which is loaded into the PC to execute the return transfer of control. When loading the PC with the address of RA, the RA tag may also be stored as the PC tag by rules of the CFI policy.

To further illustrate techniques that may be used to limit control flow on returns, an embodiment may code tag each return point (e.g., X2, Y2) with a dynamic-CFI-tag, such as expect-A. Also, code tag each JAL instruction (or call instruction) causing a rule evaluated for the JAL instruction to tag the return address in the RA register (where the return address is calculated by the JAL) with the appropriate dynamic-CFI-return-to-A tag. For each return, such as each JALR instruction that uses the RA register tagged with the dynamic-CFI-return-to-A tag, a PUMP rule propagates the tag (dynamic-CFI-return-to-A tag) onto the PC as may be performed in connection with other static CFI policy rules. The rules of the CFI policy may embody logic that checks the RA register used for the return instruction. If the RA register used for the return is not tagged with dynamic-CFI-return-to-A tag, then it is known that the RA register does not include a valid return address allowed for use with the JALR instruction. At the return point (e.g., X2 and Y2), rules may embody logic whereby when the expect-A code tag is encountered (e.g., as the tag on the instruction at X2), check that the PC is tagged with dynamic-CFI-return-to-A, and clear the CFI-return-to-A tag from the PC.

As a consequence of the above, code is prevented from returning to just any return address. Furthermore, if the return address is copied to another location, such as another register, the rules can prevent the copied value from retaining the return authorization capability; this prevents code form making copies of the return address in registers that can be used to perform multiple returns for the same call. As another consequence of the above, if a valid return address (properly tagged) on the stack is overwritten with a new address (not properly tagged) and then an attempt is made to return to the new address, the return is prevented.

An embodiment may also include rules in order to prevent or further limit the ability to use the dynamic-CFI-return-to-A tag more than once. As a first implementation, an embodiment may use rules that restrict where the return address (as stored in the RA register tagged with the dynamic-CFI-return-to-A tag) may be written or copied. For example, an embodiment may use rules that only allow the return address of the appropriately tagged RA register to write the return address to the stack in properly code-tagged function code. As a second alternative implementation, an embodiment may include rules that use PC state (e.g., PC tag) and atomic memory operations to make the return address linear (e.g., follow or occur subsequent to a call). For example, performing a call sets the PC tag to denote a valid-return-address. Rules may only allow a return if the PC tag is set to valid-return-address. Additional rules may be used that, when writing a return address to memory, sets the PC tag to no-return-address. Rules may be used that, when copying the return address to a target register, may set the PC tag to no-return-address, and the target register is not tagged as a valid-return address. Rules may be used that, when an arithmetic operation is performed using a return address from an RA register, the result is not tagged as a valid return address. Rules may be used that only allow recovering a return address from memory with an atomic swap operation with a non-return-address (e.g., where the PC tag is set to valid-return-address).

An embodiment may further define rules to provide a stack protection policy. In one aspect, the stack protection policy may, in part, be viewed as an extension of one or more other policies, such as memory safety where the rules may use tags of both instructions and data for policy enforcement. It should be note that in following discussion and elsewhere herein, terms such as routine and procedure may be used interchangeably and more generally refer to a callable unit of code that, when invoked, results in creation of a new stack frame on the call stack. Other names that may also be used for a callable unit of code may include function, subroutine, subprogram, method, and the like.

Figure 47:
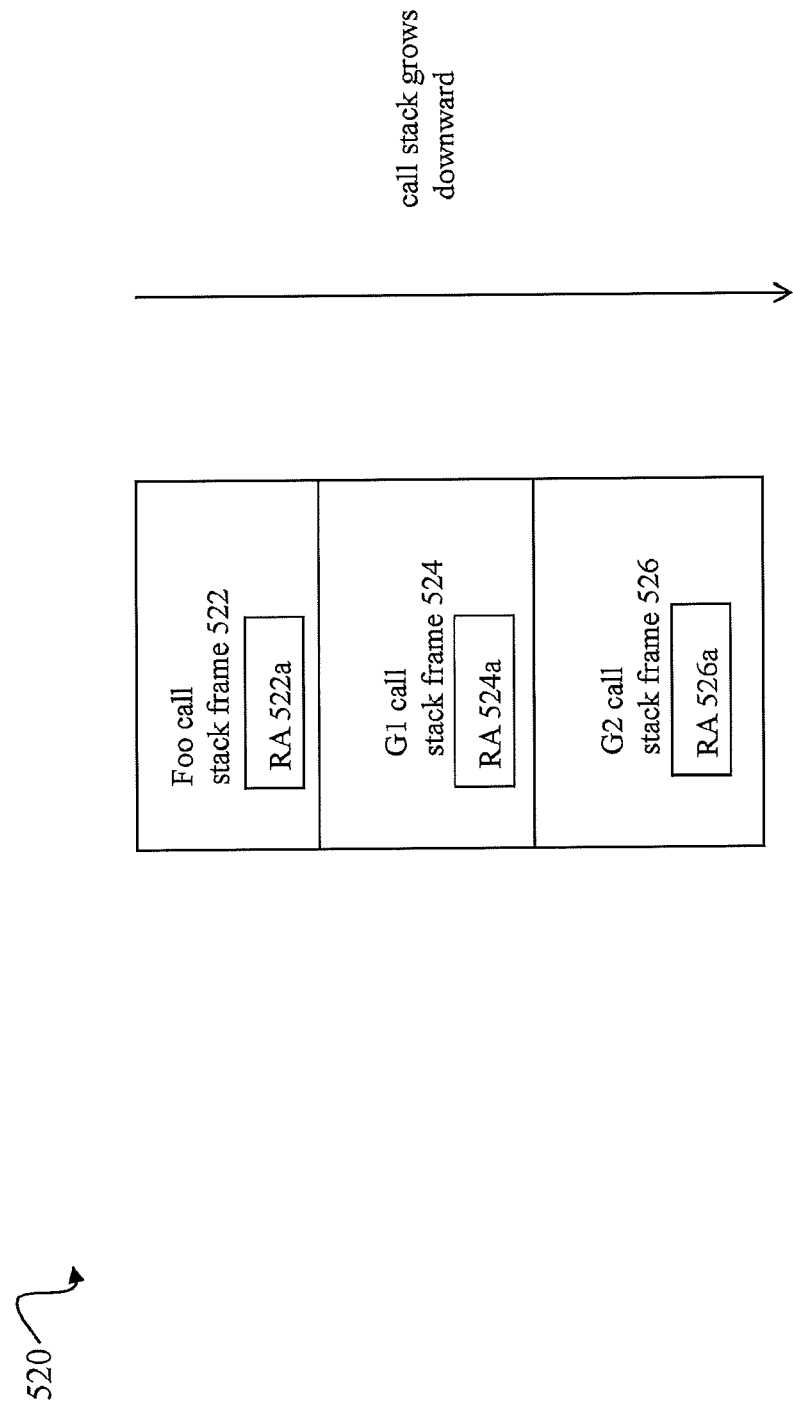
FIG. 47 is an example illustrating a call stack in an embodiment in accordance with techniques herein.

Referring to FIG. 47, shown is an example 520 illustrating a call stack of frames for runtime invocations in an embodiment in accordance with techniques herein. In 520, assume that the routine foo 502 performs a call to G1 which in turn calls G2. Thus, at a point in execution, routine foo is executing and has made a first call to routine G1 and G1 has made a call to routine G2. Element 522 may represent the first call stack frame for routine foo. Element 524 may represent the second call stack frame for routine G1. Element 526 may represent the third call stack frame for routine G2.

Information stored in a stack frame (such as 522, 524, 526) for a runtime call instance or invocation may include, for example, return addresses, data used by that call instance for registers, variables or data items, and the like. Elements 522*a* and 524*a* may denote return addresses, respectively, included in frame 522 for foo and frame 524 for G1. One common attack, such as may be performed by malicious code, may be to modify return addresses such as 522*a* and 524*a* stored on the stack 520. Using the techniques such as described elsewhere herein for the dynamic CFI return policy (e.g., described in connection with FIG. 46 in example 500) may prevent improper or invalid returns such as using a return address from a stack location that has been improperly modified. However, it may be further desirable to also enforce additional rules which provide stack protection and prevent improper modification of stack storage locations, such as return addresses. Thus, such additional rules for a stack frame protection policy may prevent modification of 522*a* or 524*a* rather than allow an improper modification of 522*a* and then stop a return using the improperly modified return address.

As described below in more detail, different levels of stack protection may be provided. In one aspect, stack protection may be determined based on static procedure (also referred to as the static authority protection model described elsewhere herein) or may be determined based on both procedure and also invocation instance of the particular procedure (also referred to as the instance authority protection model described elsewhere herein). With the static authority protection model, rules of the stack protection policy may provide stack protection based on the particular procedure or routine that creates the frame. For example, rather than the stack including only a single frame for a single instance of foo as in 520, there may be multiple invocation instances of foo including in the current call chain at a point in time and thus multiple call stack frames in the stack for routine foo (e.g., such as based on recursive calls to foo). Based on the static routine or procedure, any instance of foo may be able to modify or access information in any call stack frame for an instance of foo. For example, foo instance 1 may have call stack frame 1 and foo instance 2 may have call stack frame 2. Based on static routine or procedure for stack protection, code of foo instance 1 may be able to access stack frames 1 and 2 and code of foo instance 2 may also be able to access stack frames 1 and 2. In such an embodiment, call stack frames for all instances of the same procedure or routine foo may be colored with the same tag. For example, frame 1 for foo instance 1 and frame 2 for foo instance 2 may be both be colored with tag T1 so that rules of memory safety policy will allow the above-noted stack frame access across different instances of the same routine or procedure.

As further finer granularity of stack protection, an embodiment may use rules of the stack protection policy that further limit access of the stack based on static routine or procedure as well as the particular runtime instance of the routine or procedure (e.g., the instance authority protection model). For example, foo instance 1 may have call stack frame 1 and foo instance 2 may have call stack frame 2 as noted above. Based on static routine or procedure and also invocation instance for stack protection, code of foo instance 1 may be able to access stack frame 1 but not stack frame 2, and code of foo instance 2 may be able to access stack frame 2 but not stack frame 1. In such an embodiment, call stack frames for each invocation instance of a procedure or routine may be colored with a different tag. For example, frame 1 for foo instance 1 may be colored with tag T1 and frame 2 for foo instance 2 may be colored with tag T2 so that rules of a memory safety policy will allow the above-noted stack frame access based on each particular invocation and routine or procedure.

An embodiment may further provide a finer level of granularity for different regions or portions of the stack for a single procedure call instance such as by coloring different objects or data items in a stack frame each with a different color (also referred to as the object protection model described elsewhere herein). As described elsewhere herein, the stack frame may include storage for data items or objects used in a particular invocation of a routine or procedure where each such data item or object may be tagged with a different color. For example, referring to FIG. 48 shown is example 530 illustrating data items 540 having storage allocated by a routine or procedure foo and associated tagged memory in a stack frame 531. Element 540 denotes variables 540*a*-540*c* having storage allocated in routine foo and element 531 represents the call stack frame for this particular invocation instance of routine foo in the call stack. Element 531 includes memory region 532 for variable array 540*a*, memory region 534 for variable line 540*b* and memory region 536 for variable password 540*c*. Additionally, frame 531 includes memory region 538 for stored return addresses. Each of the different regions 532, 534, 536 and 538 may be tagged or colored with a different tag as denoted by 533. Each word in region 532 may be tagged with Red1. Each word in region 534 may be tagged with Red2. Each word in region 536 may be tagged with Red3. Each word in region 538 may be tagged with Red4.

As yet a further variation, an embodiment may define different trust regions or boundaries for sets of code (e.g., routines, procedures, etc.) and provide different levels of protection. For example, not all routines invoked may have the same level of trust. For example, a developer may have a first set of routines he/she has written and have a high level of trust that the operations performed by code of the first set does not contain any malicious code. However, the first set of routines may make calls into a library that was provided by a third party or obtained from the internet. The library may be untrusted. Thus, an embodiment may vary the level of protection based on the different bodies of code and the particular data items used by each. For example, with reference to example 550 of FIG. 49, assume that routine foo in the trusted user code call routine evil in the library and passes as a parameter to evil a pointer to region 534 (pointer to data item line 540*b*). In such a case, rather than color or tag each region of 531 with a different color, regions 532, 536 and 538 may all be colored with the same color, such as Red5, and region 534 may be tagged with a different color, such as Red6. This may be used to further ensure that memory region 534 accessed by routine evil is tagged with a different color than other regions of 531 as a level of memory safety since routine evil is considered untrusted code. Additionally, the pointer to region 534 passed to evil may be colored or tagged with the same color Red6 as the region 534. In this manner, memory safety policy rules may limit access to memory used by evil to those tagged with Red6.

Whether a particular routine, library or body or code has a particular level of trust may be determined based on analysis using one or more criteria and inputs. For example, based on runtime analysis and usage of code of a library, a level of trust may be determined. For example, if the library makes calls to yet other unknown or untrusted external or third party libraries, then the level of trust may be relatively low. A level of trust for a body of code may be used on the source or location from which the code was obtained. For example, use of code from a library obtained from the internet may be considered untrusted. In contrast, code developed by a particular developer which does not invoke any untrusted code may have a high level of trust.

The foregoing and other aspects of stack frames and stack protection are described in more detail below.

In connection with stack frames and with reference again to the example 530, a compiler may create a new stack pointer by adding an integer (the size of the frame) to the existing stack pointer. The old stack pointer may be pushed onto the stack (into the frame) and then recovered by reading it back from the stack. The addition to the stack pointer may represent the total size of a frame that includes many independent objects such as described above in 531 for the data items 540a-c. The stack needs space for these 3 data items 540a-c and the compiler is able to determine the total space needed for the data items 540a-c. In standard usage, the compiler accesses storage 532, 534 and 536, respectively, for these data items 540a-c by computing their addresses off of the stack pointer (or frame pointer that is created from the stack pointer). Thus, the compiler, runtime, and calling conventions in an embodiment may create and use pointers to different regions of the stack call frames by doing simple pointer arithmetic.

The static authority protection model indicates authority over objects belongs to the static code block, such as routine or procedure that creates the frame. Thus, as discussed elsewhere herein, procedure foo that creates a frame has authority to create pointers to things in that frame. In the simplest case, the same authority would allow foo to access any of the frames it creates, even if they were earlier or later on the stack. Static authority means tags (e.g., colors for memory cells, colored pointers, code tags (e.g., also referred to as instruction tags or tags on instructions) that create colored pointers) may be pre-allocated at load time. Instance authority protection provides authority based on the depth of the function invocation on the stack. Object protection indicates protection at the level of objects allocated on the stack, not just stack frames. Thus, object protection allows for detection and prevention of overflow from one object (e.g., array, buffer) within a frame into another object on the same frame, which is something not achieved using simple stack frame granularity PUMP rules with the static authority protection model or the instance protection model. Object protection can be applied to both the static authority protection model and the instance protection model. As a variation of object protection, an embodiment may also employ hierarchical object protection for hierarchical objects, such as a structure that includes multiple different data items subobjects, such as an integer, and an array. In at least one embodiment with hierarchical objects where a first object includes one or more levels each of one or more subobjects, a first tag may be generated for the first object and then additional subobject tags may be generated based on the first tag. Each subobject tag may be used to tag a different subobject. The subobject tag may be a value denoting the particular position of the subobject in the hierarchy. For example, tag T1 may be generated for use with a structure including 2 arrays as subobjects 2 and 3. A different subobject tags for each the 2 arrays may be generated from T1 and used to tag the 2 array subobjects.

What will now be described is processing that may be performed in connection with stack memory for different stack operations in an embodiment in accordance with techniques herein. At startup, the stack memory may have all memory cells marked or tagged using a free-stack frame tag. Consistent with other discussion and techniques herein, such tagging may be performed by invoking the PUMP rules. It should be noted that the initial tagging of stack memory cells to the free-stack frame tag may not be performed for the entire stack at once, but may rather be performed incrementally in the kernel page fault handlers that expand the stack.

In connection with allocating a new stack frame such as by the compiler, a new frame tag may be created for the newly allocation frame. A pointer to the new frame may be tagged with the new frame tag. For example, an embodiment may tag an instruction (e.g., such as an add instruction performing pointer arithmetic (by adding to the stack pointer)) that creates a new frame pointer where the tag on the instruction triggers the policy rule to create the new frame tag. Using rules and tag propagation, a special tag may be created for and used to tag the stack pointer. Subsequently, for each frame pointer, a unique frame pointer tag may be derived from the stack pointer special tag, and the frame pointer may be tagged with its unique frame pointer tag. In such an embodiment, the frame pointer tag may be created from a tagged copy (e.g., an add or 0) of the stack pointer.

When a new stack frame is allocated such as for a new invocation of a routine or procedure, memory cells of the newly allocated stack frame may be tagged or colored using, for example, a first technique referred to as strict object initialization or a second technique may be referred to as lazy object coloring.

With the first technique of strict object initialization, free stack frame cells of the newly allocated frame are all initially colored or tagged to the intended one or more colors such as based on the static objects of the frame. Such initial coloring may be performed as part of initialization processing of a newly allocated frame prior to subsequently using the frame, for example, to store information for the associated invocation. An embodiment may add code that triggers rules to perform the coloring or tagging of the free stack frame cells to the intended one or more colors such as based on the static objects of the frame. Code tags on instructions may be used to authorize and define associated memory cell coloring. Subsequent stores or reads of colored memory cells of the frame may be allowed or not based on the frame memory cell color such as in accordance with memory safety policy rules (e.g., for a memory cell tagged with color C1, a rule allows a memory operation to access the colored memory cell contents using a pointer having a tag also of the same color C1 but may not allow the memory operation if the pointer is of a different color C2). Additionally, a code tag on an instruction may provide authority to perform the memory operation within a procedure.

With the second technique of lazy object coloring, there is no initial coloring of all stack objects as with the strict object initialization technique. Rather, with lazy object coloring, a store to a stack memory location tagged as free stack frame results in triggering a rule that allows the store and also changes the color of the memory location based on the writer. A read to a stack memory location tagged as free stack frame is an uninitialized memory read and may be allowed/not allowed depending on whether the policy allows/disallows uninitialized memory reads. With lazy object coloring, no initial block of code is executed that invokes rules to completely initially tag all memory cells of a frame upon creation. Rather, memory cells are tagged by rules invoked in connection with store operations.

In at least one embodiment, whether to use strict object initialization or lazy object coloring may depend on a desired level of protection and an occurrence of untenable vulnerabilities.

Code within a routine or procedure that directly accesses data from the stack/frame pointer is code tagged to allow it do so. In connection with lazy object coloring, storing to a memory cell results in coloring the memory cell based on the writer as noted above. For example, with reference back to the example 530, a store instruction of routine foo having frame 531 may write a value to a memory location in array 532. In accordance with a current stack protection policy in effect, in order for a store instruction to write to a location in array 532 of the call frame for foo, the store instruction may be required to have a tag of Red1. A first rule of the policy may be triggered to perform this check for a store instruction. Thus, an embodiment may have a compiler generate a code sequence that triggers the first rule to tag the store instruction with Red1. (e.g., As a variation to the foregoing, the tag on a memory cell, such as Red1, may be related to but not the same as the tag on the instruction store or other instruction. For example, the "Red1 code" CI tag may indicate that the instruction having this tag can access Red1 tagged memory cells and may create Red1 tagged memory cells). When the store instruction is the current instruction, the foregoing first rule may be triggered which checks the instruction tag to ensure it is Red1. As an output, the rule may tag the memory location in array 532 with the Red1 tag.

Code within a procedure that creates a pointer to a particular object is tagged to taint or set the pointer for that object. The pointer may be for the procedure's own use in subsequent instructions and/or may be passed to another procedure as an argument.

Storing register values to a frame or restoring register values from a frame may be based on the frame authority. The memory location(s) of the stack frame storing the register values may be treated as a unique object in the stack frame. Instruction tagging provides authority for such tagged store and load instructions. With lazy-object-coloring, the store instruction tagged with the authority to store data to a memory cell also provides the authority to tag the memory cell based on the writer (e.g., procedure including the store instruction).

Procedure arguments passed on the stack may be marked with a tag that allows both the caller and callee to access. Note that return addresses may be specially tagged (e.g., the dynamic CFI return policy described elsewhere herein such as in connection with FIG. 46). Thus, if a return address is stored on the stack (e.g., such as in connection with nested or recursive calls), stores will not be allowed to overwrite return addresses on the stack due to the tagging on the return addresses). When a stack-derived pointer is passed to another frame in connection with a call to another procedure, memory accesses performed using the pointer result in triggering rules of a memory safety policy as described elsewhere herein. The instruction that created the pointer to a memory location may be tagged based on the particular memory location's tag. The instruction tag may indicate authority to access the memory location. The instruction may trigger a rule that tags the pointer to denote authority to access the memory location. For example, the rule may assign the pointer the same tag as the instruction or a variation based on the instruction tag. Thus, in one aspect, the instruction that created the pointer is also creating a capability to access the memory location through the pointer and sharing that capability through the pointer passed as an argument to the called procedure. It should be noted that with lazy-object-coloring, the pointer will need to have a tag providing authority to tag free-stack-frame-cells, which may not be allowed on heap memory safety pointers.

In connection with a return or other operation resulting in removing a frame from the stack (e.g., such as due to completion of a called routine), tagged code may clear the frame. The tags on such code provides the authority to change any frame object tags associated with this frame to the free-stack-frame-cell tag.

Code of a program executed in an embodiment of a computer system in accordance with techniques herein may include code that performs exception handling. As known in the art, exception handling is processing performed responsive to an exception denoting an occurrence of an anomalous or exceptional condition requiring special processing performed by the exception handler. Thus, when an exception occurs at a first point in a program, the normal flow of program execution may be interrupted so that control is transferred to an exception handler. Prior to transferring control to the handler, the current state of execution may be saved in a predetermined location. If program execution may be resumed after the exception has been processed by the handler, execution of the program may resume (e.g., control may then be transferred back following the first point in the program). For example, a divide by zero operation may result in an exception that is continuable where the program execution may resume after the exception is handled by the handler. In connection with implementing an exception handler, an embodiment may use library routines such as setjump and longjump. For example, setjump and longjump may be standard C library routines, respectively, setjmp and longjmp, defined as follows:

int setjmp(jmp_buf env)

where setjmp sets up the local jmp_buf buffer and initializes it for the jump. Setjmp saves the program's calling environment in the environment buffer specified by the env argument for later use by longjmp. If the return is from a direct invocation, setjmp returns 0. If the return is from a call to longjmp, setjmp returns a nonzero value.

void longjmp(jmp_buf env, int value)

where longjmp restores the context of the environment buffer env that was saved by invocation of the setjmp routine in the same invocation of the program. Invoking longjmp from a nested signal handler is undefined. The value specified by value is passed from longjmp to setjmp. After longjmp is completed, program execution continues as if the corresponding invocation of setjmp had just returned. If the value passed to longjmp is 0, setjmp will behave as if it had returned 1; otherwise, it will behave as if it had returned value.

Thus, setjmp may be used to save a current state of a program. The state of a program depends on, for example, the contents of memory (i.e. the code, globals, heap, and stack), and the contents of its registers. The contents of the registers includes the stack pointer, frame pointer and program counter. Setjmp saves the current state of the program so that longmp may restore the program state and thus return the state of the program execution to what it was when setjmp was called. In other words, longjmp( ) doesn't return. Rather, when longjmp is invoked, execution returns or resume to the particular point denoted by the previously saved program state (as saved by setjmp). Thus, longjmp( ) may be used to transfer control from a signal handler back to a saved execution point in a program without using standard calling or return conventions.

Figure 50:
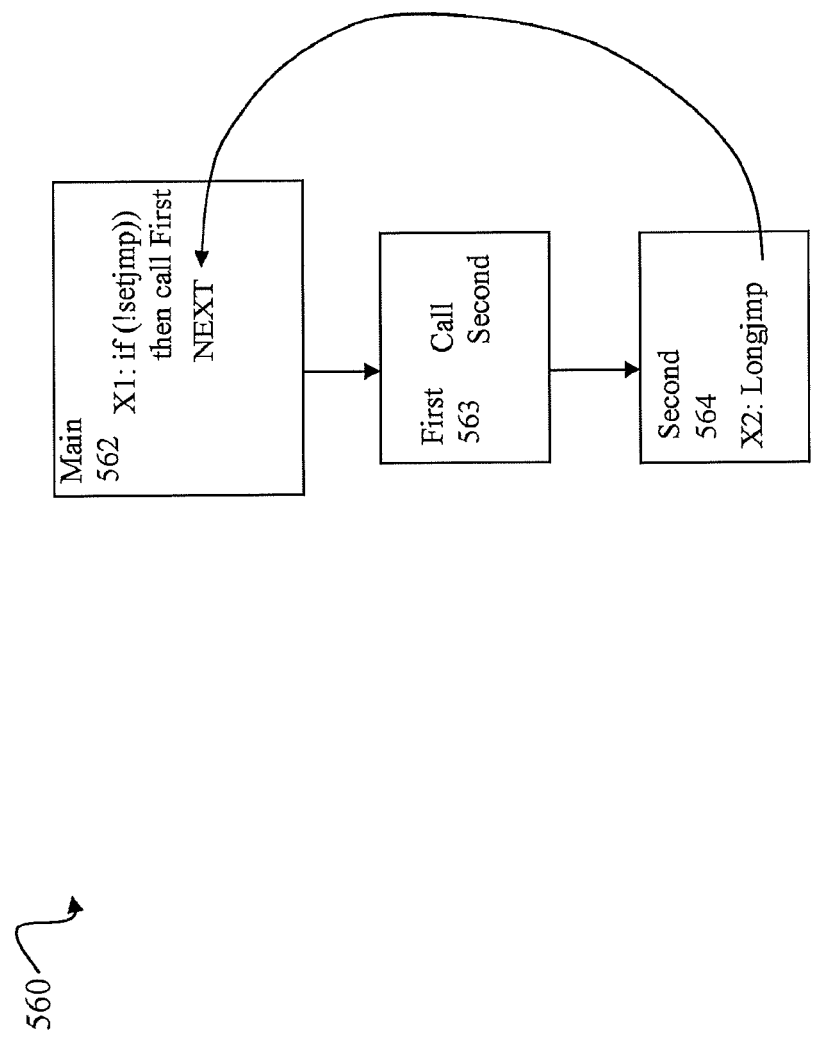
FIG. 50 is an example illustrating setjmp and longjmp in an embodiment in accordance with techniques herein.

For example, reference is made to FIG. 50. In the example 560, routine main 562 may call routine first 563, and routine first 563 may call routine second 564. As illustrated, main 562 may include a call to setjmp at point X1 prior to calling routine first. The first time setjmp is called at point X1, it returns a zero and then routine first is called. After longjmp is executed, setjmp returns 1. Routine second 564 includes a call to longjmp at point X2 which causes a transfer of control back to main at location X1 where setjmp was called. Setjmp is now called again and returns a 1 so first is not called and the control proceeds to NEXT.

In connection with a stack protection policy, it may be desirable to clear the stack prior to resuming execution to the point X1 previously saved by settmp. For example, based on the above call chain main-first-second, 3 stack frames may exist in the call stack and processing may be performed to clear stack memory associated with invocations in the call chain between the longjmp call and setjmp call. In particular, code of longjmp may include code that clears stack frames for first 563 and second 564 in this example. What will now be described are techniques that may be used in connection with performing such stack clearing in accordance with a stack protection policy.

In connection with a stack protection policy when performing a setjmp that saves program state to stack memory, an embodiment may tag the current stack pointer memory cell with a distinguished tag component so that, in connection with a subsequent longjmp, rules may check that the stack hasn't changed since the setjmp. Data may be saved to the setjmp data structure, jmpbuf, denoting the current program state. The saved data may include the stack pointer, program counter, a first pointer (tagged as being a pointer that is allowed to point to a memory location tagged with the distinguished tag component (e.g. point to the current stack pointer memory cell), and a second pointer (tagged as longjmp-clearing-authority-pointer to provide authority to perform longjmp processing). In at least one embodiment, the longjmp-clearing-authority-pointer may only provide authority to clear tags associated with frames in the set of procedures that could be recursively called from this procedure.

In connection with a stack protection policy when performing a longjmp, code may check that the current stack pointer denotes a deeper stack position than the saved stack pointer of the set jump structure (e.g., setjmp data structure, jmpbuf). A rule may be triggered that checks that the memory cell of the set jump structure containing the saved stack pointer (as saved by setjmp) has a tag that is compatible with the tagged first pointer (of the set jump structure). Code may be executed that clears all stack memory locations between the current stack pointer and the saved stack pointer (as previously saved by set jump in the set jump structure). Such code may be perform the clearing using the second pointer noted above that is tagged as the longjmp-clearing-authority-pointer providing the stack clearing authority (e.g., second pointer used to point to stack locations cleared). Rules may be triggered by the code performing the clearing where the rules check that the second pointer is tagged as longjmp-clearing-authority-pointer. Instructions in longjmp are uniquely tagged so that invoked rules allow the uniquely tagged instructions to use of a pointer tagged as longjmp-clearing-authority-pointer. Other code that is not in longjmp cannot use a pointer tagged as longjmp-clearing-authority-pointer (e.g., the other code is not tagged to allow use of longjmp-clearing-authority-pointer).

In at least one embodiment, tagging of instructions may be performed by having the compiler generate an instruction sequence that invokes rules to perform desired instruction tagging and/or memory location tagging. For example, for stack memory location tagging, the compiler may generate an instruction sequence with store instructions that trigger rules to initialize or reset the tag of a stack location. For tagging instructions, the compiler may generate an instruction sequence with store instructions that trigger rules to tag an instruction where the tag for the instruction may be based on the color associated with a tagged memory location accessed by the instruction. In connection with a return from a call having an associated stack frame, code may be added that clears the frame from the stack. When strict object initialization is employed and a new frame created in response to a call, code may be added that appropriately tags or colors objects of the new frame.

What will now be described with reference to FIGS. 51-53 are examples of different unauthorized or unintended modifications that may be made to the stack ("stack attacks" referring to attacks made through stack modifications) such as, for example, made by malicious code or unintended stack modifications by non-malicious code (e.g., accidental overwrites or buffer overflows).

FIGS. 51-52 illustrate actions that may be taken to prevent stack attacks in connection with stack modifications made by a code module such as third party code (e.g., library routine invoked) and may be characterized as an arbitrary attacker model. Thus, the cases in 570 and 575 may occur, for example, as a result of a called third party library routine including code that performs the unauthorized or unintended stack modification. Additionally, the stack modification may also be made by yet another routine further invoked by code of the called library routine. Each line of 570 and 575 includes 3 columns of information. For each of lines 572a-h, column 1 identifies an item to prevent denoting undesired runtime execution behavior, column 2 identifies a preventive action that may be taken to avoid the undesired behavior of column 1, and column 3 identifies one or more mechanisms that may be used to implement or enforce the preventive action of column 2. Generally, in column 3, alternate mechanisms are listed which may be each be implemented independently and separately depending on the particular system. For example, a conventional system may use separate processes as a first mechanism while a second system may alternatively use a capability and a second system may alternatively use coloring or tagging of the particular stack locations.

To further illustrate and consistent with discussion elsewhere herein, code, such as prolog code executed when a call is made, writes return addresses and registers to the stack. The prolog code may invoke rules that tag the stack locations with special tags to limit what code can modify or generally access the stack locations. For example, prolog code may perform memory writes/stores to store return addresses, registers, and the like, in a memory cell of a stack frame. Such write/store instructions of the prolog code may invoke a rule that tags a memory cell of the stack frame with a special tag STACK FRAME TAG to mark the memory location as special and limit what code can modify the memory cell. The write/store instructions of the prolog code may also be tagged with PROLOG STACK TAG to limit the instructions that can perform this tagging. The following is an example of logic enforced by the rule invoked by the write/store instructions of the prolog code that tags a memory cell of the stack frame with a special tag STACK FRAME TAG to mark the memory location as special and limit what code can modify the memory cell:

If (CI=PROLOG STACK TAG) AND (this is a memory write operation) then output or Rtag=STACK FRAME TAG In the foregoing rule logic, output tag refers to the tag placed on the stack location.

In a similar manner, other code, such as epilogue code invoked with performing a return, may be allowed to clear the stack, or portion thereof. The epilogue code may be tagged with the special tag of EPILOG STACK TAG (e.g., CI tag) and may be given authority through access of a pointer tagged with the special tag STACK FRAME TAG.

The epilogue code may perform the foregoing stack clearing using write/store operations using the pointer specially tagged with STACK FRAME TAG. To further limit performing stack clearing, the epilogue code may be tagged as noted above. In such an embodiment, the write/store instructions may invoke a rule implementing the following logic to enforce the policy where stack clearing may only be performed by epilogue code using the specially tagged pointer (tagged with STACK FRAME TAG):

if (CI=EPILOG STACK TAG) AND (memory write operation) AND (Mtag=STACK FRAME TAG) then output or Rtag=Default tag Code that is intended to restore return addresses and registers from the stack may be given authority to read these specially tagged memory cells of the stack. Such authority may be given, for example, by any of: tagging the code (CI tag) to denote the code is allowed to access the specially tagged memory cells of the stack, tagging the PC to indicate the code has the authority, or tagging a pointer used by the code where the pointer points to the specially tagged memory cells and the tag on the pointer denotes the access authority. For example, a read/load instruction may be given authority to read the stack memory cells tagged with STACK FRAME TAG. In one embodiment, the read/load instruction may be given authority by allowing only read/load instructions using the specially tagged pointer (tagged with STACK FRAME TAG) to read from a stack memory location. Rule logic allowing only read/load instructions using the specially tagged pointer (tagged with STACK FRAME POINTER) to read from the specially tagged stack memory location (tagged with STACK FRAME TAG) may be:

if (memory read operation) AND (R2tag=STACK FRAME POINTER) AND (Mtag=STACK FRAME TAG) then Rtag=DEFAULT TAG As a variation to the foregoing, the read/load instruction may be given authority by tagging a pointer used by the read/load instructions with the special tag STACK FRAME TAG.

Rule logic allowing only read/load instructions using the specially tagged instructions (tagged with STACK FRAME INSTRUCTION) to read from a stack memory location may be:

if (memory read operation) AND (CItag=STACK FRAME INSTRUCTION) AND (Mtag=STACK FRAME TAG) then Rtag=DEFAULT TAG)

Examples of mechanisms are described below and elsewhere in more detail.

Element 572a identifies an undesired runtime behavior of a called routine (callee) that never returns to the calling routine (caller). To prevent this behavior, an action taken may be to have a timeout associated with each call where a maximum amount of time may be allowed to complete the invoked routine. After the maximum amount of time elapses, runtime execution of the invoked routine is terminated. Mechanisms to implement the timeout may include having the invoked routine of the third party code be made from a separate thread that enforces the timeout, or directly limiting the amount of time of the called routine using a time or instruction limited call.

Element 572b identifies an undesired runtime behavior of resource exhaustion where the called routine may use up an available resource, such as memory. To prevent this behavior, an action taken may be to limit resource made available to the called routine. Mechanisms to implement the timeout may include having the invoked routine of the third party code be made from a separate thread that enforces the maximum resource limits, or directly limiting the amount of resource of the called routine using a special instruction limited call.

Element 572c identifies an undesired runtime behavior of the invoked routine exercising unexpected authority such as by making an expected call to yet another routine. To prevent this behavior, an action taken may be to limit the authority of the called routine to the minimum privilege allowable. Mechanisms to implement this may include tagging the PC with the authority and control capabilities of the callee or called routine and limiting the portion of the file system or other resources accessible to the called routine, and limiting the allowable system calls the invoked routine can make.

Element 572d identifies an undesired runtime behavior of the called routine reading items left in registers by other routines subsequently called by the called routine (e.g., mycode calls P1 in the library and P1 further calls routine evil and P1 may read data left in registers by evil). To prevent this behavior, an action may be taken to clear the non-input and non-return registers. Mechanisms to implement this may include performing explicit register clearing, coloring portions of the stack including the non-return and non-input registers so that they cannot be read by the called routine, and having a separate process invoke the called routine.

Element 572e identifies an undesired runtime behavior of the called routine reading items left on the stack by other routines subsequently called by the called routine (e.g., mycode calls P1 in the library and P1 further calls routine evil and P1 may read data left on stack by evil). To prevent this behavior, an action may be taken to make the called stack inaccessible (e.g., stack region used by the further invoked other routines such as evil are inaccessible to the first called routine such as P1). Mechanisms to implement this may include using separate stacks (e.g., for the first called routine P1 and the further invoked routine evil), capabilities (e.g., tag PC or use specially tagged pointer allowed to access particular stack regions to limit ability or authority of code allowed to read stack areas), coloring (e.g., tag data areas of stack to limit what code can access), and having a separate process invoke the called routine.

Element 572f identifies an undesired runtime behavior of the called routine writing over items in the stack prefix (e.g., overwriting the return address area identifying the return address). The stack prefix may be an area of stack that includes information needed to return to some prior caller. To prevent this behavior, an action taken to make the stack prefix inaccessible or unwritable to the called routine. Mechanisms to implement this may include having the called routine and the user code invoking the called routine use separate stacks, using capabilities (e.g., allow access through specially tagged code or code provided authority through PC tag or specially tagged pointer), using coloring (e.g., tagging the data items of the stack prefix with special tags so that called routine is not allowed to access), and having a separate process invoke the called routine.

Element 572g identifies an undesired runtime behavior of the called routine read data in the stack prefix. To prevent this behavior, an action taken to make the stack prefix inaccessible to the called routine using mechanisms similar to those described with 572f.

Element 572h identifies an undesired runtime behavior of the called routine redirecting control flow in the stack prefix such as by overwriting the pointer to the return address where the pointer is stored in the stack prefix. To prevent this behavior, action may be taken to protect the return address stored in the stack prefix. In one aspect, element 572h identifies a particular instance of 572h and thus the mechanisms of 572h are similar to those of 572f. Mechanisms to implement this may include having the called routine and the user code invoking the called routine use separate stacks, using capabilities (e.g., allow access through specially tagged code or code is provided authority through PC tag or specially tagged return pointer that is tagged by access authority), using coloring (e.g., tagging the memory location of the stack prefix including the return address with a special tags so that called routine is not allowed to access), and having a separate process invoke the called routine.

FIG. 53 illustrates actions that may be taken to prevent stack attacks in connection with an arbitrary input attacker model.

Element 581a identifies an undesired runtime behavior of executing code writing over unintended items in the current frame of the executing routine. To prevent this behavior, an action taken may be to maintain object integrity. Mechanisms to implement this may include using capabilities by object (e.g., allow access through capability provided with specially tagged code or code provided authority through PC tag or specially tagged return pointer that is tagged by access authority), or color by object (e.g., tagging the memory locations of an object).

Element 581b identifies an undesired runtime behavior of reading items in the current frame of the executing routine. To prevent this behavior, an action taken may be to maintain object integrity. Mechanisms to implement this may include using capabilities by object (e.g., allow access through capability provided with specially tagged code or code provided authority through PC tag or specially tagged return pointer that is tagged by access authority), or color by object (e.g., tagging the memory locations of an object with object specific tag).

Element 581c identifies an undesired runtime behavior of executing code (having current frame) writing over unintended items in the predecessor frame (e.g., of other routine that invoked the executing code). To prevent this behavior, an action taken may be to isolate or separate tack frames. Mechanisms to implement this may include using capabilities by frame (e.g., allow access through capability provided with specially tagged code or code provided authority through PC tag or specially tagged return pointer that is tagged by access authority), or color by frame (e.g., tagging the memory locations of frame with frame-specific tag).

Element 581d identifies an undesired runtime behavior of executing code (having current frame) reading items in the predecessor frame (e.g., of other routine that invoked the executing code). To prevent this behavior, an action taken may be to isolate or separate tack frames. Mechanisms to implement this may include using capabilities by frame or color by frame as described with element 581c.

Element 581e identifies an undesired runtime behavior of executing code (having current frame) reading items left of the stack by another routine invoked by the currently executing code. The preventive action is to make the called stack of the invoked routine inaccessible to the currently executing code. Mechanisms to implement this may include using a separate process, a separate stack, capabilities and coloring in a manner similar to as described in connection with 572g.

Element 581f identifies an undesired runtime behavior of executing code (having current frame) modifying the return pointer (e.g., location in stack including return address in routine that invoked executing code). The preventive action is to protect the return pointer or location in the stack including the return address. Mechanisms to implement this may include using capabilities and coloring in a manner similar to as described in connection with 572g.

An embodiment in accordance with techniques herein may use the PUMP rule metadata processing system as part of another hybrid system to learn and validate new set of rules. For example, the PUMP rule metadata processing system may be used to learn (e.g., through logging) allowed control flow and thus determine rules and allowed valid control transfers for an executing program. The rules and allowed valid control transfers may be then be used as the rules and set of valid control transfers of a CFI policy enforced for the program that was executed.

To further illustrate learning rules and control transfers for the program's CFI policy, a first training or learning phase may be performed. In this first phase, the program is executed with all control points (e.g., branch or transfer source and targets) tagged and a training version of a CFI policy where there are no rules for control transfer instructions. Thus, each time there is a control transfer, such as a branch or jump instruction, there is a PUMP rule cache miss causing transfer of control to the cache miss handler of the PUMP rule metadata system. The cache miss handler may perform processing to log information regarding the control transfer. The information logged may include, for example, the source location of the transfer and the target location of the transfer. Other information may also include, for example, the calling procedure or routine from which the transfer is made (e.g., and includes the source location) and the called procedure or routine to which control is transferred (e.g., and includes the target location). More specifically, in the learning or training phase, the first time a particular transfer of control occurs, the cache miss handler computes a new rule of the learned set of rules for that particular transfer of control from a source to a target. Subsequent runtime transfers of control from the same source to the same target use this computed rule. In this manner, if the program is presumed bug-free and a non-attack program (not malicious code) and all control paths are exercised during a program run, the logged set of control transfers, as indicated by the learned rule set at the end of program execution, represents as all valid or allowable control transfers for this particular program. Thus, the learned set of rules may denote an initial or first set of rules for the CFI policy for the program.

Processing may be performed to validate the learned set of rules denoting the CFI policy for the program. The validation may include ensuring that none of these rules allow invalid control transfers. The validation of the learned set of rules may be performed in any suitable manner. For example, an embodiment may run an analysis tool that validates each rule. The tool may, for example, examine the binary or object code, symbol table and original source code, and the like, to validate that each rule corresponds to an allowed transfer. To further illustrate, validation may examine the binary code that has all control points (e.g., branch or transfer source and targets) tagged. In this manner, the tagged binary or source code denotes the valid set of all potential source and target locations thereby providing a valid set of potential source and targets that can actually be used in a runtime transfer of control. Any runtime transfer of control logged should only occur from a source to a target where each of the source and target are included in the valid set. For example, the tagged binary or source code may include locations A1, A2 A3 and A4. Any logged transfer of control should include a source that is A1, A2, A3 or A4, and a target that is A1, A2, A3 or A4. If a logged runtime control transfer denoted by a first rule is from A1 to B7, the first rule may be invalidated since B7 should not be a target of a control transfer (e.g., B7 is not included in the set of statically determined possible control points tagged consistent of A1, A2 A3 and A4). In one aspect, the learned set of rules may be characterized as a candidate set of rules which may be further reduced via rule removal as a result of validation processing.

All rules of the initial or learned set of rules for the CFI policy for the program that have been validated may then be used as a validated set of rules included in a CFI policy that is then enforced for the program.

Figure 54:
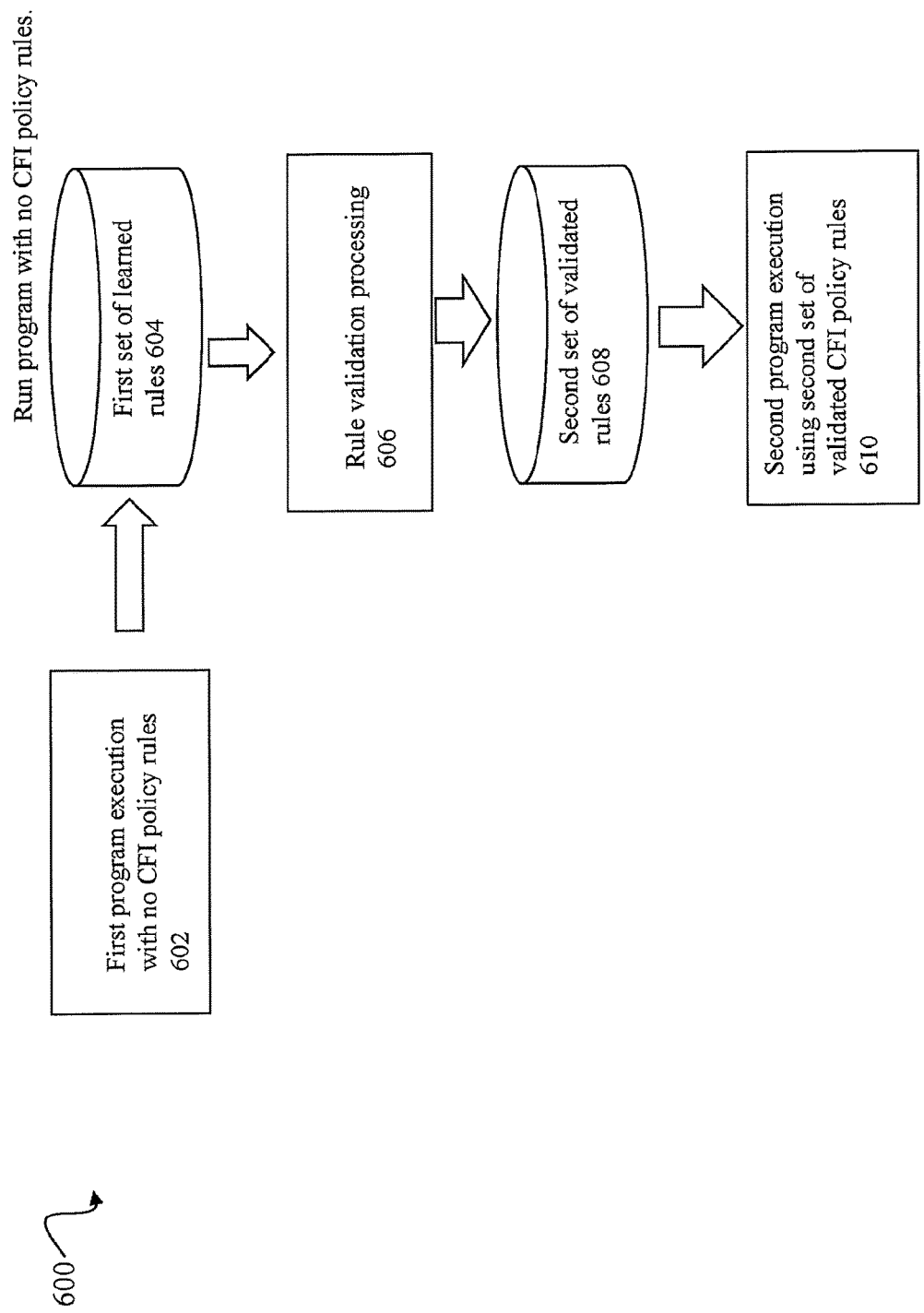
FIGS. 54, 55 and 56 are examples illustrating processing that may be performed to learn or determine policy rules in an embodiment in accordance with techniques herein.

Referring to FIG. 54, shown is an example summarizing processing just described as may be performed by an embodiment in accordance with techniques herein for learning, validating and using policy rules. In 602, the program may be initially executed with no CFI policy rules in effect so that each new transfer of control causes a rule cache miss and triggers the cache miss handler to generate a new rule regarding the transfer of control encountered at runtime. The new rule may identify a transfer of control from the source and target and may be included in a first set of learned rules 604. At the end of program execution, the first set of learned rules 604 includes a rule for each different transfer of control that occurred at runtime. The first set of learned rules may then be validated in processing of 606 to ensure each rule represents a valid control transfer. Processing of 606 may use a tool as described above for automated rule validation and may also include other processing. For example, validation processing of 606 may include presenting a rule that has been validated by the tool to a user for further confirmation that the control transfer is valid. The second set of validate rules 608 may be generated as a result of rule validation processing 606. Subsequently, the second set of validated rules 608 may be used by the PUMP system as the CFI policy enforced when executing the program at a second point in time in 610.

Thus, for foregoing first program execution in 602 may be used to determine a set of valid control transfers for the program. However, it may not be reasonable to assume that this single program execution exercises all control paths whereby the control transfers identified in 608 as valid may denote less than all possible valid control transfers. In this case, processing may be performed as described above in connection with 610 using the validated set of CFI policy rules. During runtime, if a control transfer is encountered causing a rule cache miss (e.g., indicating an unforeseen control transfer not having a rule in 608), additional checking may be performed at runtime, for example, to validate the control transfer such as described above (e.g., using the set of possible control points tagged in binary code or annotated in a source program). If the control transfer is determined as invalid, a fault or exception may be triggered.

As an alternative, if a control transfer is encountered causing a rule cache miss thereby denoting an unexpected runtime control transfer, the cache miss handler may record the unexpected transfer rule for later validation and also allow the unexpected transfer of control to proceed with additional or different policies in effect. For example, for an unvalidated control transfer, the transfer may be considered untrusted so policies may be modified to reflect a higher level of protection due to the untrusted nature of the unvalidated control transfer. For example, the unexpected transfer may transfer control to a library routine. The library routine may be executed using policies reflecting a higher level of protection and less trust than those in effect prior to the unexpected transfer. For validated control transfers, a first stack protection policy may be in effect at a first point in time prior to the unexpected transfer of control and a second stack protection policy in effect after the unexpected transfer of control. The first stack protection policy may enforce static procedure authority. The first protection policy may not include any coloring at the object level as described elsewhere herein with the object protection model. After the unexpected control transfer, the second stack protection policy in effect may provide for stack protection in accordance with the object protection model described elsewhere herein with strict object coloring. Thus, code executed once the unexpected control transfer is encountered may utilize the more restrictive second stack protection policy providing a tighter finer level of granularity of stack protection. Additionally, the program execution may continue with a reduced level of priority once the unexpected transfer of control occurs.

Figure 55:
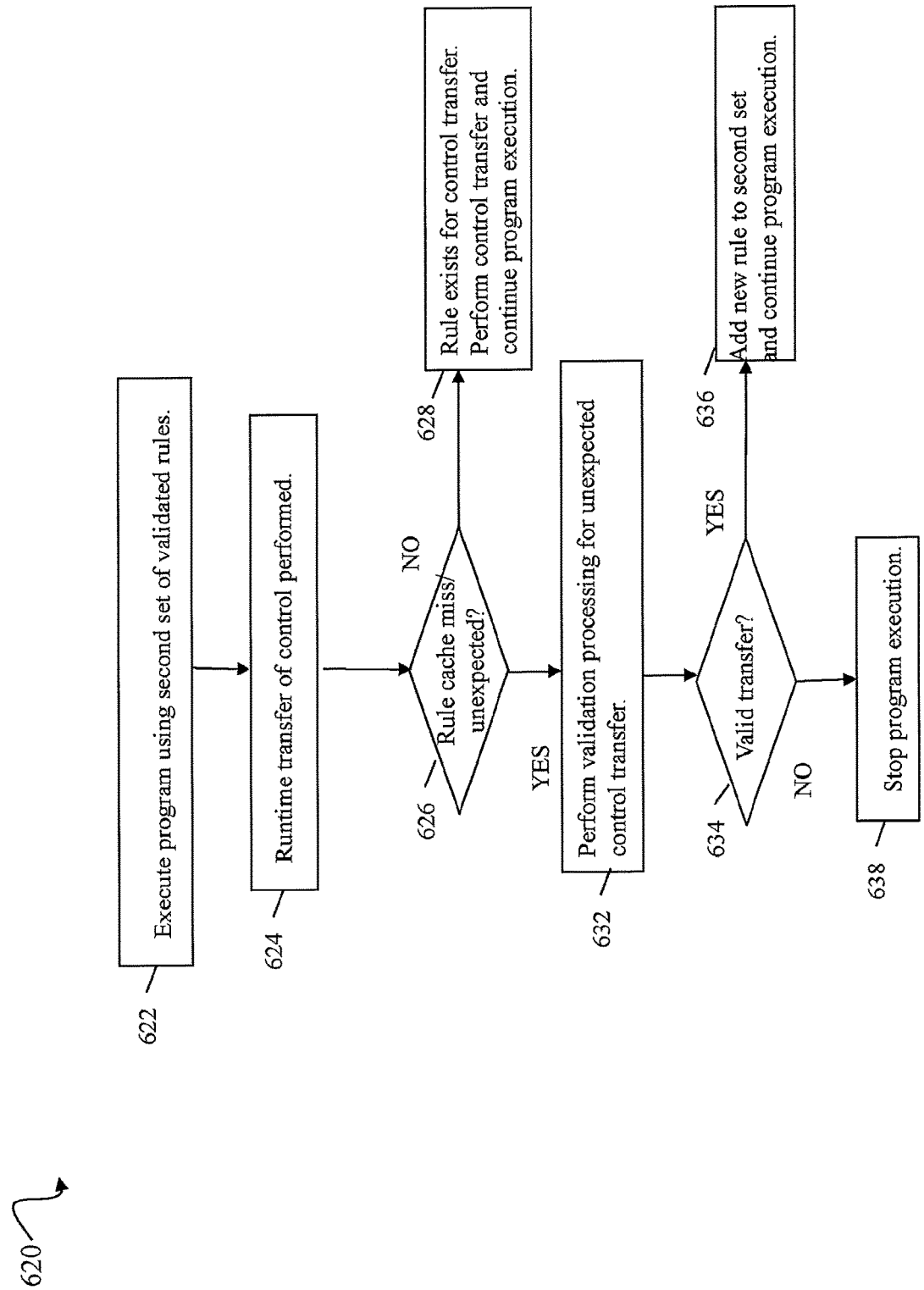
Figure 56:
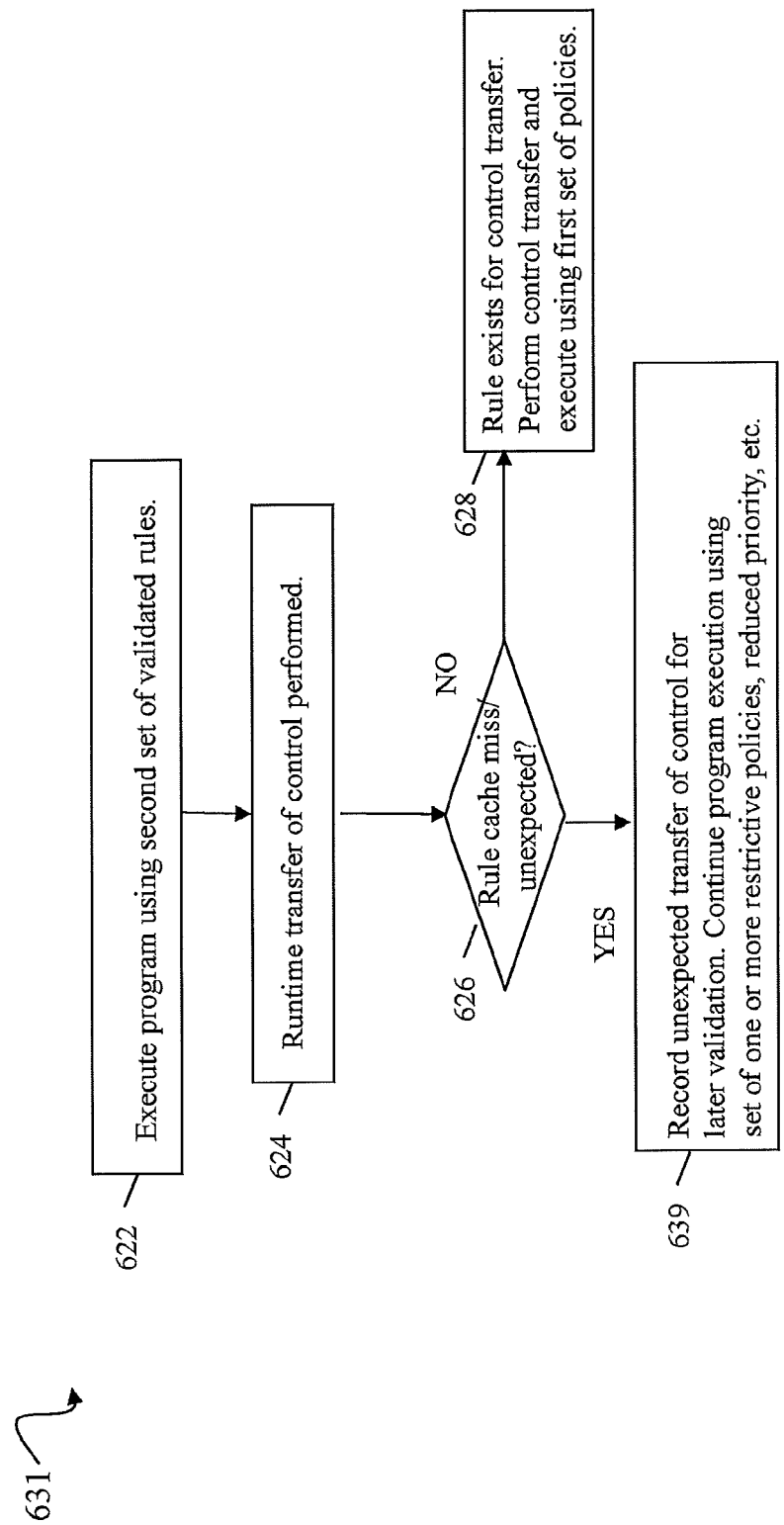

Referring to FIGS. 55 and 56, shown are flowcharts 620, 630 of processing steps that may be performed in an embodiment in accordance with techniques herein using a set of validated rules, such as the rules of a CFI policy for a program described above. Flowchart 620 describes a first set of processing steps that may be performed in connection with an unexpected transfer of control not having a rule in the CFI policy of an executing program. Flowchart 631 describes a second set of processing steps that may be performed in connection with an unexpected transfer of control not having a rule in the CFI policy of an executing program.

Referring to flowchart 620, at step 622 a program may be executed using a set of validated rules. At step 624 during program execution, a runtime transfer of control is performed. At step 626, it is determined whether there is a rule cache miss thereby indicating that the transfer is unexpected. In particular, if there is a rule in the second set of validated rules for the runtime transfer of control, then the transfer of control is expected where step 626 evaluates to no and processing continues with step 628 where the control transfer is performed and the program continues execution.

If step 626 evaluates to yes (e.g., cache miss indicating an unexpected transfer of control), processing continues with step 632 where runtime validation processing is performed for the unexpected control transfer. In particular, the miss handler may perform processing that attempts to validate the unexpected transfer. Examples of rule validation processing may include determining whether the runtime source and target locations are included in a set of potential control transfer points as described above that may be determined using tagged binary code, the original source program and symbol table, and the like. At step 634, it is determined whether the validation processing of step 632 determined the unexpected transfer of control is valid. If step 634 evaluates to yes, processing continues with step 636 where the new rule is added to the second set used as the CFI policy for the program and processing of the program continues. If step 634 evaluates to no, program execution may be terminated, for example, by causing a trap.

Referring to flowchart 631, steps 622, 624, 628 and 628 are as described above in connection with flowchart 620. If step 626 evaluates to yes, control proceeds to step 639 where the unexpected transfer of control may be recorded (e.g., candidate rule for unexpected transfer of control recorded)

for later validation. In step 639, the program is allowed to continue execution even when the transfer of control is unexpected. However, in step 639, program execution continues, for example, using a set of one or more restrictive policies, reduced execution priority, and the like, such as noted above.

The processing described above of such as described above may be similarly performed in connection with other policies such as taint tracking. For example, for taint tracking, a first learning or training phase may be performed to learn rules of a policy via program execution by having the cache miss handler "log" each cache miss. As described herein, taint tracking may include tagging data based on the code that produces or accesses it (e.g., such as using the CI as described elsewhere herein.) One reason to taint data based on code or source is to make sure that programs are properly contained and do not perform unwanted or improper data accesses. For example, rules may be used to assure that data tainted by the JPEG decoder never flows into the password database, or that credit card data, social security number or other personal information is only accessed by a particular set of one or more restricted applications. With determining a taint tracking policy, processing may be performed for a learning or training phase with no taint tracking rules run on test data that causes a cache handler miss the first time it sees a particular flow of data (e.g., which routines of a program access what data, what user input is written to what database, and the like) and records the rule. In a manner similar to that as described above for the CFI policy, at the end of a test run of the first learning phase, there is a set of learned rules to apply to protect the program during operation. Validation processing of the learned set of rules may be also be performed using a tool or other suitable means as noted above for the CFI learned set of rules. Such validation processing for taint tracking may include ensuring that each data flow or access is proper.

Also, in a manner similar to that as described in connection with flowcharts 620 and 631, the validated set of rules may be used with the PUMP system where a cache miss handler handles processing for any data access that does not have a corresponding rule in the validated set. Similar to processing of flowchart 620, the cache miss handler may then also perform runtime validation processing (e.g., similar to step 632) to determine whether a candidate rule for the data access or data flow is valid and allow program execution to continue (e.g., similar to steps 634, 636) or not (e.g., similar to step 638). Alternatively, similar to processing of flowchart 631, the cache miss handler may record a candidate rule for the unexpected data access or data flow that may be validated offline (e.g., not during runtime) and continue program execution using, for example, more restrictive policies, reduced priority, and the like (e.g., similar to step 639).

The examples above describe a generally binary learning process. An embodiment in accordance with techniques herein may further support use of statistics in making a decision about whether or not to allow an event (e.g., control transfer or data access). In at least one embodiment, a counter may be added to each rule to count the number of uses of each rule during program execution. When the rule is evicted from the PUMP cache, processing may add the accumulated rule usage into a global, software count that may be used to provide additional statistics regarding rule usage. The count may also be used to allow something to occur a limited number of times. For example, in connection with taint tracking rules tracking the flow of data from a source to a target, a limited threshold amount of data may be allowed for unexpected data flows between a source and target (e.g., X amount of data read from a particular database by a particular program). Once that threshold amount has been transferred, no additional data may be transferred between the source and target until the corresponding candidate rule has been successfully validated. With the limited use case with the threshold amount, the PUMP system (e.g., miss handler) may allow an instruction lacking a rule to occur some limited number of times. Aggregation or counting as applied to the threshold may be done in different ways. For example, consider unexpected control transfers. Non-aggregated, the cache miss handler may not allow the same unexpected control transfer without a validated rule to occur more than 5 times. Aggregated, such as across all unexpected control transfers for a program, the program may be allowed to make a maximum number of 100 unexpected control transfers. This may be useful for example, for cases where it is acceptable for a single instance of an unexpected transfer of control or unexpected data access to occur. For example, a single query to examine data from a particular source may be allowed. However, if above a threshold number of queries are performed to the data source (e.g., particular database), the program should be flagged or stopped.

The more general statistics case may be used for learning the range of normal behavior. For example, a program may be executed in a learning phase to determine a relative usage of the different rules of a policy (e.g., ratio of usage of each rule). For example, relative usage of each rule invoked for a runtime control transfer may be recorded. Ideally, such execution may be performed for the program using many different data sets to learn what may be considered average or normal program behavior. Rule learning and validation may then result in a set of rules for the validated control transfers (as described above) and additionally a ratio indicating a relative usage of each validated rule. Both the validated rules and associated usage ratios may be used during subsequent processing as the enforced policy rules. During subsequent program execution when the policy is enforced, the PUMP system may check if current rule usage is out of line with the expected ratio. An embodiment may include, for example, a range or maximum expected usage for the rule where control transfers invoking the rule more than the maximum may be flagged. For example, the program invoking the particular control transfer rule more than the maximum may be flagged for further inspection or analysis. Using this mechanism, program runtime behavior can be monitored similar to the way network behavior is monitored to generate firewall rules. Statistical learning algorithms can be used to capture rule usage, and perhaps other standard runtime characteristics like main-memory traffic and cache miss rates, to learn normal case versus attack behavior. In embodiment applying the limited-use threshold as described above, if a program exhibits other runtime behavior that is anomalous or otherwise may be considered untrusted, the use limits may be greatly reduced or otherwise set to zero. Alternatively, if a program exhibits normal runtime behavior or otherwise may be considered trusted, the use limits may be set much higher or increased in comparison the untrusted scenario.

The techniques above may be used to determine a set of valid rules of a policy, such as valid control transfers reflected in rules of a CFI policy, without having a compiler output any additional information. Thus, an embodiment in accordance with techniques herein may have two version of each policy—one used for the learning phase and another used for subsequent enforcement. The learning phase may be used as an automated diagnostic mode to discover allowable data accesses or flows for taint tracking, discover control transfers for a CFI policy, and the like.

What will now be described are examples of architectures that may be used in embodiments in accordance with techniques herein using a RISC-V processor. Additionally, described below are techniques that may be used in connection with performing processor-based mediated data transfers between untagged and tagged data sources used by the processor. Such techniques provide for tagging external untrusted data that may be brought into the system for use by the processor and also removing tags from tagged data used within the system to generate untagged data for use outside of the system.

Figure 57:
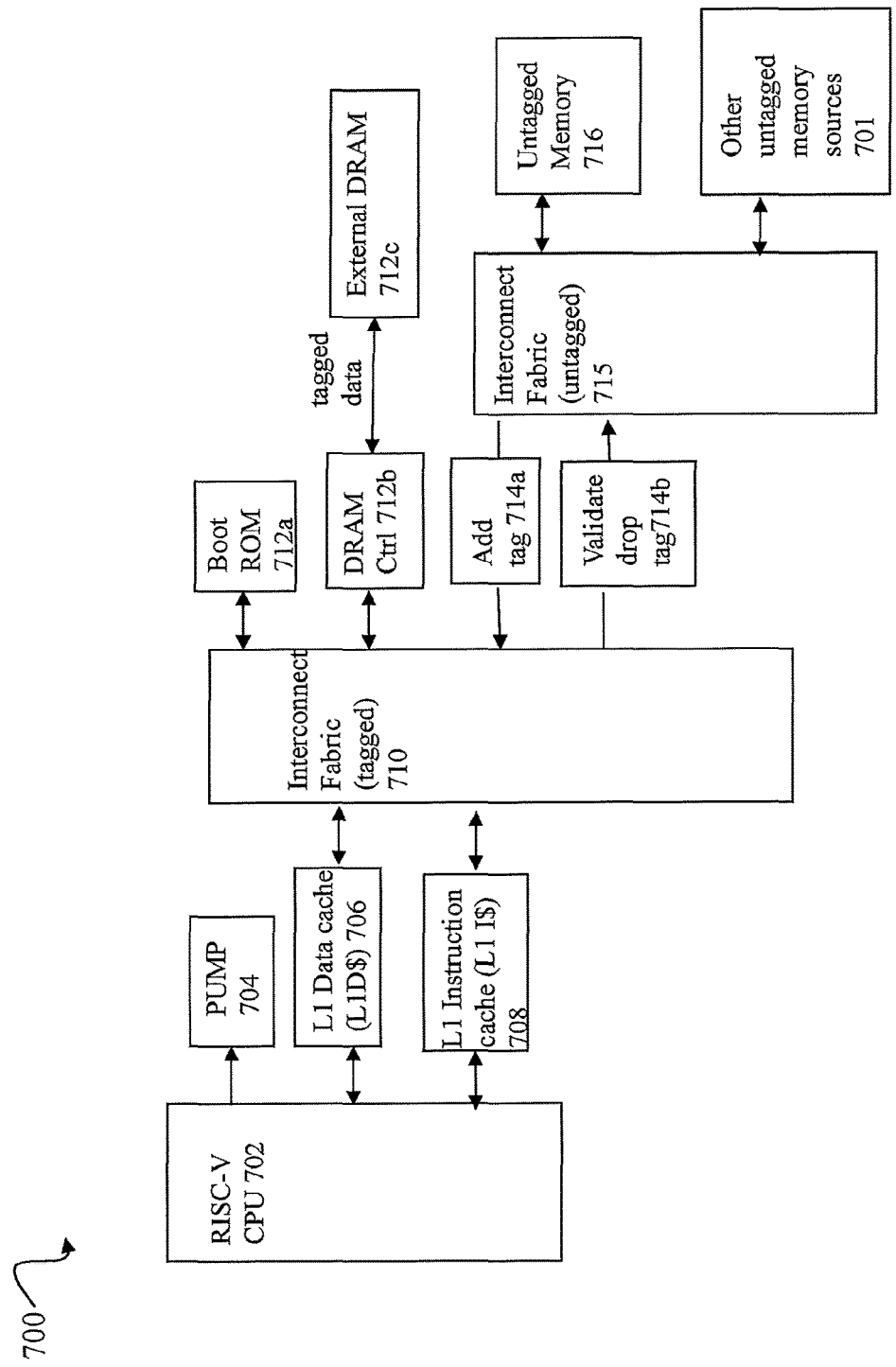
FIGS. 57, 58, 59 and 60 are examples illustrating components in an embodiment in connection with converting between an external version and an internal tagged version of data.

Referring to FIG. 57, shown is an example of components that may be used in an embodiment in accordance with techniques herein to mediate between tagged and untagged data. The example 700 includes a RISC-V CPU 702, PUMP 704, L1 data cache 706, L1 instruction cache 708, interconnect fabric 710 used internally within the system for tagged data transfers, boot ROM 712a, DRAM controller (ctrl) 712b, and external DRAM 712c storing tagged data. Also included are add tag 714a and validate drop tag 714b which are hardware components, interconnect fabric 715 used for transferring external untagged data in from untagged memory 716 for use by the processor 702 and transferring untagged data out to the untagged memory 716. It should be noted that other sources 701 of external untagged data, besides untagged memory 716, may be connected to the untagged fabric 715. For example, element 701 may include untagged data stored in flash memory, untagged data accessible from the network, and the like. The DRAM controller (ctrl) 712b is a controller used for reading data from and writing data to DRAM 712c. Boot ROM 712a may include boot code used when booting the system.

The example 700 illustrates a separate tagged fabric 710 and untagged fabric with the processor 702 used for moving data between the two. Add tag 714a takes as an input untagged data and tags it with a tag indicating that the data is public (can be used outside the system described herein) and untrusted (since the source may be unknown or otherwise not from a known trusted source). In at least one embodiment, the untagged data of untagged memory 716 may be received by 714a. The received untagged data from 716 may be encrypted whereby add tag 714a simply adds an untrusted tag to the received encrypted data. The received data may be encrypted using asymmetric cryptography, such as public key cryptography using a public-private key pair, or other suitable encryption technique known in the art. The received data may be stored in an encrypted form. As known in the art, for a public-private key pair of an owner, the private key is known only to the owner but the public key is made public and used by others. A third party may encrypt information sent to the owner using the owner's public key. The owner may then decrypt the received encrypted information using its private key (not shared with anyone else). In a similar manner, the owner may encrypt information using his private key where the encrypted information is sent to a third party that decrypts the encrypted information using the owner's public key.

Validate drop tag 714b may receive tagged encrypted data and remove the tag thereby resulting in untagged encrypted data that is being exported to the untagged memory 716. Such untagged encrypted data stored in memory 716 may be used, for example, on another system and processor not using tags and associated metadata rule processing as performing using the PUMP described herein.

In at least one embodiment, the untagged data received at 714a may be encrypted, as noted above, and also signed to provide integrity of the data. Furthermore, signatures may be used in validating the received data item to ensure authentication and data integrity (e.g., has not been modified since sent by the original sender that signed, ensure data was sent by the sender signing the data). For example, an owner may hash a message to produce a hash value or "digest," and then encrypt the digest with the owner's private key to produce a digital signature. The owner may send the message and signature to a third party. The third party may validate the received data using the signature. First, the third party may decrypt the message using the owner's public key. The signature may be verified by computing the hash or digest of the decrypted message, decrypting the signature with the owner's/signer's public key to obtain an expected digest or hash, and comparing the computed digest with the decrypted expected digest or hash. Matching digests confirms the message has not been modified since it was signed by the owner.

In operation, an instruction, such as a load instruction, may reference data stored in the untagged memory 716 which is then transferring into the data cache 706 for use in instruction execution. For such a load instruction, the data may be transferred from 716 over 715 for processing by 714a which outputs the tagged data (tagged as untrusted and public). The tagged data output by 714a is stored in the L1 data cache 706 for processing. In a similar manner, a store instruction may store data from the data cache 706 to a location in untagged memory 716. For such a store instruction, the data may be transferred from 706 over 710 to validate drop tag 714b which outputs the untagged data. The untagged data output by 71ba is then transmitted over 715 for storage in 716.

Code may be executed on the processor 702 to import the untagged data from 716 into the system for storage, for example, on DRAM 712c. The following may be denote logic of the code that imports the untagged data:
1. the tagged data output by add tag 714a may be stored in untrusted buffer (tagged as public, untrusted).
2. decrypt the tagged data stored in untrusted buffer and store in decode buffer. Thus decode buffer includes decrypted data that is tagged as public, untrusted.
3. perform validation processing to ensure that the decode buffer includes valid uncompromised data. Such validation processing may use digital signatures as described elsewhere herein and known in the art.
4. if the decode buffer includes validate data, a second portion of trusted code may be executed to convert the data of decode buffer tagged as public, untrusted, to data that is tagged as trusted. The trusted code portion may include one or more instructions that, when executed, invoke rules to retag the data of decode buffer as trusted, public. The retagged data now tagged as trusted, public may be stored in a trusted buffer located in external DRAM 712c.

The trusted code may include a memory instruction tagged with a special instruction tag giving it the authority to, when executed, invoke a rule that retags a referenced memory location. For example, the trusted code may include a specially tagged store instruction that stores the data tagged as public, untrusted (untrusted buffer) in a destination memory location (trusted buffer) with a new tag of public, trusted. The foregoing store instruction of trust may be specially tagged, for example, by a loader.

The following may be denote logic of the trust code that retags data from public, untrusted, to public trusted:

for i=1 to N
   temp=*untrusted buffer [i];
   trusted buffer [i]=temp;

where N is the length of the untrusted buffer and temp is a temporary buffer used for the retagging performed. The first instruction, temp=*untrusted buffer [i], may result in a load instruction that loads a first element of untrusted buffer from untagged memory 716 into temp. The second instruction, trusted buffer [i]=temp, may be a store instruction that stores the data tagged in temp as public, untrusted to trusted buffer [i] with a new tag of public, trusted. Thus, the second instruction is the instruction that is specially tagged as noted above to have authority to perform the data retagging from untrusted to trusted.

In a similar manner, when tagged data of 712c is being exported or stored in untagged memory 716 (or any untagged memory source 701), code is executed by the processor 702 that encrypts the data item and generates a signature where the encrypted data item and signature may be sent to 714b where the tag is removed before transmission over 715 for storing in 716.

Figure 58:
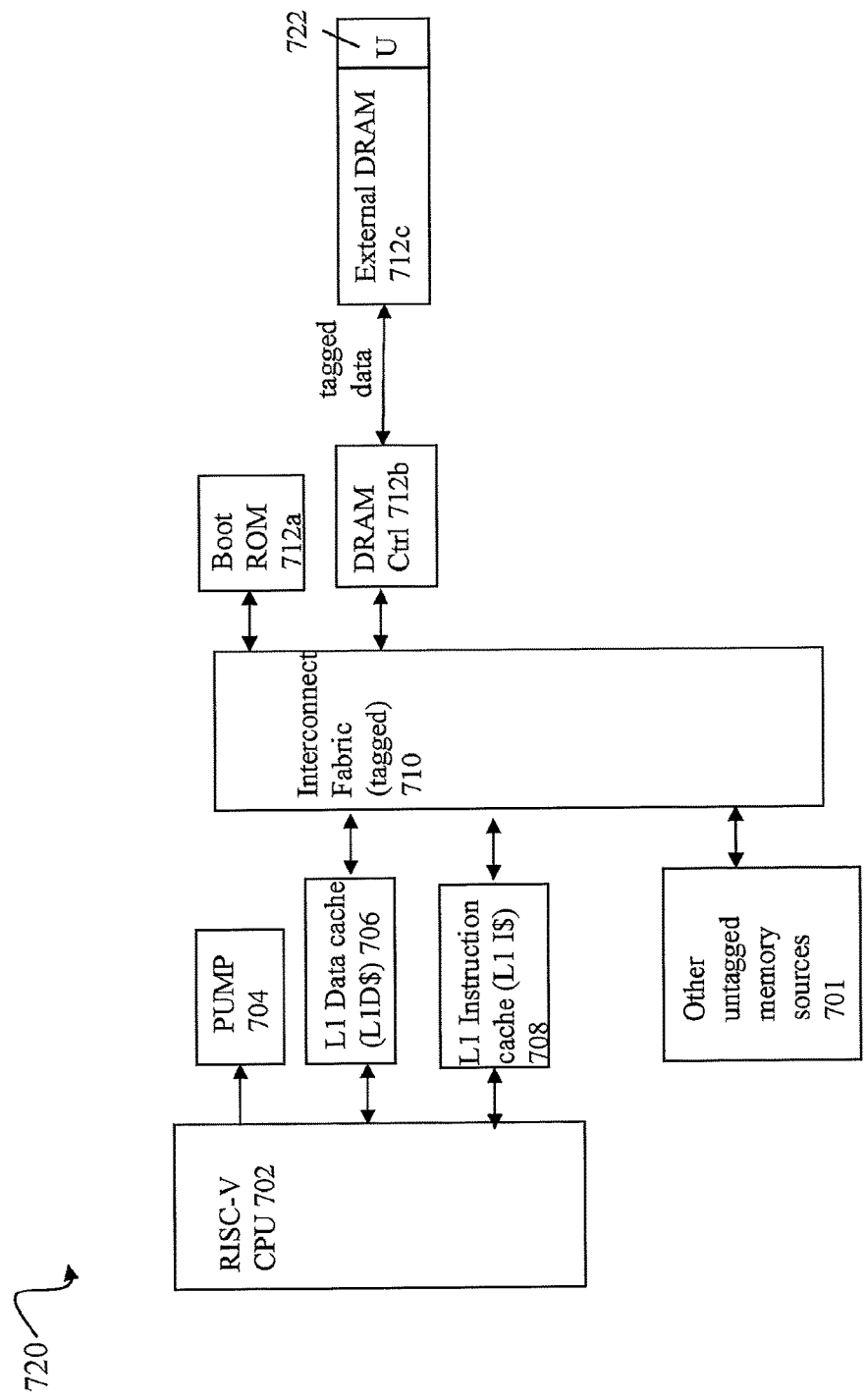

As a variation to the example 700, the memories 716 and 712c may be unified and also the interconnect fabric 710 and 715 may be unified. In such an embodiment, the address range that the untagged memory source 701 is allowed to access may be limited. For example, reference is made to the example 720 of FIG. 58. The example 720 includes components similar to those numbered as in 700 with the difference that components 714a-b, 715 and 716 are eliminated and memory 712c includes a portion U 722 denoting a region of memory 712c used for storing untrusted, public tagged data. The untagged memory source 701, such as an untrusted DMA and I/O subsystem, may be limited to using the bottom 16 or 256 MB of memory 722. In one embodiment, data stored in U 722 may not be explicitly tagged but rather all data stored in U having an address in this limited range may be implicitly tagged and treated as public and untrusted. As a variation, an embodiment may pretag portion U 722 with permanent tags indicating untrusted public data and the foregoing associated permanent metadata tag cannot be modified. Rules may prevent the processor from storing other data into region U 722. Untrusted DMA operations, for example, performed by a DMA included in 701 may be limited to writing into region U 722.

Figure 59:
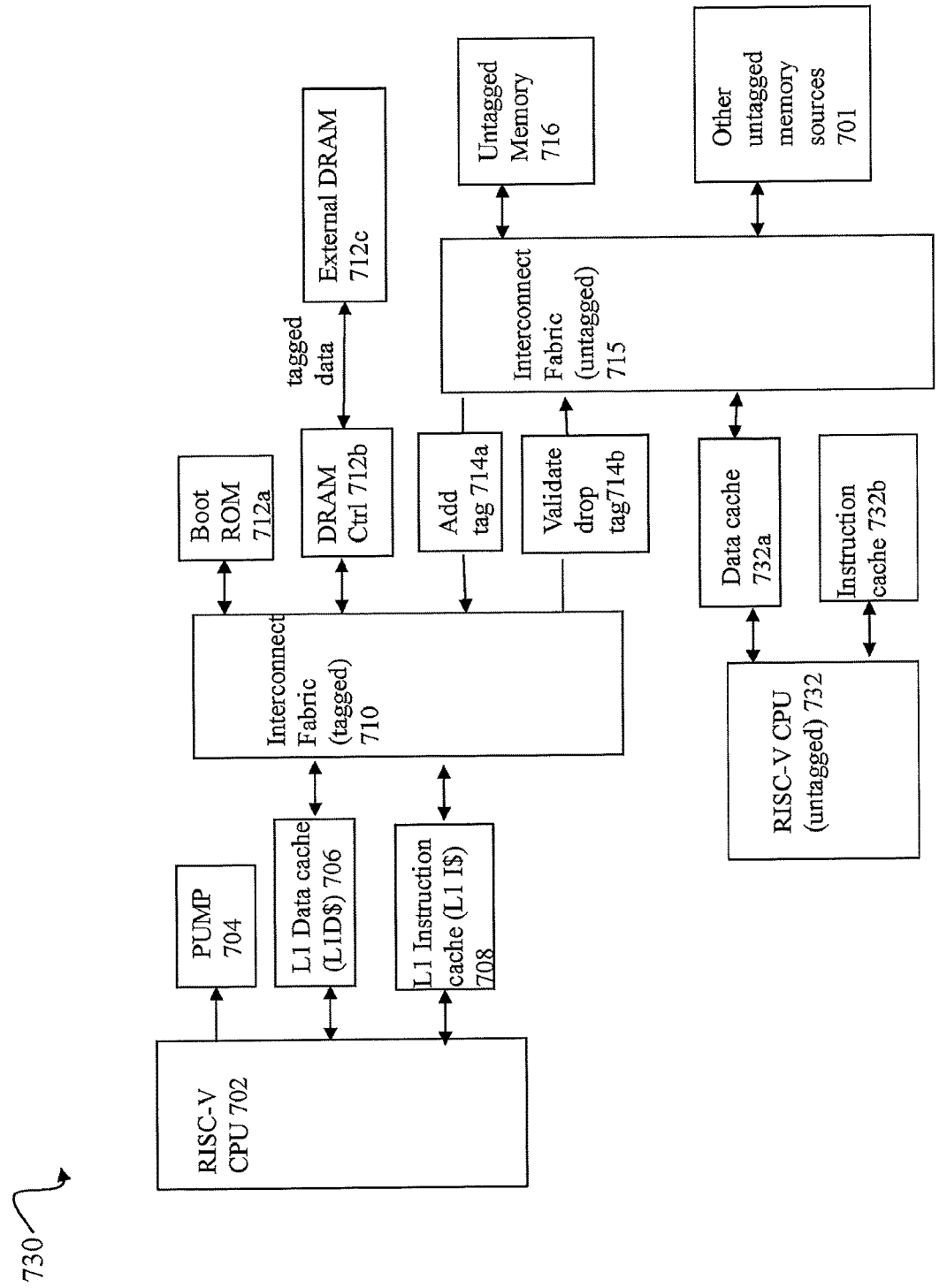

An embodiment needing to run unported I/O processing code may be executed on a dedicated I/O processor on the untrusted side of components. For example, reference is made to the example 730 of FIG. 59. The example 730 includes components similar to those numbered as in 700 with the difference of the addition of components 732, 732a and 732b. Element 732 is the additional RISC-V processor that runs without the PUMP and metadata rule processing. Element 732a denote the data cache for the second processor 732 and element 732b denotes the instruction cache for the second processor 732. The data cache 732 may be connected to the untagged interconnect fabric 715.

As described elsewhere herein in more detail, a separate I/O PUMP may be used as another alternative to mediate between the untagged data sources (e.g., 701, 716) and tagged memory 712c used by the processor 702.

Figure 60:
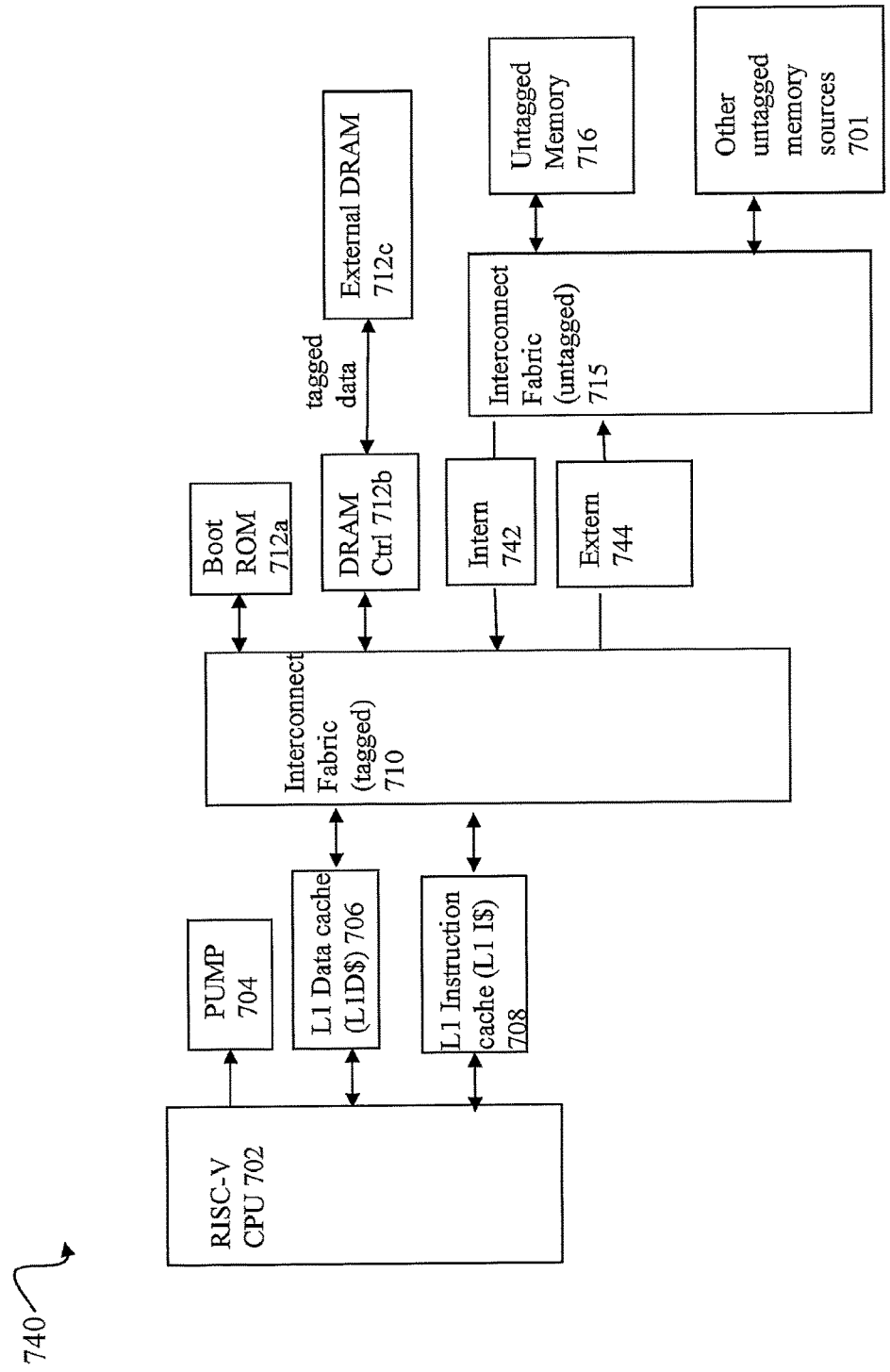

Referring to FIG. 60, shown is another embodiment of components that may be included in a system herein used in connection with techniques herein to mediate between the untagged data sources (e.g., 701, 716) and tagged memory 712c used by the processor 702. The example 740 includes components similar to the example 700 with the difference that components 714a-b are removed and replaced with intern 742 and extern 744. In this embodiment, intern 742 and extern 744 may be hardware components that perform the processing described above. In particular, intern 742 may include hardware that processes received untagged data and outputs a validated data item tagged as trusted, public. The trusted, public tagged data item may be communicated to over fabric 710 for storage in the data cache 706 used by the processor 702 in connection with executing instructions. Intern 742 may include hardware that performs validation processing of the untagged encrypted data, and, assuming successful validation, further tags the received untagged data as trusted, public. Extern 744 may include hardware that processes tagged unencrypted data and outputs a signed encrypted data item. Extern may remove the tag prior to encryption if the signed encrypted data item is going to be used on another processor that does not perform metadata rule processing as described herein.

In a simplest case, the hardware of intern 742 and extern 744 may host a single public-private key set where the signing and cryptography are also performed using the single key set. The key set may be encoded in hardware used by 742 and 744. In a further variation, the hardware of intern 742 and extern 744 may host multiple public-private key sets where the signing and cryptography are also performed using one of the multiple key sets (each set including a different public-private key pair). The multiple key sets may be encoded in hardware used by 742 and 744. Clear data included with the incoming untagged data tells the intern unit 742 which set of keys to use. Thus, intern 742 may perform a lookup in a hardware data store (e.g., associative memory) including the multiple key sets to select the desired key set. Each of the multiple key sets may be associated with a different tag so the particular key set indicated by the clear data also indicates the particular tag that the tagged data will include. In this manner, the tag of the tagged data item output by 742 denotes that the data item is public and trusted and also that the data item is encrypted/decrypted using a particular one of the multiple key sets. In the embodiment with multiple key sets, extern 744 may examine the tag to determine which particular one of the multiple key sets is used in connection with encrypting and signing a data item. Thus, the intern unit 742 processing provides an isolated hardware component that verifies received untagged data and performs tagging thereby avoiding the need to have a portion of code, such as the trust code portion noted above, with the capability to tag data.

With reference back to FIGS. 1 and 24, inputs to the PUMP 10 in stage 5 include tags as described elsewhere herein. For an instruction including a memory location as an operand of the instruction, obtaining the memory input and associated tag, MR tag (also sometimes referred to herein as the Mtag), may cause an extra pipeline stall whereby PUMP 10 at stage 5 cannot proceed until it has all its inputs including the MR tag. Rather than wait to retrieve the actual MR tag value read from memory, processing may be performed in accordance with techniques herein to determine an expected or predicted MR tag which can then be used to determine the R tag, the tag value for the instruction's result (e.g., destination register or memory location, if any). In such an embodiment, a final check may be done in stage 6, the writeback or commit stage (e.g., see element 22 of FIG. 1 and commit stage as last stage 6 in FIG. 24) to determine whether the predicted MR tag matches the action MR tag retrieved from memory for the operand of the instruction. The foregoing selection and use of a predicted MR tag to determine Rtag for an instruction having a memory location as an operand may be referred to as an Rtag prediction accelerator optimization.

Figure 61:
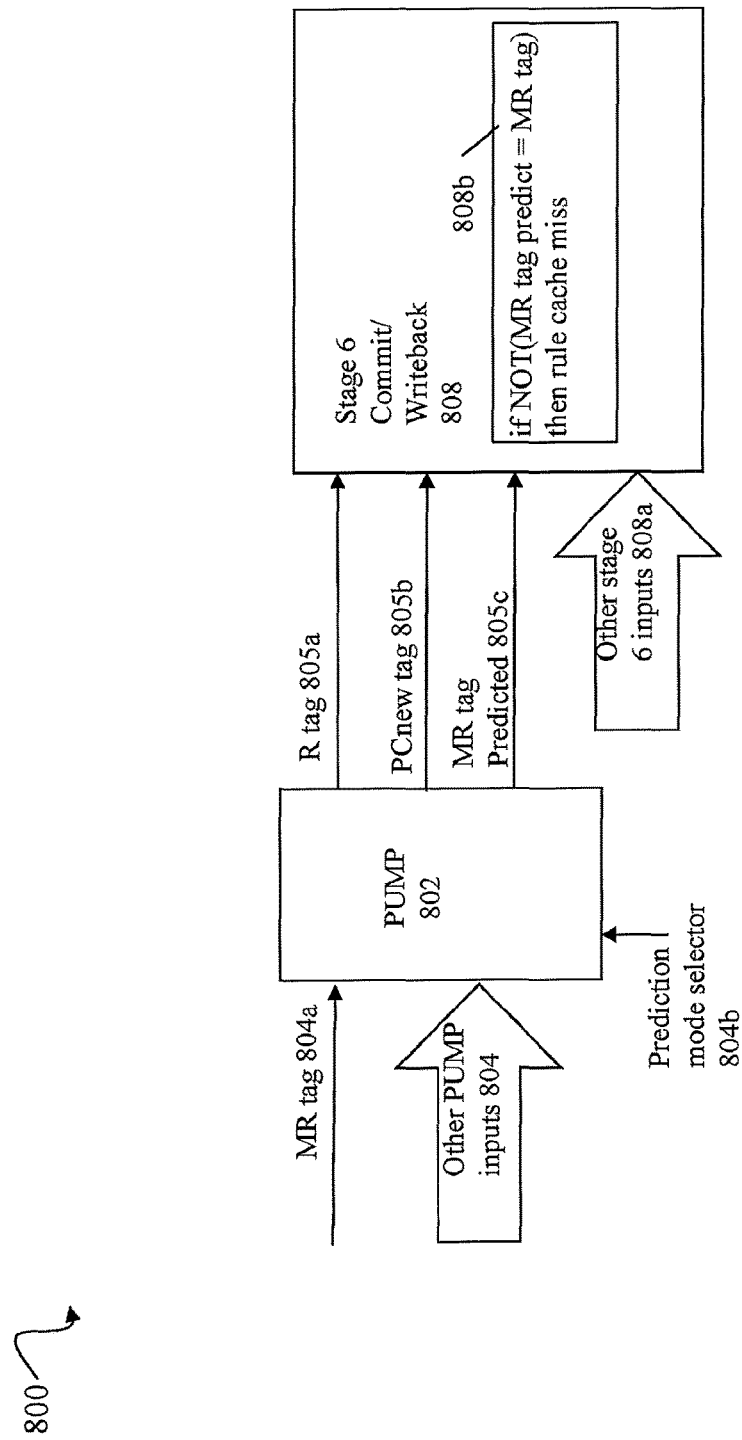
FIGS. 61, 62 and 63 are examples illustrating aspects of performing tag prediction in an embodiment in accordance with techniques herein.

Referring to FIG. 61, shown is an example 800 illustrating components of an embodiment in accordance with techniques herein for the Rtag prediction accelerator optimization. The example 800 includes the PUMP 802 corresponding to the PUMP 10 at stage 5 as described elsewhere herein (e.g., FIGS. 1 and 24) with the additional features for performing the Rtag prediction accelerator optimization. The PUMP 802 includes as inputs the MR tag 804*a* as well as other PUMP inputs 804 as described elsewhere herein. The PUMP 802 also includes another input, a prediction selector mode 804*b*, which denotes whether the PUMP 802 runs in normal processing mode (non-prediction mode where MR tag prediction processing is not performed) or otherwise runs in a prediction mode (where MR tag prediction processing is performed). In at least one embodiment, the prediction mode selector 804*b* may either be 0, denoting normal processing mode for the PUMP where no predicted MR tag value is determined, or 1, denoting prediction mode for the PUMP where a predicted MR tag value is determined. When the prediction mode selector is 1, the PUMP 802 may execute in prediction mode where the MR tag 804*a* input may be masked out or ignored and the PUMP 802 produces as an output the predicted MR tag 805*c*. When the prediction mode selector is 0, the PUMP 802 may execute in a normal processing mode such as described elsewhere herein wherein MR tag 804*a* is an input to the PUMP 802 and there is no output 805*c* generated.

As illustrated in the example 800, additional outputs of the PUMP 802 in stage 5 include R tag 805*a* and PC new tag 805*b*. When using a predicted MR tag, a rule for the predicted MR tag may be determined where the rule specifies an associated tag for R tag. When operating in prediction mode, the predicted MR tag 805*c* is an additional input to stage 6 808 of the pipeline. Element 808 may denote the commit or writeback stage as described elsewhere herein (e.g., FIGS. 1 and 24). Thus, element 808*a* may generally denote other stage 6 inputs, besides 805*a-c*, as described elsewhere herein.

In stage 6 808, additional processing 808*b* may be performed when the PUMP 802 operates in prediction mode. Element 808*b* indicates that a check may be performed in stage 6 808 which compares the predicted MR tag to the action MR tag obtained from memory for the operand of the instruction. In other words, 808*b* evaluates whether the PUMP 802 correctly predicted the MR tag value by determining whether the predicted MR tag matches the MR tag obtained from memory. If the predicted MR tag does not match MR tag as obtained from memory, then an incorrect rule was triggered and used by PUMP 802 in determining R tag 805*a* with the incorrect predicted MR tag. The correct rule must now be selected (in accordance with the actual MR tag) and used in determining a revised R tag. Thus, if the predicted MR tag does not match MR tag, a rule cache miss is determined and cache miss handling is performed. Consistent with description elsewhere herein, cache miss handling may include processing to select and evaluate the correct rule using MR tag.

Load/read and store/write instructions are examples of instructions in an embodiment that may include a memory location as an operand benefiting from use of a predicted MR tag. Other inputs 804 to the PUMP include a set of other or remaining input tags besides MR tag 804*a*. For example, one embodiment as illustrated in connection with FIG. 23 may have 5 input tags—PC tag, CI tag, OP1 tag, OP2 tag, and MR tag—and 2 output tags—PC new and R tag. Thus the set of remaining input tags (besides MR tag) includes the following 4 tags of PC tag, CI tag, OP1 tag, OP2 tag. Determining a predicted MR tag or an instruction may include determining a set of one or more rules having tags values that match the 4 tags (e.g., for PC tag, CI tag, OP1 tag, OP2 tag) of the instruction. In some instances, only a single rule may include matching tag values for the 4 input tags. In this case, the single matching rule also specifies a value to MR tag which may be used as the predicted MR tag 805*c*. Additionally, the rule may be evaluated using the 4 inputs tags and the predicted MR tag to further determine the R tag 805*a*.

For example, consider a memory safety policy with typical load and store operations. A load operation may load data from a source memory location using a pointer where a first rule indicates that the tag or color on the source memory location should match the tag or color of the pointer. A store operation may store data to a target memory location using a pointer where a second rule indicates that the tag or color on the target memory location should match the tag or color of the pointer. For a load instruction, the first rule may be the only rule having tag values matching the 4 input tags for PC tag CI tag, OP1 tag and OP2 tag of the load instruction. The MR tag of the first rule may be used as the predicted MR tag 805*c*. Additionally, the R tag of the first rule may be determined using the set of 4 input tags and the predicted MR tag. In a similar manner, for a store instruction, the second rule may be the only rule having tag values matching the 4 input tags for PC tag CI tag, OP1 tag and OP2 tag of the store instruction. The MR tag of the second rule may be used as the predicted MR tag 805*c*. Additionally, the R tag of the second rule may be determined using the set of 4 input tags and the predicted MR tag.

In other instances, the set of rules of the policy having tags matching the input tags for PC tag CI tag, OP1 tag and OP2 tag of an instruction may include multiple matching rules with each matching rule identifying a different allowable or candidate MR tag that may be used as the predicted MR tag 805*c*. An embodiment may use any suitable technique to select one of the multiple allowable MR tags to use as the predicted MR tag. For example, an embodiment may select the MR tag of the set of allowable MR tags that is the most common or likely to occur. The MR tag that is most likely to occur may be based on previous observations or rule profiling. As an alternative, an embodiment may set the predicted MR tag to be the previous or most recent MR tag. In the worst case, if the predicted MR tag does not match the actual MR tag once received, cache miss handling may be performed as described herein to determine the correct rule using the actual MR tag along with the other inputs tags of the instruction.

In at least one embodiment, a class of rules for memory operations may be created which are used when the PUMP operates in prediction mode. The class of rules may be referred to as a class of "predict memory tag" rules. For the "predict memory tag" rules, the MR tag 804*a* is not used as an input to the PUMP 802 and is thus not used in connection with various lookups performed by the PUMP. For example, the care/don't care bit vector for the "predict memory tag" rules may treat the MR tag as a don't care. Additionally, the "predict memory tag" rules may omit the MR tag as an input and rather specify predicted MR tag as an output. As described above, if there are multiple matching normal rules matching a particular set of input tags for PC tag, CI tag, OP1 tag and OP2 tag, the single "predict memory tag" rule corresponding to the set of matching rules may specify a predicted MR tag as an output that is the most common or expected MR tag. In one embodiment, the single "predict memory tag" rule corresponding to the set of matching rules may specify, as the predicted MR tag, the last or previous MR tag that was received by the PUMP 802.

Policy logic may decide whether to insert or use "predict memory tag" rules or not. An embodiment may keep 2 versions of each policy where a first version includes policy "predict memory tag" rules for use when operating in prediction mode and a second version includes normal or non-prediction policy rules for use when operating in normal processing mode or non-prediction mode. If the check performed in 808*b* of stage 6 fails for a given instruction when using a "predict memory tag" rule, the cache miss handling may perform processing to determine a matching rule for the instruction using the normal rule set (e.g., second version of rules described above).

In an embodiment using a RISC-V processor and architecture, the prediction mode selector 804*b* may have a corresponding PUMP CSR. Use of CSRs in an embodiment using the RISC-V architecture is described elsewhere herein in more detail.

Figure 62:
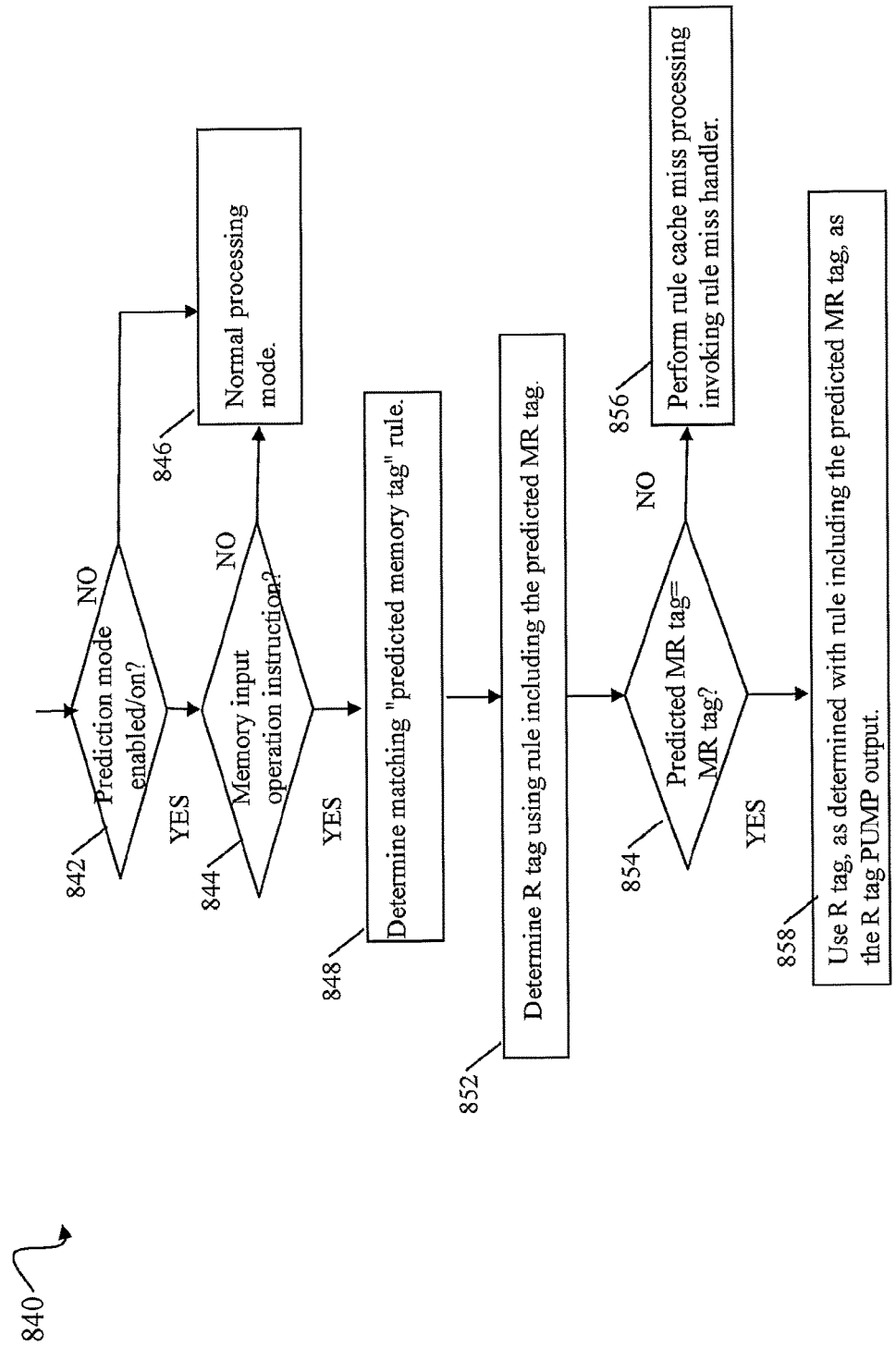

Referring to FIG. 62, shown is a flowchart of processing steps that may be performed in an embodiment in accordance with techniques herein. The flowchart 840 summarizes processing as described above in connection with the example 800. As noted above, the PUMP 802 illustrated in the example 800 denotes the PUMP at stage 5 providing inputs to stage 6 of the processor pipeline. In at least one embodiment steps 842, 844, 846, 848 and 852 of the flowchart 840 may denote processing steps performed in stage 5 as described above embodied within the PUMP and the particular policy rules used, and steps 854, 856 and 858 may be performed in stage 6 as described above.

At step 842, a determination is made as to whether prediction mode is on/enabled thereby denoting that the PUMP is operating in prediction mode using "predict memory tag" rules. If step 842 evaluates to no, control proceeds to step 846 where the PUMP operates in normal or non-prediction mode using normal rules. If step 842 evaluates to yes, control proceeds to step 844 where a determination is made as to whether the current instruction is a memory input operation instruction. If step 842 evaluates to no, control proceeds to step 846. If step 844 evaluates to yes, control proceeds to step 848 where the PUMP operates in prediction mode using "predicted memory tag" rules. In step 848, a matching "predicted memory tag" rule for the instruction may be determined. In step 852, the R tag for the current instruction may be determined using the matching "predicted memory tag" rule from step 848. At step 854, a determination is made as to whether the predicted MR tag matches the actual MR tag. If step 854 evaluates to no, control proceeds to step 856 to perform rule cache miss processing by invoking the rule miss handler. If step 856 evaluates to yes, control proceeds to step 858 where the R Tag, as determined with the rule including the predicted MR tag, is used as the R tag PUMP output.

Figure 63:
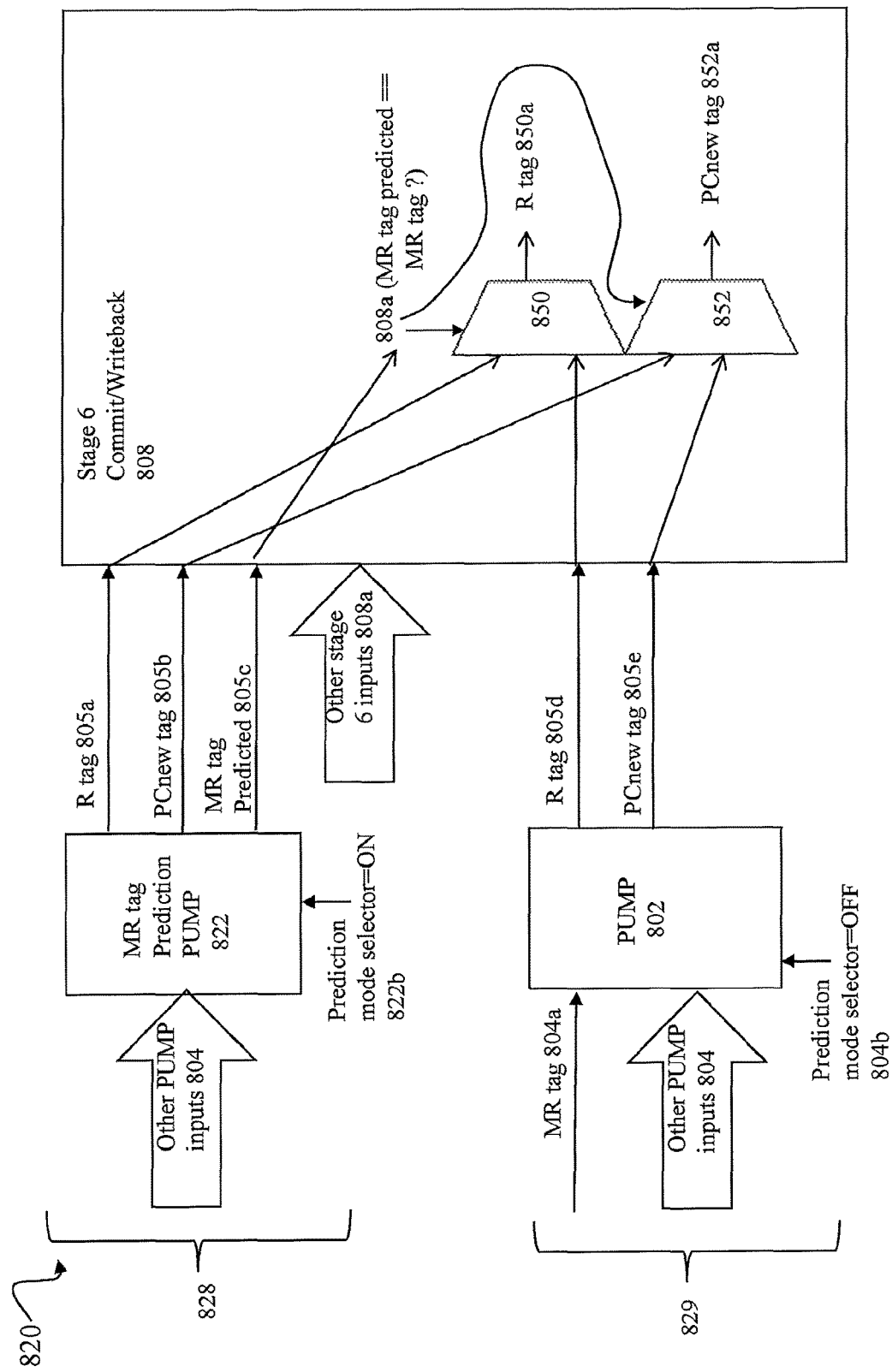

As a variation from the of the example 800, reference is made to FIG. 63 illustrating components of an embodiment including PUMP 802 running in normal non-prediction mode and also a second PUMP 822 that runs in prediction mode. In this example, PUMP 822 running in prediction mode may also be referred to as the MR tag prediction PUMP where the prediction mode selector 822*b* is always ON (e.g., 1). Similarly, for the PUMP 802 the prediction mode selector 804*b* may also be OFF (e.g., 0). The MR tag prediction PUMP 822 may only use the "predict memory tag" rules and the PUMP 802 may only use the normal or non-prediction version of the policy rules. In such an embodiment, the PUMPs 802 and 822 may operate in parallel in stage 5. Element 828 may denote the stages 5 and 6 processing and components associated with the MR tag prediction PUMP 822. Element 829 may denote the stages 5 and 6 processing and components associated with the PUMP 802 operating in normal mode. In 829, the PUMP 802 outputs are as in connection with the example 800 with the difference that the predicted MR tag 805*c* is no longer output by PUMP 802. Additionally, stage 6 808 does not perform the check 808*b*. Element 828 may include components that perform processing in a manner similar to the example 800 with a difference being that the MR tag prediction PUMP 822 only uses "predict memory tag" rules as noted above.

Stage 6 (808) is revised to take PUMP outputs Rtag 805*a* and PCnewtag 805*b* from MR tag prediction PUMP 822 and outputs Rtag 805*d* and PCnew tag 805*e* from PUMP 802. Additionally, in stage 6, selection is made between Rtags 805*a* and 805*d* and also selection is made between PCnew tags 805*c* and 805*e* based on whether or not the predicted MR tag matches the actual MR tag (e.g., as denoted by 808*a*). If there is a match between the predicted MRtag and the actual MRtag (e.g., 808*a* evaluates to 1 or true), the tags (e.g., Rtag 805*a* and PCnew tag 805*b*) from the predicted PUMP 822 are used and the tags (e.g., Rtag 805*d* and PCnew tag 805*e*) from the non-predicted PUMP 802 are discarded. If there is a mismatch between the predicted MRtag and the actual MRtag (e.g., 808*a* evaluates to 0 or false), the tags 805*a*-*c* from the predicted PUMP 822 are discarded and the tags 805*d*-*e* from the non-predicted PUMP 802 are used. The non-predicted PUMP 802 provides its output outputs 805*d*-*e* a cycle later than the outputs 805*a*-*c* of predicted PUMP 822, so when PUMP outputs from stage 5 regarding PCnewtag and MRtag are needed as inputs to stage 6 for processing, this introduces a stall into stage 6 waiting on the foregoing stage 6 inputs. The non-predicted PUMP 802 may also experience a PUMP rule cache miss when it is selected, in which case, this is handled like a typical rule cache miss as described elsewhere within this disclosure.

Referring to the stage 6 808, elements 850 and 852 represent multiplexers. Element 808*a* may denote a selector used to select an input from each of 850 and 852 based on the logical result of whether MRtag predicted matches MRtag. If the foregoing two tag values match, Rtag 805*a* is selected as the input into 850 provided as the selected Rtag 850*a* denoting the in final Rtag output of stage 6; otherwise if the foregoing two tag values do not match, Rtag 805*d* is selected as the input into 850 provided as the selected Rtag 850*a*. Additionally, if the foregoing two tag values match, PCnew tag 805*b* is selected as the input into 852 provided as the selected PCnew tag 852*a* denoting the in final PCnew tag output of stage 6; otherwise if the foregoing two tag values do not match, PCnew tag 805*e* is selected as the input into 852 provided as the selected PCnew tag 852*a*.

What will now be described are techniques using coloring allocated memory that may be used in an embodiment in accordance with techniques herein.

A user program, such as one coded in the C programming language, may include calls to routines used in connection with memory allocation and deallocation. For example, malloc and free are routines in the C standard library and may be linked into an executable of a user program. Thus, malloc and free execute as routines in the user process address space along with other user code that may invoke malloc and free. Malloc is invoked for dynamic memory allocation to allocate a block of memory used by executing code. In at least one embodiment, malloc may have an input specified on the invocation denoting the size of the memory block to be allocated whereby malloc returns a pointer to the allocated memory block. A program accesses the allocated memory block using the pointer returned by malloc. In at least one embodiment, free is invoked to free or deallocate memory previously allocated with malloc. When a memory block allocated using malloc is no longer needed, the pointer (as returned by malloc) may be passed to free as an input argument whereby free deallocates the memory (located as the address denoted by the pointer) so that it may be used for other purposes. User code executing on a processor in an embodiment in accordance with techniques herein may perform such calls to malloc and free or other routines or functions similarly performing memory allocation and deallocation. Routines such as malloc and free that perform dynamic memory allocation may utilize memory management metadata regarding the allocated memory. In following paragraphs, such metadata used for memory management may be referred to as malloc metadata and is distinct and in addition to tag-based metadata described herein including tags and other metadata pointed to by pointer tags (e.g., where tag-based metadata that is inaccessible to executing user code and is processed by the metadata processor or subsystem such as described in connection with the example 1000 and elsewhere herein). Malloc metadata may include, for example, information about the allocated memory block such as the size of an allocated memory block, and a pointer to the malloc metadata portion for a subsequently allocated memory block.

Figure 64:
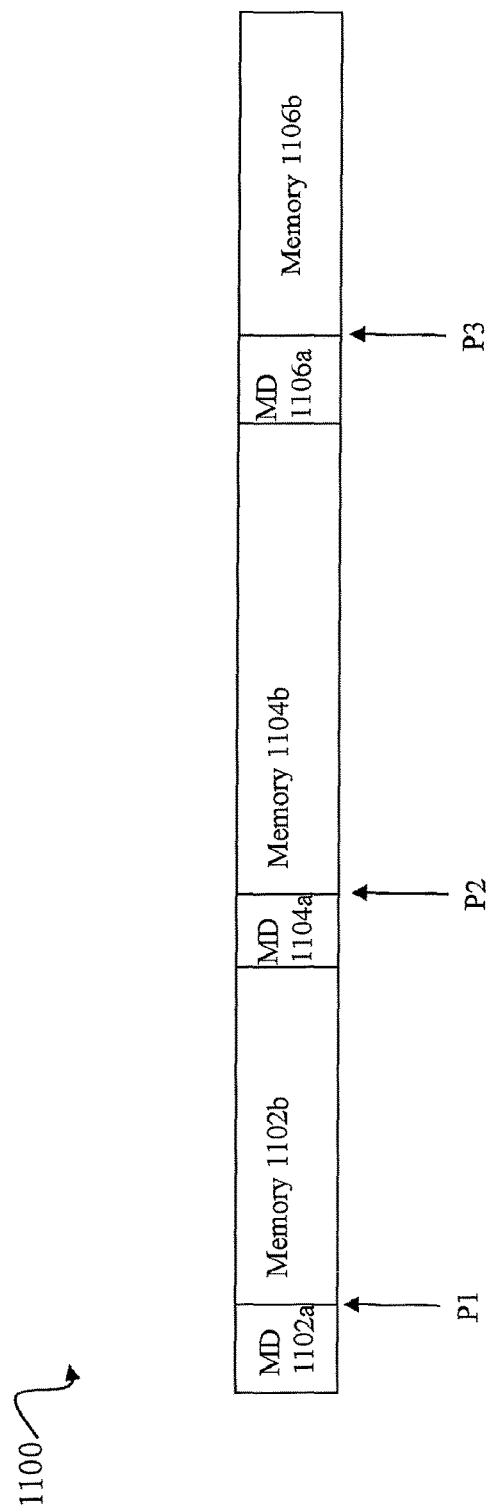
FIGS. 64-65 illustrate use of coloring memory location techniques herein with allocated memory in an embodiment.

Referring to FIG. 64, shown is an example illustrating memory allocation such as in connection with malloc. In the example 1100, a program may perform a first call to malloc to allocate a first block of memory of a requested size. In response, malloc may allocate memory block 1102*b* of the requested size and return pointer P1 denoting the starting address for the memory block 1102*b*. The user program may then store data to, and read data from the allocated memory block 1102*b* using the pointer P1 or another address based on an offset from P1. Additionally, for purposes of dynamic memory management, malloc may also allocate storage 1102*a* for its own malloc metadata for each memory block allocated. Element 1102*a* denotes the memory portion allocated and used by malloc for storing the malloc metadata for the allocated memory block 1102*b*. In a similar manner, the user program may subsequently perform a second call to malloc to allocate a second memory block. Element 1104*a* denotes the memory portion allocated by malloc responsive to this second call where 1104*a* is used for storing malloc metadata. Element 1104*b* denotes the second memory block allocated where P2 is the pointer returned to the user program to access the second memory block. In a similar manner, the user program may subsequently perform a third call to malloc to allocate a third memory block. Element 1106*a* denotes the memory portion allocated by malloc responsive to this third call where 1106*a* is used for storing malloc metadata. Element 1106*b* denotes the third memory block allocated where P2 is the pointer returned to the user program to access the third memory block.

After an allocated block of memory, such as 1102*b*, is no longer needed by the executing code, the code may perform a call to free to free the memory block 1102*b* so that such memory block 1102*b* is deallocated and may be used for other purposes. Pointer P1 may be returned when making such a call to free. In a similar manner, when memory blocks 1104*b-c* are no longer needed, calls to free may be made specifying, respectively, pointers P2 and P3.

Through a pointer such as P1 returned by malloc to executing user code, the user code may inadvertently or intentionally access the malloc metadata since the address of the memory portion 1102*a* holding the malloc metadata is mapped into the executing code's address space. For example, the user code may assign another pointer P4 an address in memory portion 1102*a* (e.g., P4=P1-2) and then read or write to the memory location identified by the pointer P4. Thus, the user code may, for example, overwrite the malloc metadata stored in 1102*a* and read malloc metadata stored in 1102*a*. In this manner, performing a write to the memory location at the address identified by P4 may corrupt the malloc metadata portion 1102*a*. More generally, the foregoing may be performed by user code in connection with any of the malloc metadata portions 1102*a*, 1104*a* and 1106*a*.

In connection with a call to free, user code may specify a pointer that does correspond to the starting address of an allocated memory block previously allocated using malloc. For example, the user code may perform a call to free specifying the foregoing pointer P4 as an argument rather than P1, P2 or P3. Assume, for example, malloc allocates an X byte block (e.g., X being a non-zero integer) for each malloc metadata portion 1102*a-c* in connection with a call to malloc. The routine free may perform processing under the assumption that memory locations from the first address (P4-X) to the second address (P4-1) denote, respectively, starting and ending address spanning a malloc metadata portion such as 1102*a*. In this case, processing performed by free may be using a corrupted malloc metadata portion 1102*a* resulting in, for example, unexpected runtime performance and/or dynamic memory management errors.

An embodiment may use techniques described herein to protect the malloc metadata portions 1102*a*, 1104*a* and 1106*a* to avoid corruption through overwrites performed by other executing code, such as the user code. Such techniques may include tagging code and/or data with particular colors or tags and enforcing rules to allow only desired access and operations such as described elsewhere herein.

Figure 65:
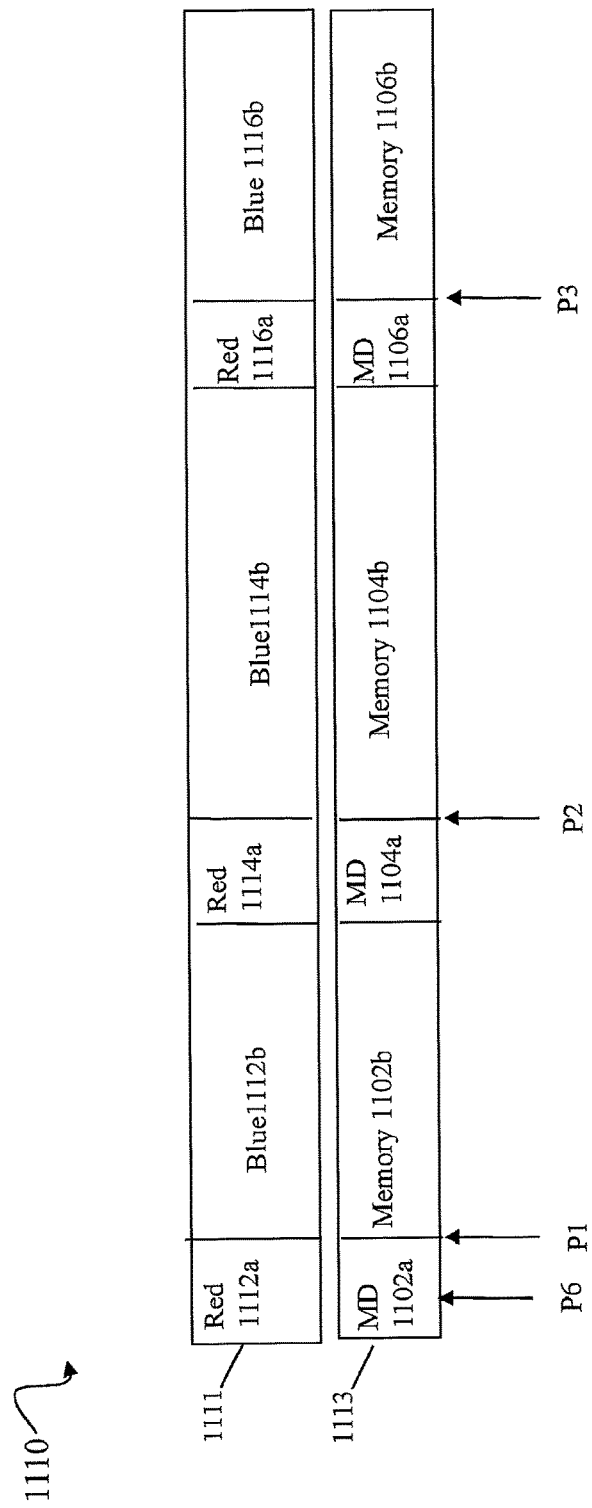

With reference to FIG. 65, in at least one embodiment, memory portions used by malloc and free may be colored or tagged with a first tag used by metadata processing as described herein and other memory portions used by user code (as allocated by malloc) may be colored or tagged with a second different tag used by metadata processing as described herein. In the example 1100, data portions used by malloc and free (containing malloc metadata) may be colored or tagged red, and user data portions (memory blocks allocated by malloc for use by user code) may be colored or tagged blue. An embodiment may have at least one tag or color reserved exclusively for use in coloring or tagging memory locations used by malloc and free. In this example, red is the reserved color used for tagging memory locations used by malloc and free. As described elsewhere herein, an embodiment may also reserve one or more colors or tags for executing user code. In at least one embodiment, all memory allocated for use by a user program may be tagged with the same color. As a variation, an embodiment may use a different tag for each call to malloc and thus a different color for each separate memory block allocated. In this example 1110, for simplicity of illustration, only a single color blue is used to tag all memory blocks allocated by malloc for a user program.

Element 1111 may denote tags specified for corresponding memory locations 1113. Elements 1112*a*, 1114*a* and 1116*a* respectively denote tags for malloc metadata portions 1102a, 1104a and 1106a. Elements 1112b, 1114b and 1116b respectively denote tags for memory blocks 1102b, 1104b and 1106b allocated by malloc for user by user code via calls made to malloc as described above.

Elements 1112a, 1114a and 1116a denote that each memory location, respectively in 1102a, 1104a and 1106a is tagged as red. Elements 1112b, 1114b and 1116b denote that each memory location, respectively in 1102b, 1104b and 1106b is tagged as blue.

Generally, an embodiment may use instruction tagging, colored pointers, or a combination of the foregoing, in connection with triggering rules that color the memory blocks of 1113 with tags denoted by 1111, and also enforce a memory safety policy whereby only malloc and free are able to access malloc metadata areas 1102a, 1104a and 1106a and user code cannot.

In a first embodiment, code of malloc and free may be tagged (e.g., instruction tagging) such as by a loader, with a special instruction tag (e.g., CI tag). Both malloc and free may be tagged with the same unique or special instruction tag (e.g., malloc and free code tagged with the same CI tag of tmem) or may each be tagged with their own unique or special instruction tag (e.g., malloc code tagged with tmalloc and free code tagged with tfree). Code of malloc may include store instructions that, when executed, trigger rules that perform coloring such as in the example 1110. Code of free may include store instructions that, when executed, trigger rules that reinitialize or deallocate a malloc metadata portion (e.g., 1102a, 1104a and 1106a) or a previously malloced memory block (e.g., 1102b, 1104b and 1106b) such as by retagging each memory cell of the block or malloc metadata portion with an F tag representing free memory. Also, in the first embodiment, the memory safety policy may include rules triggered by execution of particular instructions, such as the load and store instructions, whereby the rules only allow instructions tagged with the special instruction tag(s) noted above to 1) access malloc metadata portions 1102a, 1104a and 1106a and 2) perform the memory block coloring as in the example 1110. Such rules may generally check the CI tag to ensure that each instruction coloring or accessing a memory cell in any of 1102a, 1104a and 1106a has the special instruction tag denoting malloc or free.

In a second embodiment, rather than use special instruction tags, an embodiment may use colored pointers with rules of the memory safety policy triggered by execution of particular instructions, such as the load and store instructions. The loader may tag pointers of malloc and free that reference malloc metadata portions 1102a, 1104a and 1106a with the color red. Code of malloc may include store instructions that, when executed, trigger rules that perform coloring such as in the example 1110. Code of free may include store instructions that, when executed, trigger rules that reinitialize or deallocate a malloc metadata portion (e.g., 1102a, 1104a and 1106a) or a previously malloced memory block (e.g., 1102b, 1104b and 1106b) such as by retagging a memory cell with a tag F representing free memory. The memory safety policy may include rules triggered by execution of particular instructions, such as the load and store instructions, whereby the rules only allow access to malloc metadata portions 1102a, 1104a and 1106a with instructions referencing a memory cell using a red colored pointer. Such rules may generally check the MR tag to ensure that the memory instruction accessing a memory cell in any of 1102a, 1104a and 1106a uses a pointer with a first color that matches a second color of the memory cell.

In a third embodiment, both special instruction tags and colored pointers as described above may be utilized in combination. Following is an example of instructions and rules that may be used in such a third embodiment. Consistent with other discussion herein, following examples use rules based on 5 input tags to metadata processing for PC (program counter), CI (current instruction), OP1 (operand 1 of the current instruction), OP2, operand 2 of the current instruction), MR (memory location, if any, referenced in the current instruction), and two propagated or generated tags for PCnew (new PC tag for next PC for next instruction) and R (tag for result of current instruction; used to tag destination register or memory location into which the result of the current instruction is stored). Additionally, "-" denotes a don't care for a tag. In such an embodiment, the loader may tag instructions of malloc with the special tag tmalloc and may tag instruction of free with the special tag tfree. Colored pointers may be created using triggered rules noted below.

In connection with malloc, metadata rule processing triggered by executing the code portion of malloc may generate a tag for the pointer to a newly allocated memory block such as 1102b via a first rule invoked as a result of a store instruction in the code portion of malloc. For example, malloc C code may be "P1=next free" where next free is a pointer to the next free memory location in 1113 and the store instruction may be "move R1, R2", where register R1 is the source register that contains the address next free and register R2 is the destination register that is the pointer P1. Register R1 may be OP1 (having OP1 tag) and register R2 may be the result or destination register (having R tag propagated or generated as a result of a fired rule). The code portion of malloc may include instructions, such as the foregoing move instruction, also tagged with a special tag, tmalloc, denoting the instruction is included in malloc code. In at least one embodiment, the loader may tag instructions of malloc with the special code tag, tmalloc. The first rule may tag pointer P1 to the allocated memory block 1102b with the tag blue. The first rule triggered as a result of the above move instruction in malloc may be:

my rule1A: (-, t malloc, blue-predecessor, -, _)→(-, blue)
The above rule only fires when the CI tag is tmalloc and thus for tagged move instruction in malloc. Assuming that the pointer used by malloc is P1, the above my rule 1A tags P1 stored in register R2 with the tag or color blue to denote it is a pointer to a blue memory location (e.g., memory location tagged with blue tag).

The pointer P1 tagged with blue may then be used with another second store instruction of malloc to write a 0 or some other initial value to each word in the allocated memory block 1102b. For example "*P1=0" may be included in malloc C code resulting in "Store R3, (R2)" where R3 is a source register operand OP1 containing zero (0), and R2 is the OP2 register that contains the address P1. In this store instruction, "(R2)" is operand MR and also denotes a memory location that is the target or destination of the store instruction. Additionally, the above store instruction in malloc may also be tagged tmalloc and may result in triggering a second special store rule as follows:

store 2A: (-, t malloc, -, blue, F)→(-, blue)
prior to returning the tagged pointer P1 to user code that invoked malloc.

The above store rule 2A only fires when CI tag is tmalloc, the pointer or address in R2 (denoting P1) is tagged as blue, and when the memory location MR pointed to by P1 has an F tag. The foregoing memory location *P1 is assumed tagged with "F" prior to coloring the memory location blue.

In this example, F denotes a free memory location. The resulting MR tag for the memory location denotes a blue tag for the memory location.

Thus, malloc may include code that results in triggering the above-noted second rule for each memory location of a memory block being allocated.

Malloc may also include code that triggers additional rules described below (e.g. that are similar to move (my) rule 1A and store rule 2A above) for use in initializing malloc metadata portions 1102a, 1104a, and 1106a. For example, malloc C code may be "(P1-2)=MD area" where MD area is a pointer into the malloc metadata area 1102a and the move instruction may be "move R7, R8", where register R7 is the source register that contains the address "P1-2" and register R8 is the destination register that is the pointer MD area. The rule triggered by the above move instruction may be:

my rule 1B: (-, t malloc_md, -, -, -)→(-, red)

to tag the MD area pointer red.

Malloc may also include code that triggers store rule 2B noted below (that is similar to the store 2A rule above) to tag each memory location of a malloc metadata portion such as to store tags 1112a, 1114a, 1116a, respectively for malloc metadata portions 1102a, 1104a and 1106a. For example assume size is an integer denoting the size of the malloced memory block 1102b and that "*(P1-2)=size" is included in malloc C code resulting in "Store R6, (R7)" where R6 is a source register operand OP1 containing the size value), and R7 is the OP2 register that contains the address P1. In this store instruction, "(R7-2)" is operand MR and also denotes a memory location in MR 1102a that is the target or destination of the store instruction. The store rule 2B may be:

store 2B: (-, t malloc_md, -, red, F)→(-, red)
store 2D: (-, t malloc_md, -, red, red)→(-, red)

which performs the store if the store instruction is tagged tmalloc, if the R7 register containing address P1 is tagged red, and if the MR operand is tagged as F. It should be noted that an embodiment may also include store rule 2D (store 2D) noted above that is a variation of store 2B rule noted above whereby store 2D rule may be used in cases where updating the metadata value is desired.

At a later point in time, free may include code, such as "*P=0" that results in triggering store rule 3 noted below to retag a memory location of a previously malloced memory block (e.g., memory block allocated for user code use), such as when freeing or deallocating blue colored block 1102b. The loader may color or tag instructions of free with tfree. The routine free may include the C code statement "*P=0" that results in "Store R4, (R1)" where R4 is source register operand OP1 containing zero, R1 is the OP2 register containing the address of the memory location to be initialized, and "(R1)" denotes a memory operand MR with R1 containing the address to the memory location. The store rule 3 may be:

store rule 3: (-, t free, -, blue, blue)→(-, F)

Thus, free may include code that results in triggering the above-noted third rule for each memory location of a memory block being deallocated, where the memory block was previously allocated using malloc for use by user code (e.g., used for storing data other than malloc metadata). Store rule 3 checks to ensure that the CI tag=t free and that both the memory location and pointer thereto have the same color, blue.

It should be noted that the MR tag of "blue" may generally be any color previously used by malloc to color an allocated user memory block.

Code of free may also include code that triggers move (my) rule 1C and store rule 4 described below in connection with retagging each memory location of a malloc metadata portion such as 1112a. Code of free may include code that triggers move (my) rule 1C noted below which is similar to move (my) rule 1B above. Move (my) rule 1C may be:

my rule1C: (-, t free, -, -, -)→(-, red)

to tag a red pointer for use by free in connection with retagging using store rule 4.

Store rule 4 below (that is similar to the store rule 3 above) may be triggered to retag each memory location of a malloc metadata portion such as retag 1112a, 1114a, 1116a, respectively for metadata portions 1102a, 1104a and 1106a. The store rule 4 may be:

store rule 4: (-, t free, -, red, red)→(-, F)

which performs the store if the store instruction is tagged tfree, and if the MR operand uses a pointer tagged as red. The memory location is tagged with "F" to now denote it as free.

In a fourth embodiment, PC tagging may be used to provide malloc and free to provide malloc and free with sufficient privilege, access or authority to read data from and write data to malloc metadata portions 1102a, 1104a and 1106a and also exclude other code from accessing the foregoing metadata portions. PC tagging is described elsewhere herein, for example, in connection with the example 430 with providing different privilege, access or authority on a per process basis using different PC tag values. In a similar manner, a special or unique PC tag value may be used to provide malloc and free with authority to perform load and store operations with respect to malloc metadata portions 1102a, 1104a and 1106a. To further illustrate, malloc may include instructions tagged with tmalloc (e.g. CI tag=tmalloc when instruction is executed). Malloc may also include code that, when executed, triggers application of a rule that propagates or produce a particular PC tag as an output denoting a privilege or authority to access malloc metadata portions 1102a, 1104a and 1106a. Malloc may include a first instruction INS1 such as:

Add 0, R2 where R2 is an address in the malloc metadata portion, such as address P6 in area 1102a, and (R2) denotes the memory location having address P6 in 1102a that is colored red. The foregoing instruction INS1 when executed, may result in generating PCnew having a tag value such as X1 where X1 denotes the privilege needed to access 1102a. In this case, the rule triggered for the above first instruction INS1 may be:

add: (-, tmalloc, --, red, -)→(X1, red)

to color R2 with the color red and also set the PC to X1 to denote read/write access to the memory location having the address stored in R2 (e.g., address P6). Subsequently, malloc may include a second instruction, INS2, of "store R3, (R2)" to store a value from register R3 (e.g., OP1) into the memory location having address P6 (P6 is stored in R2). The rule triggered for the above second instruction INS2 may be:

store: (X1, tmalloc,-, red, red)→(PCdefault, red)

where PCnew is cleared or reset to be PCdefault, a default PC tag that does not denote privilege to access malloc metadata portion 1102a. Thus, in this particular example, the first ADD instruction triggers a rule to grant malloc the privilege or authority for read/write access to 1102a. After the above second instruction of malloc is executed that performs a write, the PC tag propagated removes the privilege or authority from malloc for read/write access to 1102a. As a variation, an embodiment may include a version of malloc with a prolog including an instruction that triggers a rule to grant malloc read/write access to 1102*a* by generating a PCnew tag of X1 (e.g, prolog includes Add instruction INS1 that triggers the rule noted above). At the end of malloc before returning, an epoligue may be executed that includes an instruction that, when executed, triggers a rule to remove malloc's read/write access to 1102*a* by generating a PCnew tag of PCdefault (e.g., epilogue includes store instruction INS2 that triggers the rule noted above).

In a similar manner, free may include instructions that invoke rules to generate or propagate a PCnew tag value to provide free with access to 1102*a*. The rules applied may propagate or produce a particular PC tag as an output that denotes a desired access, privilege or authority based on the particular process whereby the particular allowed privilege, access or authority may be represented by different PC tag values.

It should be noted that the foregoing illustrates a single color of blue for all malloced memory blocks and a single color of red for all malloc metadata portions. More generally, as described elsewhere herein, malloc may be provided with the authority to generate an unbounded number of new colors as may be needed for coloring different portions of heap memory. As discussed elsewhere herein, for example, malloc may be given and initial predetermined set of one or more colors or tags and may generate subsequently needed tags from the initial predetermined set. For example, malloc's initial predetermined set may include yellow or Y and red or R. For an executing process, malloc may generate a fresh Y-based tag (e.g., Y1, Y2, Y3, . . . ) for each call to malloc to allocate a new memory block used by user code (e.g., other than for malloc metadata storage). Thus, a different Y-based tag may be used to color each malloced memory block 1102*b*, 1104*b* and 1106*b* (e.g., 1102*b* colored with Y1, 1104*b* colored with Y2, 1106*b* colored with Y3). Malloc may generate a fresh R-based tag (e.g., R1, R2, R3, . . . ) for each different malloc metadata portion created for each call to malloc. Thus, R-based tags may be used to color malloc metadata portions 1102*a*, 1104*a*, 1106*a* each with a different R-based tag (e.g., 1102*a* colored with R1, 1104*a* colored with R2, 1106*a* colored with R3). The current or last R-based tag and the current or last Y-based tag used by malloc may be stored as state information via rules triggered when executing malloc instructions. For example, malloc may include an instruction which triggers a rule that stores the last Y-based tag, Y9, as the tag of a first memory location. Y9 may be generated as the Rtag. A subsequent instruction may again reference the same first memory location tagged with the saved last Y-based tag, Y9, where the subsequent instruction triggers a rule that 1) generates a new tag, Y10, based on the last Y-based tag, Y9, and 2) saves the tag Y10 as the tag on the first memory location. Y10 may be generated as the Rtag. The rule triggered by the subsequent instruction may indicate to determine Rtag, for example, as MRtag+1, where MRtag is Y9 for the subsequent instruction.

What will now be described are techniques that may be used as an optimization in connection with metadata processing using hardware accelerated miss handling. Generally, some policies used in embodiment herein may cause frequent rule cache misses and the cache miss handlers for such policies may take many cycles to run. In some policies, the relationships between various rule inputs may be rather simple in terms of logically determining a result or outcome and may therefore be hardwired and resolved quickly with dedicated hardware.

As a result, such policies implemented using hardware (HW) rule cache miss handler may be resolved in a much shorter amount of time than others not using such hardware acceleration. In such an embodiment, policy components, such as the cache miss handler for one or more selected policies, may be implemented with dedicated hardware. Thus, an embodiment in accordance with techniques herein may use such hardware-supported policies alone, or in combination with, software-defined policy components using a software rule cache miss handler.

As one example, consider a memory safety policy that uses memory safety coloring. In connection with a memory safety policy such as described elsewhere herein, memory cells and pointers may be colored whereby rules invoked in connection with both load and store operations may only allow a memory reference where a pointer color matches that of the memory cell. For example, rules triggered for a load instruction may be used to enforce a policy where the pointer color (e.g., of a register tag where the register is an operand such as OP1) is equal to a memory-cell color (e.g., memory location tag such as Mtag). The memory safety policy may challenge capacity by filling the PUMP rule cache with many different concrete rules that simply capture this equal color relationship for many colors, increasing the capacity miss rate. In some embodiments as described herein without preloading the rule cache, compulsory rule cache misses are required to insert every one of these rules. Since memory safety policy rules may be commonly triggered in connection with executing user code, memory safety policy rules may be supported using HW rule cache miss handler rather than a software rule cache miss handler.

In such an embodiment, the HW rule cache miss handler may generate or calculate a new rule inserted into cache upon the occurrence of a rule cache miss. For example, the miss handler for memory safety may be implemented using hardware as a HW rule cache miss handler that, for load instructions, compares OP1tag to the Mtag If OP1tag equals Mtag, the HW rule cache miss handler may generate a new rule with Rtag assigned Mtag. For example, if the pointer PTR is red and the memory cell pointed to by PTR is red, the instruction invoking the rule is allowed and the resulting tag Rtag should be red. To generate the foregoing as a new rule to be inserted in the rule cache, the HW cache miss handler may first compare OP1tag to Mtag. If they are not equal, there has been a rule violation and the instruction is not allowed (e.g., cause processor to stop execution). If the HW rule cache miss handler determines OP1tag is equal to Mtag, the HW rule cache miss handler may generate as outputs of hardware the new rule including opcode=load, OP1tag=red, Mtag=red, and Rtag=red (all other tag inputs and outputs of the rule may be don't cares), where the generated rule may then be inserted into the rule cache.

Figure 66:
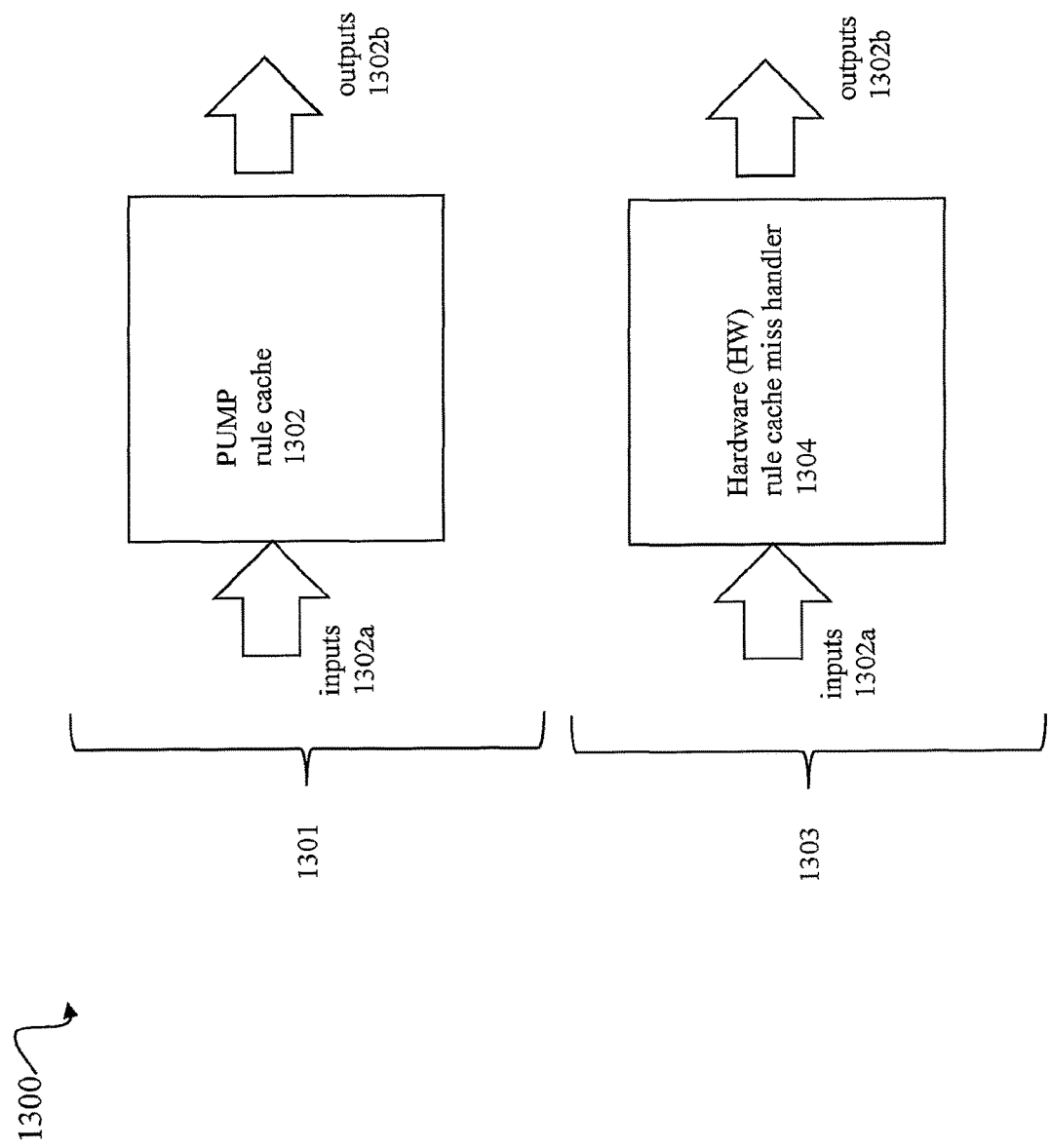
FIG. 66-67 illustrate different components providing hardware rule support in an embodiment in accordance with techniques herein.

Referring to FIG. 66, shown is an example illustrating a hardware implemented cache miss handler in an embodiment in accordance with techniques herein. The example 1300 includes 1301 which illustrates inputs 1302*a* input to the PUMP rule cache 1302 (e.g., FIG. 22) to perform a lookup to determine whether a rule matching the inputs 1302*a* is in the cache. If so, the outputs 1302*b* are determined based on the rule stored in the cache. Consistent with discussion elsewhere herein, the inputs 1302*a* may include the opcode and input tags—PCtag, CItag, OP1tag, OP2tag, Mtag. The outputs 1302*b* may include output tags of the rule such as PCnew tag and Rtag. In connection with an embodiment in accordance with techniques herein implementing the cache miss handler in software, upon the occurrence of a rule cache miss, the software cache miss handler may be invoked whereby code of the miss handler executes and calculates a new rule for the inputs 1302*a* causing the current rule cache miss. The cache miss handler first determines whether the inputs coincide with an allowable rule (e.g., for memory safety load rule, does OP1tag equal Mtag), and if so, calculate the outputs for the particular inputs 1302a (e.g., determine the Rtag as Mtag) thereby generating a rule for the inputs 1302a. The new rule (which is based on the combination of the inputs 1302a and the calculated outputs of the miss handler) is inserted into the rule cache. Consistent with discussion elsewhere herein, the new rule may include the opcode, input tags—PCtag, CItag, OP1tag, OP2tag, Mtag—and output tags—PCnewtag, Rtag.

Element 1303 illustrates the HW rule cache miss handler 1304 that may be used in an embodiment in accordance with techniques herein rather than the software rule cache miss handler. In such an embodiment, the HW rule cache miss handler 1304 may be implemented using dedicated hardware including, for example, gate-level logic and other hardware components. In such an embodiment, the HW miss handler 1304 may take the same inputs 1302a as the PUMP rule cache 1302 and may generate, using its hardware, the same outputs 1302b that would be output the PUMP rule cache. Subsequently, a new rule may be formed by combining the opcode, input tags and output tags as noted above. The new rule may then be stored in the PUMP rule cache (e.g. FIG. 22).

In at least one embodiment, the HW rule cache miss handler for the memory safety policy may be implemented as described above in hardware (e.g., using gate level logic) that, to load a rule into cache, may simply copy the memory-cell tag from the Mtag to the Rtag and immediately perform the PUMP rule insertion. Note in this simple case, there is no need to dereference memory and perform any data structure operations in memory.

Additionally, in at least one embodiment, memory safety may implement the memory cell's tag as a pair of tags: (1) memory-cell color tag, (2) pointer-color tag on pointer in the memory cell. Memory-safety acceleration may include dedicated caches to perform the combination of the Mtag and OP2tag into the new Rtag on a store, and to perform the extraction of the pointer-tag from an Mtag pair to place onto the Rtag for a load. Misses to these caches may use simpler, dedicated software handlers. While the foregoing is described for a single (non-composite) policy such as memory safety, the same general technique may be applied to a component of a composite policy on the UCP.

An embodiment may also perform hardware acceleration using HW rule cache miss handler for a limited common subset of rules such as those that are expected to be commonly referenced. For example, in memory safety, the rules for load/store and propagation during arithmetic are the most standard and stylized. Other, uncommon rules exist for initially coloring memory regions and reclaiming memory regions on free. Such uncommon rules may result in using the typical rule miss handler as described herein rather than being implemented with hardware support.

In at least one embodiment, a HW rule cache miss handler may directly implement a mapping function as gate-level logic. For example, such gate level logic may map an input tag to an output tag for rule such as mapping Mtag to Rtag for store instruction rules of the memory safety policy. As another example, a HW rule cache miss handler for a CFI (control flow integrity) policy may use gate level logic to make the tag of the control flow target or destination be a pointer to the set of allowed callers (e.g., source locations or addresses allowed to transfer control to the tagged particular control flow target or destination), allowing the CFI HW rule cache miss handler to read through the set for a match. As yet another example, a stack protection policy may encode the stack-frame-code tag and the associated stack-frame-memory-cell tag in a manner that allows hardware derived one from the other (e.g. they could differ by only a few bits, and this could be arranged even if the tags were pointers by allocating the stack-frame-code tag pointer and the stack-frame-memory-cell tag pointer together); consequently, a HW rule cache miss handler enforcing a stack protection policy would be able to determine the tag to create (in case of creating a tag from the stack pointer), or demand on the memory reference (in the case of a read or write) within such code.

As a variation from using HW rule cache miss handlers to calculate or determine a new rule which is then inserted into the PUMP rule cache, an embodiment may actually hardwire the logic of one or more rules of a policy where such rules are completely embodied and enforced in hardware and therefore not stored in the PUMP rule cache. For example, rather use a HW rule cache miss handler and PUMP rule cache for a policy, an embodiment may use hardware to enforce and encode the rules of the policy (e.g., rules of policy embodied in hardware such as gate level logic and circuits). In such an embodiment using both the PUMP rule cache and HW specified rules, a rule lookup may be performed of both the PUMP rule cache and also the HW specified rules. In this case, a miss handler (e.g., either a HW rule cache miss handler or a software miss handler) may be invoked to determine/calculate a new rule responsive to not finding a rule for the particular inputs in either the PUMP rule cache or the HW specified rules.

Composite policies present additional challenges and opportunities. Consistent with discussion elsewhere herein, a composite policy includes multiple policies simultaneously enforced for an instruction. The challenge is that the composite policies need resolution of several different policy components. The opportunity is that the entire sequence of resolution for the composite policy may be hardware supported using HW rule cache miss handlers for all the different policy components of the composite policy with the data cache, UCP caches (per UCP cache per policy component in the composite policy), and CTAG cache. From prior experience, a common challenge is where newly allocated memory (e.g., using malloc), hence new memory color tags, causes compulsory rule cache misses. In these cases, the memory safety policy component needs new rules, but the other components may likely already have their rules in the UCP caches. With hardware acceleration through HW rule cache miss handlers for the top-level composite policy and for the memory-safety color matching, memory rule resolution may be performed with a small finite state machine running in hardware and consulting the caches (e.g., data cache, UCP caches and CTAG cache) rather than requiring hundreds-to-thousands of cycles to resolve the rules running software-based miss handler code.

In at least one embodiment, the UCP caches may be decomposed by component policy and all resolved in parallel to produce the composite set of tag results to then be fed back into the CTAG cache. If all the policies may be resolved either by their UCP cache or by a simple hardware rule like the one for memory safety, the total time for lookup for the UCP caches would be that of a single policy rather than being proportional to the number of policies. This works perfectly if the number of component policies is fixed and matched to the hardware provided. Nonetheless, a slight variant simply distributes the component policies across the fixed, available number of UCP caches, so that the number of sequential UCP cache resolutions is only the ratio of the number of component tags to physical UCP caches.

Figure 67:
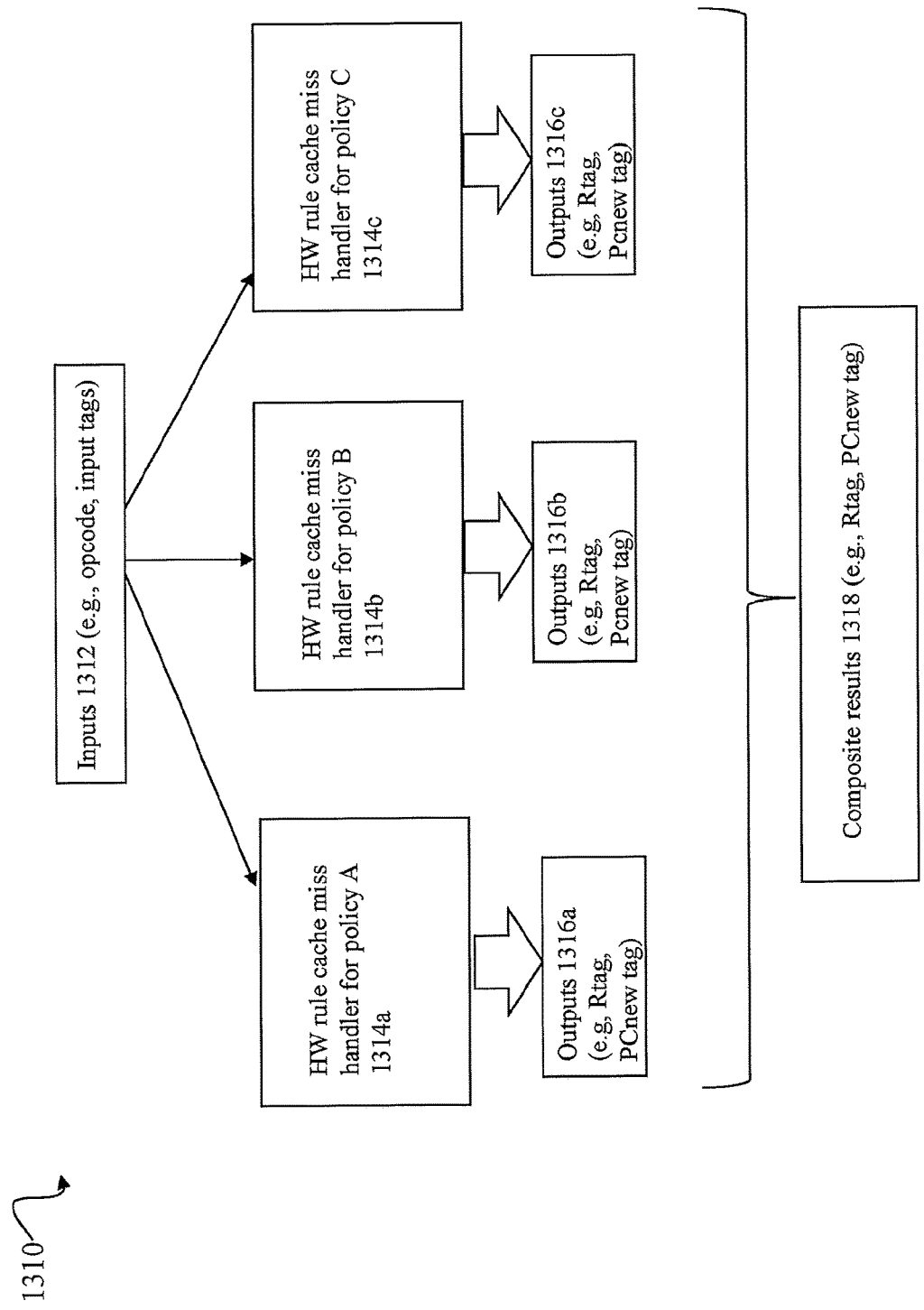

Referring to FIG. 67, shown is an example 1310 illustrating use of HW rule cache miss handlers in connection with a composite policy that may be used in an embodiment in accordance with techniques herein. In this particular example, 3 policies comprise the composite policy whereby all 3 policies are simultaneously enforced for the same instruction although more generally a composite policy may include any number of policies and is not limited to 3. Elements 1314a-c are HW rule cache miss handlers for the 3 policies comprising the composite policy. Inputs 1312 may be provided to each of the HW rule cache miss handlers 1314a-c which, respectively, determine or calculate rule outputs 1316a-c for the particular policy (e.g., HW rule cache miss handler 1314a determines outputs 1316a including Rtag and PCnew tag for policy A; HW rule cache miss handler 1314b determines outputs 1316b including Rtag and PCnew tag for policy B). Subsequently, the outputs 1316a-c may be combined into a single composite result 1318 denoting a composite Rtag and PCnew tag for the 3 policies. The combining of the outputs 1316a-c to determine composite results 1318 may also be implemented using hardware or software. A new rule may be inserted into the cache where the new rule includes the inputs 1312 (e.g., opcode and inputs tags) for the particular instruction triggering the rule cache miss handling along with the composite results 1318 (e.g., composite values for Rtag and PCnew tag).

Additionally, although not illustrated in the example 1310, an embodiment may use the UCP caches and CTAG cache in combination with the HW rule cache miss handlers 1314a-c in an embodiment in accordance with techniques herein. As described elsewhere herein (e.g., in connection with FIGS. 21, 23 and 24), each of the policies A, B and C may have its own UCP cache caching results of the most recent policy result tags (e.g., UCP cache for policy A stores recently calculated result tags by miss handler 1314a—PCnewtag and Rtag results—based on the combination of opcode and input tags of an instruction). As described elsewhere herein (e.g., in connection with FIGS. 21, 23 and 24), the CTAG cache may store composite results for Rtag for a particular combination of individual Rtag values as may be output from multiple composite policies such as policies A, B and C. The CTAG cache may also store composite results for PCnewtag for a particular combination of individual PCnew tag values as may be output from multiple composite policies such as policies A, B and C. Thus, the hardware that generates the composite results 1318 from outputs 1316a-c may use information from the CTAG cache to determine the composite results 1318. Additionally, the HW rule cache miss handlers 1314a-c may also have as inputs information from the UCP caches for the policies A, B and C.

As an alternative to having HW rule cache miss handlers for all 3 policies of the composite policy as in the example 1310, an embodiment may selectively choose to implement HW rule cache miss handlers for one or more, but less than all, such policies comprising the composite policy. In such an embodiment, a portion of the rule cache miss handlers may be implemented in hardware and the remaining portion of the rule cache miss handlers of the composite policy may be implemented in software as described elsewhere herein.

It should be noted that some policies as described herein may allocate new tags such as, for example, in connection with a memory safety policy. In at least one embodiment, the HW rule cache miss handler for a policy such as memory safety that may allocate new tags may be provided with a FIFO-based cache of new tag values that the HW-based handler may use (e.g., cache of tags that may be used as the newly allocated tag values generated. If the tag allocated is a pointer denoting an address, then the cache includes addresses or pointers rather than the tag values). In this manner, the HW rule cache miss handler may perform allocation simply by reading the top entry from the FIFO-based cache. Periodically, software handlers may be executed the metadata processing domain to refill the FIFO-based cache with new tags available for allocation.

Embodiments are described herein where there is complete and strict isolation between the metadata processing domain and the "normal" code processing of the user code or execution domain. As a variation, an embodiment may take a more relaxed approach and expand the foregoing strict isolation model which still does not allow modification or writing of information by the user code or execution domain to the metadata processing domain but may allow information/values to be returned by the metadata domain to the user code or execution domain.

What will now be described are techniques that may be included in at least one embodiment which may utilize the foregoing more relaxed approach whereby the metadata processing domain returns a value that may be used or referenced by code executing in the normal code processing or execution domain (e.g., metadata processing returns a value that is an input to the normal or user code execution domain). For example, as described elsewhere herein, an embodiment may use malloc and free routines where such routines have their code tagged with instruction tags providing them with unique capabilities needed so that code of malloc and free, when executed, trigger rules which allow malloc and free the ability to perform their processing accessing malloc metadata, generating new color tags, tagging user data areas with such new color tags, and the like. The foregoing provides such privileges or abilities uniquely assigned to malloc and free at the exclusion of other code, such as user code. Now consider such an embodiment where malloc and free perform their processing and code tagging is utilized to specially tag malloc and free code by the loader with a special code tag(s) uniquely identifying such code as belonging to malloc and free with special execution privileges. In such an embodiment, it may be the case that user code making a call to free, for example provides a pointer PTR1 which has been corrupted or otherwise does not point to the beginning of the previously allocated storage area which is now being deallocated. PTR1 may be presumed, by free, to point to the first location of the user data area previously allocated by malloc. Free may assume a predetermined structure to the user data area and associated memory locations of the memory heap such as described in connection with FIGS. 64 and 65, for example, where the malloc metadata is stored in a predetermined location relative to the allocated user data area.

What will now be described are techniques that may be used in an embodiment to have the PUMP return a value to the code execution domain.

Figure 68:
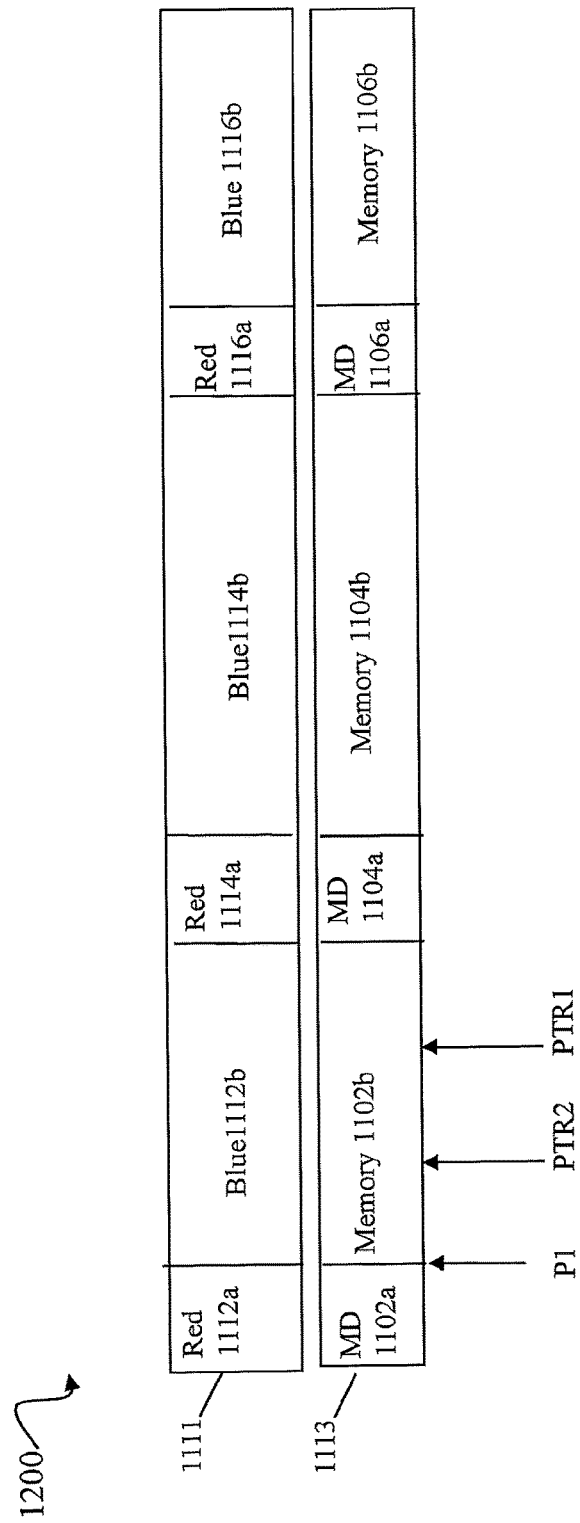
FIGS. 68-70 are examples illustrating use of techniques herein in an embodiment where the PUMP returns a value.

With reference to the example 1200 of FIG. 68 shown are elements 1111 and 1113 as described in connection with example 1110 of FIG. 65 further annotated with pointers PTR1 and PTR2 discussed below. Assume that user code invokes free with PTR1 with the intent to deallocate memory block 1102b. P1 may denote the pointer or address expected by free. However, PTR1 in this example may denote a corrupted or incorrect address that generally denotes a different address other than P1 (e.g., PTR1 may identify a location in memory 1102b, or may denote an address not even pointing into the heap). Although PTR1 has been corrupted or otherwise does not point to the correct memory location P1, free may perform processing using PTR1 to access malloc metadata using relative addressing relative to PTR1 where the malloc metadata is assumed to exist in its predefined structure, format or layout. For example, the malloc metadata area used by free may be presumed to be located immediately prior to the allocated user data portion as in FIGS. 64 and 65. In such a case, the code of free may determine the malloc metadata it uses in processing to deallocate a particular memory block is located at a particular offset OFF1 prior to PTR1 based on a predetermined layout. For example, with reference to FIG. 68, free may presume that PTR1=P1 where PTR1 may be provided by the user code on the call to free. Free may use relative addressing as described above based on a predefined data layout that the corresponding malloc metadata 1102*a* for the memory block 1102*b* to be deallocated should begin at the memory location with address PTR2=PTR1−OFF1. In this example, PTR1 does not equal P1 and PTR1 actually points to somewhere in the allocated memory block 1102*b* so that the address calculation PTR2=PTR1−OFF1 is also in the user allocated memory block 1102*b* (PTR2 denotes the expected beginning of the associated malloc metadata used by free).

In such a case where PTR1 provided by the user code on the free invocation does not point to the expected location P1 and whereby PTR2 denotes the presumed beginning of malloc metadata used by free, code of free may incorrectly access data stored in memory block 1102*b* using such data as its malloc metadata which causes a violation, interrupt or trap (e.g., may be due to a rule violation detected by the PUMP, or other code execution error condition during execution of free). Thus, the execution of code executing in the user process space or domain may be aborted due to the foregoing violation during execution of the routine free as invoked in the call to free using PTR1 from user code. Rather than have routine free cause the foregoing abort of user code, it may be desirable to allow code of free to query the PUMP, or more generally, the metadata processing to return a value. The returned value may be, for example, a Boolean denoting whether the color associated with PTR2 (as will be used by code of free to access malloc metadata) actually points to a valid or expected malloc metadata area. Using such a returned PUMP or metadata processing value allows free to perform different conditional processing based on the whether the color associated with the memory location at address PTR2 denotes a valid malloc metadata color, such as red. Routine free may perform some recovery or other action if PTR2 identifies an invalid malloc metadata area as determined through the color of PTR2. Such action may be more desirable than having the user code aborted due to a rule violation, trap, interrupt or other execution error.

In at least one embodiment using the RISC-V instruction set, to implement returning a metadata processing value, a new instruction, gmd (get-metadata-info), may be added to the RISC-V instruction set such as:
  gmd R1, R2, R3
where
  R1 contains the result value returned by the PUMP or metadata processing;
  R2 contains the address PTR2 which is tagged with the color of the memory location having address PTR2; and
  R3 is tagged with the valid color as expected for a valid malloc metadata area.

Thus, R2 and R3 may be registers that are input or source operands, and R1 may be the register containing the result or output. In this particular example, R3tag may be red denoting the color of a valid malloc metadata area and R2tag may be blue. The rule invoked by the new instruction may output a return value as a Boolean in this example denoting whether R2tag=R3tag where the foregoing Boolean result may be the return value output by metadata rule processing (e.g., PUMP output) stored in register R1 accessible to free included in the address space of user executing code. It should be noted that R1 may be tagged with Rtag as the result tag consistent with discussion elsewhere herein.

The following describes logical processing that may be performed by code of free using a C-like pseudo code description with PTR1, PTR2, and OFF1 as described above:

```
free (char *PTR1)
    PTR2 = PTR1 − OFF1; /** PTR
    if (IS_RED (PTR2)) then
        PTR2 points a validly colored malloc metadata area.
Perform processing to         deallocate.
    else
        PTR2 does not point to a validly colored malloc metadata
area. Perform recovery processing.
```

In the above logical processing, IS_RED may check to see if PTR2 is the color RED.

The recovery processing performed by code of the above-noted else block may, for example, try to locate the beginning of a valid malloc metadata area by searching backward or forward from PTR2. Code of the above-noted else block may allow termination of user code in a more defined an expected manner such as with a runtime error message/condition denoting the invalidly colored pointer PTR2.

The new instruction Get metadata info R1, R2, R3 may be included in instructions generated, for example, as a result of compilation and linking code of a free routine written in C to perform the above-noted logical processing. An embodiment may want to control or restrict what particular code portions may be allowed to execute this new instruction. PUMP rules may be used to mediate or restrict when this new instruction is allowed to be executed by what routine. For example, code of free or malloc may be allowed to execute the new Get metadata info instruction but not user code. Any suitable technique, some of which are described herein, may be used to provide the routine free with the needed privilege or authority to execute the new instruction returning a PUMP value. For example, code of free may be tagged with a special instruction tag denoting that free is allowed to execute the new instruction. For example, a loader may tag the new instruction appearing in free code with a special tag NI. Rules may be used to mediate or restrict what code may be allowed to invoke the new instruction to those having an instruction tag (CI tag) of NI.

Figure 69:
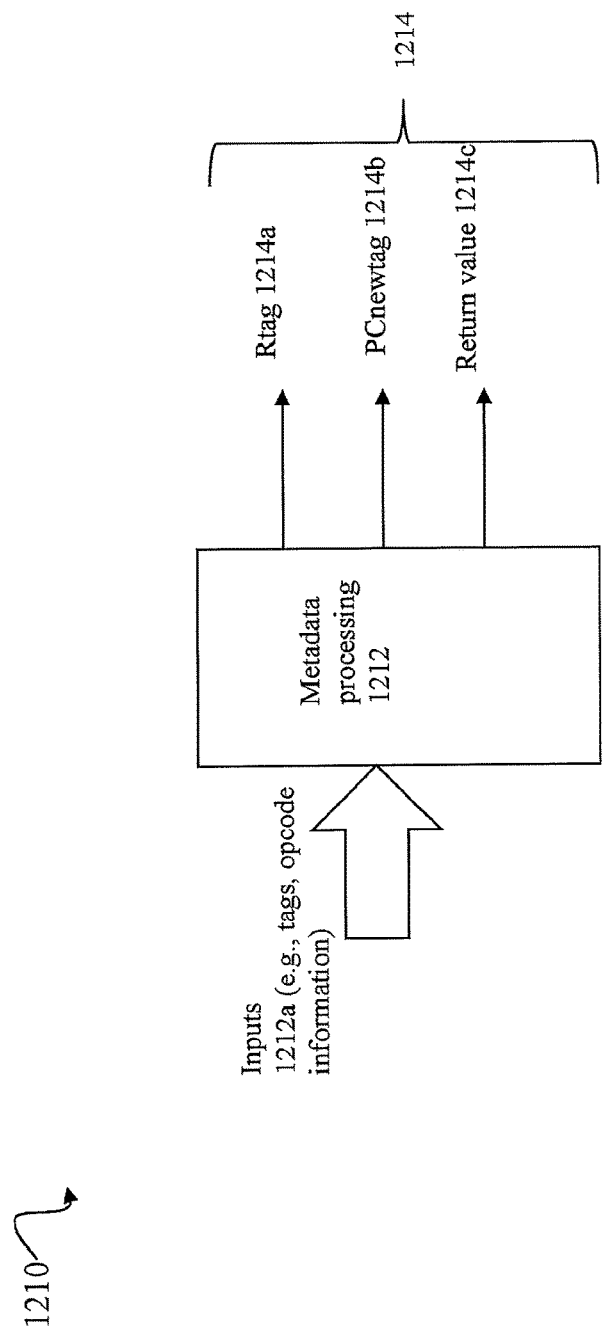

Referring to FIG. 69, shown is an example 1210 illustrating inputs and outputs of metadata rule processing in an embodiment in accordance with techniques herein. Element 1212 may generally denote metadata processing as described herein. Inputs 1212*a* to metadata processing may include, for example, the various tags and opcode information as described herein. Outputs 1214 generated by metadata processing 1212 may include the Rtag 1214*a* and PCtag 1214*b* as described elsewhere herein. Additionally, metadata processing may generate a new output that is the return value 1214*c*. The return value 1214*c* may be placed in a register, such as R1 denoted above with the new instruction, which is in the set of registers accessible to user process space/code execution. Consistent with description elsewhere herein, 1214a and 1214b denote tags which are placed, respectively, on a result (e.g., result register or memory location) and the PC, whereby 1214a-b are not accessible to user process space/code execution. It should be noted that whether metadata processing returns the return value 1214c may be conditional on the particular instruction or opcode. For example, as described elsewhere herein, the metadata processing outputs may be filtered as described in connection with FIGS. 27-33 based on opcode using a multiplexer to enable/disable outputting return value 1214c. Value 1214c in this example denotes a logical result of whether or not R2tag=R3tag when the opcode is that of the new instruction. Otherwise, if the opcode does not denote the new instruction opcode, a default value may be conditionally returned by metadata processing as the return value 1214c.

Figure 70:
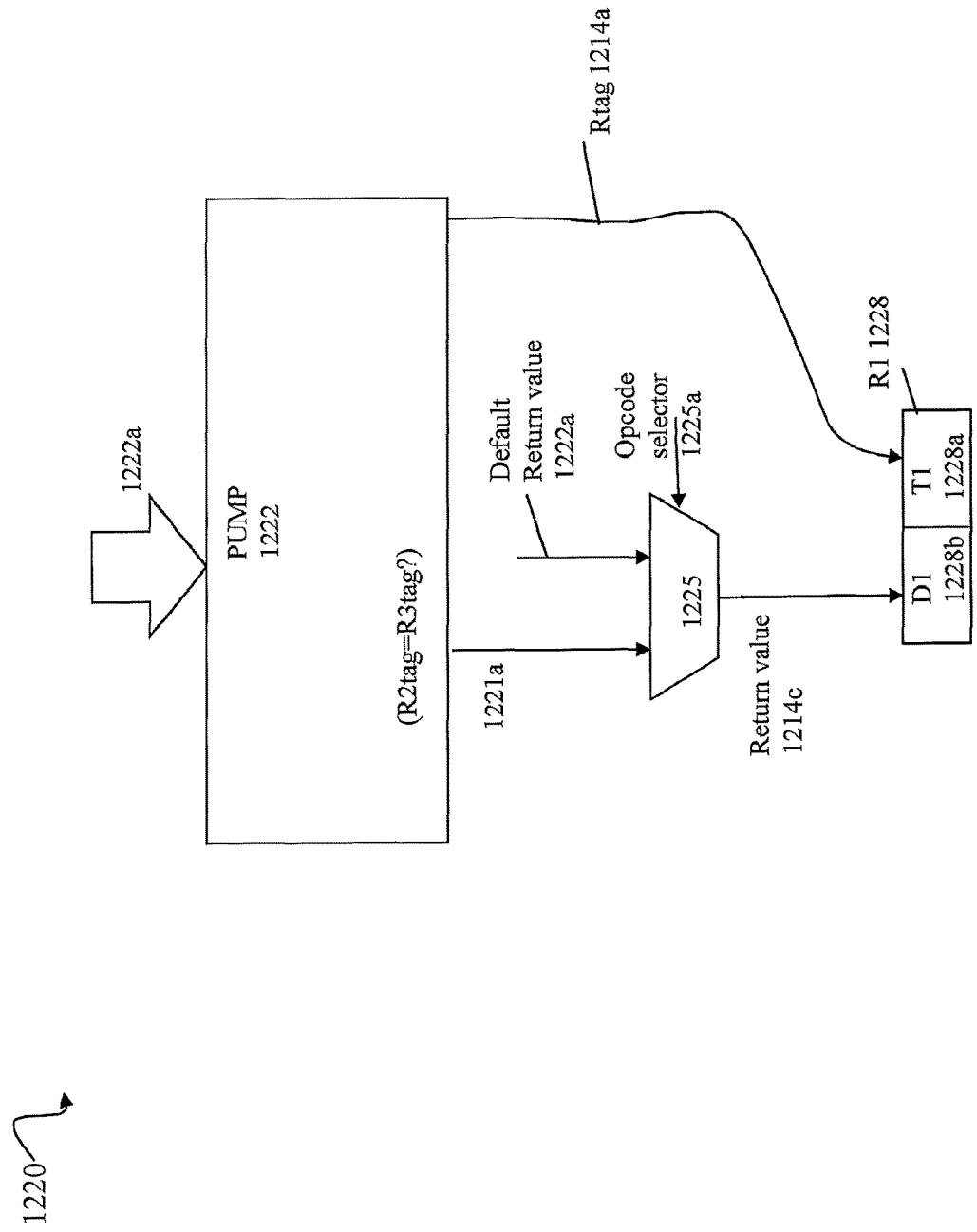

Referring to FIG. 70, shown is an example 1220 illustrating components and processing that may be performed in an embodiment in accordance with techniques herein when returning a value by metadata processing to the user execution domain, such as when executing the new instruction included in code of free as described above. For simplicity of illustration, the example 1220 illustrates logic and components of metadata processing employed only with the destination or result register R1 for this new return value and the associated result register. Element 1222a may generally represent PUMP inputs (e.g., tags such as the R2tag and R3tag in this example, opcode) as described elsewhere herein for metadata processing. PUMP 1222 may include rules for the new instruction which check if the code tag is NI, and outputs a logical result denoting whether R2tag=R3tag (e.g., OP1 denoting the first input source operand R2 and OP2 denoting the second input source operand R3 in this example). The rule results in outputting the foregoing logical result 1221a. Element 1225 may denote a multiplexer with the opcode used as the selector 1225a for the multiplexer 1225. When the opcode of the current instruction denotes the particular opcode for the new instruction Get metadata info, 1225a results in selecting 1221a to be output as the return value 1214c. Otherwise, if the opcode is not that of the new instruction, 1225a results in selecting a default return value 1222a as the return value 1214c. The return value 1214c is a PUMP output stored in the destination register, RD, 1228 (e.g., 1214c is stored in D1 1228b denoting the contents stored in register RD accessible to code executing in the user process address space). Since RD 1228 is the result register, the rule may also result in tagging RD with Rtag (e.g., Rtag is stored in tag portion T1 1228a where T1 is the tag word of the RD register). In at least one embodiment, Rtag may be a special tag SPEC1 denoting that RD contains the output of the new instruction. Based on symbolic logic as described elsewhere herein where tag inputs to the rule are (PCtag, CItag, OP1tag, OP2tag, MR tag) and rule outputs are (PCtag, Rtag) along with a third output, NEWOUT denoting the new return value 1214c, the rule may be expressed as:

gmd: (-, NI, t1, t2, -)→(-, SPEC1, NEWOUT)

where NEWOUT=1 if t1=t2 and NEWOUT=0 otherwise.

More generally, the foregoing use of a new instruction may be used in an embodiment in accordance with techniques herein to return a value that is any suitable and desirable value that may be used by code specially tagged (e.g., with NI) to denote those occurrences of the new instruction that are allowable via invoked metadata processing rule(s).

Alternate embodiments may avoid adding a new instruction. This can be done by code-tagging an existing instruction to control this behavior and setting the care-bit to select the value output in this case. Another alternative may add a value-output-care-bit that is also an output of the PUMP so that the rule can determine the cases in which the value output should flow to the RD value result. This second case allows the opcode to behave normally when not tagged, and only exhibit this special behavior when given the appropriate code tag.

Figure 71:
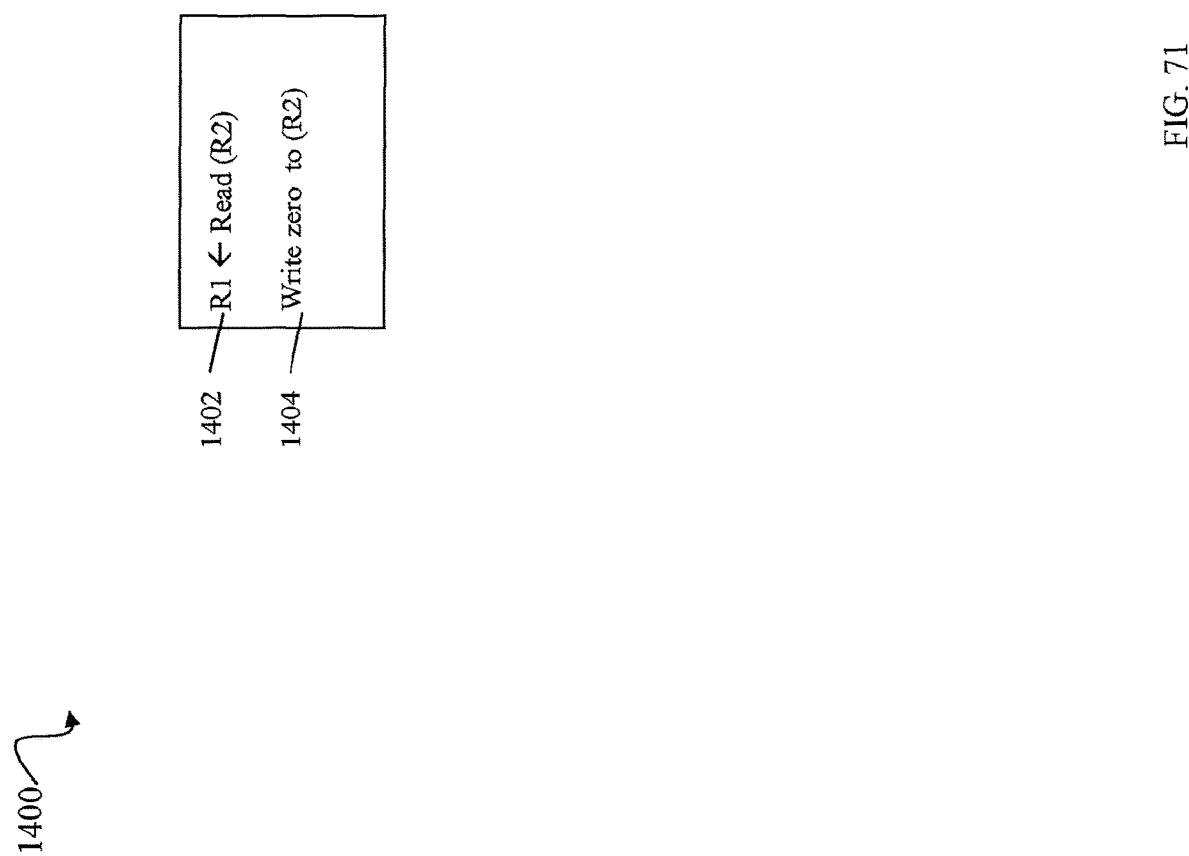
FIG. 71 is an example illustrating use of techniques herein in an embodiment with a sequence of instructions.

What will now be described are techniques that may be used to guarantee that a particular sequence of instructions is performed atomically as a single unit or complete sequence in a specified order from the first instruction to the last instruction of the sequence. Additionally, such techniques guarantee that there is no transfer of control into the sequence of instructions other than to the first instruction of the sequence and that there is no transfer or exit out of the sequence other than through the last specified instruction of the sequence. For example, consider the simple instruction sequence of FIG. 71.

In the example 1400, shown is a sequence of 2 instructions 1402 and 1404. The first instruction 1402 reads or loads contents from a memory location (where the address of the memory location is stored in R2) to R1. The second instruction writes or stores a zero (0) to the same memory location (the memory location having the address stored in R2). Such an instruction sequence may provide for ensuring that a value read from a memory location (having the address specified in R2) is used only once whereby the old value is erased or zeroed out from the memory location immediately after the value is read from the memory location. Thus, the zeroing out of the memory location is performed by the second instruction 1404 of the sequence and is required to be performed as the next instruction in the sequence after the first instruction 1402 that reads the value from the memory location.

In at least one embodiment in accordance with techniques herein using a RISC architecture, rules may be used to enforce the foregoing linearity of a data item and atomicity of the instruction sequence of 1400. In such an embodiment, the PC tag (PC new tag) may be updated to communicate the state of the sequence of the next expected instruction in the sequence. In at least one embodiment, one solution is to tag the instruction 1402 with a CI tag denoting it as a linear read instruction. Additionally, (R2), denoting the memory location having the address stored in R2, may be typed and tagged as a linear variable with a unique metadata id X1 (e.g., X1 uniquely identifies this linear variable from all other linear variables). A first rule may be triggered as a result of the first instruction 1402. The first rule may indicate that only instructions tagged as linear reads are allowed to read from linear variables. Additionally, the resulting PCnew tag may be clear-linear-variable-X1-next to denote that the next instruction executed needs to clear the linear variable X1. A second rule may be triggered as a result of executing the second instruction 1404 where the value of the operand, zero (written to the memory location), is tagged with a special EMPTY tag denoting the special value used to initialize or clear the memory location. Additionally, the memory location is required to be the linear variable X1 denoting the particular tagged linear variable from the immediately preceding instruction 1402. If the second instruction following 1402 does anything other than write an EMPTY value to linear variable X1, a trap is caused. Thus the second rule enforces the desired sequentially and atomicity of the sequence of instructions in 1400.

More specifically, assume the first instruction 1402 is a load instruction that loads into R1 the contents from the memory location having the address stored in R2. The load instruction may be as follows:

load R1, (R2)

Additionally, assume the second instruction 1404 is a move instruction that move zero (0) into the memory location having the address stored in R2. The move instruction may be as follows:

move 0, (R2)

Following conventions noted elsewhere herein a rule may be defined as an opcode, input tags—PCtag, CItag, OP1tag, OP2tag, Mtag—and output tags—PCnewtag, Rtag. Based on the foregoing rule conventions, for the first load instruction, OP1 is R1, OP2 is R2 and (R2) is the memory location tagged as Mtag. The first rule triggered by the first load instruction may be:

load: (-, linear read, -, -, linear variable X1)→(clear-linear-variable-X1-next, -)

Based on the foregoing rule conventions, for the second store instruction, OP1 is 0, OP2 is R2 and (R2) is the memory location tagged as Mtag. The second rule triggered by the second move instruction may be:

move: (clear-linear-variable-X1-next, -, EMPTY, -, linear variable X1)→(default tag, -)

This example shows how tags and rules can be used to guarantee the indivisibility of a particular instruction sequence. One skilled in the art can readily see that this general technique can be applied in many other scenarios where it is desirable to enforce that data may only be accessed in a particular way as part of a specific sequence of instructions. One skilled in the art can also readily see that this technique can be adopted for any case where strict enforcement of an instruction sequence is required. As noted above, the general technique involves tagging the new PC (e.g., PCnew tag) from instruction N in the sequence with a special tag that is checked as the PC tag in a rule triggered by the next expected instruction N+1 in the glued sequence.

What will now be described are techniques that may be performed as part of booting or starting up a system in an embodiment in accordance with techniques herein based on the RISC-V architecture. Following paragraphs may refer to various CSRs described elsewhere herein such as in connection with the example 900 where such CSRs may be used in connection with the metadata processing domain.

As described elsewhere herein, a bootstrap tag may be hardwired or a value stored in a particular ROM location. As part of booting the system, a segment of bootstrapping code may be executed that generally performs initialization including initializing different CSRs, memory and the like. As part of initializing, such processing also initially tags memory locations with a default tag value derived from an initial bootstrap tag. In at least one embodiment, a CSR such as the boottag CSR (e.g., sboottag CSR as in the example 900) may be initialized with a special bootstrap tag used as the initial "seed" tag from which all other tags in the system are derived. Different code entities, such as a loader, may have their instructions specially tagged (e.g., CI tags set to special instruction tag) to thereby designate the loader as having particular privileges or authority to perform tasks that other code not having the special instruction tag is not allowed to do. The foregoing may be enforced using rules triggered by code of the loader that examine the CI tag to ensure it is the special tag in order to have the triggered rule perform a desired tagging operation. Thus, for example, the special CI tag used to tag instructions of the loader may be generated or derived from the bootstrap tag as a result of special rules triggered by executing code as part of the startup process. Generally, once some portion of code or stored instructions are tagged, rules may be triggered by execution of such tagged code to generate more desired tags and also place such generated tags on code and data. The foregoing and other aspects are described in more detail below.

At startup or booting of the system, the tag mode such as stored in the tagmode CSR (e.g., 901r of the example 900) may initially be off (e.g., 911a of the example 910). A bootstrap ROM program may be executed that first directly sets the default tag CSR (e.g., 901c of the example 900) to a special default tag value. Subsequently, the bootstrap program may set the tagmode CSR to a mode whereby the metadata processing domain writes the default tag as stored in the default tag CSR on all results. In other words, while in defaulttag tag mode (e.g., 911b of the example 900), the PUMP output Rtag is always the default tag value.

Subsequently, after memory locations have been initialized and tagged with the default tag, processing may be performed to generate an initial set of tags that will be used to further generate or derive all other subsequent tags (e.g., the initial set may be further used to derive one or more other generations of tags in an unbounded manner). Such processing may include executing an instruction sequence or code segment that triggers rules to generate the initial set of tags. In this case, the tag mode may be set to an appropriate tag mode level that engages the PUMP during execution of the code segment. For example with reference to the example 910 if boot code is executing in hypervisor mode, the tag mode may be set to either x110 as denoted by 911e or x111 as denoted by 911f to engage the PUMP during execution of the code segment whereby rules are triggered and enforced as a result of the code segment instructions.

It should be noted that prior to executing the above-noted code segment, processing may be performed to verify or validate the code segment. For example, in at least one embodiment, the above-noted code segment may be stored in an encrypted form where, prior to executing, the code segment is decrypted and verified or validated (e.g., such as using a digital signature) to ensure the code segment has not been tampered with or modified.

To further illustrate, the bootstrap program may include in the above-noted code segment 4 instructions executed while the PUMP is engaged to thereby generate an initial set of tags:

1. R1←read boottag CSR
2. Add R2←R1+1
3. Add R3←R2+1
4. Add R4←R3+1

In instruction 1 above, R1 is a general-purpose register. Instruction 1 reads the boottag CSR, transferring both the value stored in the boottag CSR and the tag stored in the boottag CSR onto R1. The boottag CSR was either set to hold a particular tag during processor reset or by privileged mode write of the CSR, including its tag. The read from the boottag CSR may also clear the boottag CSR so that it is not available to be retrieved after this initial retrieval during boot.

In each of the add instructions forming instructions 2-4 of the above of the form "Add Rn←Ry+1" wherein Rn denotes the target or result register to store the results of the Add, and wherein Ry also denotes a register a source operand. Instruction 2 of the foregoing code segment may trigger a second rule that generates a second tag from the first tag and places the second tag on the memory location pointed to by R2. Instruction 3 of the foregoing code segment may trigger a third rule that further generates a third tag from the second tag and places the third tag on the memory location pointed to by R3. Instruction 4 of the foregoing code segment may trigger a fourth rule that further generates a fourth tag from the third tag and places the fourth tag on the memory location pointed to R4. In this manner the foregoing code segment may be used to generate an initial set of 4 tags stored as tag values on registers. The foregoing general technique may be further extended in a similar manner to generate any desired number of tags of the initial set.

Generally, in generating an initial set of tags in at least one embodiment, the particular number of tags in the initial set may be a predefined number. Each of the special tags may be generated as a result of a different unique rule triggered when executing an instruction. Each instruction, such as in the code segment above, may result in a cache miss and thereby result in execution of the cache miss handler to calculate the Rtag as part of the rule outputs for the particular instruction, where Rtag is one of the tags of the initial set. In a manner similar to the instructions of the code segment above, a different code sequence may be executed at different points in time to further generate other tags using one of the tags of the initial set. Thus, each tag in the initial set may denote a tag generator used to further generate another sequence of tags. In the foregoing example, the Add instruction may be used in generating a next tag generator that may be used to generate another entire sequence of tags. As discussed below, a tag generator of the initial set (which is itself a further tag generator used as a starting point to generate another sequence) may be distinguished from a regular or non-generating tag which cannot be further used as a generator to generate another sequence of tags. Thus, particular instructions such as ADD may be used to trigger rules and miss handling to generate a set or sequence of tag generators. This may be contrasted with another instruction, such as MOVE, which may trigger rules and miss handling to generate a non-generating tag in a sequence. In connection with code such as malloc, an ADD instruction may be similarly used to generate a new application tag color generator used to generate a sequence of different colors for a first application (e.g., new application tag color generator may be APP1 used to generate a sequence of different colors RED-APP1, BLUE-APP1, GREEN-APP1, etc for the particular application). A tagged ADD instruction may then be used to obtain the next tag in the particular applications specific sequence, such as one of RED-APP1-gen, BLUE-APP1-gen, or GREEN-APP1-gen. Then a tagged MOVE instruction may be used to generate the actual colors, RED-APP1, BLUE-APP1, or GREEN-APP1 from RED-APP1-gen, BLUE-APP1-gen, or GREEN-APP1-gen, respectively, (where RED-APP1, BLUE APP1, GREEN-APP1 cannot be used to further generate additional tag sequences).

The code segment of the bootstrap program that is executed while the PUMP is engaged may also include additional code that, when executed, triggers rules to tag kernel code/instructions and additionally tag other code modules or entities with any desired special instruction tags to enable such specially tagged code to have desired privileges or capabilities. For example, the code segment may include instructions that trigger rules to tag the loader code, and code of routines malloc and free with special instruction tags extending privileges or authority to such code to perform privileged tagging operations. The special code tags may be generated from the initial set of tags in a manner similar to that as noted above using a predetermined code sequence/set of instructions that triggers rules to generate further desired tags and also appropriately tag additional code and/or data with the generated tags.

In at least one embodiment, additional measures or techniques may be taken in connection with portions of the above-noted code segment. For example, the above noted 4 instructions used to generate the initial set of tags may be included in a first instruction sequence using rules of a "glue" policy to enforce sequentiality and atomicity such as described elsewhere herein (e.g., example 1400).

After the code segment noted above has been executed to generate the initial set of tags and further specially tag kernel code and any other desired instructions, control may be transferred to additional boot code. In at least one embodiment based on the RISC-V architecture, the additional boot code may be executed at a hypervisor privilege level. Such additional boot code may, for example, include instructions triggering loading of an initial set of rules into the PUMP. Once booting has been completed, the PUMP tag mode as denoted by the tagmode CSR may be set to suitable level to engage the PUMP in connection with user code such as executes at the user privilege level (e.g., set tag mode as in 911c of the example 910 to denote PUMP is engaged and operations in U (user) mode or privilege level only).

Figure 72:
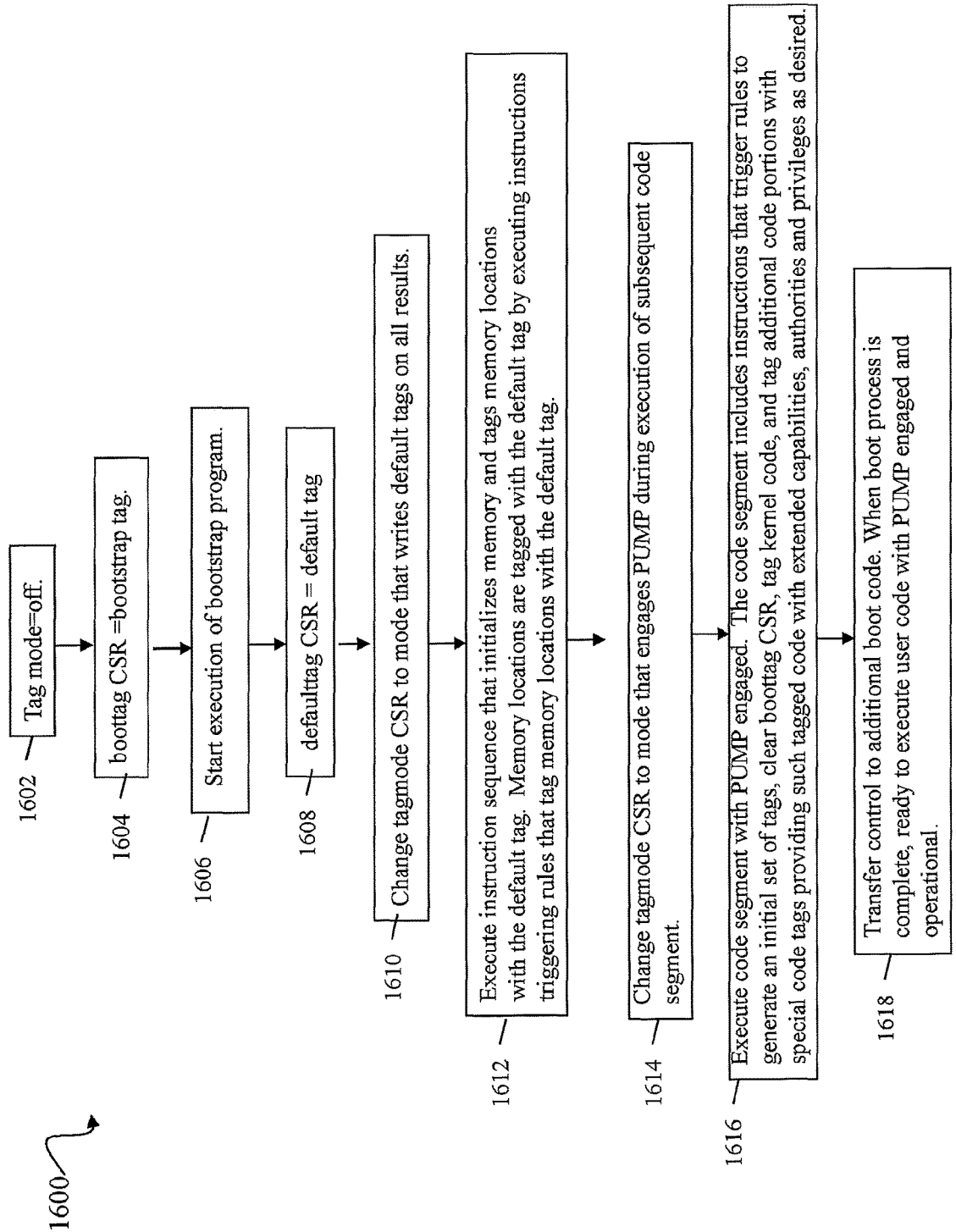
FIG. 72 is a flowchart of processing steps that may be performed in connection with booting a system in an embodiment in accordance with techniques herein.

Referring to FIG. 72, shown is a flowchart of processing steps that may be performed in an embodiment in accordance with techniques herein. The flowchart 1600 summarizes processing described above. At step 1602, tag mode is set to off where the tagmode CSR denotes the PUMP off state as described elsewhere herein in connection with 911a of the example 910. At step 1604, the boottag CSR is initialized to the special bootstrap tag. At step 1606, execution of the bootstrap program is commenced. At step 1608, the bootstrap program may set the defaulttag CSR to the default tag. At step 1610, the tagmode CSR may be modified to a mode that writes the default tag on all results (e.g., each Rtag=default tag while in this tag mode). At step 1612, instructions may be executed that trigger rules to initialize memory locations and tag the memory locations with the default tag. At step 1614, the tagmode CSR may be changed to a mode that engages the PUMP during execution of subsequent code segment in step 1616. At step 1616, the subsequent code segment is executed with the PUMP engaged. The code segment includes instructions that trigger rules to generate an initial set of tags, clear boottag CSR, tag kernel code, and tag additional code portions with special code tags providing such tagged code with extended capabilities, authorities and privileges as desired. At step 1618, control may be transferred to additional boot code that is executed. When the boot process is complete, the system is now ready to execute user code with the PUMP engaged and operational for executing user code.

Figure 73:
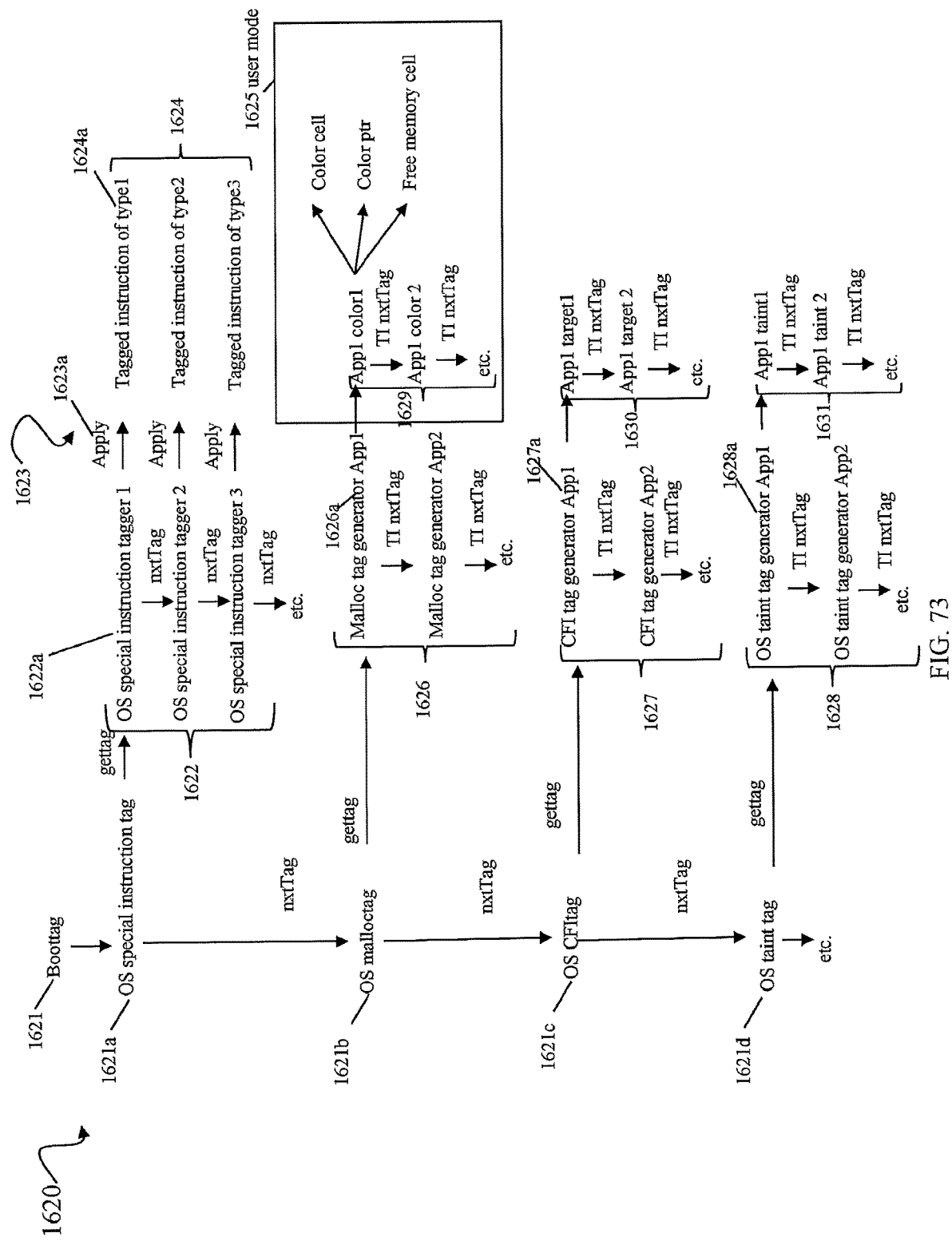
FIG. 73 is an example of a tree tag hierarchy in connection with tag generation in an embodiment in accordance with techniques herein.

What will now be described in more detail is how to generate tags from the bootstrap tag. The tag generation processing commencing with the bootstrap tag may also be referred to as a tag tree or tree of life. More generally, the tag generation process forms a hierarchical structure as illustrated in the example 1620 of FIG. 73.

The example 1620 illustrates the boottag 1621 as the root of the tag generation process. Element 1621a-d may denote the initial set of tags such as generated as described above. In this example, the initial set of tags 1621a-d may include an initial OS special instruction tag 1621a used to further generate a sequence 1622 of an unbounded number of special instruction tags which may then be applied 1623 to tag instructions of different code portions or modules 1624. From the initial OS special instruction tag 1621a, additional tags 1622 may be generated for the different modules to be tagged. For example, a first OS special instruction tag1 1622a may be generated for malloc which is applied 1623a to malloc code whereby instructions of malloc are tagged 1624a with the special instruction tag 1 1622a. In this manner, malloc code may be tagged with a special instruction tag identifying malloc as a tag generator (e.g, denoting that malloc code has privileges to further generator other new tags and further use the newly generated tags to tag other memory cells).

In this example regarding malloc, 1621b may be the initial malloc tag used to further generate malloc tag generator application tags 1626, one per user application since an instance of malloc is included in each user application. We want to give each such malloc instance in each user application the privilege to generate different colored tags as included in 1625.

Generally, the example 1620 illustrates an initial set of tags 1621a-d for Special Instruction tags 1621a, Malloc 1621b, CFI 1621c, and Taint 1621d. Thus, each of the tags 1621a-d in the vertical display of tags in the first row (other than boottag 1621) denotes a different initial tag used for a generating an unbounded tag sequence. For example, the value 1621a is used in further deriving or generating an unbounded number of special instruction tags 1622. The value 1621b is used in further deriving or generating an unbounded number of values 1626. Each instance of 1626 may be further used as a generator of another unbounded sequence of tags for each application. For example, 1626a denotes a generator value used to further generate another unbounded sequence 1629 of different colors used for a single application app1. In a similar manner, each different generator value of 1626 may be used to further generate an unbounded number of colors for each application.

The value 1621c may be used as a generator in further generating an unbounded number of values 1627. Element 1627 is similar to 1626 in that each occurrence of CFI tag generator n for a particular application or app N denotes a privilege or ability to further generate another unbounded sequence. For example, 1627a denotes a generator value used to further generate another unbounded sequence 1630 of different colors used for a single application app1. In a similar manner, each different generator value of 1627 may be used to further generate an unbounded number of colors for each application.

The value 1621d may be used as a generator in further generating an unbounded number of values 1628. Element 1628 is similar to 1626 and 1627 in that each occurrence of a tag generator n for a particular application or app N denotes a privilege or ability to further generate another unbounded sequence. For example, 1628a denotes a generator value used to further generate another unbounded sequence 1631 of different colors used for a single application app1. In a similar manner, each different generator value of 1628 may be used to further generate an unbounded number of colors for each application.

As illustrated sequences or subtrees for CFI and Taint originating, respectively, from 1621c-d are similar to the Malloc subtree originating from 1621b. In the example 1620, nxtTag or TInxtTag is used to denote a next element in a generated unbounded sequence, and getTag to extract a next tag from a sequence member. Generally, getTag may be used to denote extracting a tag to use which is, itself, not a tag generator. If the usable tag is going to be given to a particular code portion to use, we don't to want to also give the code portion the ability to generate tags. For example, we want to give each application a Malloc Tag Generator for that application (e.g. App1ColorTagX), but do not want to give the application the ability to generate the Malloc Tag Generator for other applications. So, getTag changes the type from generator to instance. The distinction between nxtTag and TInxtTag is that nxtTag is usable without a "tagged instruction", but TInxtTag is one that is only usable by a suitably tagged instruction.

The Malloc Application Tag sequence 1626 allows the operating system or loader to generate Color Tag generators for each application. For example, element 1626a denotes an application specific color tag generator value used to generate tags of the application color sequence 1629. Within an application, the AppYColorTag sequence 1629 allows malloc to generate an Authority for each color. That color authority can be used to: color the cells for allocated memory, color a pointer for the allocation and free cells of that color (e.g., when free is invoked). The use of colors such as with malloc and free are described elsewhere herein.

In this manner, different tags may be reserved for different uses. From initially tagged kernel instructions as noted above, kernel code may be executed that further tags other code portions with different capabilities or authority. For example, kernel code of the operating system may further tag other code entities, such as a loader, with special privileges such as granting the loader the ability to further tag other code and data, generate additional tag generators, and the like. The loader when loading a user program including malloc may further tag malloc code with special instruction tag(s) denoting it as malloc code giving it the capability to further generate other tags used to color different memory regions. A particular instruction tag placed on code of the loader thus provides the loader with one set of privileges. Placement of a second different instruction tag on malloc code provides malloc code with another different set of privileges. Generally, when performing tag generation of a sequence a current tag in the sequence is saved as state information which is referenced and used in connection with generating a next tag in the sequence. As described herein, such state information regarding the current tag in the sequence may be saved and used in the metadata processing domain. The current tag, or more generally metadata processing state information, may be saved and restored as a result of rule processing and cache miss processing. The current tag in a sequence, such as the last color allocated for use for a particular application, may be saved as a current state of the sequence as a tag on a specified memory location. When a new next color for the application needs to be allocated, code of malloc may trigger rules which retrieve the last allocated color for the application and use the last allocated color to determine the next color in the application-specific color sequence. Generally, generating a unique sequence of tags may include executing instructions that trigger rules that perform the following:

1. storing/saving sequence state in a tag portion of an atom (e.g., register, memory location);
2. executing an instruction that triggers a rule which generates the next tag of the sequence using the saved/stored sequence state; and
3. storing/saving the next tag of the sequence (generated from 2) in the tag portion of an atom where the next tag is now the updated current state of the sequence.

With reference back to the example 1620, the loader may allocate for each application using malloc a particular one of the malloc tag generator application tags of 1626. The loader may, for example, execute code triggering a rule which generates the next malloc tag generator tag, such as 1626a, and then stores this tag as state information via tagging a memory location. Subsequently, on a first call to malloc by the application, code of malloc may execute that triggers a rule which then retrieves the saved malloc tag generator tag, uses the saved tag to generate the first color for the application, and then updates the saved state information to store the first color as the last or most recent color generated for the application. On a second call to malloc by the application, code of malloc may execute that triggers a rule which then retrieves the previously saved first color, uses the saved first color to generate a second color for the application, and then updates the saved state information to now store the second color as the last or most recent color generated for the application. In a similar manner, other subsequent calls to malloc may be trigger other rules to allocate additional colors based on the saved state information (e.g., most recently allocated color) for the application.

What will now be described are aspects of a direct memory access (DMA) architecture that may be included in an embodiment in accordance with technique herein. Generally, described in following paragraphs is use of an I/O PUMP to mediate DMAs issued from a source, such as an untrusted device connected to a first interconnect fabric that uses untagged data, to access data stored in memory of a second interconnect fabric that uses tagged data.

Figure 74:
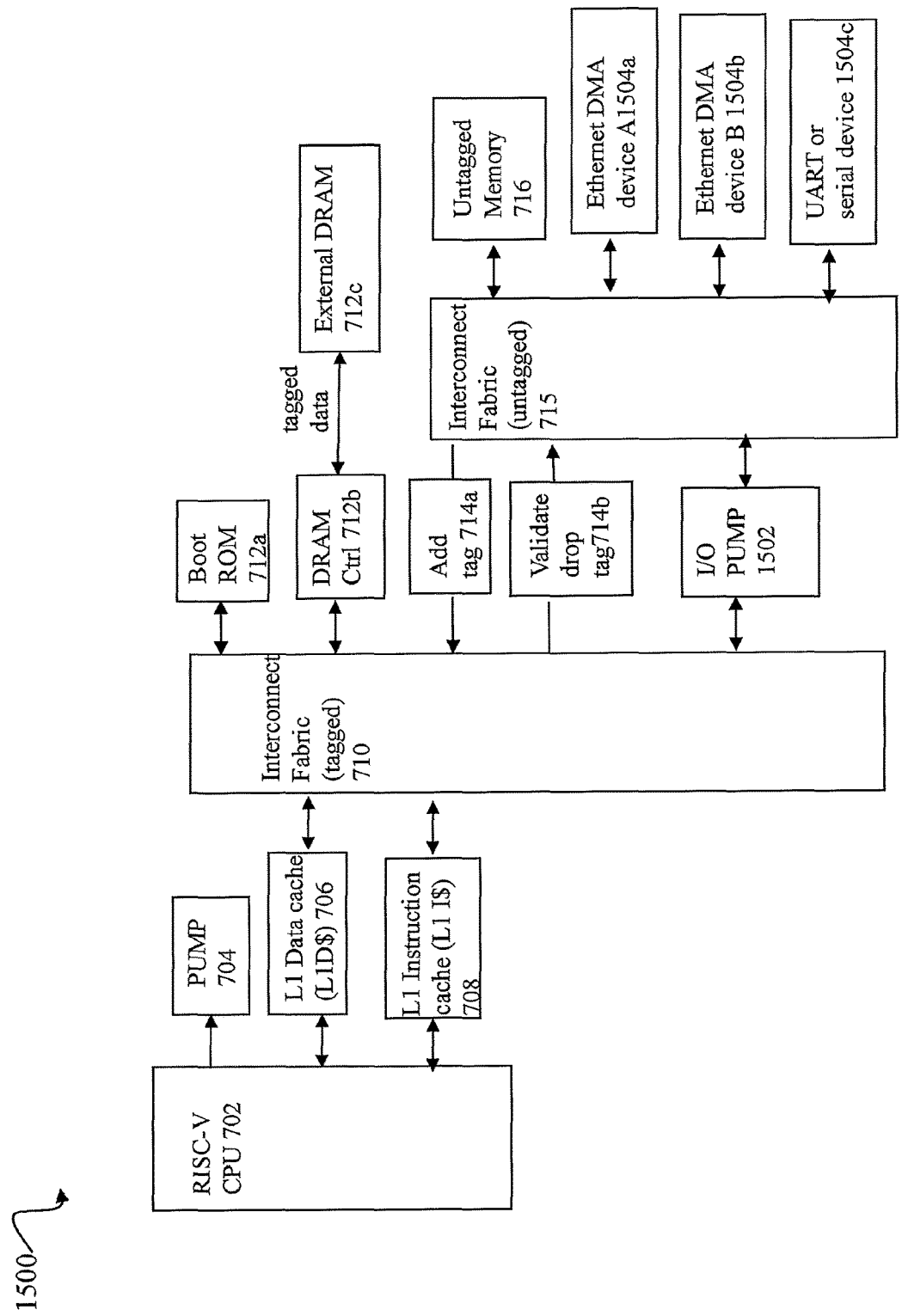

Referring to FIG. 74, shown is an example of components that may be included in an embodiment in accordance with techniques herein. The example 1500 includes components similarly numbered to those of the example 700 and others (e.g., FIGS. 57-60) described elsewhere herein. Additionally, the example 1500 also includes I/O PUMP 1502 and additional actors, DMA request sources or initiators 1504a-c that may issue DMA requests to access data stored in memory 712c. The example 1500 includes Ethernet DMA device A 1504a, Ethernet DMA device B 1504b, and UART (universal asynchronous receiver/transmitter) or serial communications device 1504c connected to the untagged fabric 715. A DMA request to read or write data may originate from one of the devices 1504a-c. The request is sent to the I/O PUMP 1502 which performs processing to determine whether the DMA request is allowed and if so, allows the request to proceed. Thus, the I/O PUMP 1502 may be characterized as mediating DMA requests received from over the untagged fabric 715 whereby the general assumption is that devices connected to 715 issuing such DMA requests may be untrusted.

In at least one embodiment, the I/O PUMP 1502 may be an instantiation of the PUMP as described herein (e.g., FIG. 22) with a difference that the rules enforced are those of a DMA policy controlling DMA access into memory 1712c. The foregoing use of the I/O PUMP 1502 is line with the general architecture of assuring that all instructions, including memory operations, are mediated by rules. If autonomous DMA devices 1504a-c were allowed direct, unmediated access to memory, the DMA devices 1504a-c may undermine the invariants and safety properties that the rules are enforcing. Consequently, to allow DMA, an embodiment in accordance with techniques herein may also enforce rules on DMA access into the memory 712c. Analogous to the PUMP that enforces rules for processor instructions, the I/O PUMP 1502 enforces rules for memory loads and stores from DMA devices, such as 1504a-c. Generally, the I/O PUMP mediates all loads and stores. In at least one embodiment described herein based on the RISC-V architecture, the I/O PUMP uses CSRs and performs rule cache miss handling in a manner similar to that as described elsewhere herein in connection with the PUMP used in a RISC-V architecture. The I/O PUMP 1502 has a set of CSRs similar to the PUMP, but accesses them via memory mapped addresses. Accesses to I/O PUMP CSRs such as described in following paragraph in connection with the example 1520 may also be tag protected using rules. Rule cache misses encountered when attempting to locate a rule in the I/O PUMP trigger an interrupt to be serviced by the processor, RISC-V CPU 702. The I/O PUMP uses the same rule resolution process as the processor 702 but there is a single DMA policy including only rules for DMA loads and stores to access data in memory 712c. The I/O PUMP writes atomically into memory 712c (e.g., writes the tag and value as a single atomic operation). However, in some embodiments, the complete process from reading the Mtag to writing the Mtag (e.g., processing to perform a tag check or validate and write) may not be atomically with a standard store.

The I/O PUMP 1502 is a rule cache for SDMP. The I/O PUMP provides a mapping between a set of tags involved in a DMA operation and the result of the operation. In at least one embodiment, the I/O PUMP runs independent of the processor 702. Since the I/O PUMP 1502 is a cache, it will take misses when it has never seen a set of inputs before (compulsory) or when it was unable to hold onto a rule (capacity, or perhaps conflict). This results in a rule cache miss with respect to the I/O PUMP in a manner similar to rule cache misses as described herein for the PUMP. Misses with respect to the I/O PUMP rule cache 1502 raise an interrupt that is then handled by in software by a rule cache miss handler system—the same one that services processor 702 miss traps. On a rule miss with respect to the I/O PUMP 1502, inputs are communicated to the Miss Handler (such as executed on code of the processor 702 in the metadata processing domain) through I/OPUMP CSRs described below (e.g., example 1520), and rule insertion is provided back to the I/O PUMP through CSRs. I/OPUMP misses cause the I/O PUMP to be disable until serviced by the processor 702. In at least one embodiment, the disabled state of the I/O PUMP means all DMA transfers mediated by the I/O PUMP are stalled until the I/O PUMP miss is serviced.

Consistent with discussion elsewhere herein with the PUMP, I/O PUMP inputs include an opgroup (opgrp), tags for the DMA instruction and its operands (e.g. PCtag, CI tag, OP1 tag, OP2 tag, Mtag (also referred to sometimes herein as the MRtag). I/O PUMP outputs may include the Rtag and PCnew tag (tag for the PC of the next instruction) as described herein. In connection with the I/O PUMP, such inputs and outputs may have further meaning and values as described below in one embodiment.

Following are I/O PUMP inputs in one embodiment:
1. Opgrp—there are current two: load and store
2. PCtag—state of the DMA IO device (analog to the PCtag for code)
3. CItag—tag identifying the DMA IO device (analogous to instruction tags on a designated region of code)
4. OP1tag—assume always "public, untrusted" (not physically represented in IOPUMP cache, but used for rules)
5. OP2tag—same as OP1tag
6. Mtag—tag on memory input to DMA operation
7. byteenable—which bytes are being read/written?
Following are I/O PUMP outputs in one embodiment:
8. Rtag—tag on memory result for a store
10. PCnew tag—state of the DMA I/O device after this operation With the I/O PUMP, there may be no programmable opgroup mapping table (e.g., example 420). Rather, an opgroup used by the I/O PUMP to look up a rule may be a fixed opcode denoting a single opgroup for DMA load and DMA store operations. In at least one embodiment, there is no care masking for the I/O PUMP.

When there is a rule cache miss in connection with the PUMP as described herein such as in FIG. 22, it may be expected that the processor 702 will automatically reissue the instruction that caused the miss after its corresponding rule has been inserted into the PUMP rule cache. As a result, rule insertion simply places the rule in the PUMP cache and expects the instruction to be re-issued in order to get the tagged result. However, behavior with DMA operations varies from the foregoing. DMA operations are not expected to be interrupted and to require retry operations. In order to support these DMA operations, rule insertion may be handled differently for the I/O PUMP. In particular, once the I/O PUMP has faulted due to a miss, processing may hold the pending DMA operation and wait for the processor 702 (e.g., performing rule miss handling to calculate the output tag Rtag and PC new tag for the new rule) to supply the missing output tags for the rule (assuming it will be allowed). When the outputs are supplied, in addition to triggering a rule write into the IOPUMP, the outputs are forwarded to the DMA pipeline (e.g., described in connection with example 1540 below) just as if they had come from the I/O PUMP so the operation can continue without forcing the operation to be re-issued to the I/O PUMP. Rule violations may be handled by supplying a designated disabled-DMA-device tag for the updated PCtag, PCnew tag, that will signal that the operation is not allowed and no further DMA operations will be allowed from that particular DMA device 1504a-c until its PCtag is reset. Generally device tags for a particular DMA device, such as one of 1504a-c, issuing a DMA operation or request may be the particular values of the CI uniquely identifying the issuing DMA device (e.g. source of the DMA request), and the PC tag denoting the current state of the DMA device. In at least one embodiment, the PC tag may be set to a particular value at a point in time disabling further processing of DMA requests from the particular DMA device identified by the CI tag.

Referring to FIG. 75, shown is a table of CSRs that may be used in by the I/O PUMP in an embodiment in accordance with techniques herein. The table 1520 includes an address column 1524 (denoting the memory mapped address of a CSR), a name column 1526 and a description column 1528. Each row of the table 1520 corresponds to one of the defined CSRs used by the I/O PUMP. Row 1522a indicates that CSR transaction id has address 0x00. A write to the transaction id CSR increments the current transaction id stored (e.g., for prefetch) and reading from the transaction id CSR return the current transaction id stored in the transaction id CSR. Row 1522b indicates that CSR opgrp has address 0x01. The opgrp CSR contains the opgroup for the current DMA instruction and is used on a rule miss as an input to the rule miss handler. Row 1522c indicates that CSR byteenable has address 0x02. The byteenable CSR indicates which of the bytes in a word the DMA operation effects and is used on a rule miss as an input to the rule miss handler. Consistent with other discussion herein, this allows policies to provide byte-level protection; a rule triggered may check to ensure that the bytes of the DMA requested data are allowed to be accessed by a particular DMA device initiating the request such as by specially tagging memory portions accessible to the different DMA devices. Row 1522d indicates that CSR pctag has address 0x03. The pctag CSR contains the PC tag for the current DMA instruction and is used on a rule miss as an input to the rule miss handler. Row 1522e indicates that CSR citag has address 0x04. The citag CSR contains the CI tag for the current DMA instruction and is used on a rule miss as an input to the rule miss handler. Row 1522f indicates that CSR mtag has address 0x07. The mtag CSR contains the M tag for the current DMA instruction and is used on a rule miss as an input to the rule miss handler. Row 1522g indicates that CSR newpctag has address 0x08. The newpctag CSR contains the PC new tag placed on the PC after completion of the current DMA instruction (e.g. output of PUMP and cache miss handling). Row 1522h indicates that CSR rtag has address 0x09. The rtag CSR contains the tag placed on the memory result of the current DMA instruction (e.g. output of PUMP and cache miss handling). Row 1522i indicates that CSR commit has address 0x0A. Writing to the commit CSR results in a comparison between the value written to the commit CSR and the current transaction id (as stored in the transaction id CSR). If the foregoing two match, the match triggers a write of a rule to the I/O PUMP. The rule written includes an opcode and tag inputs and outputs (as determined by miss handling) for the current DMA instruction. Row 1522j indicates that CSR status has address 0x0E. The status CSR contains a value denoting a status of the I/O PUMP. For example in one embodiment as described herein, the status CSR may denote whether the I/O PUMP is enabled or disabled. It may be disabled in the case of a PUMP I/O rule cache miss as described elsewhere herein. Row 1522k indicates that CSR flush has address 0x0F. The flush CSR, when written to, triggers a flush of the I/O PUMP (e.g., flushes or clears rules from the I/O PUMP cache).

In at least one embodiment, if bit 0 of the status CSR is 1, it means the I/O PUMP is disabled and if the bit 0 otherwise has a value of 0, it means the I/O PUMP is disabled. PUMP I/O misses disable the pump. Bit 1 of the status CSR indicates whether the PUMP has faulted and is waiting for service (e.g., Bit1=1 implies I/O PUMP faults/cache miss and waiting for service). Bit 2 of the status CSR indicates whether an I/O PUMP rule miss is currently being resolved by a rule cache miss handler and, if the transaction id matches, will provide the inserted results directly to the pending miss operation. All the foregoing bits of the status CSR are reset (e.g., bit 0=enabled, bit 1=no fault, bit 2=no pending miss) by a commit operation (successful or unsuccessful). Writing to the status CSR may also be performed to reset the foregoing bits, for example, as needed on startup to initially enable the I/O PUMP. Reset of the status CSR for an unsuccessful write allows the DMA device to retry the operation and retrigger the fault.

Load/store memory operations by the processor 702 to the I/O PUMP CSRs should be tagged with the iopump CI tag. Policy rules should be in place to restrict operations to instructions having the iopump CI tag. Individual I/O PUMP CSRs do not have tags.

Each device 1504a-c on the untagged or untrusted fabric 715 may be configured with its own tag that is presented as a device tag when the processor performs loads or stores to the device (e.g., see 1534b where the device tag is stored in the device register file described below and specified as the CI tag when the particular device performs a DMA load or store). This allows fine-grained control over which code and authorities can access which devices directly. The same tag is presented on all loads and stores to the device, and the tag does not change based on load and store operations. The particular device tag associated with, and identifying, each device 1504a-c may be stored in a device register file. A particular device tag specified for a device 1504a-c may only be changed by modifying the device register file. The device register file may denote, for each device 1504a-c, a unique target device id (used to identify the device on the untagged or untrusted fabric 715) and a target-device specific tag for the unique target device id. In at least one embodiment, the device register file may itself be accessed as a device on the untrusted fabric 715 with its own device tag. To bootstrap the use of the device register file, the device tag register file's own tag (stored in the device register file) may be written to the file during startup before the PUMP is enabled. For example, the device tag register file's own tag may be written to the file as part of boot processing while the PUMP is off (e.g., tagmode denoting by 911a of the example 910). The CI tag of an instruction may identify the target id of the DMA target device performing a load or store instruction where the CI tag may be used in rules triggered by such load and store operations to restrict (e.g., allow or not allow) a particular load or store operation by the specified DMA device. Additionally, if a particular DMA device performs load and/or store operations which are not allowed, a state associated with the particular DMA device may be modified to disabled so that further requests (e.g., DMA loads and stores) are ignored.

As noted above, a DMA device that initiates or is a source of DMA requests or instructions may have an associated status indicated by the PCtag of the DMA device. In particular, a unique PCtag may be used to denote a disabled status with respect to DMA operations being allowed from a DMA device (identified by the CI tag). Disabled initiators have their DMA requests rejected at the start of the DMA or Trustbridge pipeline described below (e.g., examples 1530 and 1540).

It should be noted that an embodiment may have a single I/O PUMP mediating all DMA traffic, an I/O PUMP per DMA engine, or multiple I/O PUMPs that mediates DMA traffic for multiple DMA engines. Illustrated in the example 1510 is a single I/O PUMP for a single DMA engine (e.g., single memory 712c). Use of a single I/O PUMP as in the example 1500 may become a bottleneck and thus an embodiment may choose to have multiple I/O PUMPs mediate I/O traffic. In such an embodiment where there are multiple I/O PUMPs, each may be enabled or disabled independently so that even though a first portion of one or more of the multiple I/O PUMPs may be disabled (due to an I/O PUMP miss), the remaining second portion of the multiple I/O PUMPs may be enabled and continue to service DMA requests.

In at least one embodiment, different DMA devices acting as initiators or sources of the DMA operations may each be allowed to access only specified portions of memory 712c. Different portions of memory 712c accessible via DMAs may each be tagged with a distinct tag. For example, device 1504a may have access to a first range of addresses of memory 712c and device 1504b may have access to a different second range of addresses of memory 712c. Memory locations of 712c corresponding the first range may be tagged with a first tag and memory locations of 712c corresponding to the second range may be tagged with a second tag. In this manner, rules may be used to enforce or restrict access of device 1504a to memory locations in the first range and enforce or restrict access of device 1504b to memory location in the second range. As a variation, different tags may be associated with a type of allowed access (e.g., read only, write only read and write). In a similar manner, in an embodiment having multiple DMA engines accessing the same memory 712c, different portions of the single memory 712c accessible exclusively to each of the DMA engines may be uniquely tagged whereby rules enforce or restrict access of each DMA engine to its specified address range of memory locations.

Figure 76:
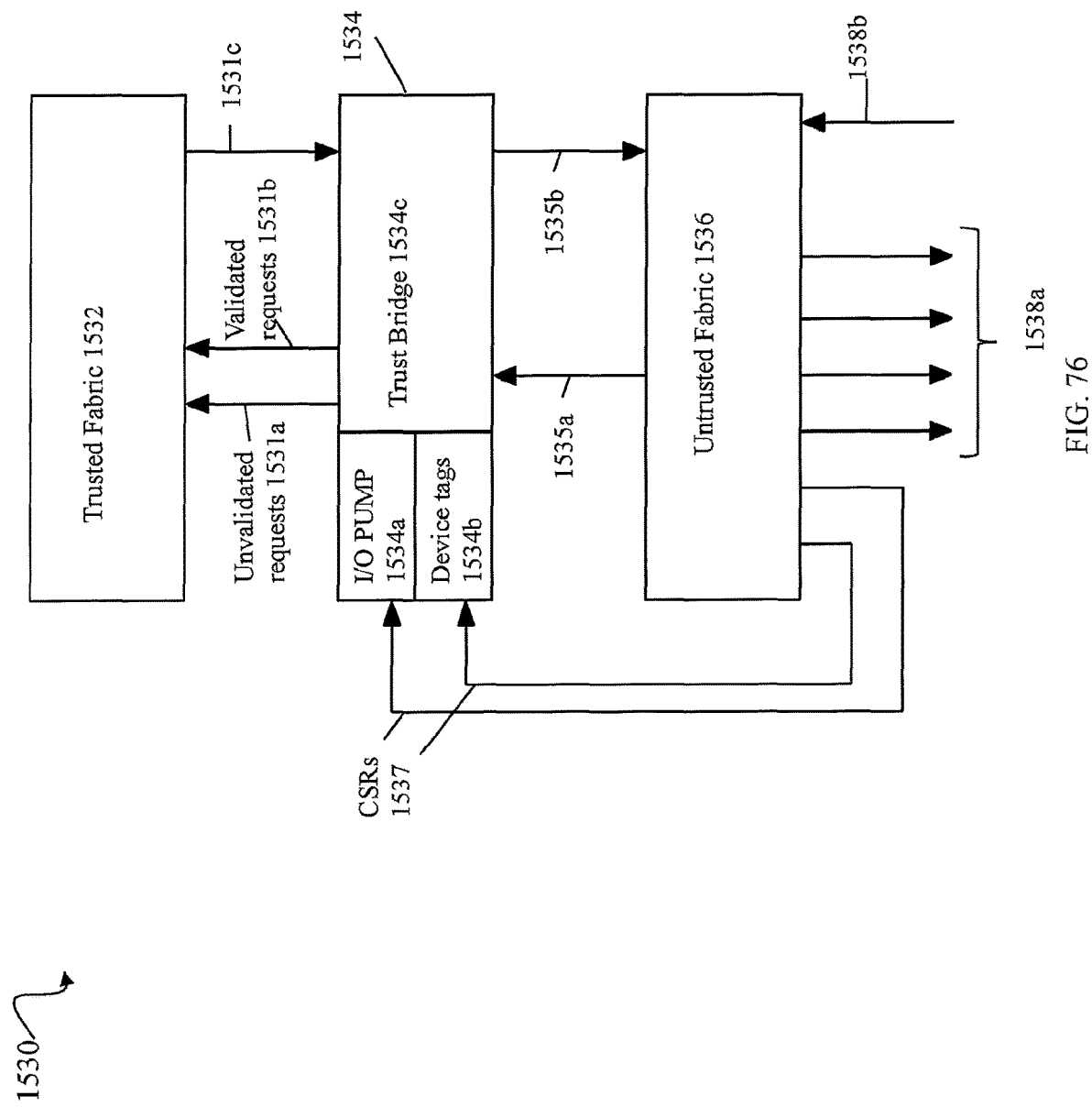

Referring to FIG. 76, shown is an example illustrating data flow between trusted fabric 1532 (e.g., corresponding to tagged interconnect fabric 710) and untrusted fabric 1536 (e.g., corresponding to untagged interconnect fabric 715) in an embodiment in accordance with techniques herein. Element 1534 generally represents processing performed by the I/O PUMP 1534a in connection with DMA mediation between 1532 and 1536. Element 1534 may denote a trust bridge or DMA pipeline 1534c performed to validate and service a DMA operation as part of the DMA mediation. Element 1538a may denote the output channels from the untrusted fabric 1536 (e.g., such as to the DMA devices 1504a-c in the example 1500). Element 1538b may denote the input channel to the untrusted fabric 1536 (e.g., from one of the devices 1504a-c). Generally, the I/O PUMP 1534a will need to issue read requests during DMA read and write operations to validate that the tag on the target memory allows the requested DMA access. The I/O PUMP will need to buffer requests (as described below in the example 1540 between processing stages) and perform master control of tagged communication operations.

Element 1537 denotes values provided as inputs to load (or retrieve) the I/O PUMP CSRs as described in the example 1520. Additionally device state information for the different DMA device initiators may be stored in the untrusted fabric device register file 1534b including the PCtag (e.g., state of the DMA device such as whether requests from this DMA device are disabled) and CItag (e.g., DMA device unique identifier) for the DMA device initiator (e.g., such as 1504a-c on the untrusted fabric 715). The entry in the device register file 1534b for a particular DMA device performing a DMA load or store may provide the CI tag and PCtag values for the current DMA load or store. Element 1535a may denote the channel used for devices on the untrusted fabric 1536 to make mediated DMA processing requests of 1534. Element 1535b may denote the channel used for returning the results of mediated DMA requests of 1534 to the untrusted fabric 1536.

Elements 1531a-b denote channels for forwarding DMA requests from the untrusted fabric 1536 (via the DMA mediation processing of 1534) to the trusted fabric 1532. In particular, channel 1531a is a channel for forwarding initial tag read (unvalidated) DMA requests to the trusted fabric 1532 and channel 1531b is a second channel for forwarding the final write of data with tags updated. Use of the two channels may become more apparent given further discussion of the DMA or trustbridge pipeline described below in connection with the example 1540. Element 1531c denotes a channel from the trusted fabric 1531c to the untrusted fabric via the DMA mediation processing 1534.

Figure 77:
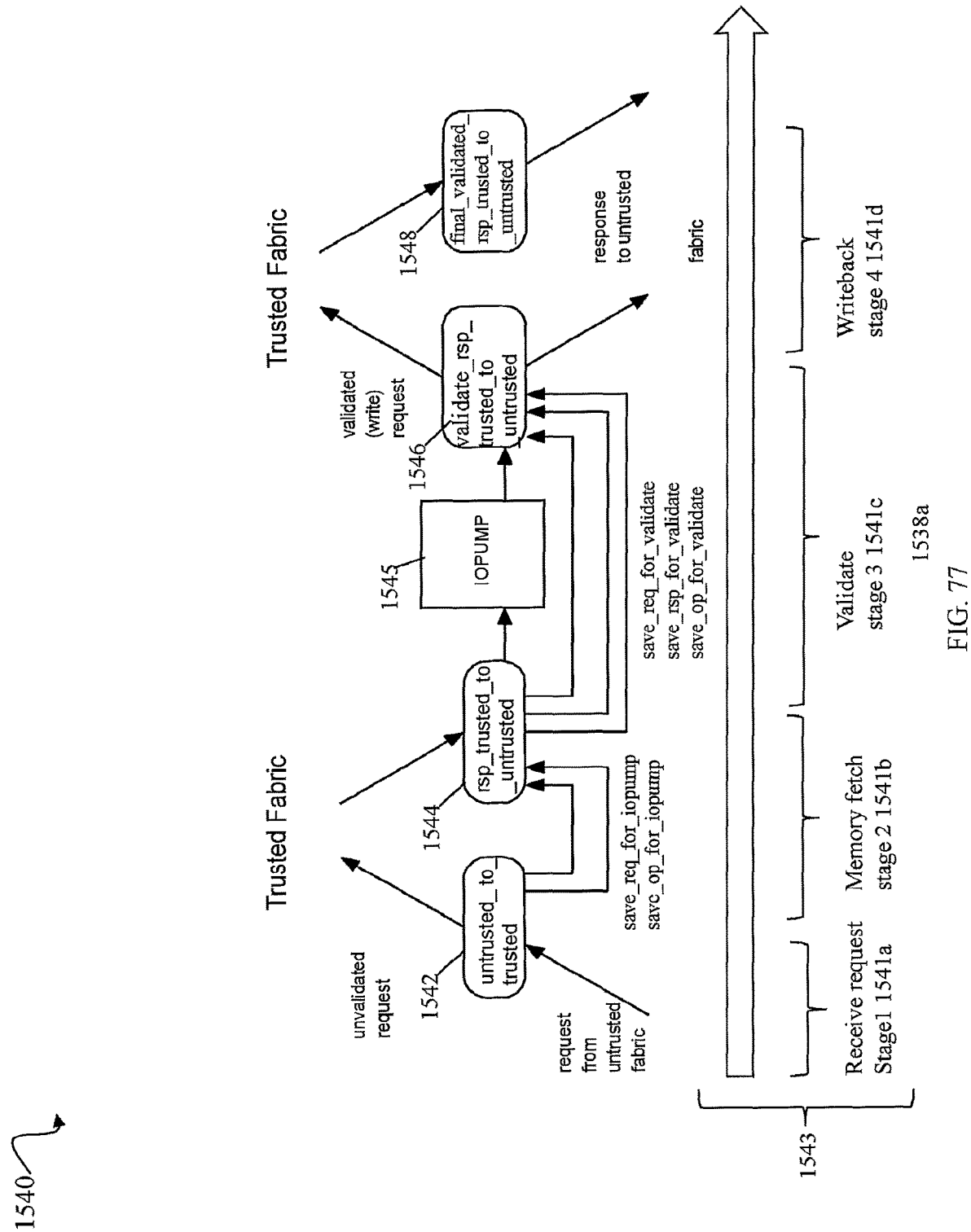

In one embodiment, element 1534 may represent a DMA processing pipeline as illustrated in the example 1540 of FIG. 77. The example 1540 denotes a 4 stage processing pipeline for servicing a DMA operation as made by a DMA device 1504a-c from the untrusted or untagged fabric (e.g., 1506 in the example 1500 and 1536 in the example 1530). Elements 1542, 1544, 1546 and 1548 may denote rules triggered as a result of a DMA request. Element 1545 denotes the I/O PUMP such as described in connection with other figures (e.g., 1502 of the example 1500). Element 1543 denotes the stages of the DMW processing pipeline. In a first stage 1541a, the DMA request is received from the untrusted fabric and an unvalidated request is made via rules 1542 in a second memory fetch stage 1541b to obtain the requested DMA data and its associated tags from the memory 712c. The fetched tag information from the memory for the DMA requested data is provided as an input to the third validate stage 1541c where a lookup is performed in the I/O PUMP cache 1545 for a rule corresponding to the current DMA request. If no rule is found in the I/O PUMP, the I/O PUMP processing may be stalled and disabled in stage 1541c while a rule miss handler executes in the processor 702 to either calculate the outputs Rtag and PCnew tag for the DMA request or otherwise determine that the current DMA request is not allowed (thereby triggering a fault or trap). Assuming that a rule for the current DMA request is located in the I/O PUMP, it is determined that the DMA request is allowed to be performed. If the DMA request is a write request, the write data of the DMA request, along with its tag information, is written back to memory 712c in stage 4 1541d. For DMA write operations, a response 1548a may be provided to the untrusted fabric (and then to the DMA device that initiated the DMA request) once the write has completed. For DMA read operations, a response 1546a may be returned to the untrusted fabric (and then to the DMA device that initiated the DMA request) where the response includes the requested data fetched in stage 2 1541b.

Element 1542 may denote the rules that pass along a request from the untrusted fabric and pass along information (from stage 1 1541a) regarding the I/O request for the I/O PUMP 1545 (in stage 3 1541c) while the memory fetch is performed in stage 2 1541b. Elements 1544 may denote the rules that gather up tag responses from the trusted fabric, formulate the actual rule input to the I/O PUMP, and propagate information from stage 1541b to the writeback stage 1541d to be merged with the output of the I/O PUMP.

As a variation to the foregoing embodiment, reference is made back to the example 1500. In at least one embodiment, rather than have rules stored in an I/O PUMP cache as described above, the I/O PUMP may be implemented as a hardwired I/O PUMP where the rules may be implemented using dedicated hardware such as logic gates wired to embody a fixed set of I/O PUMP load and store DMA rules.

As further variation, the I/O PUMP may alternatively be defined in yet another embodiment as a cache that is programmable as described in connection with the example 1500 with the difference that the I/O PUMP as a rule cache has a finite capacity and is filled with a fixed set of rules that are all stored in the I/O PUMP cache. In this latter embodiment, the I/O PUMP may be populated with the complete set of all DMA rules so that there is never a rule cache miss for the I/O PUMP. Thus, there is never a need to service an I/O PUMP rule cache miss.

What will now be described are techniques that may be used in connection with initializing, setting or resetting tags such as may be associated with memory locations. Consistent with description elsewhere herein, a tag used in connection with such techniques may denote a non-pointer tag (where the non-pointer tag is the actual tag value for the associated memory location) or a pointer tag (where the pointer tag is a pointer or address of another memory location including the actual tag value or values). For example, a pointer tag associated with a memory location may be used in connection with composite tags where the pointer identifies an address in memory including multiple tag values such as for a plurality of composite policies implemented in parallel. As described elsewhere herein, example composite policies that may be supported in parallel include a memory safety policy and a control flow integrity (CFI) policy described elsewhere herein.

Processing performed in connection with memory safety and stack policies, for example, may include setting or initializing a large number of tags associated with memory locations to a particular value. For example, when allocating a region of memory such as may be associated with a particular color, each tag associated with a memory location in the region needs to be initialized to have the particular color value. As another example, when reclaiming a region of memory such as when freeing the memory region, all memory locations of the freed or unallocated region may be initialized to a particular tag value denoting the memory locations as free or unallocated.

Processing performed to initialize or reset tags of all memory locations in a region may consume an unacceptable amount of time and becomes particularly unacceptable as the size of memory region to be tagged increases. Thus, described in following paragraphs are techniques that provide for efficiently initializing or setting tags (e.g., tagging) of memory locations. In at least one embodiment, tag initialization or setting may be performed, for example, in connection with allocation a region of memory or freeing a region of memory. Such techniques described herein are scalable for use with large memory regions. Although such techniques are illustrated below in connection with tags of memory location, more generally, such techniques may be used in connection with initializing, setting or resetting values each associated with a data item or entity.

In at least one embodiment, the tags and associated memory locations of a region of memory may be represented in a hierarchical structure or arrangement where the leaves of the hierarchy denote the tags for the memory locations. For purposes of illustration, following discussion makes reference to a tree as the hierarchical structure. However, more generally, any suitable hierarchical structure may be used to represent an address space associated with a region of memory locations.

In an extreme case, in one embodiment, the leaves of the tree or hierarchical structure may represent individual words in memory and hold the tags. However, if an entire subtree is homogeneously tagged with the same tag value, techniques herein may simply store the tag value at that particular node and associated level in the tree without further representing any descendant nodes of the subtree. In this case, the tag value of the node specifies a tag value for multiple memory locations of a particular region (e.g., such as a range of consecutive or contiguous memory addresses). In this manner, storage may be saved in storing tag values if there are large homogenously tagged regions. In a worst case scenario where there is no homogeneous tag value (e.g., no two memory locations having consecutive addresses have the same tag value), the leaves of the tree each represent a tag value for a single memory location, such as a single word in the region.

With such a hierarchical structure such as a tree as described in following paragraphs, processing may be performed to retag or initialize a power-of-two memory region by simply rewriting one node in the tree. For a non-power-of-two region, processing may be performed to partition the region into a minimum set of power-of-two regions (e.g., at most $2*\log_2$ (region size) such regions in the minimum set). When a tag of a particular word or memory location is needed (e.g., read the tag for an associated memory location), processing may be performed to determine the tag using the tree. In at least one embodiment described below, a hierarchy of cache memories may be utilized for the different levels of the tree. The tag value may be provided by the cache associated with the highest level in the tree having a cache hit with respect to the desired memory location (e.g., perform a cache lookup for the tag value for the address of the desired memory location). In connection with processing performed to write or modify a tag value associated with a memory location, processing may include performing a single write to mark a subtree, or multiple writes (e.g., $2*\log_2$ (region size) log writes). Such multiple writes may be performed, for example, responsive to modifying or setting the tag of a first memory location included in a first memory region that is homogenously tagged prior to such modifying or setting the tag value. In this case, setting or modifying the tag value causes the first memory region to no longer be homogenously tagged and the hierarchical structure denoting the tag values for the first memory region is accordingly updated to further decompose a subtree denoting tag values for the first memory region.

Figure 78:
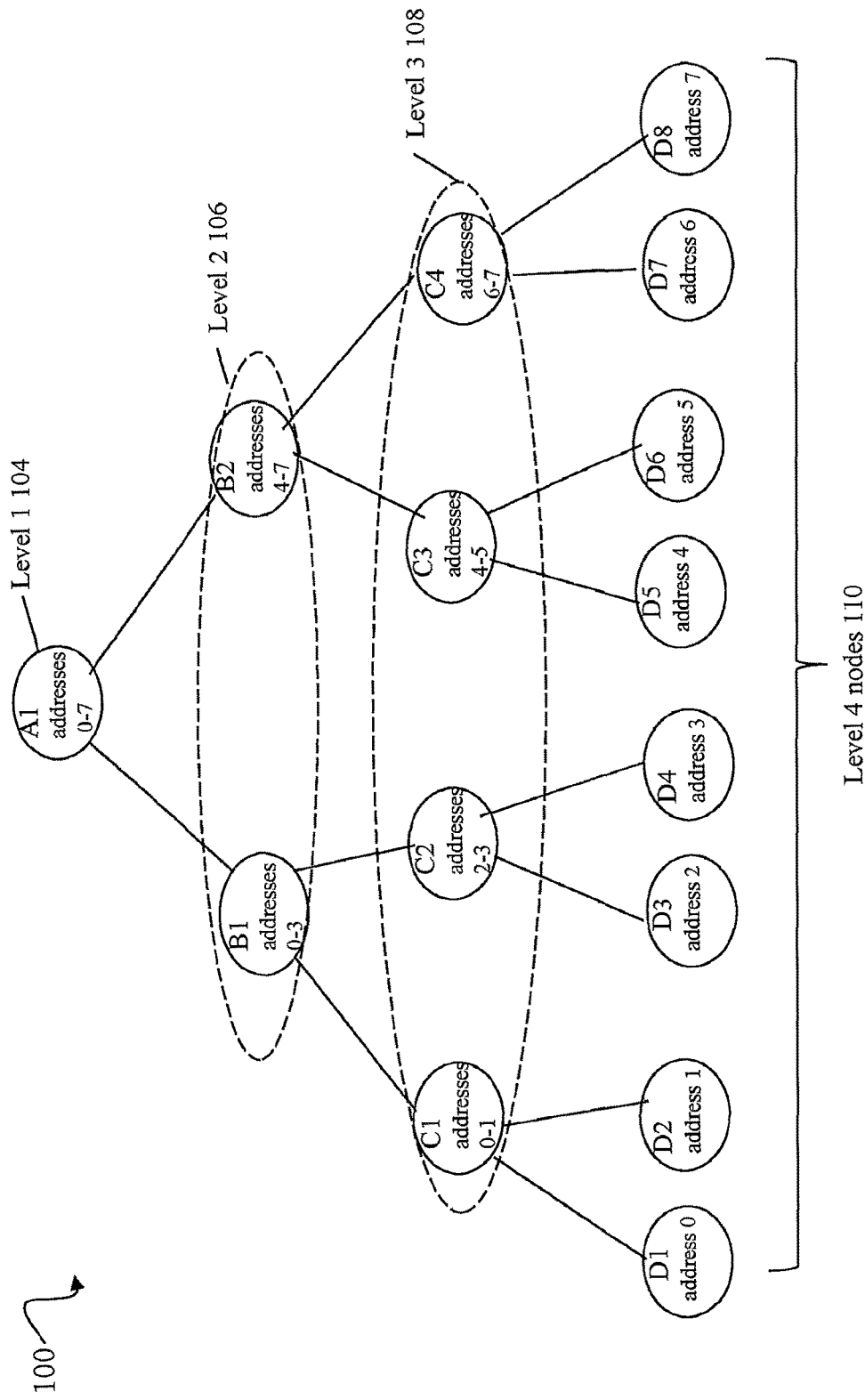
FIGS. 78, 79, 80, 81 and 82 are examples illustrating a hierarchy used in connection with storing and determining tag values in an embodiment in accordance with techniques herein.

Referring to FIG. 78, shown is an example of a hierarchical structure that may be used to represent tag values for an address space corresponding to a region of memory in an embodiment in accordance with techniques herein. The example 100 illustrates a tree as a hierarchical structure used to represent a memory region including 8 memory locations for purposes of simplicity of illustration. More generally, techniques herein may be used to represent tag values for any address space or memory region using any suitable hierarchy having any number of levels, any suitable number of nodes at each level, any suitable number of child nodes per parent node, and the like.

The example 100 illustrates a binary tree representation of tag values for 8 memory locations having addresses 0 through 7, inclusively. The tree in this example may include up to 4 levels of nodes, depending on which of the 8 memory locations, if any, are homogeneously tagged using a same subtree of the structure 100. In this example, the entire memory region of 8 memory locations may be partitioned repeatedly into power of two smaller memory regions where each such partitioning of smaller memory regions corresponds to a different level of nodes in the tree. For example, level 1 104 includes node A1 corresponding to the entire address space 0 through 7 which is partitioned into two smaller regions each represented by a node (nodes B1 and B2) at level 2 106. Level 2 106 includes node B1 associated with addresses 0-3 and node B2 associated with addresses 4-7.

Each of the nodes B1 and B2 at level 2 106 may be further partitioned into two smaller regions each represented by a node at level 3 108. Node B1 and its associated address range 0-3 is partitioned into two regions represented by nodes C1 and C2, where C1 is associated with address range 0-1 and C2 is associated with address range 2-3. Similarly, node B2 and its associated address range 4-7 is partitioned into two regions represented by nodes C3 and C4, where C3 is associated with address range 4-5 and C4 is associated with address range 6-7.

Each of the nodes C1-C4 at level 3 108 may be further partitioned into two smaller regions each represented by a node at level 4 110. In this example, nodes at level 4 each represent a tag value for a single word or memory location. Node C1 and its associated address range 0-1 is partitioned into two regions represented by nodes D1 and D2, where D1 is associated with address 0 and D2 is associated with address 1. Node C2 and its associated address range 2-3 is partitioned into two regions represented by nodes D3 and D4, where D3 is associated with address 2 and D4 is associated with address 3. Node C3 and its associated address range 4-5 is partitioned into two regions represented by nodes D5 and D6, where D5 is associated with address 4 and D6 its associated with address 5. Node C4 and its associated address range 6-7 is partitioned into two regions represented by nodes D7 and D8, where D7 is associated with address 6 and D8 is associated with address 7.

All the nodes A1, B1-B2, C1-C4 and D1-D8 may represent the maximum number of possible nodes that may exist in the hierarchical representation of tag values for the region of 8 memory locations. However, as described in more detail below, the particular nodes included in the tree denoting the tag values stored in the memory locations 0-7 may vary depending on the particular tag values and homogenous and non-homogeneous tag regions represented at various points in time. Levels of the hierarchy may be ranked from a highest level corresponding to the root or level 1 104 node to the lowest level corresponding to the bottom most level 4 110.

Figure 79:
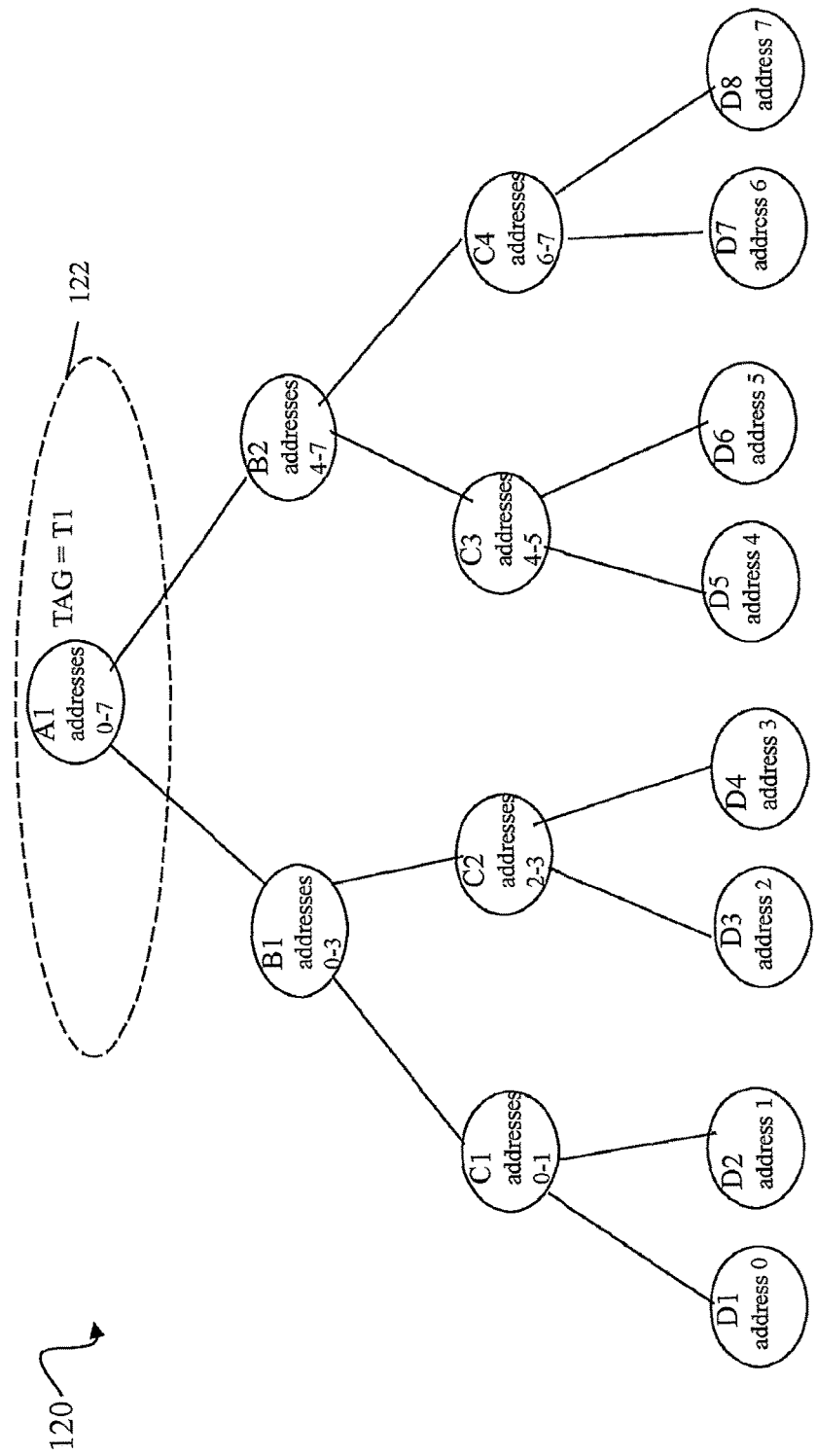

In connection with techniques herein with a first example, reference is made to 120 of FIG. 79. In this first example, assume all memory locations associated with a node at a particular level in the hierarchy 120 have the same tag value, T1, thereby denoting a subtree of homogenously tagged memory locations, the node at the particular level has the tag value for all such memory locations and no further descendant nodes in the subtree need to be consulted to determine the tag value for any of the homogenously tagged memory locations. For example, if all memory locations 0-7 include the same tag value T1 such as in connection with initializing the region of memory with the same tag, the tag value T1 for memory locations 0-7 may be stored at node A1 (e.g., as denoted by the "tag=T1" indication by node A1). In at least one embodiment, there is no further need to store additional tag values for other nodes of the tree since the tag values for the entire region for addresses 0-7 is represented by the single node A1. In this case, element 122 denotes the single node that may be included in the hierarchical representation of tag values stored at memory locations with addresses 0-7 and the remaining nodes B1, B2, C1-C4 and D1-D8 may be omitted from the hierarchical representation.

Figure 80:
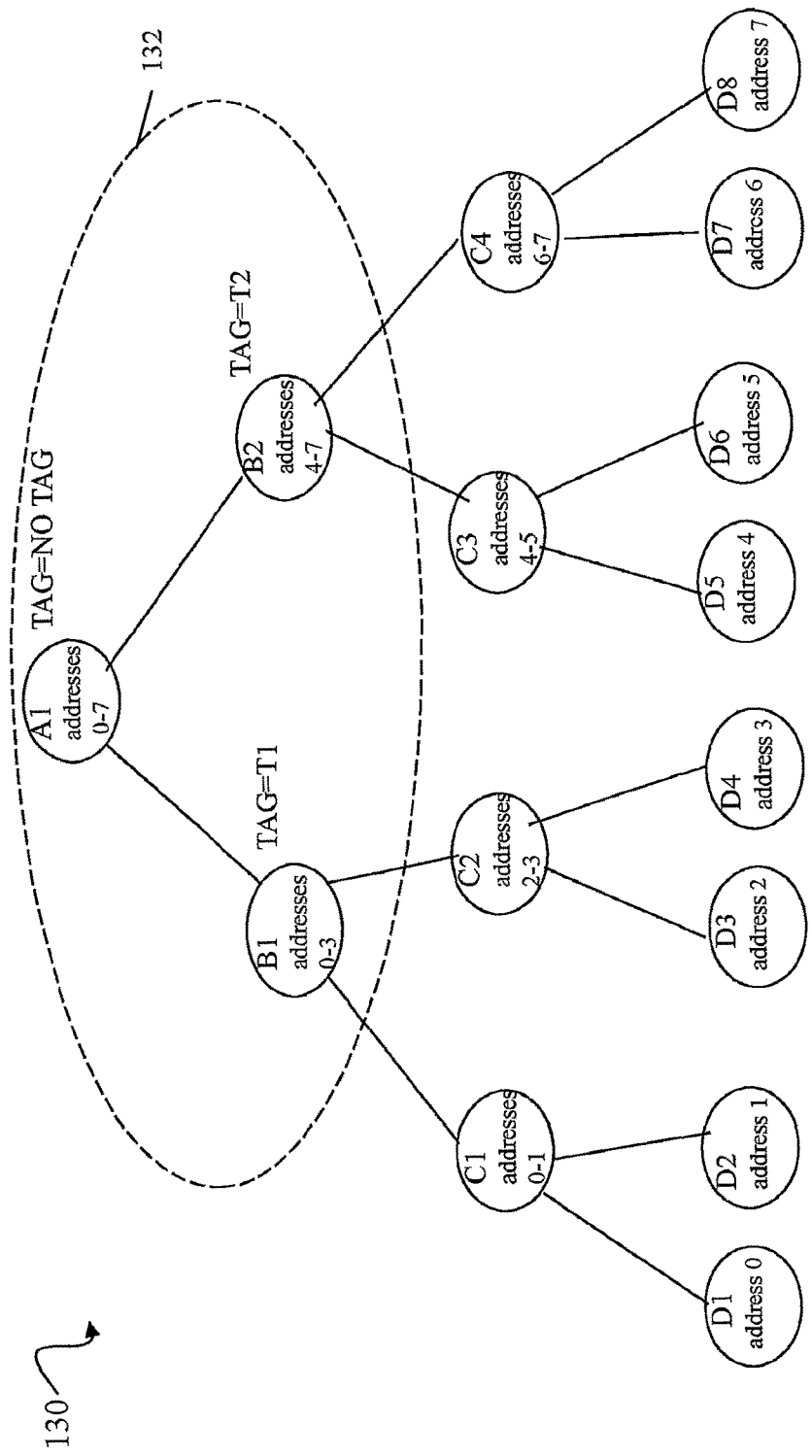

In a second example, reference is made to 130 of FIG. 80. In this second example, assume that memory locations 0-3 have the same first tag value T1 and memory locations 4-7 have the same second tag value T2 (first and second tag values being different). In this case, node A1 may include an indicator (e.g., denoted by the "TAG VALUE=NO TAG VALUE" indication by node A1) denoting that node A1 does not specify a homogeneous tag for memory locations 0-7 and tag values for memory locations 0-7 are specified by nodes at one or more lower levels of the hierarchy. At level 2 of the hierarchy, the first tag value, T1, may be stored at node B1 (as denoted by the "TAG VALUE=T1 indication by node B1) and the second tag value T2 may be stored at node B2 (as denoted by the "TAG VALUE=T2 indication by node B2). The subtree (B1, C1, C2, D1-D4) of which B1 is the root denotes a set of homogenously tagged memory locations 0-3. The subtree (B2, C3, C4, D5-D8) of which B2 is the root denotes another set of homogenously tagged memory locations 4-7. In at least one embodiment, there is no further need to store additional tag values for other nodes of the tree at levels 3 and 4 (e.g., nodes C1-C4 for level 3 and nodes D1-D8 for level 4) since the tag values for the entire region for addresses 0-7 are represented by nodes B1 and B2 at level 2. In this case, element 132 denotes the nodes that may be included in the hierarchical representation of tag values stored at memory locations with addresses 0-7 and the remaining nodes C1-C4 and D1-D8 may be omitted from the hierarchical representation.

At a first point in time, the tag hierarchy may be as described in connection with the example 120 with only the single node 122 since all tags have the same tag value. At a subsequent second point in time, tag values for addresses 0-3 may be modified to be the same first tag value T1 and addresses 4-7 may be modified to be the same second tag value T2. As a result of the foregoing tag modifications, two addition nodes B1 and B2 as described above in the example 130 may be added to the hierarchy. Assume now at a subsequent third point in time tag values for addresses 0-3 remain the same as in the example 130. However, tag values for addresses 4-7 may be modified as described below in connection with FIG. 81 whereby additional nodes C3-C4 and D5-D6 are added to the tag hierarchy.

Figure 81:
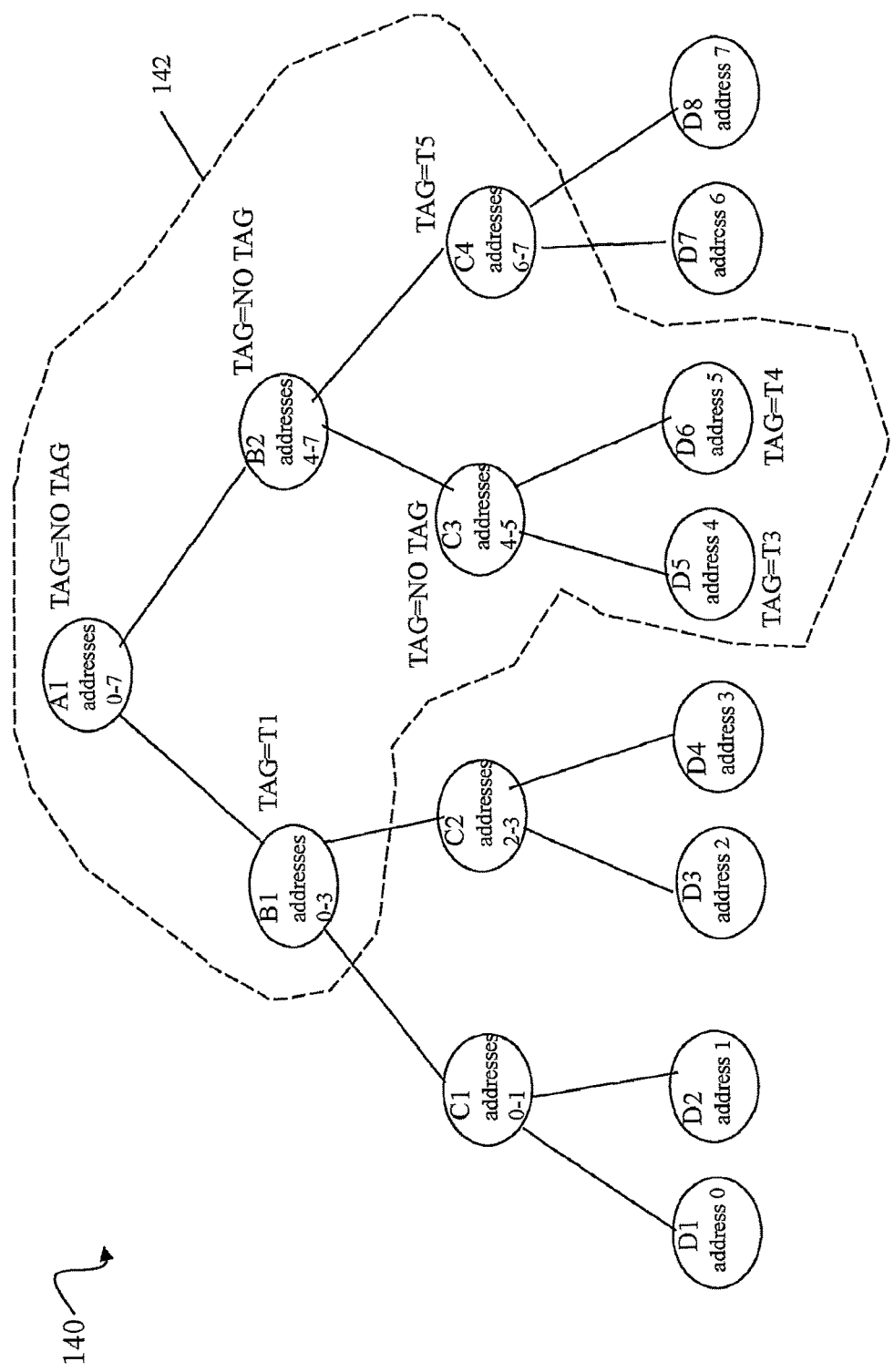

In a third example, reference is made to 140 of FIG. 81. In this third example, assume that memory locations 0-3 have the same first tag value T1 as described above (where the first tag value T1 may be stored at node B1 and the subtree (B1, C1, C2, D1-D4) of which B1 is the root denotes a set of homogenously tagged memory locations 0-3). Further, assume that the memory locations 4-5 each include a different tag value where memory location 4 has tag value T3 and memory location 5 has tag value T4, and that memory locations 6-7 are homogeneously tagged and include the same tag value T5. In this case, consistent with description above, nodes A1, B2, and C3 may each include an indicator (e.g., TAG=NO TAG) that the particular node does not specify a tag value whereby nodes at one or more lower levels in the hierarchy specify tag values for the particular memory locations associated with nodes A1, B2 and C3. For example, node C3 corresponding to memory locations 4-5 may include an indicator that the node C3 does not specify a tag value whereby nodes at one or more lower levels in the hierarchy specify tag values for memory locations 4-5. Node D5 at level 4 may specify the tag value T3 (e.g., TAG=T3 indicator by node D5) for memory location 4 and node D6 and level 4 may specify the tag value T4 (e.g., TAG=T4 indicator by node D6) for memory location 5. Node C4 corresponding to memory locations 6-7 may specify the tag value T5 (e.g., TAG=T5 indicator by node C4), the homogeneous tag value common to memory locations 6-7 and indicate there is no further need to store additional tag values in nodes D7 and D8 (e.g., no need to further examine descendant nodes D7, D8 of C4). In this case, element 142 denotes the nodes that may be included in the hierarchical representation of tag values stored at memory locations with addresses 0-7 and the remaining nodes C1-C2, D1-D4 and D7-D8 may be omitted from the hierarchical representation.

The foregoing illustrations of 120, 130 and 140 may denote the hierarchical representation of tag values for the memory region for addresses or memory locations 0-7 at different points in time as tag values associated with the memory locations may change over time. In a manner similar to adding nodes to the hierarchy as described above, nodes may be removed from the hierarchy as needed as subtrees of existing nodes are modified to all have the same tag value (e.g., if descendants of a node all have the same tag value then all descendant nodes may be removed from the hierarchy and the node may be used as the sole node of a subtree to denote the single homogeneous tag value of the node and its descendants).

In at least one embodiment, when a first node at a level in the tree specifies a value for one or more memory locations associated with the first node, there is no need to further represent descendant nodes of the first node (e.g. no need to further represent nodes of the subtree beyond the first node). To further illustrate, reference is made to the first example noted above in 120 of FIG. 79 where only a tag value of node A1 is needed to represent the single homogeneous tag value for the memory region 0-7. To further illustrate, reference is made to the third example 140 of FIG. 81 noted above where an embodiment may not further represent nodes C1-C2, D1-D4, and D7-D8. In this manner, using such a hierarchical representation of memory locations and associated tag values may save storage in connection with tag values for the memory locations. In other words, in at least one embodiment, rather than always allocate and store individual tag values for each of the memory locations, storage may be allocated where a single tag value in the hierarchy denote a homogeneous tag value for multiple memory locations having consecutive or contiguous addresses. With reference to the first example noted in 120, rather than allocate storage for 8 tag values for memory locations 0-7 each including the same tag value, memory may be allocated for storing the single tag value of node A1.

In a worst case scenario assuming there are no homogeneously tagged memory locations in the memory region having addresses 0-7, the entire hierarchical structure of nodes of FIG. 78 is used to represent the tag values stored at the addresses 0-7. For example, each of the leaves of the hierarchy may represent a different word in memory. Thus, the bottom level 4 110 of the hierarchy may denote the tag values for the address space 0-7.

Referring back to FIG. 78, assume there is an 8 bit address space used to represent the addresses of the memory locations 0-7. In at least one embodiment, the entire 8 bit address space may be partitioned into different memory regions each including 8 memory locations where each of the different memory regions may have tag values represented by a different instance of a tag value hierarchy. Thus, for the memory region of addresses 0-7 just described, the highest or top 5 bits are all=0 and the addresses 0-7 may be represented in the remaining lower 3 bits. The highest or top 5 bits=0 may thus be used to indicate the memory region of addresses 0-7. In such an embodiment, each memory region of 8 memory locations may have a separate tag value hierarchy such as illustrated in FIG. 78 denoting tag values of the particular memory region. In this example, each of the different memory regions denoting a different range of 8 addresses or memory locations may be differentiated by examining the top 5 bits of the 8 bit address of a memory location.

Figure 82:
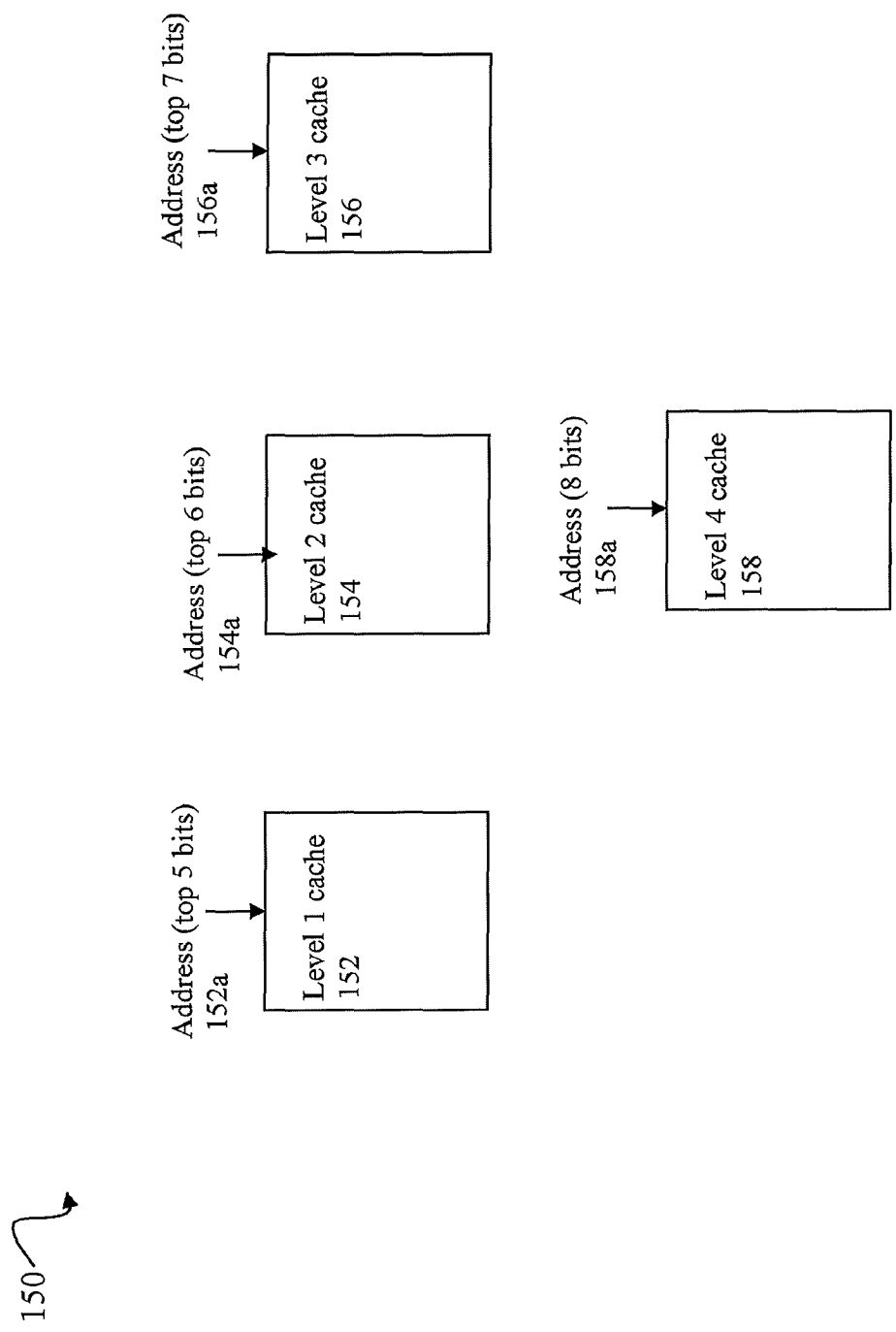

In at least one embodiment in accordance with techniques herein, a series of tag cache memories may be used where the number of tag caches may correspond to the number of levels in the hierarchy of nodes denoting tag values. Continuing with the example discussed above and with reference back to 100 of FIG. 78, each instance of a tag hierarchy for a memory region of 8 memory locations has 4 levels. In such a case, an embodiment may use 4 tag cache memories 152, 154, 156 and 158 as illustrated in the example 150 of FIG. 82 to store tags for memory locations. Generally, each of the 4 tag cache memories 152, 154, 156 and 158 is associated with a different level in the tag value hierarchy and may store information about each node in the associated different level of the tag value hierarchy. For example, tag level cache 152 may include information for level 1 104 nodes or the roots of the tag value hierarchies for each of the memory regions (which in this particular example as noted above is a memory region of 8 memory locations). Tag level cache 154 may include information for level 2 106 nodes of the tag value hierarchies for each of the memory regions. Tag level cache 156 may include information for level 3 108 nodes of the tag value hierarchies for each of the memory regions. Tag level cache 158 may include information for level 4 108 nodes of the tag value hierarchies for each of the memory regions. The lowest or bottom most level in the hierarchy, which is level 4 110 in this example, may correspond to cache lines for memory locations that may be stored in the data cache (e.g., denotes as L1-D$ such as denoted by element 20 of FIG. 1). An embodiment may have a level 4 158 of the tag cache and additionally have metadata tags that may be separately stored in the cache lines of the data cache. Each of the caches 152, 154, 156 and 158 of nodes have an associated representation in main memory.

In connection with the example embodiment described herein with an 8 bit address space, the top or highest 5 bits 152*a* of the address of a memory location may be used by level 1 cache 152 to lookup whether the cache 152 includes any level 1 node for the address of the memory location. The top or highest 6 bits 154*a* of the address of the memory location may be used by level 2 cache 154 to lookup whether the cache 154 includes any level 2 node for the address of the memory location. The top or highest 7 bits 156*a* of the address of a memory location may be used by level 3 cache 156 to lookup whether the cache 156 includes any level 3 node for the address of the memory location. The 8 bits 154*a* of the address of the memory location may be used by the level 4 cache 158 to lookup whether the cache 158 includes any level 4 node for the address of the memory location.

For a particular address, each of the caches associated with a level other than the bottom most level, may return:

1). the tag value for the particular address (denoting that this is a homogeneous tag value at that level for multiple addresses);
2). an indicator that the cache does not specify a tag value for the particular address and a cache at a lower level in the hierarchy needs to be consulted to obtain the tag value for the particular address (this particular level does not specify a homogeneous tag value for the particular address); or
3). null or a second indicator denoting that there is no cache location in that particular level cache including node or tag information corresponding to the particular address. The second indicator also denotes that no cache at a lower non-bottom level cache includes a node or tag information for the address. This is discussed below in more detail.

Consistent with discussion above, the indicator returned in item 2) above may be the "NO TAG" indicator associated with a node such as illustrated in examples 120, 130 and 140. For example, with reference to the illustration 130 of FIG. 80, assume processing is performed to determine the tag for memory location 5. In this case, level 1 cache 152 may return the NO TAG indicator indicating that the tag value for memory location 5 is specified by one of the other lower level caches 154, 156, or 158. Level 2 cache 154 may return the tag value T2 for memory location 5 illustrating returned cache item 1) above. To illustrate returned item 3) above where the second indicator is returned, consider the level 3 cache 156. The level 3 cache 156 may not include any node information corresponding to the memory location 5 (e.g., no cache location includes node or tag information associated with memory location 5 lookup) and so the second indicator described above in 3) may be returned indicating that there is no node information for the memory location 5 in this level 3 cache. In such an embodiment, processing may generally utilize the tag value returned from the highest tag level cache. For example, in connection with memory location 5 with reference to the example 130, level 2 cache 154 is the highest level of the tag caches returning a tag value for memory location 5.

For contents of a memory location stored in an L1 (level 1) data cache, cached information may include the current tag value and also the level in the tag cache hierarchy where the tag value is defined. Referring again to the example above for the memory location 5 using the hierarchy 130 of FIG. 80, if the contents of memory location 5 is also stored in the data cache, the data cache may include the tag value T2 and also information that the current tag value T2 is defined by a level 2 node (e.g. B2) having its node information stored in the level 2 cache 154. Thus, the example 150 illustrates 4 tag caches in the tag cache hierarchy where tag values may be stored and the embodiment may additionally include a tagged data cache (e.g., L1 data cache) separate from any tag information stored in the tag cache hierarchy.

In an embodiment in accordance with techniques herein, processing may be performed by the PUMP to resolve or determine a tag value for a particular memory location having a particular address. When performing processing to obtain a tag value and contents for a particular memory location, there may be a data cache hit whereby the memory location contents and its tag are stored in the data cache. Upon the occurrence of a data cache hit for a memory location, processing may be performed to consult the stored level of the tag cache hierarchy which defines the tag value for this memory location to make sure the first cached tag value obtained from the tag caching level matches the second tag value of the memory location as stored in the data cache. If the two do not match, this indicates that the second cached tag value as stored in the data cache is stale, out of date and has been modified. In this case if the second cached tag value stored in the data cache for the memory location and the first tag value as obtained from the tag cache for the memory location do not match, processing may be performed including updating the second cached tag value as stored in the data cache for the memory location (e.g., to match that as stored in the tag cache hierarchy). In at least one embodiment, for a memory location having its data and thus its tag cached in the data cache, information may be tracked in the data cache for the memory location's tag including the level of the tag cache hierarchy where the tag is defined. The foregoing storing of the level in the cache tag hierarchy may be an optimization whereby the stored level may be used to readily access the tag value from the tag hierarchy (e.g., rather than having to consult all tag level caches or otherwise search the hierarchy of existing nodes such as in a search from the root or top of hierarchy downward toward the leaf nodes). Thus, upon the occurrence of a data cache hit and where the tag value stored in the data cache for a memory location does not match the tag value stored in the tag hierarchy for the memory location, processing may include updating the tag value as stored in the data cache and additionally updating the hierarchy level information stored in the data cache as to where the memory location's tag is defined in the tag hierarchy. Subsequently, processing performed by the PUMP for resolving or determining the tag value for the memory location may be restarted.

Upon the occurrence of a data cache miss for a memory location (e.g., where the memory location contents and tag are not found in the data cache), processing may be performed to perform a tag cache lookup for the tag value in levels of the tag cache (e.g., other than the bottom most tag cache level) in parallel. For example, a lookup for the tag value for the memory location may be performed by consulting the 4 caches 152, 154, 156 and 158, respectively, for levels 1, 2, 3 and 4 of the tag caches in parallel. As discussed above, the tag value returned by the highest level of the tag caches 152, 154, 156 and 158 is used as the tag value for the memory location. Additionally, it should be noted that in a properly represented tag value hierarchy, only a single one of 152, 154, 156 and 158 may return a tag value for the memory location. In at least one embodiment, the caches 152, 154, 156 and 158 may be indexed to allow for parallel access.

An embodiment may also not perform a parallel lookup or search for a particular memory location's tag with respect to all 4 tag caches 152, 154, 156 and 158. As a variation an embodiment may traverse the tag caches of the hierarchy from the root node level (level 1) downward toward the leaf nodes (e.g., level 4). For a tag cache miss at a level N, the tree or hierarchy may be traversed inserting nodes into the different levels of tag caches for the particular memory access. In connection with a level cache miss for a parallel search of the tag caches, an embodiment may choose to only insert nodes into the level caches when there is a tag. So as some level cache provides a tag, it is not required that all other level caches have a NO TAG entry.

As discussed elsewhere herein, a tag of a memory location may be modified. In response to modifying a tag of a memory location, processing may be performed to accordingly update the hierarchy specifying a tag value for the memory location. Such updating may include invalidating any one or more levels of the hierarchy which are no longer homogeneous. Additionally, processing may be performed to accordingly update the levels of caches such as illustrated in the example 150 of FIG. 82.

When performing an operation to set or initialize a tag of a memory location, such processing may include the PUMP checking for the validity of performing the desired operation. For example, consider the case with retagging all memory locations in the memory region with a new tag. Processing may include obtaining the current tag values of all memory locations in the region and checking via PUMP processing for validity of the retag. The processing may include clearing the tags of the memory locations in the region, if allowed, and then updating the tag values for the memory locations in the region, if allowed. Consistent with discussion above, updating, modifying, or setting tags of a memory region may include accordingly modifying the hierarchy and associated nodes to reflect the tag values for different memory locations in the memory region (e.g., decomposing portions of the region which are homogeneous prior to the modification and non-homogeneous after the modification whereby there may be additional children or descendant nodes added to reflect the tag value modification(s)).

In at least one embodiment, the hierarchical representation of tag values for a memory region may be a tree. For example, the tree may be a binary tree where each node has either 0, 1 or 2 children. As a variation, the hierarchical representation may be a tree but not a binary tree. For example, each node in the tree may be allowed to have any suitable number of child nodes up to a specified maximum. The hierarchical representation may include any suitable number of levels, nodes at each level, children per parent node, and the like. As known in the art, there is a tradeoff between various parameters of the hierarchical representation such as depth or number of levels and nodes at each level/number of children per parent node). For example, the larger the number of nodes at each level, the fewer the number of levels and thus the shorter amount of time/levels to be consulted when determining a tag value for a memory location. However, in such a case, more writes need be performed to clear a region.

What will now be described are techniques that may be performed, such as by rules triggered as a result of loader code, in connection with a CFI policy in an embodiment in accordance with techniques herein. To enforce the CFI policy using metadata processing rules accessing tag information, information regarding allowable control flow needs to be communicated to the metadata processing domain. To this end, an embodiment in accordance with techniques herein may use an approach described in following paragraphs. Generally, a transfer of control is made from a branch source to a target or destination. In connection with allowable control flow, for a particular control flow target or destination, a set of sources that are allowed to transfer control to the particular control flow target or destination may be identified. The set of sources for each possible control flow target may be communicated to the metadata processing domain, such as stored metadata tag information, which may then be used by rules of the CFI policy in connection with CFI policy enforcement during runtime execution of user code (e.g., code executing in the code execution domain or non-metadata processing domain).

Figure 83:
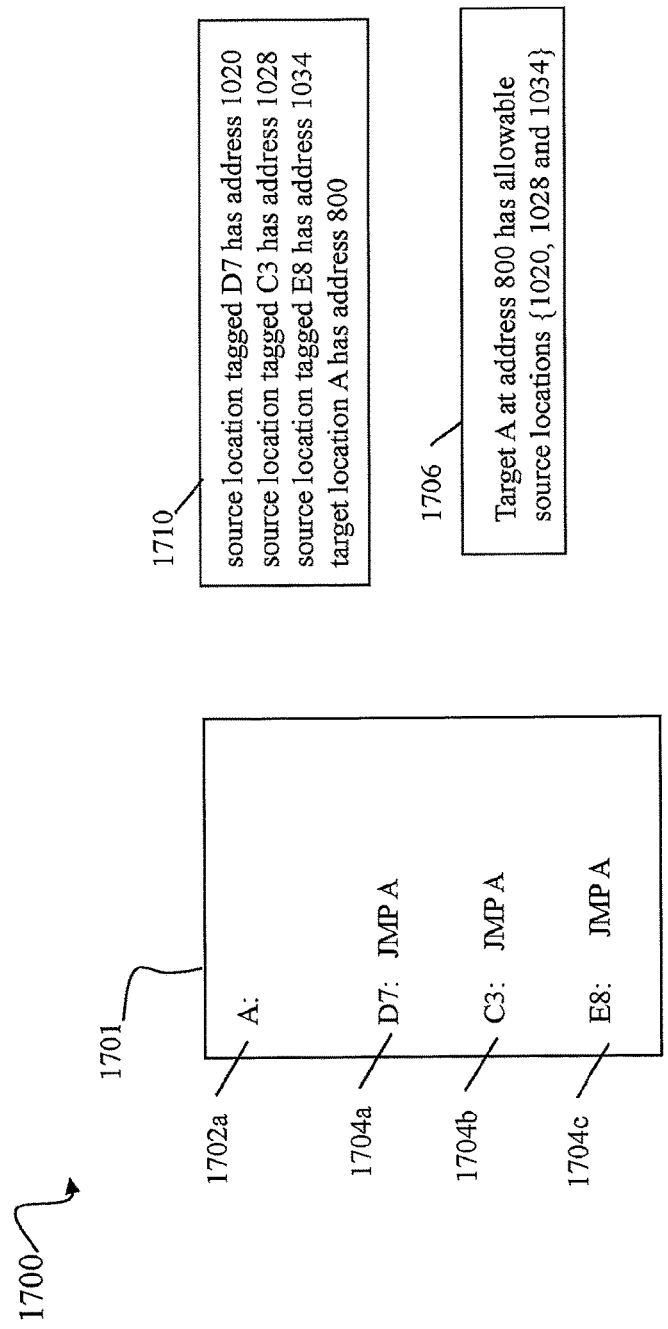

The processing performed may include uniquely tagging each source and then tagging each target with the set of allowable sources (e.g., address of the sources) permitted to transfer control to that particular target. For example, reference is made to FIG. 83. In the example 1700, element 1701 may denote a code portion of instructions of an application executed in the code execution or non-metadata processing domain. Element 1702*a* and 1704*a-c* denote locations of instructions in the code portion. Element 1702*a* denotes a control flow target A. Elements 1704*a-c* denote control flow sources that are allowed to transfer control to target A 1702*a*. Such transfer of control from each of 1704*a-c* is denoted by the JMP (jump) A instruction. Element 1706 denotes the set of allowable sources that are permitted to transfer control to the target A. D7 denotes the unique source tag of instruction 1704*a*. C3 denotes the unique source tag of instruction 1704*b*. E8 denotes the unique source tag of instruction 1704*c*. As illustrated by 1710, the JMP (jump) instructions 1704*a-c* are tagged, respectively, as D7, C3 and E8. As also illustrated by 1710, the instructions 1704*a-c* are also stored, respectively, at addresses 1020, 1028 and 1034. The target location A has address 800. In this case, the set of allowable sources, or addresses of the source instructions allowed to transfer control to the target A, may be the set {1020, 1028, 1034} denoted by 1706. Thus, the set 1706 is an example of the allowable control flow information that needs to be communicated to the metadata processing domain where such allowable control flow information is stored as tag metadata for use by rules of the CFI policy. In at least one embodiment in accordance with techniques herein, code of the loader may fire rules that perform processing to collect the control flow information needed by the metadata processing domain to enforce the CFI policy for the application include code portion 1701. The loader code may be executed in connection with loading the application (e.g., loading executable code for the application) whereby the loader code, while executing to load the application, triggers rules that perform the necessary processing to collect the control flow information (as subsequently used by the metadata processing to enforce the CFI policy during execution of the application).

In at least one embodiment consistent with description elsewhere herein, execution of kernel code may trigger rules that tag code of the loader with special instruction tags enabling the tagged instructions of the loader, when executed, to trigger rules that generate a sequence of source tags (each tag of the sequence being unique) used to tag the sources (e.g., generate source tags D7, C3 and E8). For example, reference is made to FIG. 84 including logical processing performed by rules fired as a result of executing code of the loader. The logical processing is described in 1720 using a C-like pseudo code description where such processing may be performed for each control flow target such as A 1702a. At step 1721, the source set is initialized to the empty set. At step 1722, for each source that is allowed to transfer control to the target, steps 1723, 1724 and 1725 may be performed. At step 1723, t is assigned a newly allocated CFI source tag. At step 1724, a source location (of an instruction that transfers control to the target) is tagged with the newly allocated tag t generated in step 1723. In step 1725, the source set is updated to also include tag t. In one aspect, the operation of step 1725 may be characterized as forming a set union of allowable sources for the target where the union operation is performed in 1725 for each iteration of the loop processing, that begins at 1722, as performed for each source. Step 1726 tags or marks the target with the source set.

Element 1723 may be the following instruction included in loader code that triggers a rule that generates or allocated the new CFI source tag:

ADD R1←R1+R1 where the ADD instruction (e.g., such as ADDI in the RISC-V instruction set) has been tagged by the kernel code with the special CI tag of CFI-alloc-tag marking this instruction as an allowable tag generator instruction. In at least one embodiment a different sequence of source tags may be generated by the loader for each application in connection with a CFI policy (e.g., in the example 1620, the loader may use a different sequence of CFI tags 1630 as the unique sequence of CFI source tags for an application where the sequence of CFI tags may be generated from a particular one of the CFI tag generator App-n tags of 1627). The CFI-alloc-tag is the CI tag placed on the loader ADD instruction above denoting that the ADD instruction is allowed to allocate or generate a next tag in the application specific CFI sequence. CFI-alloc-tag may be one of the special instruction types of 1624 as described in connection with the example 1620. The ADD instruction above indicates that the tag on R1 holds the state of the CFI sequence where the state may be the last tag of the sequence previously generated. Execution of the above ADD instruction triggers a rule that generates the next new tag in the CFI sequence and updates the tag on R1 to now be the newly generated tag. Using rule conventions as described elsewhere herein, the following ADD rule may denote the rule triggered by the above ADD instruction:

ADD: (-, CFI-alloc-tag, t1, t1, --)→(-, t1next)

which ensures that the CI tag for the ADDI instruction is CFI-alloc-tag. In this ADD rule, t1 denotes the previous tag in the sequence (saved as the current state of the CFI tag sequence for the application) which is used to generate the next tag, t1next, in the sequence, where t1next is then stored as the tag for RD (the destination or result register). The foregoing tag, t1next, in the CFI sequence may be used as the unique CFI source tag placed on a source point.

Element 1724 may be an instruction of the loader code, such as a ST (store) instruction below, used to trigger a rule that tags a source location with the unique CFI source tag:

ST R1→R3 where R3 is a pointer to the control flow source location in the user program code (e.g., 1704a in the example 1700) being tagged, and the tag on R1 is the unique CFI source tag to be placed on the source location. The above ST instruction may also be tagged with a special CI tag, such as CI-LDR, denoting the ST instruction is included in loader code triggering rule ST below:

ST: (-, CI-LDR, t1, -, codetag)→(-, t1)

where CI tag=CI-LDR, t1 is the CFI source tag currently stored as the tag on R1, and codetag is an instruction tag on the source location at address R3 (e.g., ensuring that the source location is currently tagged as code). As a result, the destination (R3) is tagged with t1, the unique CFI source tag.

Element 1725 may be an instruction of the loader code, such as an ADD instruction below, used to trigger a rule that adds the address of the source (e.g., currently pointed to by R3, where R3 contains the address of the source) to an accumulated set of CFI source tags denoting allowable source locations that can transfer control to the target:

ADD R2←R2+R3 where the tag on R2 points to a memory location denoting the accumulated set of allowable source locations. The above ADD instruction may be tagged with a special CFI UNION instruction tag denoting that this ADD instruction is performing a union operation of CFI sources and the union is stored as a tag on R2. The following rule for ADD may be fired as a result of the above ADD instruction:

ADD: (-, CFI UNION, tset, tsrc, -)→(-, tunion)

which checks to ensure that the CI tag is CFI UNION, tset is a target set, and tsrc is a source tag. It produces a new CFI set, tunion, that represents the addition of tsrc to tset.

Element 1726 may be an instruction of the loader code, such as a ST instruction below, used to trigger a rule that tags the target with the union or accumulated list of allowable source locations that can transfer control to the target:

ST R2→R17

R17 may be a register containing the address of the target location, and R2 may be, as noted above, a register tagged with the current accumulated set union of allowable source locations (e.g., tag on R2 denotes the set of allowable source locations for the target location whose address is contained in R17). The above ST instruction may be tagged with a special instruction tag CFI MARK TARGET denoting the instruction as a special one that is allowed to tag a control transfer target location (e.g., this STORE instruction 1726 of the loader code may have been tagged by kernel code in a manner similar to other code tags on load code instructions that trigger rules to perform processing of 1720). The following ST rule may be triggered as a result of the above STORE instruction for 1726:

ST: (-, CFI MARK TARGET, tset,-, codetag)→(-, tset)

which triggers when CI tag is CFI MARK TARGET and the target (pointed to by R17, wherein R17 includes the target address) is tagged with codetag indicating an instruction, and places the tset annotation onto the target.

Different tag structures or layouts that may be defined for use with sources, targets and the set of allowable source locations are described elsewhere herein as well as any other suitable structure definition (e.g., see examples 240, 250, 260, 267, 270 and 280 describing tag layouts for use with tagged source and target locations that may be used more generally with any instruction as well as in connection with multiple instructions per tagged word).

Thus, the processing steps described above as in the example 1720 may be performed by having code of the loader properly tagged so that when such loader code is executed, rules are fired which cause the steps of the example 1720 to be performed by the metadata processing domain in an embodiment in accordance with techniques herein. It should be noted that the foregoing sequence of instructions and fired rules as a result of the instructions are merely one examples of instructions and rules that may be used in an embodiment using techniques herein. For example, an embodiment may include a different instruction other than an ADD in loader code that triggers a rule performing processing as described above (e.g., element 1725).

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the preferred embodiment of the present disclosure are an example and the present disclosure is not limited to the exact details shown or described.

Various aspects of techniques described herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with various embodiments shown and described in detail, their modifications and improvements thereon will become readily apparent to those skilled in the art. Accordingly, the spirit and scope of the present invention should be limited only by the following claims.

What is claimed is:

1. A method comprising:
   at an input/output (IO) metadata processor having a cache configured to store one or more rules, receiving, from a first fabric, a direct memory access (DMA) request directed to an address of a second fabric;
   generating an unvalidated request to obtain DMA data, the unvalidated request (i) being based on the DMA request and at least one of the one or more rules triggered by the DMA request, and (ii) being generated prior to a validation, by the IO metadata processor, of the DMA request;
   obtaining DMA data that was requested by the unvalidated request, the DMA data located at the address of the second fabric and obtaining tags associated with the DMA data;
   attempting to load at least one of the one or more rules from the cache of the IO metadata processor based on the tags obtained, wherein the at least one rule based on the tags obtained indicates a set of addresses;
   when the at least one rule based on the tags obtained is not found in the cache, executing rule miss handling; and
   when the at least one rule based on the tags obtained is found in the cache, allowing the DMA request.

2. The method of claim 1, wherein the first fabric is an untrusted fabric, and the second fabric is a trusted fabric.

3. The method of claim 2, further comprising:
   when the DMA request is allowed, allowing reading of the address of the trusted fabric; and
   when the DMA request is allowed and the DMA request is a write request, allowing write back to the address of the trusted fabric.

4. The method of claim 3, wherein allowing reading of the address and allowing write back is performed over an output channel between the IO metadata processor and the untrusted fabric.

5. The method of claim 2, further comprising storing device state information in an untrusted fabric device register file.

6. The method of claim 2 wherein obtaining the DMA data is over an initial channel from the trusted fabric to the IO metadata processor, the channel being isolated from the untrusted fabric.

7. The method of claim 2, wherein the untrusted fabric is at least one of a network device, ethernet DMA device, universal asynchronous receiver/transmitter (UART), and serial communication device.

8. The method of claim 2, wherein executing rule cache miss handling includes at least one of (i) rejecting the DMA request and (ii) redirecting the DMA request to an address separate from the trusted fabric.

9. The method of claim 1, wherein executing rule cache miss handling includes sending, from the IO metadata processor, an interrupt to a processor connected with the IO metadata processor.

10. The method of claim 2, wherein the DMA data includes at least one of an operation group, a tag identifying a state of the untrusted fabric, a tag identifying the untrusted fabric, a tag indicating a trust level of the untrusted fabric, a memory input tag, an enable byte tag, a memory result tac, and tag of a state of the untrusted fabric state after the DMA request is processed.

11. A system comprising:
    an input/output (IO) cache; and
    an input/output (IO) metadata processor coupled to a memory with computer code instructions stored thereon, the IO metadata processor having a cache configured to store one or more rules, the computer code instructions, when executed by the IO metadata processor, cause the system to:
    receive, from a first fabric, a direct memory access (DMA) request directed to an address of a second fabric;
    generate an unvalidated request to obtain DMA data, the unvalidated request (i) being based on the DMA request and at least one of the one or more rules triggered by the DMA request, and (ii) being generated prior to a validation, by the IO metadata processor, of the DMA request;
    obtain DMA data that was requested by the unvalidated request, the DMA data located at the address of the second fabric and obtain tags associated with the DMA data; and
    attempt to load at least one of the one or more rules from the IO cache of the IO metadata processor based on the tags obtained, wherein the at least one rule based on the tags obtained indicates a set of addresses;
    when the at least one rule based on the tags obtained is not found in the IO cache, execute rule miss handling;
    when the at least one rule based on the tags obtained is found in the IO cache, allowing the DMA request.

12. The system of claim 11, wherein the first fabric is an untrusted fabric, and the second fabric is a trusted fabric.

13. The system of claim 12, wherein the IO metadata processor is further configured to:
    when the DMA request is allowed, allow reading of the address of the trusted fabric; and
    when the DMA request is allowed and the DMA request is a write request, allow write back to the address of the trusted fabric.

14. The system of claim 13, wherein allowing reading of the address and allowing write back is performed over an output channel between the IO metadata processor and the untrusted fabric.

15. The system of claim 12, wherein the IO metadata processor is further configured to store device state information in an untrusted fabric device register file.

16. The system of claim 12 wherein the IO metadata processor is configured to obtain the DMA data over an initial channel from the trusted fabric to the IO metadata processor, the channel being isolated from the untrusted fabric.

17. The system of claim 12, wherein the untrusted fabric is at least one of a network device, ethernet DMA device, universal asynchronous receiver/transmitter (UART), and serial communication device.

18. The system of claim 12, wherein execution of rule cache miss handling includes at least one of (i) rejection of the DMA request and (ii) redirection of the DMA request to an address separate from the trusted fabric.

19. The system of claim 12, wherein execution of rule cache miss handling includes conveyance, from the IO metadata processor, of an interrupt to a processor connected with the IO metadata processor.

20. The system of claim 12, wherein the DMA data includes at least one of an operation group, a tag identifying a state of the untrusted fabric, a tag identifying the untrusted fabric, a tag indicating a trust level of the untrusted fabric, a memory input tag, an enable byte tag, a memory result tac, and tag of a state of the untrusted fabric state after the DMA request is processed.

\* \* \* \* \*